(12) United States Patent
Ma et al.

(10) Patent No.: US 12,179,173 B2
(45) Date of Patent: Dec. 31, 2024

(54) FUNCTIONALIZED POROUS ORGANIC POLYMERS AS URANIUM NANO-TRAPS FOR EFFICIENT URANIUM EXTRACTION

(71) Applicant: UNIVERSITY OF SOUTH FLORIDA, Tampa, FL (US)

(72) Inventors: Shengqian Ma, Tampa, FL (US); Qi Sun, Tampa, FL (US); Briana Aguila, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 18/170,463

(22) Filed: Feb. 16, 2023

(65) Prior Publication Data

US 2024/0109051 A1 Apr. 4, 2024

Related U.S. Application Data

(63) Continuation of application No. 16/961,158, filed as application No. PCT/US2019/013394 on Jan. 12, 2019, now Pat. No. 11,628,419.

(51) Int. Cl.
| | | |
|---|---|---|
| B01J 20/26 | (2006.01) |
| B01J 20/28 | (2006.01) |
| B01J 20/30 | (2006.01) |
| C08F 112/34 | (2006.01) |
| G21F 9/12 | (2006.01) |

(52) U.S. Cl.
CPC ....... *B01J 20/267* (2013.01); *B01J 20/28066* (2013.01); *B01J 20/28071* (2013.01); *B01J 20/2808* (2013.01); *B01J 20/28083* (2013.01); *B01J 20/3085* (2013.01); *C08F 112/34* (2013.01); *G21F 9/12* (2013.01); *C08F 2810/00* (2013.01)

(58) Field of Classification Search
CPC ............... B01J 20/267; B01J 20/28066; B01J 20/28071; B01J 20/2808; B01J 20/28083; B01J 20/3085; C08F 112/34; G21F 9/12
See application file for complete search history.

(56) References Cited

U.S. PATENT DOCUMENTS

| | | | | |
|---|---|---|---|---|
| 3,845,014 A | * | 10/1974 | Frank et al. ........ | C08G 18/3819 528/68 |
| 11,628,419 B2 | * | 4/2023 | Ma ..................... | B01J 20/28083 502/402 |
| 2009/0130849 A1 | | 5/2009 | Lee | |
| 2013/0248778 A1 | | 9/2013 | Goto et al. | |
| 2014/0162872 A1 | | 6/2014 | Bohringer et al. | |
| 2014/0255794 A1 | | 9/2014 | Zhang et al. | |
| 2014/0294701 A1 | * | 10/2014 | Dai ............................ | C22B 3/24 423/7 |
| 2015/0190779 A1 | | 7/2015 | Ma et al. | |
| 2016/0367948 A1 | | 12/2016 | Song et al. | |
| 2017/0225969 A1 | | 8/2017 | Ma et al. | |
| 2017/0355621 A1 | | 12/2017 | Gill et al. | |
| 2020/0206691 A1 | | 7/2020 | Jaber et al. | |

FOREIGN PATENT DOCUMENTS

| | | |
|---|---|---|
| GB | 1344943 A | 1/1974 |
| JP | 861157344 A | 7/1986 |
| JP | 861219718 A | 9/1986 |
| JP | H01284336 A | 11/1989 |
| WO | 1991018026 | 11/1991 |
| WO | 2012036034 A1 | 3/2012 |
| WO | 2017205722 A1 | 11/2017 |
| WO | 2019140338 A1 | 7/2019 |
| WO | 2019140339 A1 | 7/2019 |

OTHER PUBLICATIONS

Jan Zareba, Inorganic Chemistry Communications, (2017), v.86, p. 172-186.*
Japan Patent Office, Notice of Reasons for Rejection, Application No. 2020-538594, Jan. 5, 2023, 13 pages.
International Search Report of Related Application No. PCT/US2019/013393, dated May 2, 2019, 4 pages.
Written Opinion of Related Application No. PCT/US2019/013393, dated May 2, 2019, 8 pages.
International Search Report of Related Application No. PCTUS2019013394, dated Apr. 25, 2019, 5 pages.
Written Opinion of Related Application No. PCTUS2019013394, dated Apr. 25, 2019, 10 pages.
MA "Functionalized Porous Organic Polymers as Uranium Nano-Traps for Efficient Recovery of Uranium from Seawater" Univ. of South Florida, Tampa, FL (United States), 2018. 16 pages.
Sun et al., "Bio-inspired nano-traps for uranium extraction from seawater and recovery from nuclear waste" Nat Commun. Apr. 2, 20184;9(1):1644. 9 pages.

(Continued)

*Primary Examiner* — Yong L Chu
(74) *Attorney, Agent, or Firm* — Quarles & Brady LLP

(57) ABSTRACT

Compositions are provided for efficient uranium extraction, for example from wastewater, seawater, or other water sources. The compositions can include a functionalized porous organic polymer functionalized with one or more uranium binding moieties, e.g. having a plurality of amidoxime or amidrazone groups covalently attached thereto. The compositions can include covalent organic frameworks, porous aromatic frameworks, and various porous organic polymers, especially those having a hierarchical pore size distribution over a range of pore sizes. The compositions can have functional groups such as amidoxime or an amidrazone covalently attached thereto. The hierarchical pore size distribution can be determined based upon at least 60% of the pore sizes in the range of pore sizes having a pore volume of at least 0.01 $cm^3$ $g^{-1}$ in the pore size distribution at 77 K. Methods of making the compositions and methods of using the compositions are also provided.

7 Claims, 80 Drawing Sheets

(56) References Cited

OTHER PUBLICATIONS

ZAREBA "Tetraphenylmethane and tetraphenylsilane as building units of coordination polymers and supramolecular networks—A focus on tetraphosphonates." Inorganic Chemistry Communications 86 (2017): 172-186.

* cited by examiner

FIG> 33B

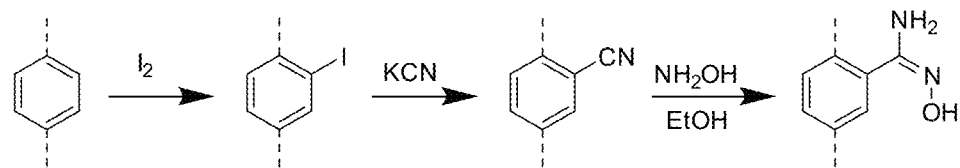
FIG. 49A
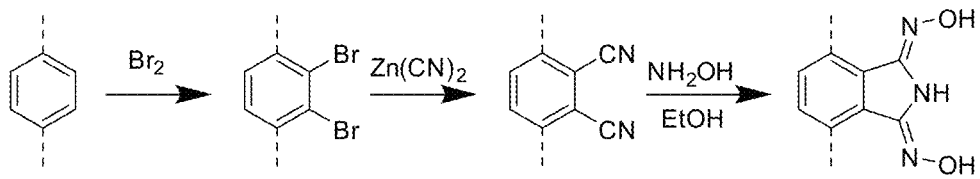
FIG. 49B
FIG. 49C
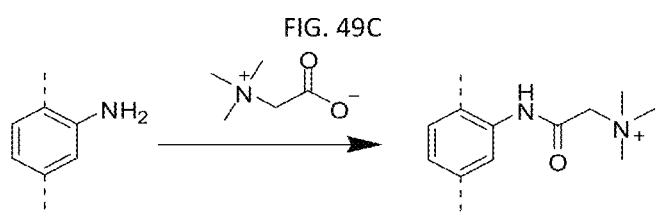
FIG. 50
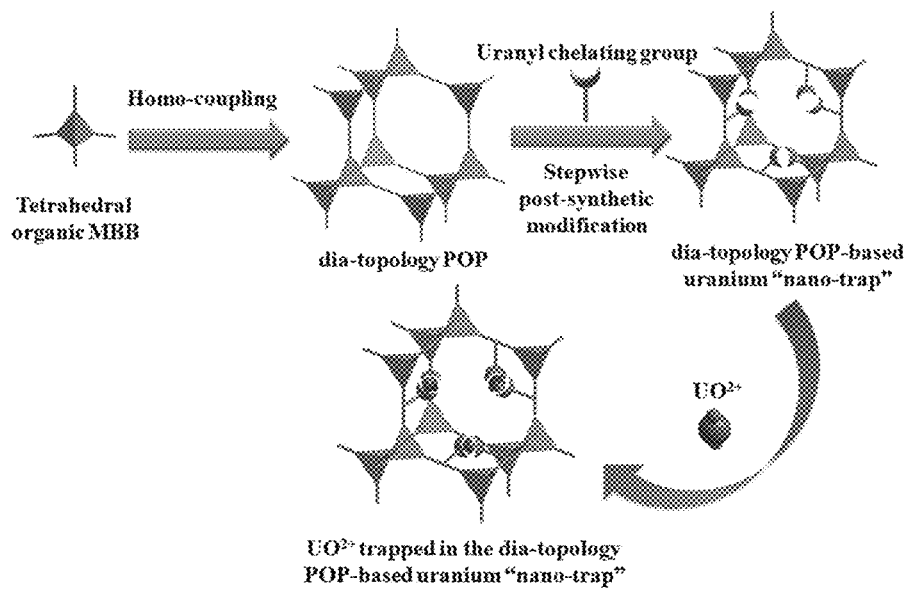
FIG. 51

FUNCTIONALIZED POROUS ORGANIC POLYMERS AS URANIUM NANO-TRAPS FOR EFFICIENT URANIUM EXTRACTION

CROSS-REFERENCE TO RELATED APPLICATIONS

This application is a continuation of U.S. patent application Ser. No. 16/961,158 filed Jul. 9, 2020, now U.S. Pat. No. 11,628,419 which is the 35 U.S.C § 371 national stage application of PCT Application No. PCT/US2019/013394, which claims priority to, and the benefit of, U.S. Provisional Patent Application entitled "Functionalized Porous Organic Polymers as Uranium Nano-Traps for Efficient Uranium Extraction from Seawater and Recovery from Nuclear Waste" having Ser. No. 62/616,914, filed Jan. 12, 2018, the contents of each of which are incorporated by reference in their entirety.

STATEMENT REGARDING FEDERALLY SPONSORED RESEARCH OR DEVELOPMENT

This invention was made with government support DE-NE0008281 awarded by the Department of Energy. The Government has certain rights in the invention.

TECHNICAL FIELD

The present disclosure generally relates to porous materials.

BACKGROUND

Nuclear energy remains at the forefront of low carbon energy sources in an age when climate change has become a serious threat to humanity and at a time when society is in need of alternative energies to replace fossil fuels.[1] The irreplaceable role of the radionuclides is contrasted with their extreme toxicity, raising serious concerns about the hazardous impact of radioactive and toxic waste and thereby motivating the development of new technologies to provide enhanced protection.[2] To efficiently remove and recover radionuclides, it necessitates advanced sorbent materials with not only high binding affinity and selectivity but also rapid kinetics and large capacity.[3] Slow adsorption kinetics and low adsorption capacity significantly diminishes the practical utility for the traditional porous materials such as clays, activated carbons, and zeolites.[4] Amorphous porous organic polymers are potential candidates[5] but their performance is often compromised by buried chelating sites stemmed from the small and irregular pores. In addition, their poorly defined structures complicate characterization and rational improvement. Metal-organic frameworks (MOFs) have been developed for nuclear waste removal based on their crystallinity and amenability to design, but stable performance under a wide range of conditions, such as pH values, remains a challenge.[6] Moreover, adsorbent capacities suffer due to the comparatively large weight fraction attributable to metals comprising the MOF secondary building units. Therefore, porous materials formed solely of light elements that meet the requirements of capacity and stability together with a deliberate and precise preparation are highly desirable.

The long-term use of nuclear power for energy applications relies on the secure and economical supply of nuclear fuel.[103] Among various natural sources of uranium for use in nuclear reactors, sea water is highly appealing given that the oceans contain about 4.5 billion tons of dissolved uranium, almost 1000-fold that estimated for mineral reserves.[104] Nonetheless, the concentration of uranium in seawater is extremely low (3-3.3 mg/L or 3-3.3 ppb); this, coupled with the presence of relatively high concentration of other metal ions, makes uranium recovery from seawater a challenge which requires the development of efficient and effective separation processes.[105] Various adsorbent technologies based upon synthetic organic polymers, biopolymers, inorganic materials, mesoporous silica materials, porous carbon-based adsorbents, and ionic liquids have been widely developed for the extraction of uranium from seawater.[106] However, these benchmark sorbent materials suffer from a number of drawbacks such as low adsorption capacity (typically 0.1~3.2 mg-U/g adsorbent), poor selectivity, and slow kinetics.[107] Hence, there is a need for developing new adsorbent materials with high loading capacity and high selectivity of U (VI) ions.

SUMMARY

In various aspects, compositions and methods of making and methods of use thereof are provided that overcome one or more of the aforementioned deficiencies. In some aspects, the compositions include a porous organic polymer having a plurality of amidoxime or amidrazone groups covalently attached thereto.

In some aspects, the composition is a covalent organic framework. For example, the composition can include a covalent organic framework (COF) having a plurality of two-dimensional polymers (2d-polymers), each made of repeat units according to the following formula, where each occurrence of $R^1$ is independently a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone, and where n is an integer from 2 to 12; wherein each of the 2d-polymers in the plurality of 2d-polymers stacks via non-covalent interactions to form a plurality of pores.

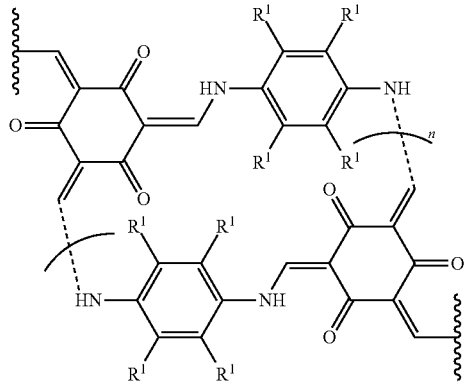

The compositions can include a porous aromatic framework. For example, the composition can include a porous aromatic framework (PAF) made of a plurality of repeat units having a structure according to the following formula and having a plurality of pores; where each occurrence of $R^1$ is independently a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone.

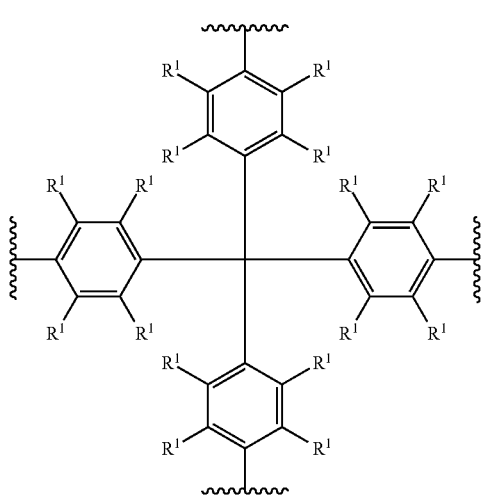

In some aspects, the compositions include a porous organic polymer having (i) a plurality of repeat units each having a structure according to any one of Formula 1A-Formula 1C; and (ii) a plurality of pores having a hierarchical pore size distribution over a range of pore sizes; where each occurrence of $R^1$ is independently a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone; where each occurrence of $R^2$ is independently an alkyl having 1 to 3 carbon atoms; where each occurrence of $R^3$ is independently none or a substituted or unsubstituted alkyl or heteroalkyl having 1 to 5 carbon atoms; and where each occurrence of $A^2$ is independently none or a substituted or unsubstituted phenyl.

Formula 1A

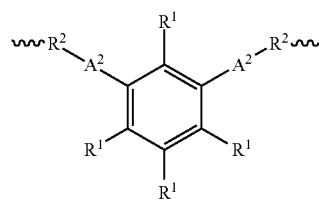

Formula 1B

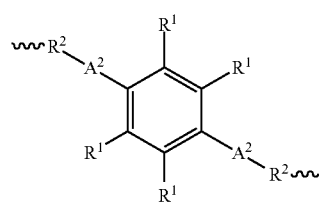

Formula 1C

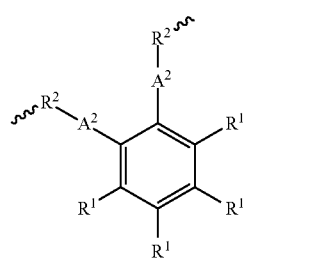

The compositions can have a hierarchical pore size distribution. In some aspects, the range of pore sizes is at least 5 nm, at least 8 nm, or at least 10 nm. In some aspects, the range of pore sizes is about 1 nm to 10 nm, about 1 nm to 8 nm, about 1 nm to 5 nm, or about 5 nm to 10 nm. The hierarchical pore size distribution can be determined based upon at least 60% of the pore sizes in the range of pore sizes having a pore volume of at least 0.01 $cm^3$ $g^{-1}$ in the pore size distribution, wherein the pore size distribution is based on a non-local density functional theory model applied to a nitrogen adsorption isotherm for the POP measured at 77 K. In some aspects, the range of pore sizes is about 1 nm to about 10 nm; and at least 80% of the pore sizes in the pore size distribution have a pore volume of at least 0.01 $cm^3$ $g^{-1}$.

The compositions can have a strong affinity for uranium and high uptake capacity. For example, the composition can in some aspects have a maximum uranium uptake capacity of 1,000 mg $g^{-1}$ to 2,000 mg $g^{-1}$ at 1 atm and 296 K. In some aspects, the composition has a distribution coefficient for uranium of $3\times10^7$ mL $g^{-1}$ to $1\times10^9$ mL $g^{-1}$. In some aspects, the composition attains at least 90% of the equilibrium adsorption capacity in less than 10 minutes when placed in an aqueous solution containing the uranium. The uptake capacity can be stable and recyclable and/or stable under basic conditions.

Methods of making the compositions and methods of using the compositions for uranium trapping and sequestration are also provided. Other systems, methods, features, and advantages of compositions and methods will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIGS. 1B-1C) Graphic view of the slipped AA stacking structure of COF-TpDb (hydrogen is omitted for clarity). (FIG. 1D) Graphic view of COF-TpDb-AO (hydrogen is omitted for clarity).

(FIG. 2B) AA stacking mode of COF-TpDb. (FIG. 2C) AB stacking mode of COF-TpDb. (FIGS. 2D-2E) Nitrogen-sorption isotherm curves measured at 77 K for COF-TpDb and COF-TpDb-AO, respectively. (FIG. 2F) IR spectra. (FIG. 2G) Solid-state $^{13}C$ NMR spectra.

(FIG. 3B) Enlarged section of rectangle in FIG. 3A. (FIG. 3C) The kinetics of uranium adsorption from aqueous solution with an initial concentration of 9.25 ppm (400 mL), at pH~6, and adsorbent material (4.5 mg).

(FIG. 4B) The functionalization of amorphous porous organic polymers, illustrating the blockage of narrow pore channels and bottlenecks. Pore-blocking is likely to impede access of metal ions to the functional sites in POPs.

(FIG. 6B) Fourier transform of the U $L_{III}$-edge EXAFS spectrum of COF-TpDb-AO in R-space. The magnitude of the Fourier transform and the real component are both fit with a line. (FIG. 6C) Accompanying $k^2$-weighted $\chi(k)$ data and fit. Dashes denote the fit window.

(FIG. 13B) IR spectra of POP-TpDb and POP-TpDb-AO, respectively.

(FIG. 22B) IR spectra of POP-TpAab and POP-TpAab-AO, respectively.

(FIG. 23B) Enlarged section of green rectangle in a. (FIG. 23C) The kinetics of uranium adsorption from aqueous solution with an initial concentration of 9.25 ppm (400 mL), at pH~6, and adsorbent material (5 mg).

(FIG. 28B) Accompanying k2-weighted $\chi(k)$ data and fit. Dashes denote the fit window.

(FIG. 31A) FT-IR spectra, (FIG. 31B) $^3$C CP/MAS NMR spectra, (FIG. 31C) N$_2$sorption isotherms, and (FIG. 31D), (FIG. 31E) SEM and TEM images for POP-CN and POP-AO, respectively.

(FIG. 32A) Uranium sorption isotherms for POP based adsorbents. The lines are fit with the Langmuir model, all the fits have R$^2$ values higher than 0.99. (FIG. 32B) The kinetics of uranium adsorption from aqueous solution with an initial concentration (7.56 ppm, 400 mL), at pH~6, and adsorbent material (3 mg). (FIG. 32C) Uranium removal kinetics with an initial concentration of 3560 ppb (pH~6) at a V/m ratio of 50000 mL g$^{-1}$. (FIG. 32D) Enlarged section of rectangle in FIG. 32C.

FIGS. 33A-33B show uranium sorption from simulated seawater. (FIG. 33A) The kinetics of uranium adsorption for various adsorbents in simulated seawater solutions with an initial uranium concentration of 10.3 ppm (400 mL) and adsorbent material (3 mg). (FIG. 33B) The kinetics of uranium removal efficiency from simulated seawater spiked with uranyl (4056 ppb) at V:m=2000 mL g$^{-1}$.

(FIG. 41A) POP-AO, (FIG. 41B) POP-pNH$_2$-AO, and (FIG. 41C) POP-oNH$_2$-AO, respectively.

(FIG. 48B) U adsorption kinetics of POP-based uranium "nano-trap" under the U initial concentration of 10 ppm.

FIGS. 49A-49C show an illustration of stepwise post-synthetic modification to graft amidoxime group (FIG. 49A), phthalimide group (FIG. 49B), and phosphorylurea group (FIG. 49C) to the phenyl ring of POP to afford uranium "nano-trap" for UO$^{2+}$ adsorption.

FIG. 50 shows an illustration of modifying POP-based uranium "nano-trap" with anti bio-fouling ligand trimethylglycine FIG. 51 shows an illustration of the creation of dia-topology POP-based uranium "nano-trap" for UO$^{2+}$ adsorption.

DETAILED DESCRIPTION

Figure 1A:
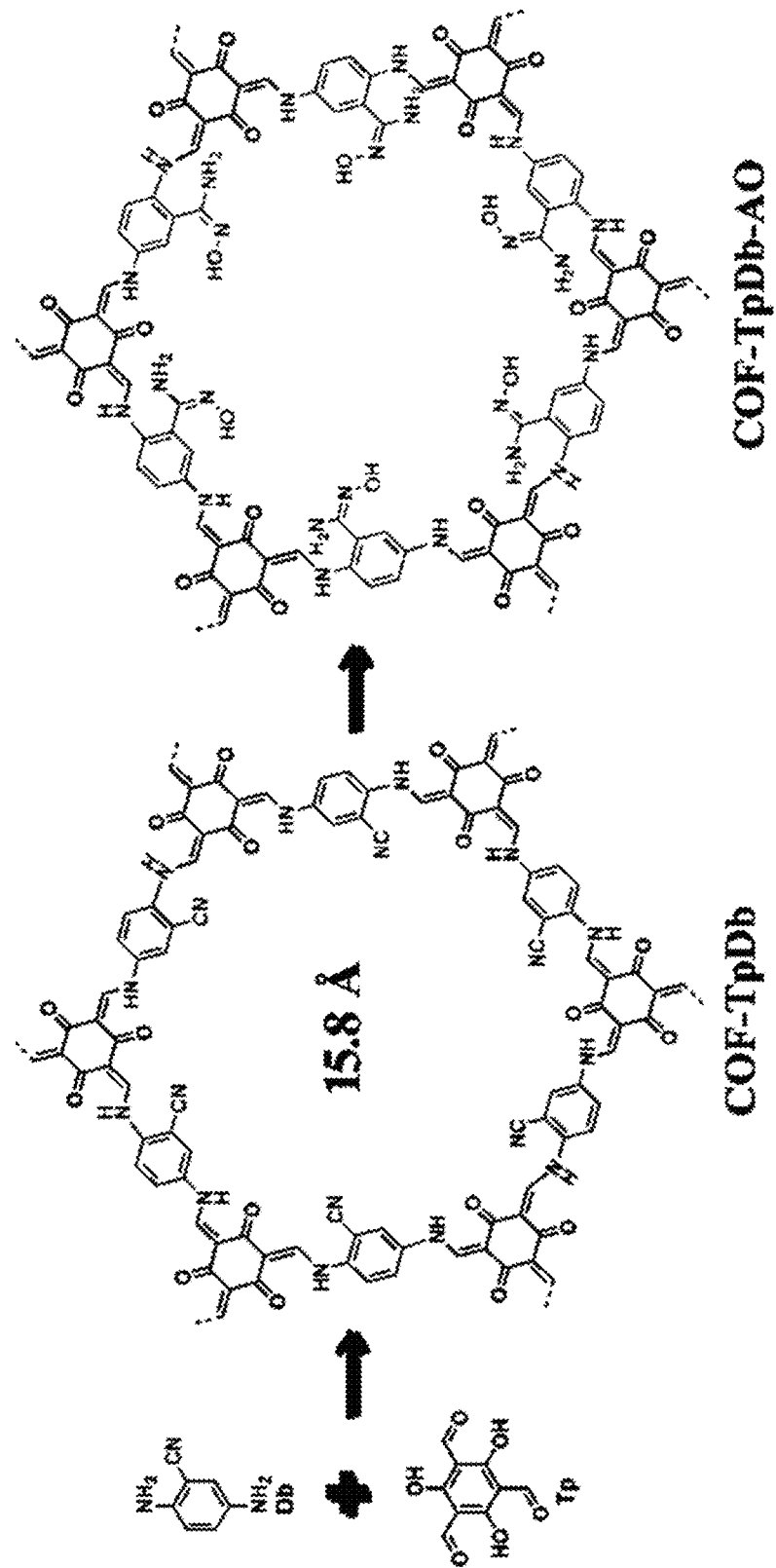
FIGS. 1A-1D show (FIG. 1A) Synthetic scheme of COF-TpDb through the condensation of Tp and db and corresponding chemical transformation from the cyano to amidoxime group, yielding COF-TpDb-AO.
Figure 1D:
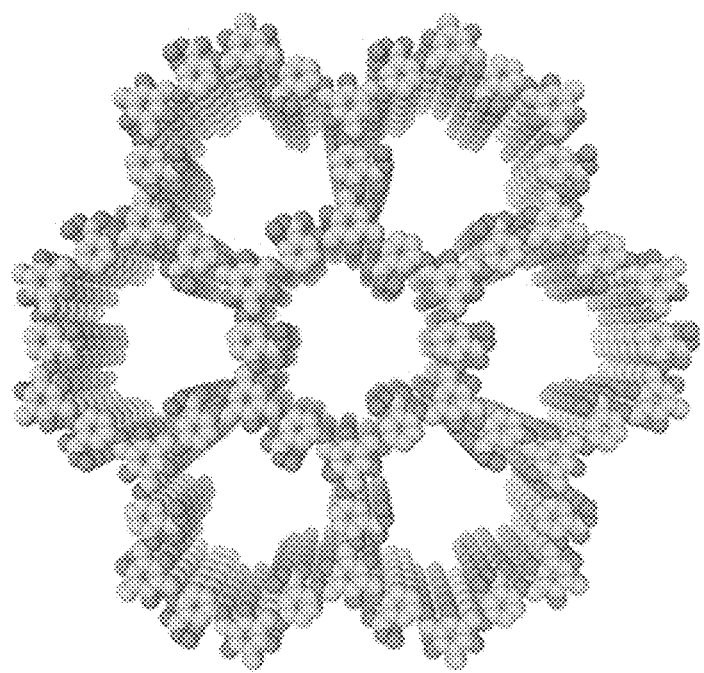
Figure 1C:
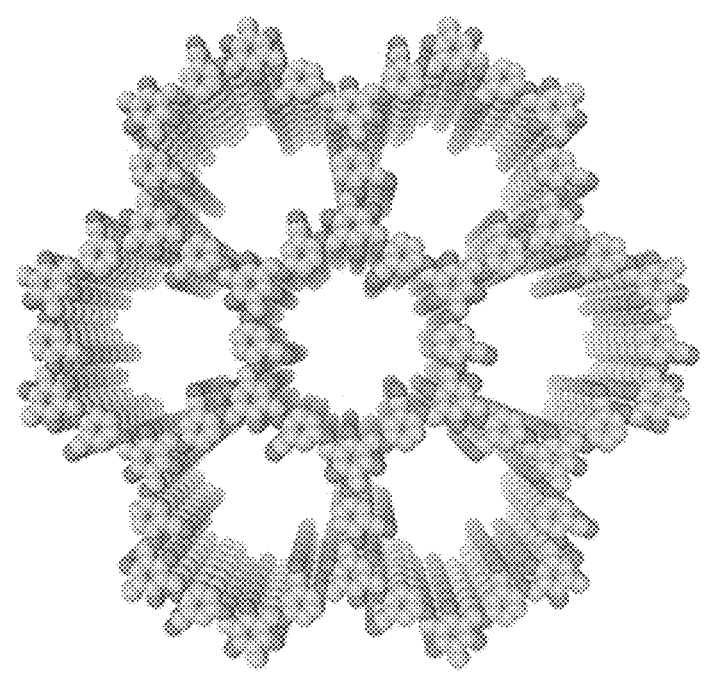
Figure 1B:
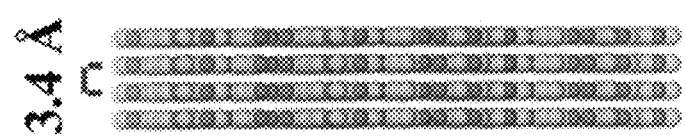

To achieve high efficiency and high effectiveness for uranium recovery from seawater, POPs are provided with nanospaces that are decorated with judiciously selected uranyl chelating groups (e.g. amidoxime, phthalimide, phosphorylurea, etc.) to afford uranium "nano-traps" via stepwise post-synthetic modification of POPs that are constructed through covalent linkage of custom-designed functional organic MBBs under the guidance of "crystal engineering". Two categories of POP-based uranium "nano-traps" are provided: channeled uranium "nano-traps" that contain 1D, 2D, or 3D channels and caged uranium "nano-traps" that include nanoscopic polyhedral cages. Compared with current sorbent materials[106] particularly mesoporous polymers[114] and MOFs[115] recently exploited for uranium extraction, POP-based uranium "nano-traps" can feature the following advantages:
  a. high surface area with high density of uranyl binding groups thus affording high uranium adsorption capacity;
  b. high selectivity/affinity of uranium over other metal ions;
  c. large yet tunable pore size to enable fast yet controllable kinetics of uranium adsorption;
  d. functionalizable exterior surface to avoid bio fouling, which is difficult for other types of adsorbents;
  e. exceptional water/chemical stability facilitating regeneration/recyclability.

The POP-based uranium "nano-traps" offer highly efficient and highly effective recovery of uranium from seawater.

Considering their exceptionally high surface areas and tunable pore sizes, this disclosure demonstrates rational design and synthesis of three families of POP "platforms": dia (diamond)-topology POPs, tbo (twisted boroncite)-topology POPs, and hcb (honeycomb-like)-topology POPs[111a] under the guidance of "crystal engineering", which represents a useful and effective approach to build extended networks with targeted topologies and desired properties as well demonstrated in the MOF area.[116] It has been well documented that the phenyl ring can be functionalized with different groups through various established organic reactions,[117] which makes POPs that are constructed from phenyl ring-derived building blocks readily to be grafted with desired functional groups. Although other uranyl chelating groups may be used, this disclosure will mainly focus on decorating the nanospace of POPs with amidoxime, phthalimide, and phosphorylurea groups given their excellent capability of chelating uranyl ions particularly at the pH of sea water, ~8.1 as well as great stability over a broad pH range.[118] The amidoxime, phthalimide, and phosphorylurea groups will be selectively and controllably grafted to the phenyl rings of the aforementioned POP "platforms" via stepwise post-synthetic modification (FIGS. 49A-49C) to afford POP-based uranium "nano-traps". To avoid bio-fouling, the resulting POP-based uranium "nano-traps" could be further modified with some anti bio-fouling ligands, e.g. trimethylglycine (FIG. 50).

Dia-Topology POP-Based Uranium "Nano-Traps"

Figure 53:
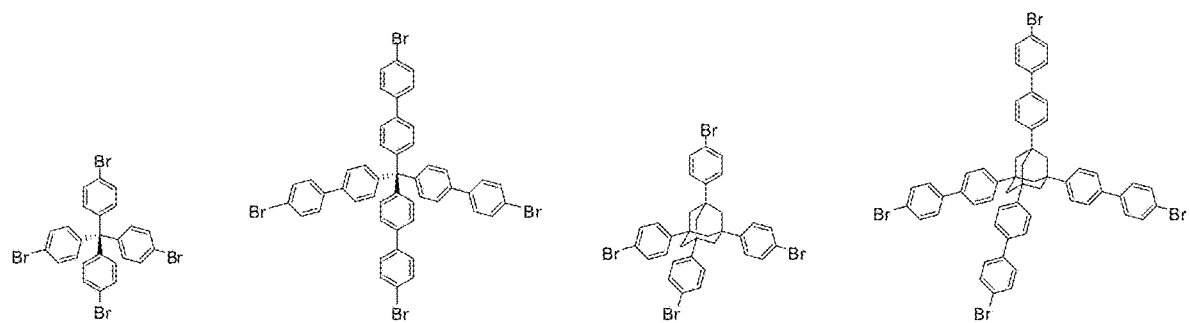
FIG. 53 shows representative custom-designed tetrahedral organic MBBs for the construction of dia-topology POP-based uranium "nano-traps."

According to the principle of "crystal engineering" (or 'reticular chemistry"),[116] bridging the tetrahedral MBBs would result in a dia-topology network. The dia-topology POP will be constructed through the Yamamoto homo-coupling reaction[119] of bromophenylethenyl-terminated tetrahedral functional organic MBBs; the synthesized POP will be then functionalized with the aforementioned uranyl chelating groups via stepwise post-synthetic modification using selected organic reactions (FIG. 49A), thereby affording dia-topology POP-based uranium "nano-trap" containing 3D channels (FIG. 51). The pore sizes and pore chemistry of dia-topology POP-based uranium "nano-traps" will be systematically tuned and tailored using a series of custom-designed tetrahedral functional organic MBBs (FIG. 53).

Tbo-Topology POP-Based Uranium "Nano-Traps"

Figure 52:
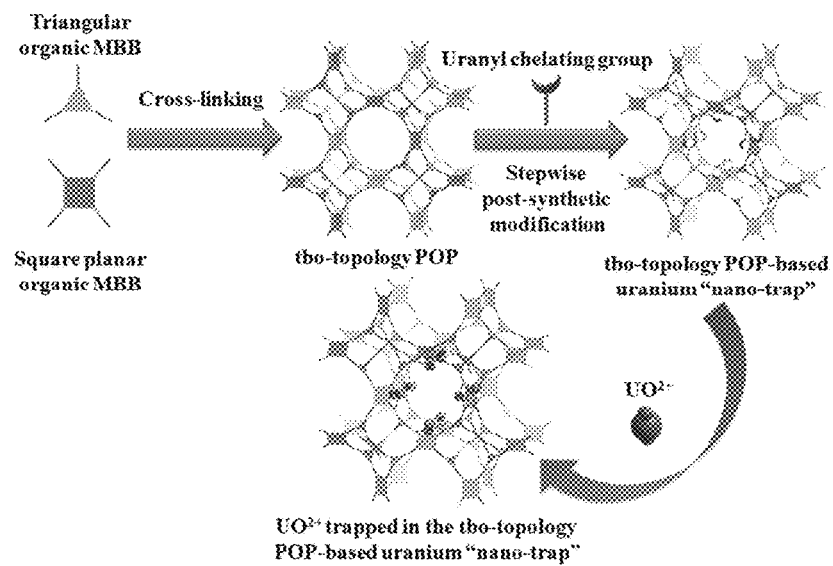
FIG. 52 shows an illustration of the creation of tbo-topology POP-based uranium "nano-trap" for UO$^{2+}$ adsorption.
Figure 54:
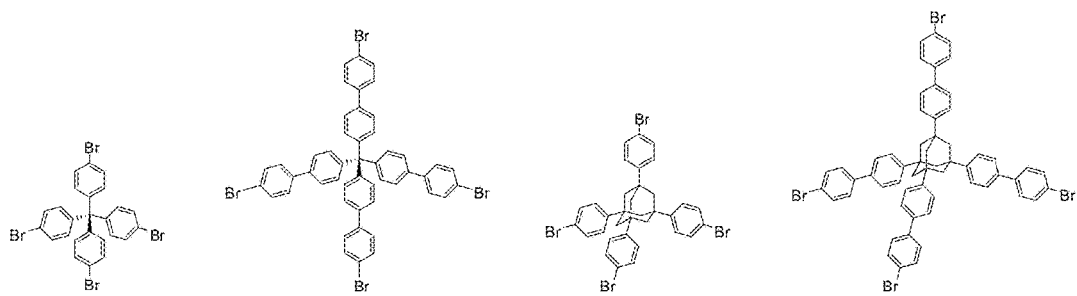
FIG. 54 shows representative custom-designed organic MBBs (top: triangular; bottom: square planar) for the construction of tbo-topology POP-based uranium "nano-traps."

Under the guidance of "crystal engineering",[116] cross-linking the triangular MBB with the square planar MBB would afford a tbo-topology network as exemplified by the prototype MOF of HKUST-1 that consists of polyhedral cages[120]. The tbo-topology POP will be targeted through the cross coupling reaction [121] of the triangular functional organic MBB and the square planar functional organic MBB. The 3D polyhedral cage-containing tbo-topology POP-based uranium "nano-trap" will be achieved by grafting the synthesized POP with the aforementioned uranyl chelating groups via stepwise post-synthetic modification through selected organic reactions (FIG. 52). A series of custom-designed triangular and square planar functional organic MBBs will be employed to systematically tune and tailor the pore sizes and pore chemistry of tbo-topology POP-based uranium "nano-traps" (FIG. 54).

Hcb-Topology POP-Based Uranium "Nano-Traps"

Figure 55:
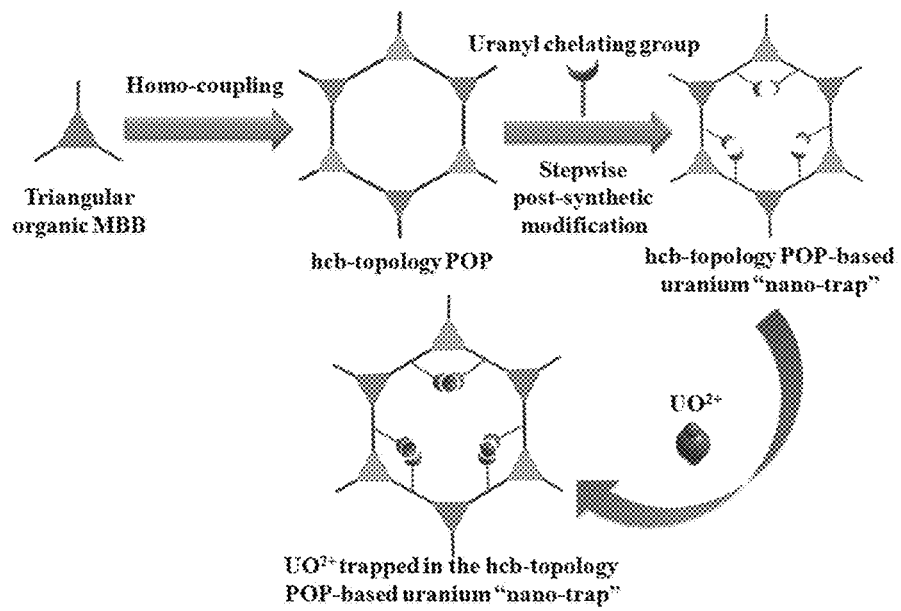
FIG. 55 shows an illustration of the creation of hcb-topology POP-based uranium "nano-trap" for UO$^{2+}$ adsorption.
Figure 56:
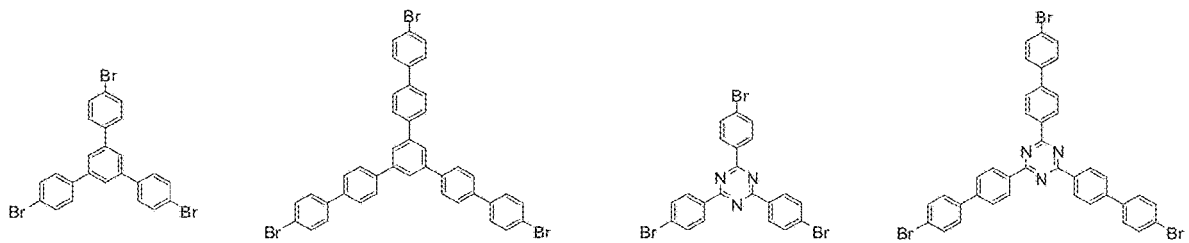
FIG. 56 shows representative custom-designed for the construction of hcb-topology POP-based uranium "nano-trap."
Figure 57:
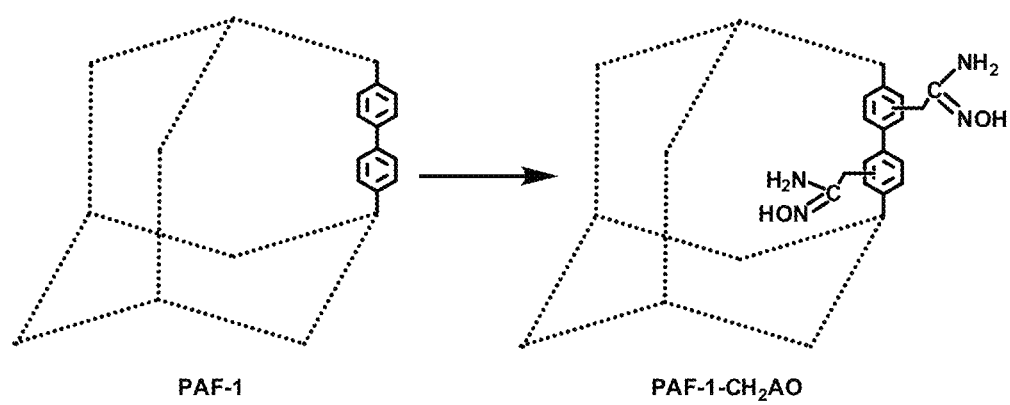
FIG. 57 shows schematic illustration of the creation of POP-based uranium "nano-trap" decorated with amidoxime groups.
Figure 58:
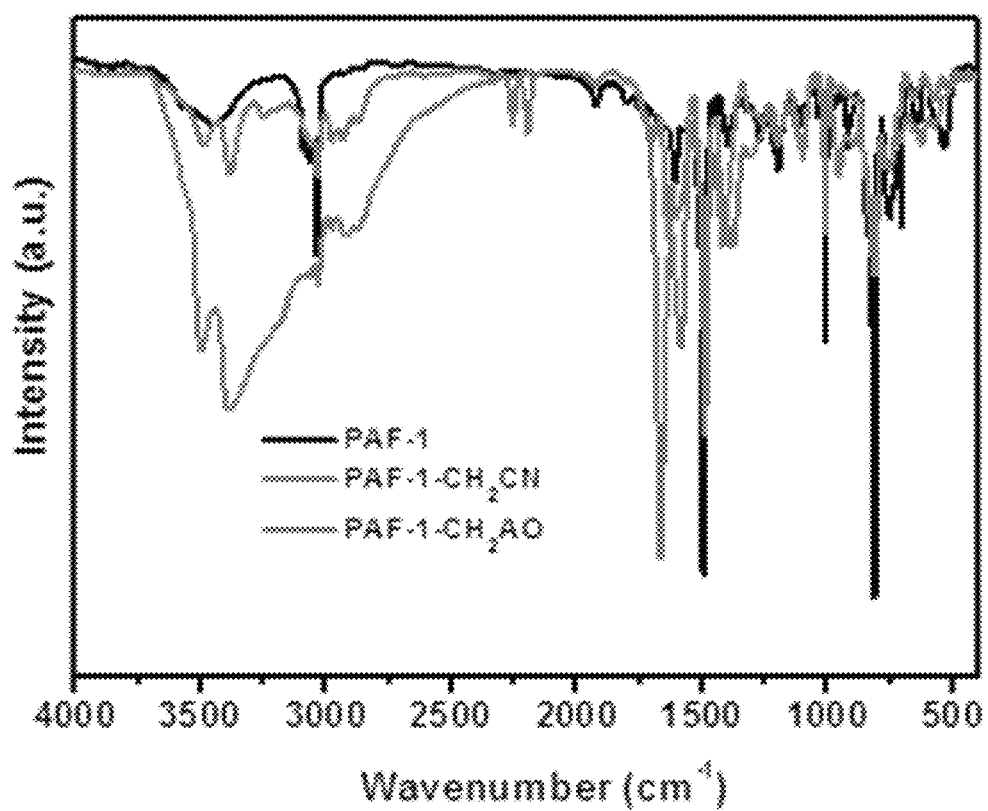
FIG. 58 shows corresponding IR spectra of polymers of FIG. 57.
Figure 59:
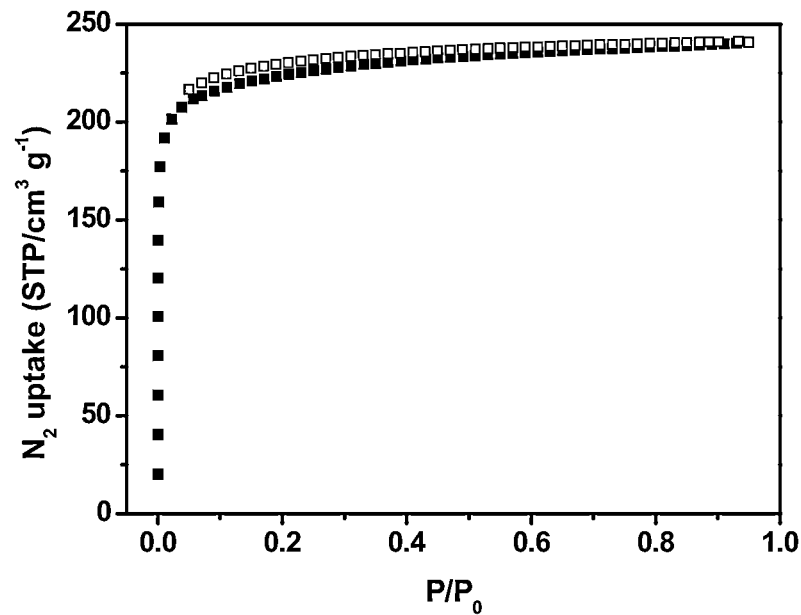
FIG. 59 shows $N_2$ sorption isotherms at 77K (revealing a BET Surface Area of 855 m$^2$ g$^{-1}$)
Figure 60:
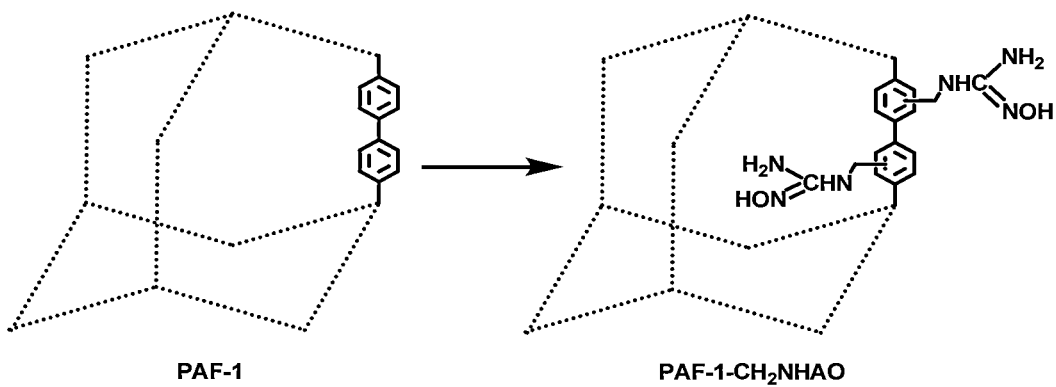
FIG. 60 shows schematic illustration of the creation of POP-based uranium "nano-trap" decorated with acetamidoximate groups.
Figure 61:
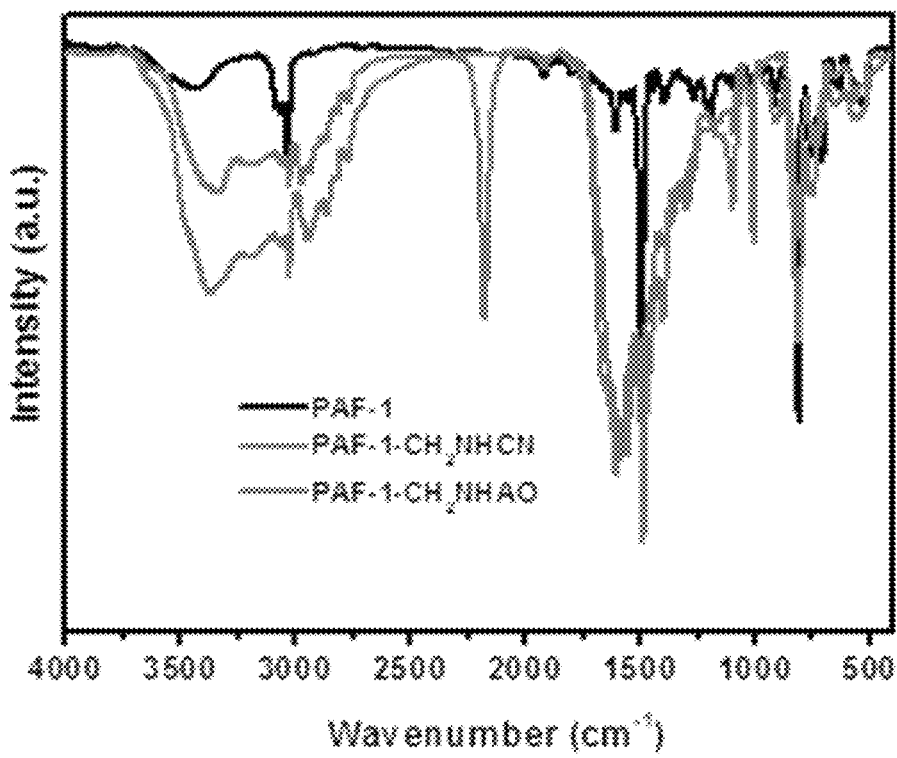
FIG. 61 shows corresponding IR spectra of polymers of FIG. 60.
Figure 62:
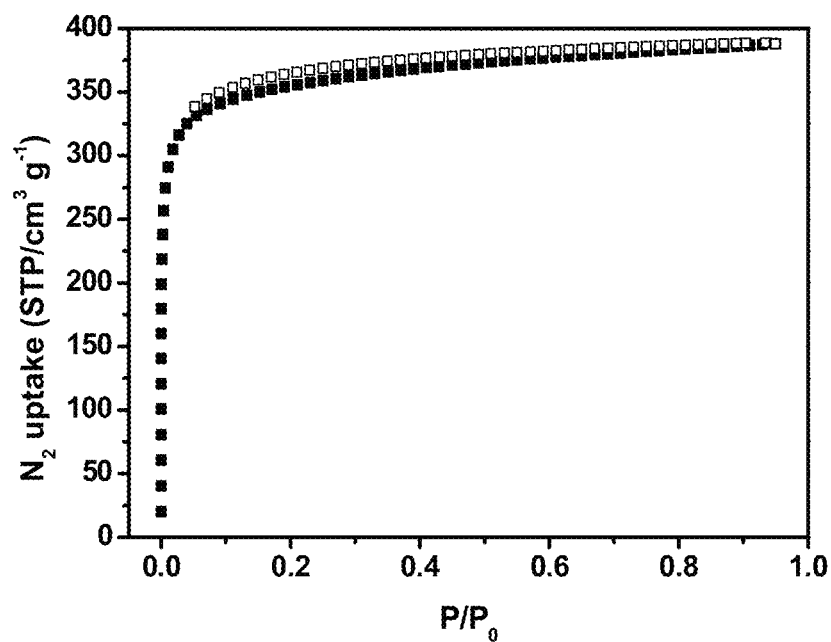
FIG. 62 $N_2$ sorption isotherms at 77K (revealing a BET Surface Area of 1352 m$^2$ g$^{-1}$)
Figure 63:
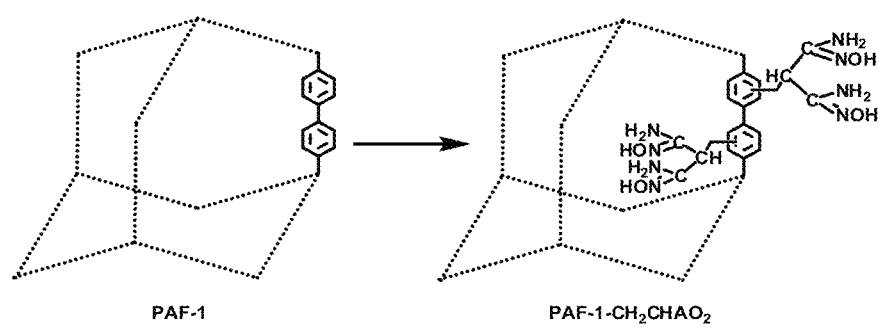
FIG. 63 shows schematic illustration of the creation of POP-based uranium "nano-trap" decorated with diamidoxime groups.
Figure 64:
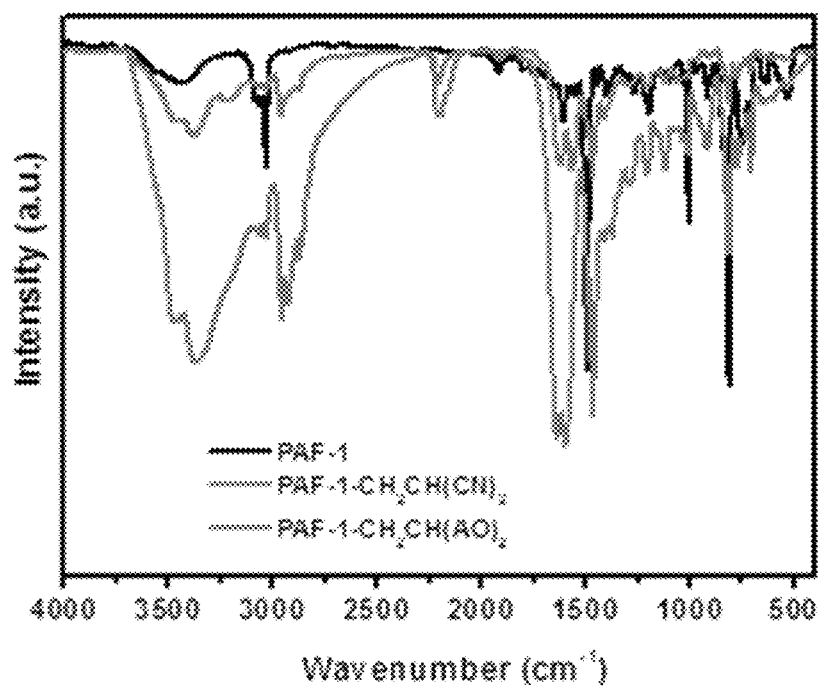
FIG. 64 shows corresponding IR spectra of polymers of FIG. 63.
Figure 65:
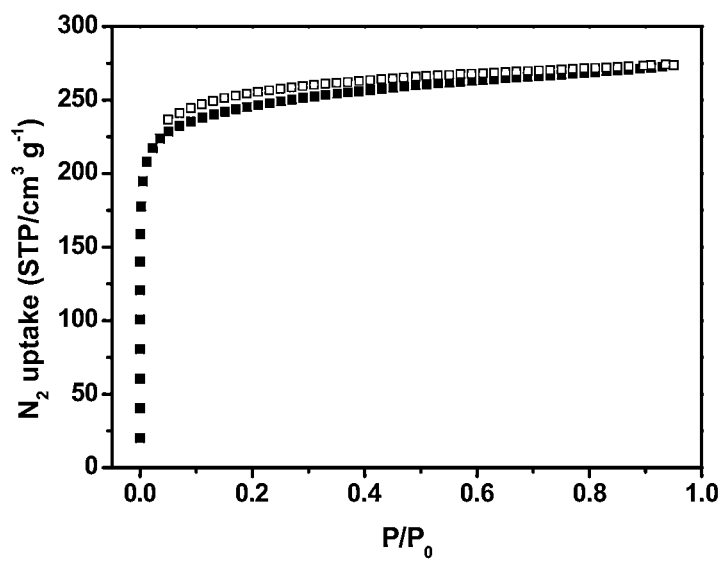
FIG. 65 shows $N_2$ sorption isotherms at 77K (revealing a BET Surface Area of 932 m$^2$g$^{-1}$)
Figure 66:
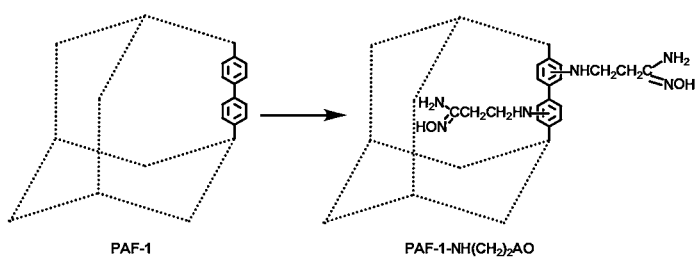
FIG. 66 shows schematic illustration of the creation of POP-based uranium "nano-trap" decorated with 3-amino-N-hydroxy-propionamidine groups.
Figure 67:
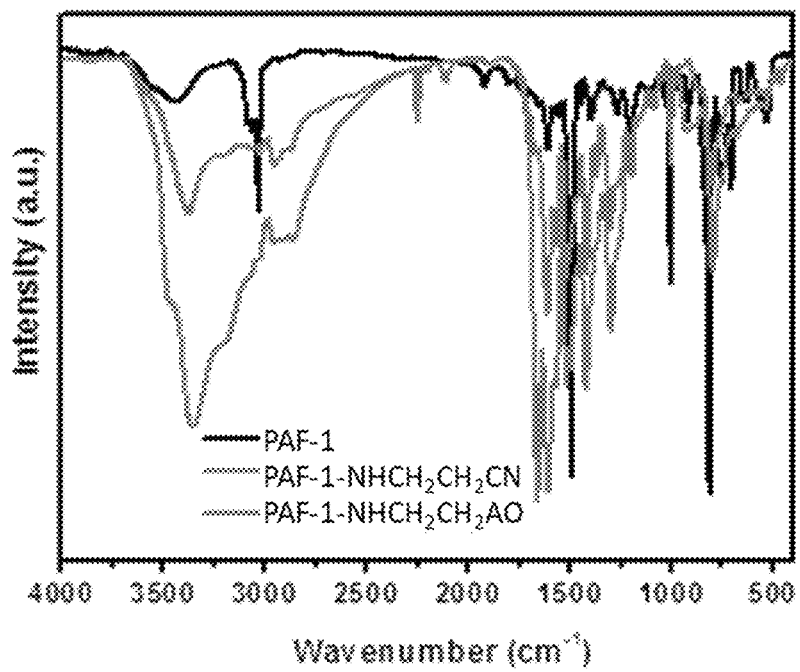
FIG. 67 shows corresponding IR spectra of polymers of FIG. 66.
Figure 68:
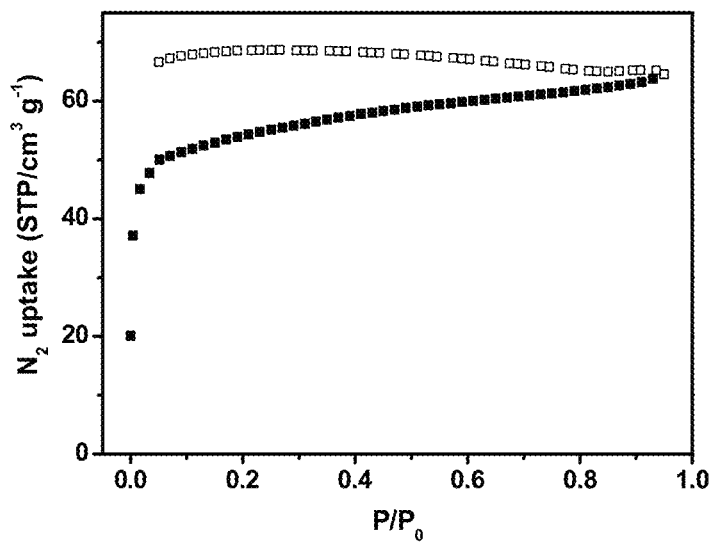
FIG. 68 shows $N_2$ sorption isotherms at 77K (revealing a BET Surface Area of 204 m$^2$g$^{-1}$)
Figure 69:
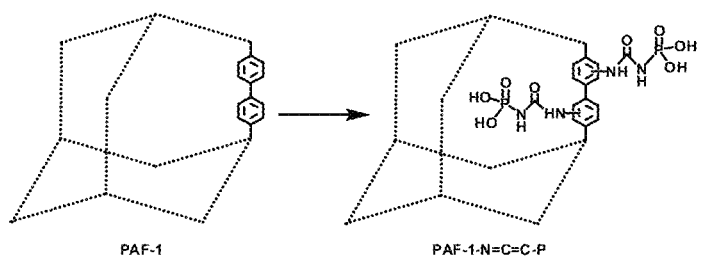
FIG. 69 shows schematic illustration of the creation of POP-based uranium "nano-trap" decorated with phosphorylurea groups.
Figure 70:
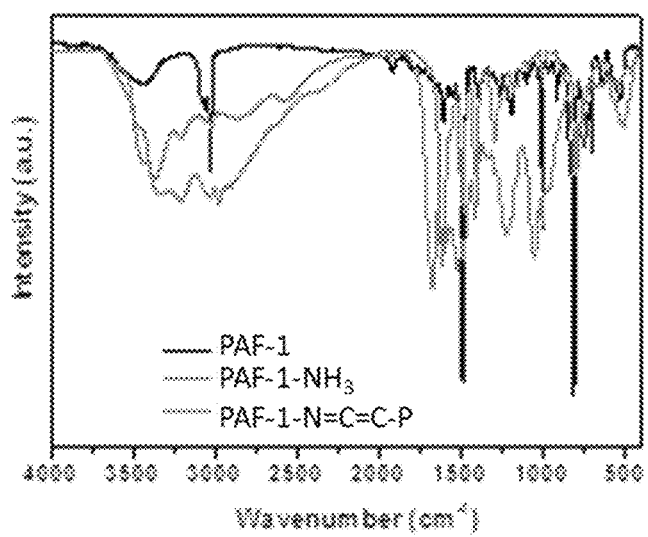
FIG. 70 shows corresponding IR spectra of polymers of FIG. 69.
Figure 71:
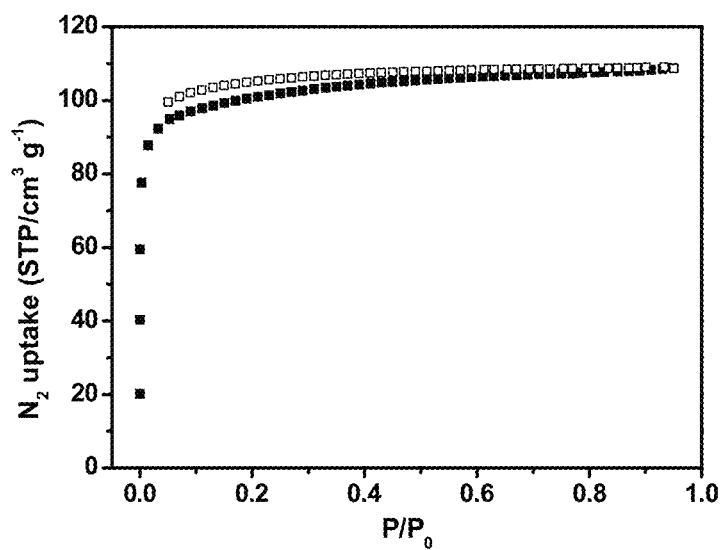
FIG. 71 shows $N_2$ sorption isotherms at 77K (revealing a BET Surface Area of 384 m$^2$g$^{-1}$)
Figure 72A:
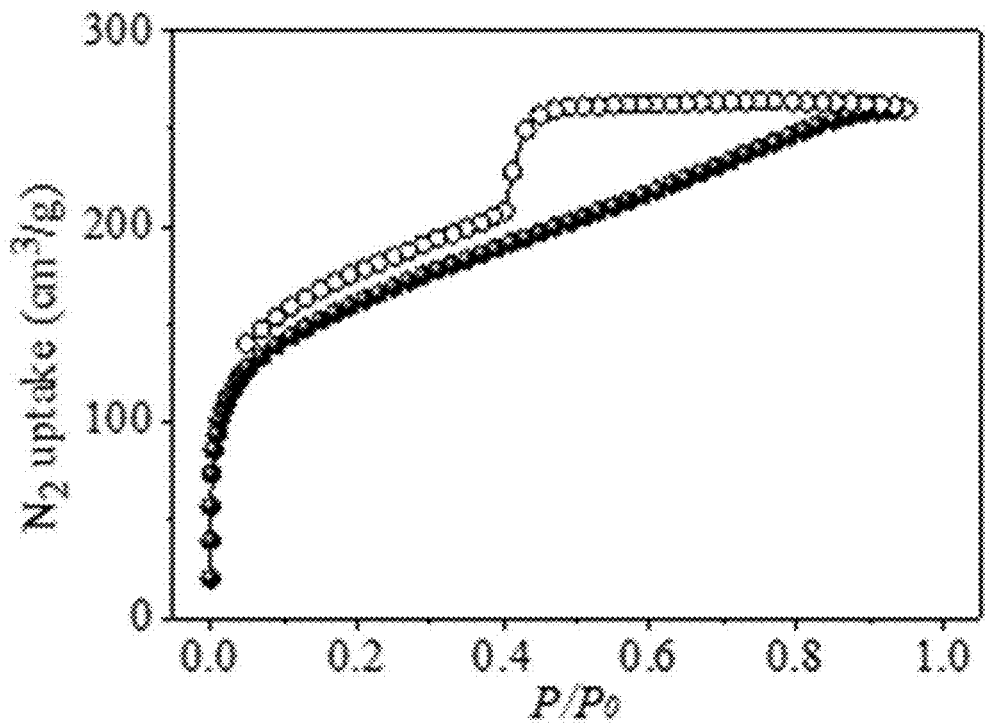
FIGS. 72A-72B show $N_2$ sorption isotherms of polymer 4D and 6D.
Figure 72B:
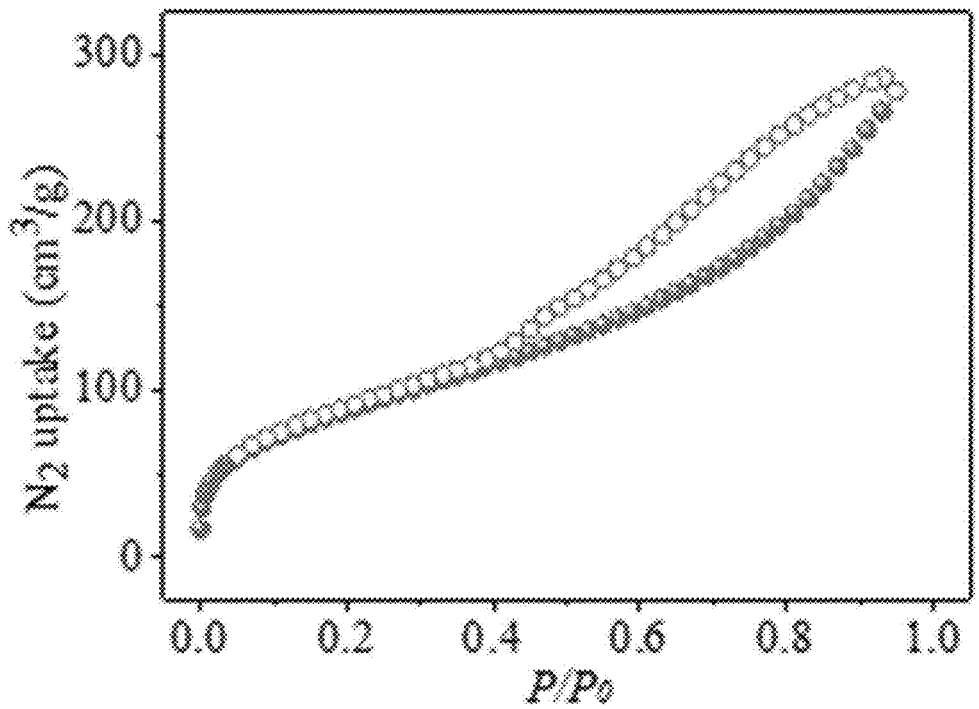
Figure 73:
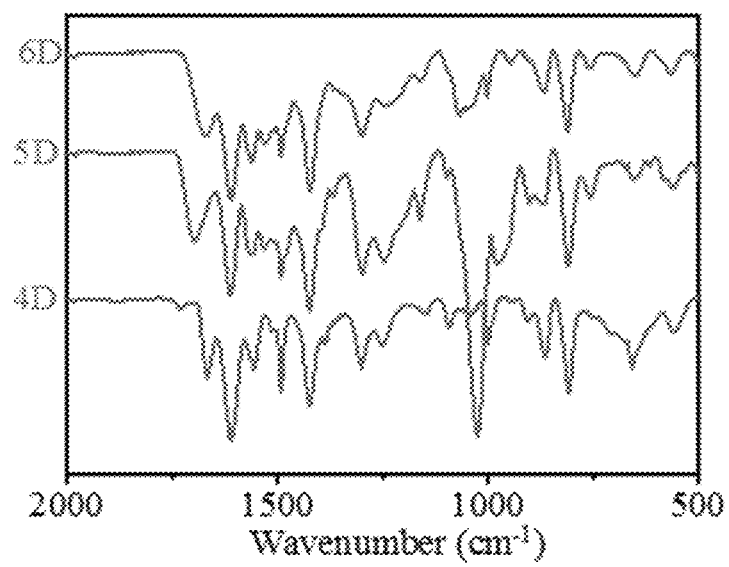
FIG. 73 shows IR spectra of polymer 4D, 5D, and 6D.
Figures 74A, 74B:
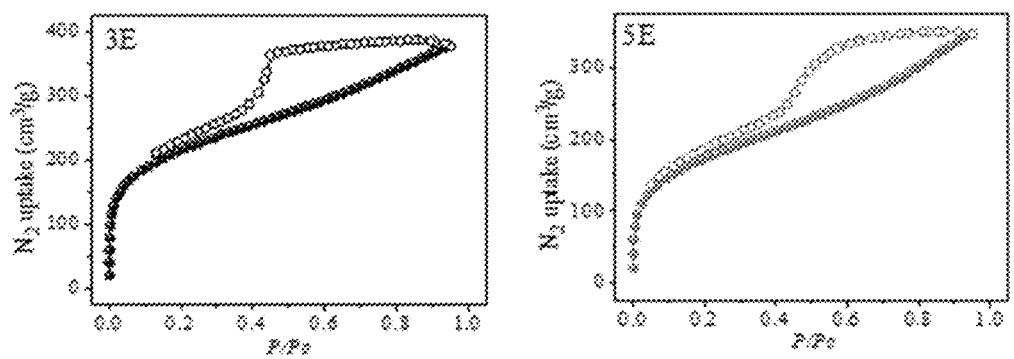
FIGS. 74A-74B show $N_2$ sorption isotherms of polymer 3E and 5E.
Figures 75A, 75B:
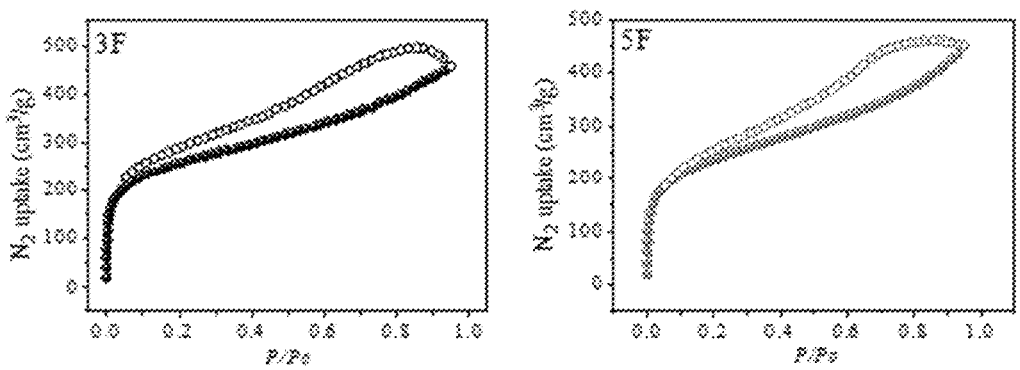
FIGS. 75A-75B show $N_2$ sorption isotherms of polymer 3F and 5F.
Figure 76:
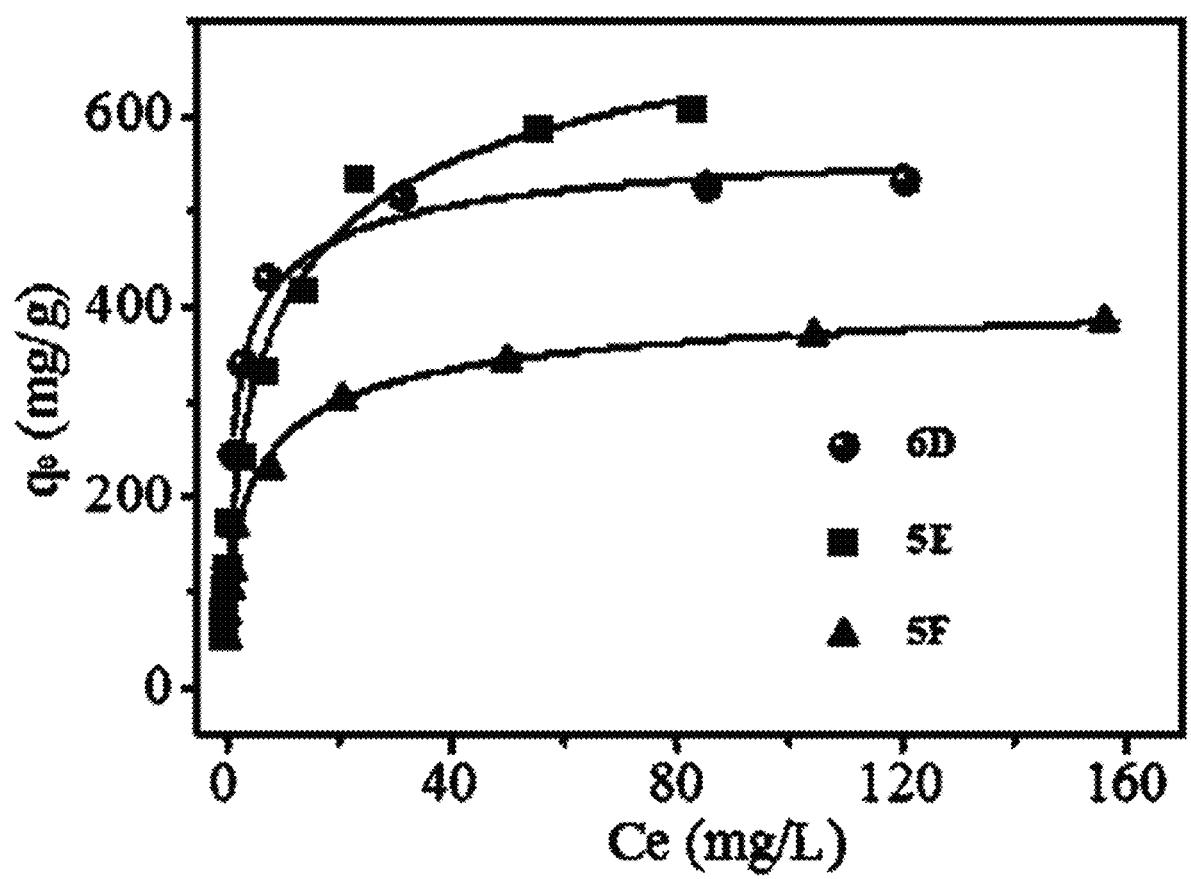
FIG. 76 shows U adsorption isotherm for polymer 6D, 5E, and 5F at pH≈5.
Figure 77:
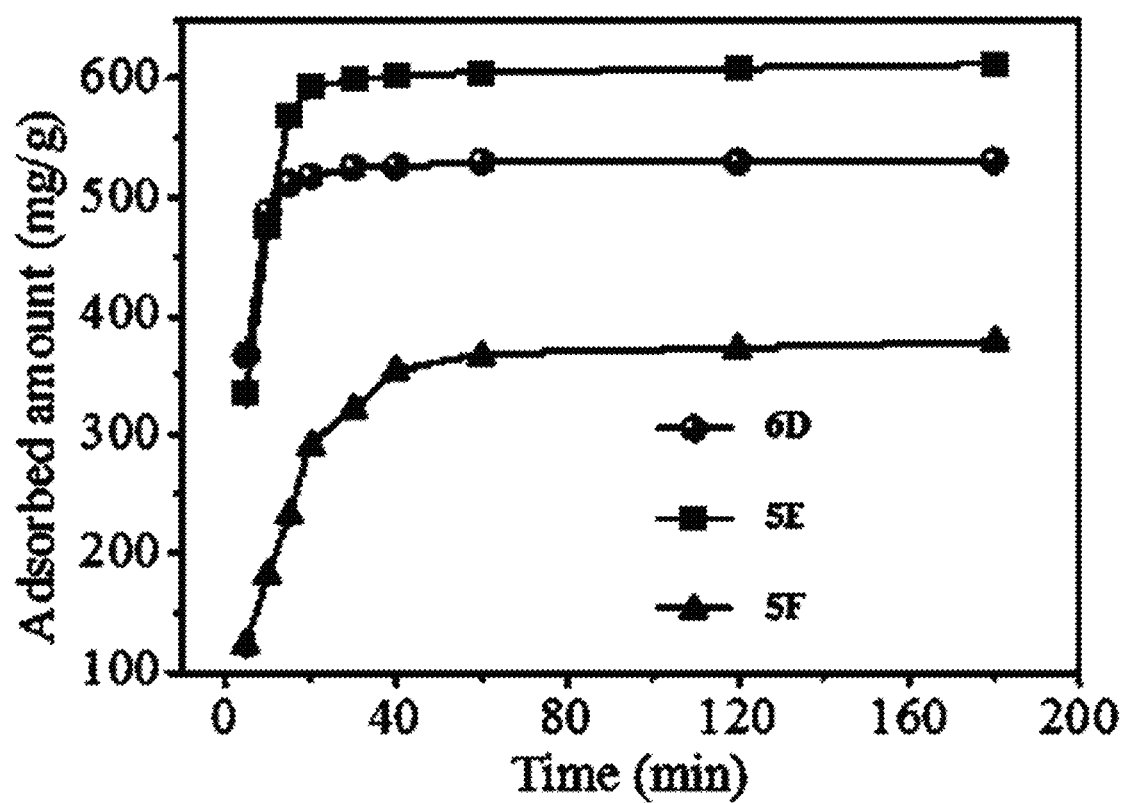
FIG. 77 shows the kinetics of U adsorption for water solution over various phosphorylurea functionalized porous organic polymers of 6D, 5E, and 5F. Adsorption conditions: U initial concentration (7.56 ppm, 400 mL), sorbent (3 mg), pH≈5.
Figure 78:
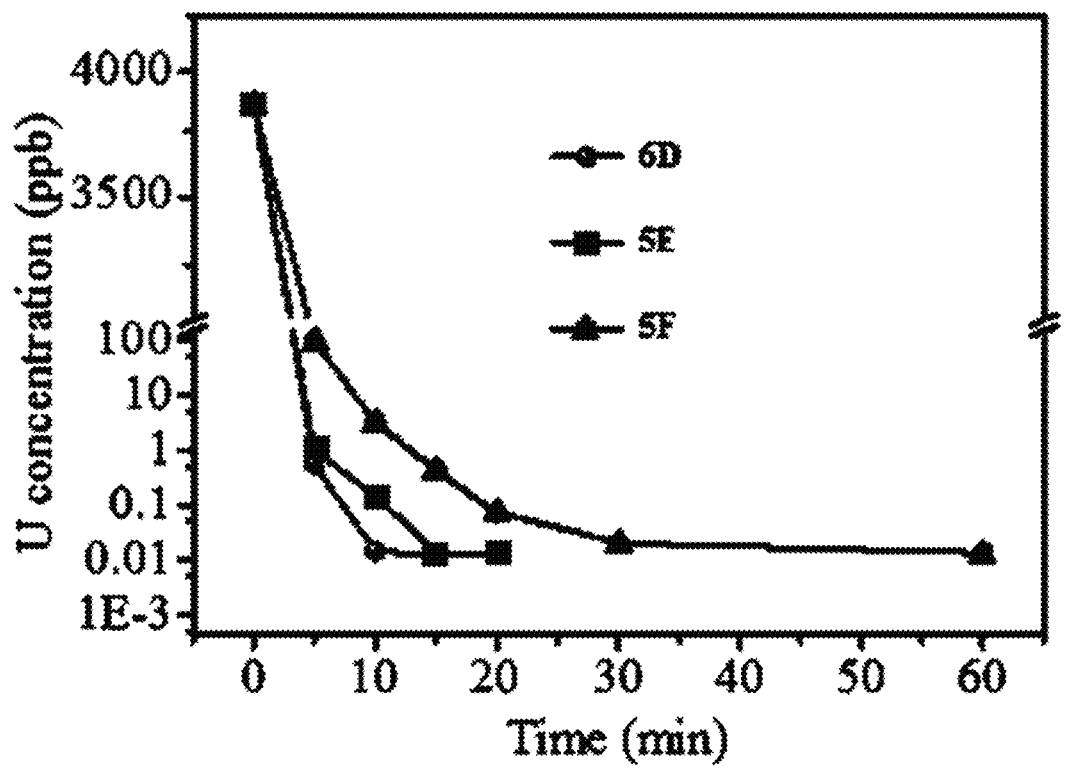
FIG. 78 shows the kinetics of U adsorption for water solution over various phosphorylurea functionalized porous organic polymers of 6D, 5E, and 5F. Adsorption conditions: U solution with initial U concentration at 3865 ppb (250 mL), sorbents (5 mg), pH=5.
Figure 79:
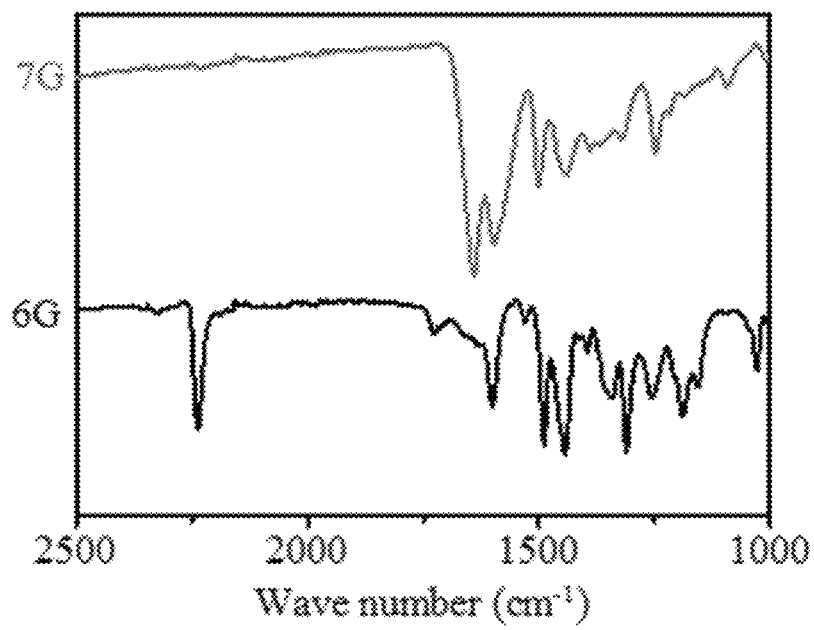
FIG. 79 shows IR spectra of polymers 6G and 7G.
Figure 80:
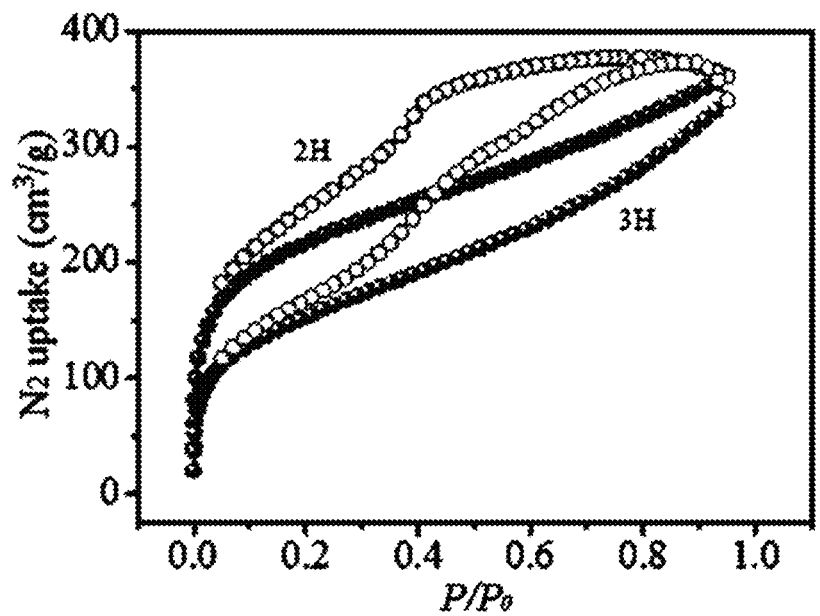
FIG. 80 shows $N_2$ sorption isothermals of polymers 2H and 3H.
Figure 81:
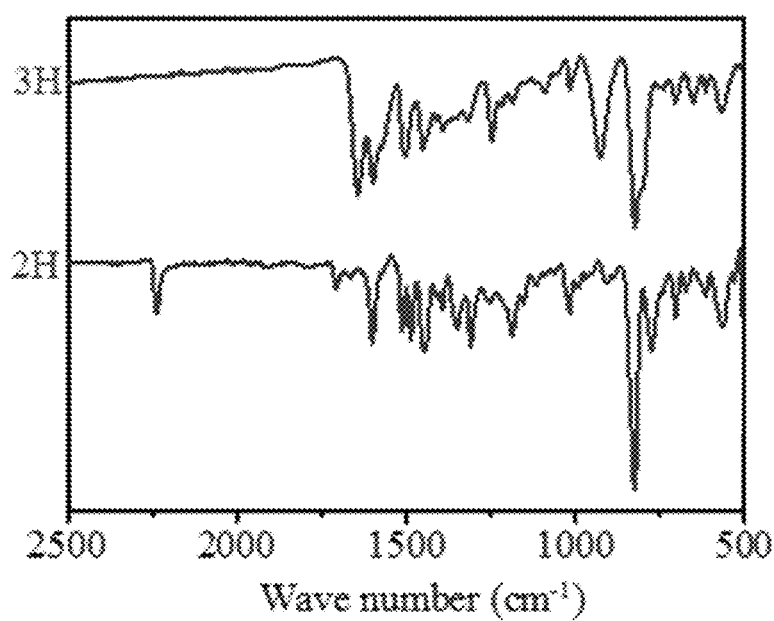
FIG. 81 shows IR spectra of polymers 2H and 3H.
Figure 82:
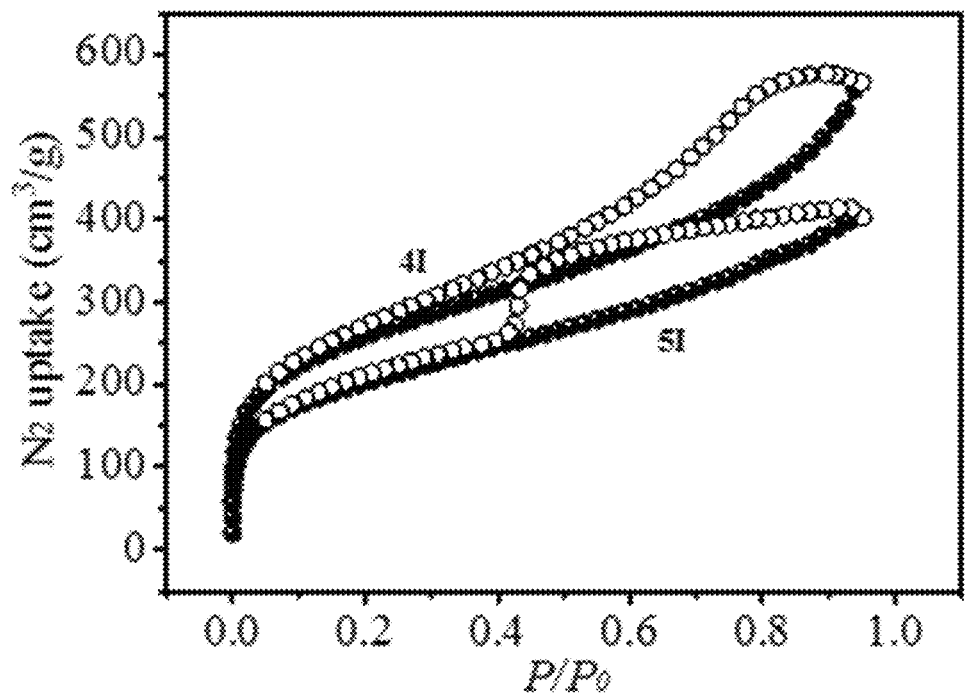
FIG. 82. $N_2$ sorption isotherms of polymer 4I and 5I.
Figure 83:
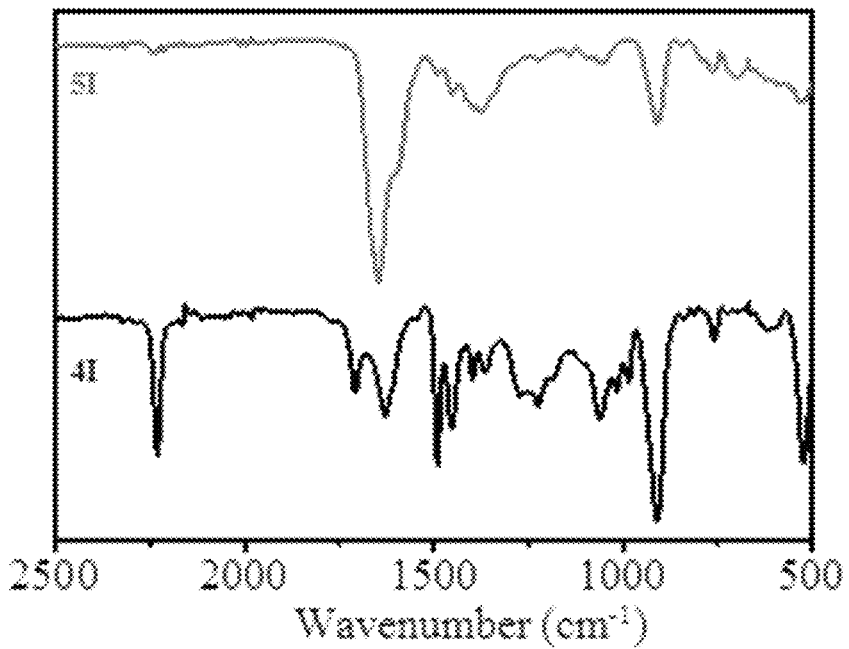
FIG. 83. IR spectra of polymer 4I and 5I.
Figure 84:
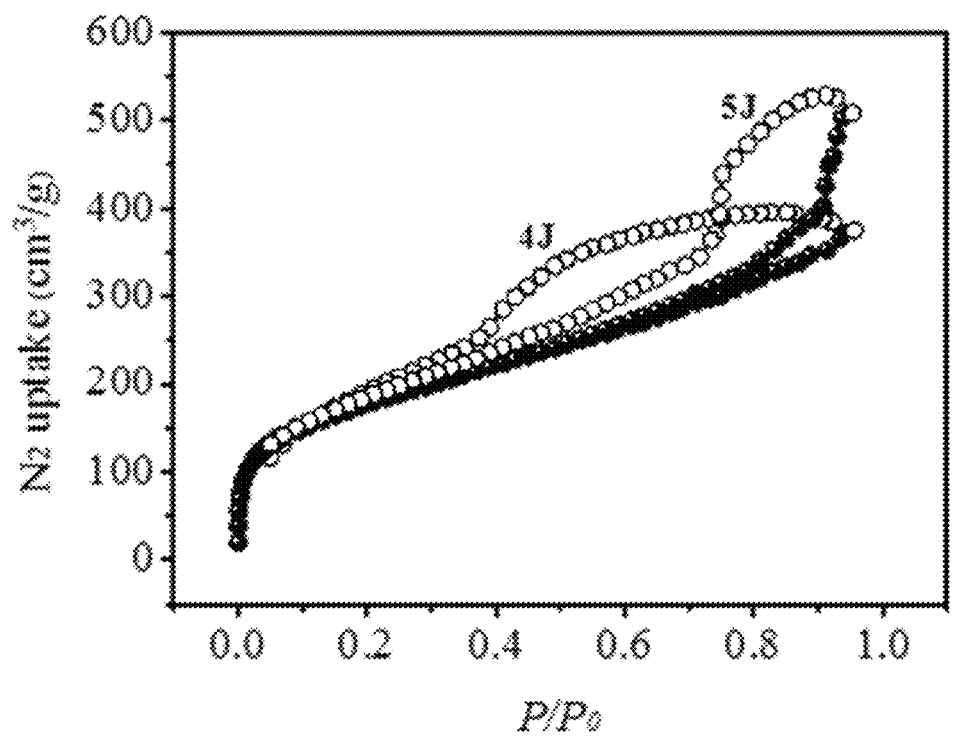
FIG. 84. $N_2$ sorption isotherms of polymer 4J and 5J.
Figure 85:
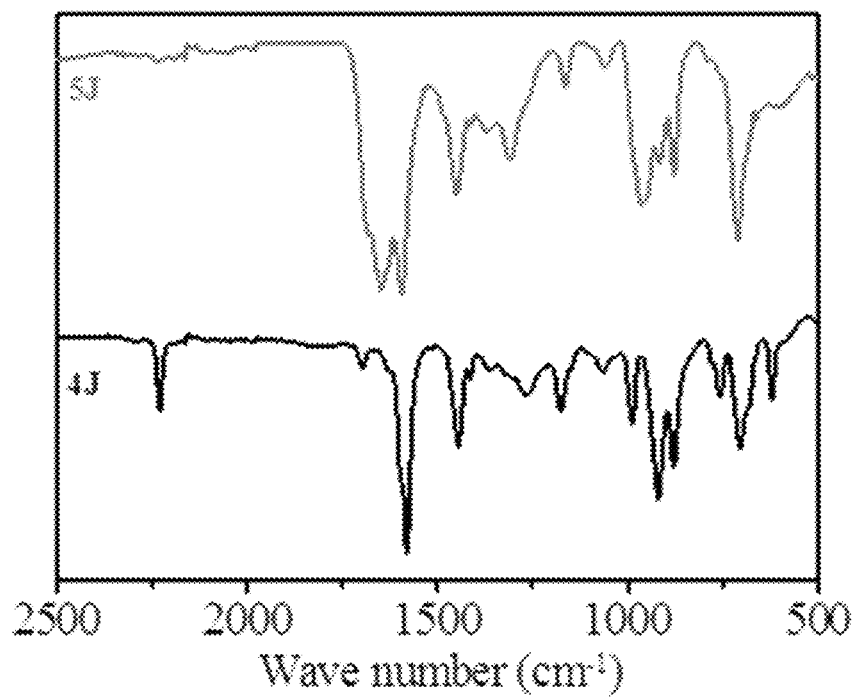
FIG. 85. IR spectra of polymer 4J and 5J.
Figure 86:
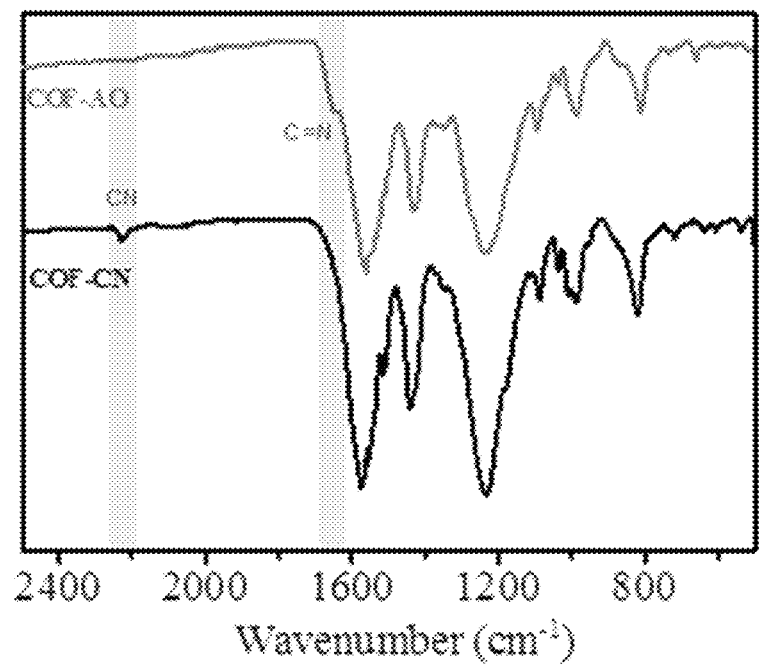
FIG. 86. IR spectra of COF-CN and COF-AO.
Figure 87:
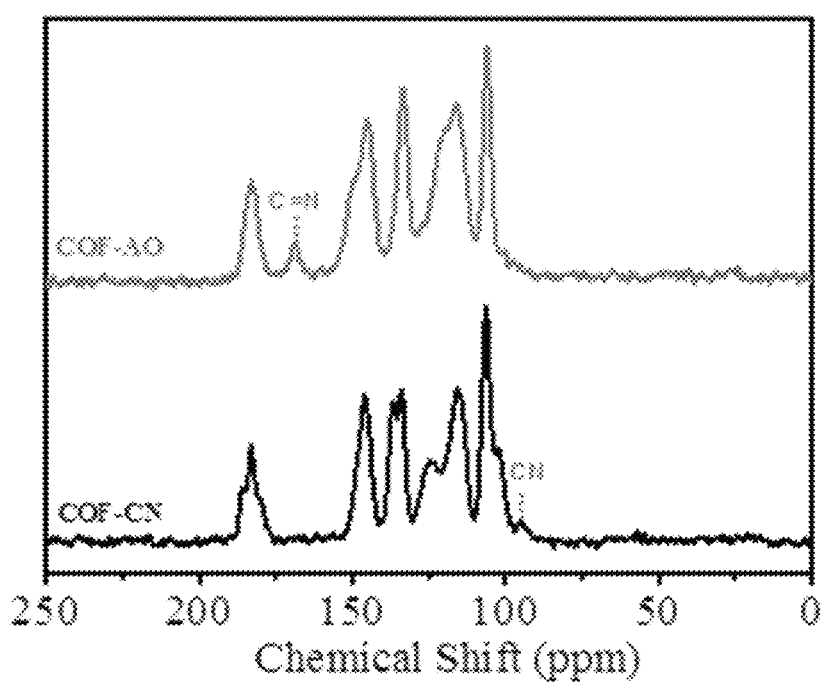
FIG. 87. $^{13}C$ MAS NMR spectra of COF-CN and COF-AO.
Figure 88:
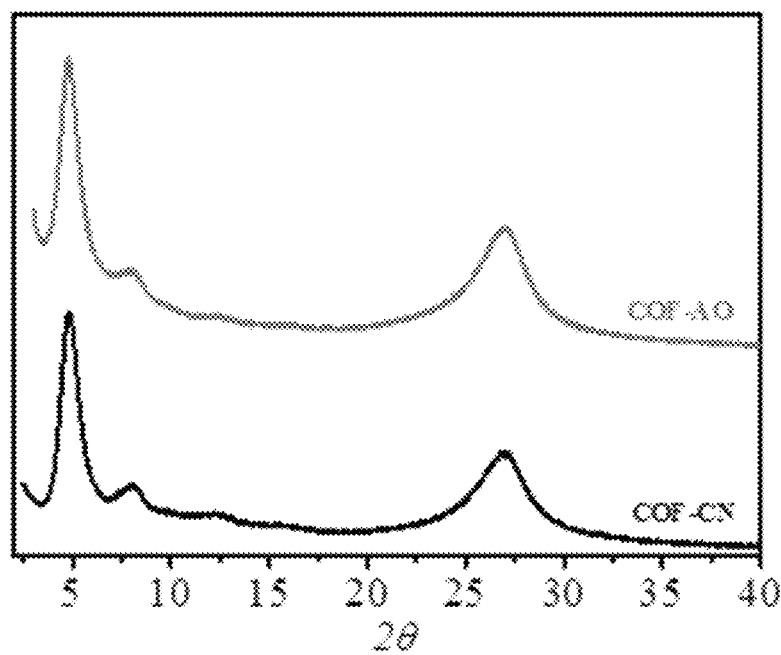
FIG. 88. XRD patterns of COF-CN and COF-AO.
Figure 89:
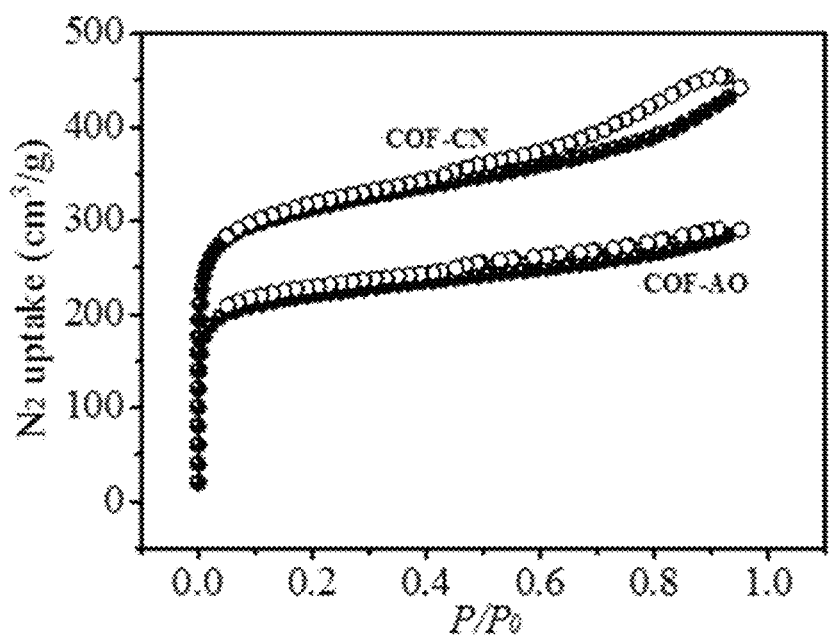
FIG. 89. $N_2$ sorption isotherms of COF-CN and COF-AO.
Figure 90:
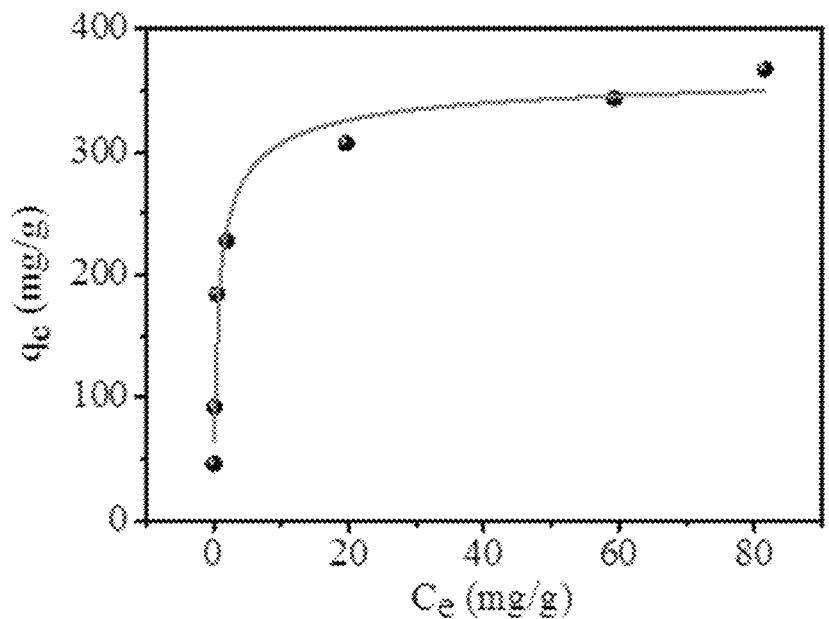
FIG. 90. U adsorption isotherm for COF-AO at pH=6.
Figure 91A:
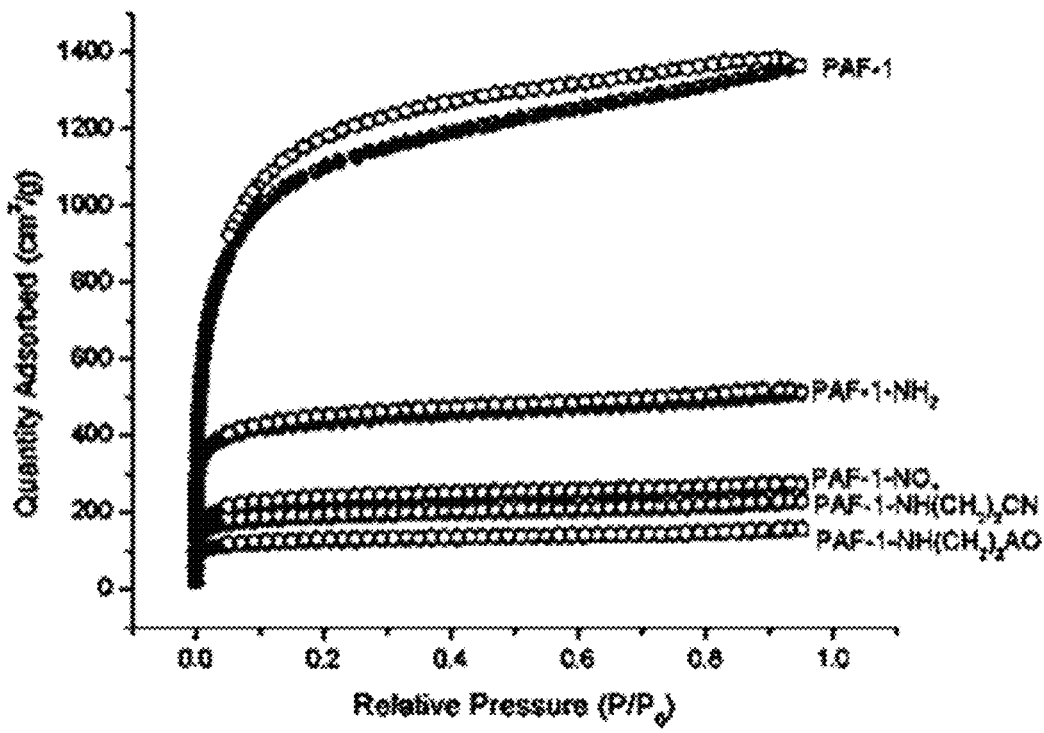
FIGS. 91A-91B show (FIG. 91A) Nitrogen sorption measurements of intermediates and final product, PAF-1-NH(CH$_2$)$_2$AO with a BET surface area of 465 m$^2$/g and (FIG. 91B) FT-IR measurements of intermediates and final product, PAF-1-NH(CH$_2$)$_2$AO.
Figure 91B:
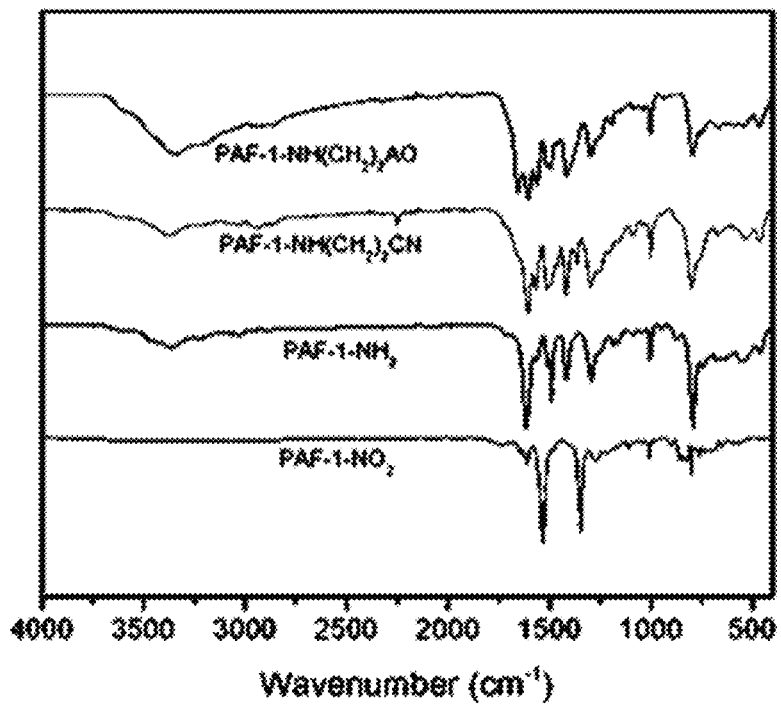
Figure 92:
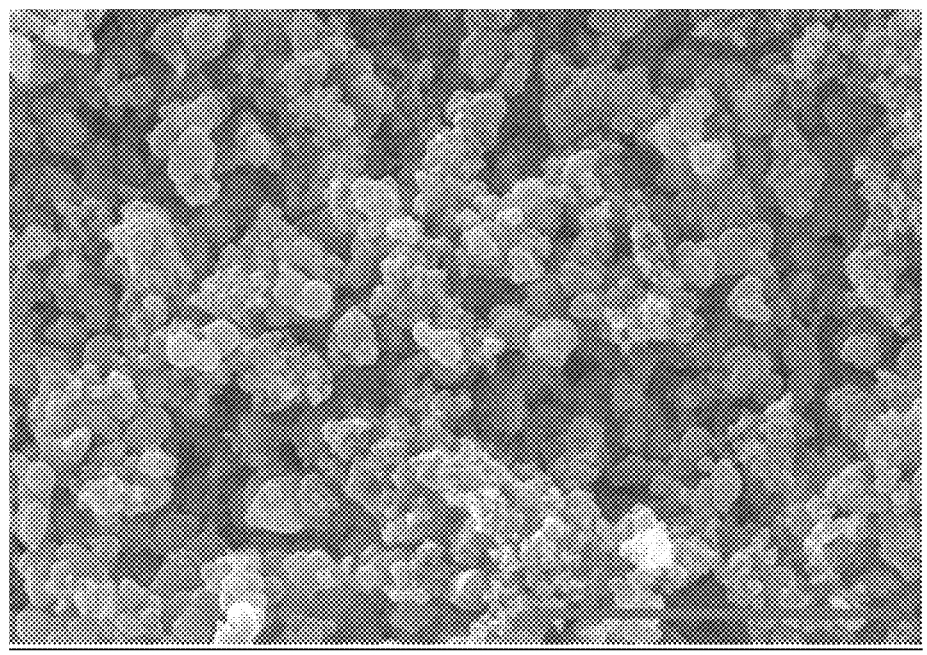
FIG. 92 shows scanning electron microscopy image of PAF-1-NH(CH$_2$)$_2$AO (scale bar 5 um).
Figure 93A:
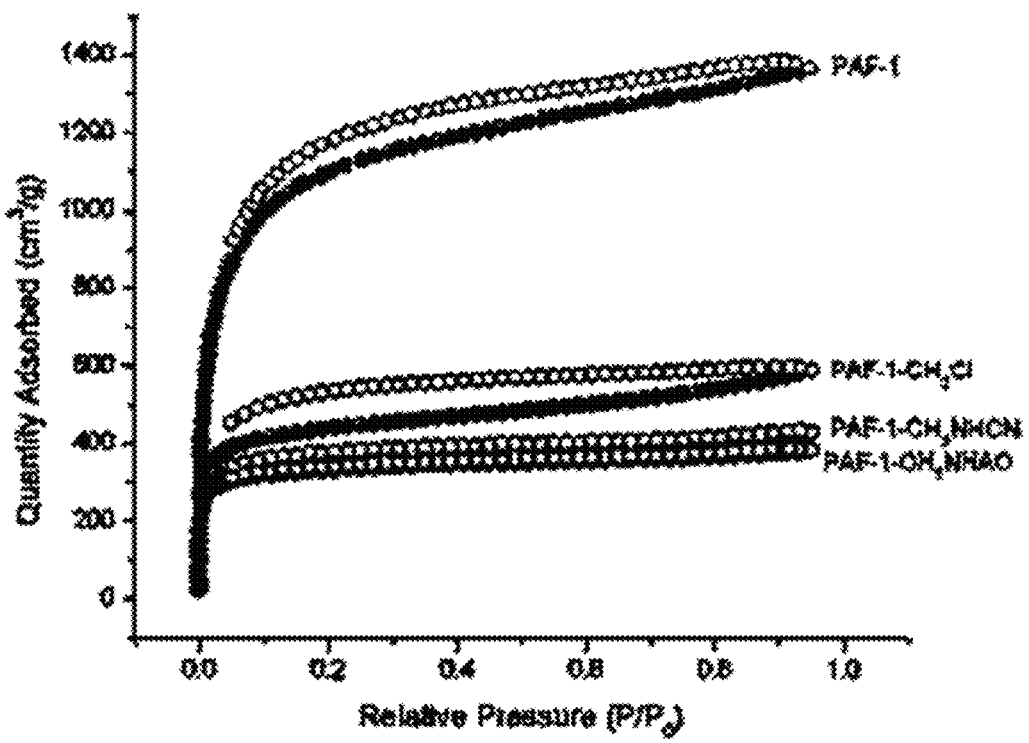
FIGS. 93A-93B show (FIG. 93A) Nitrogen sorption measurements of intermediates and final product, PAF-1-CH$_2$NHAO with a BET surface area of 1254 m$^2$/g and (FIG. 93B) FT-IR measurements of intermediates and final product, PAF-1-CH$_2$NHAO.
Figure 93B:
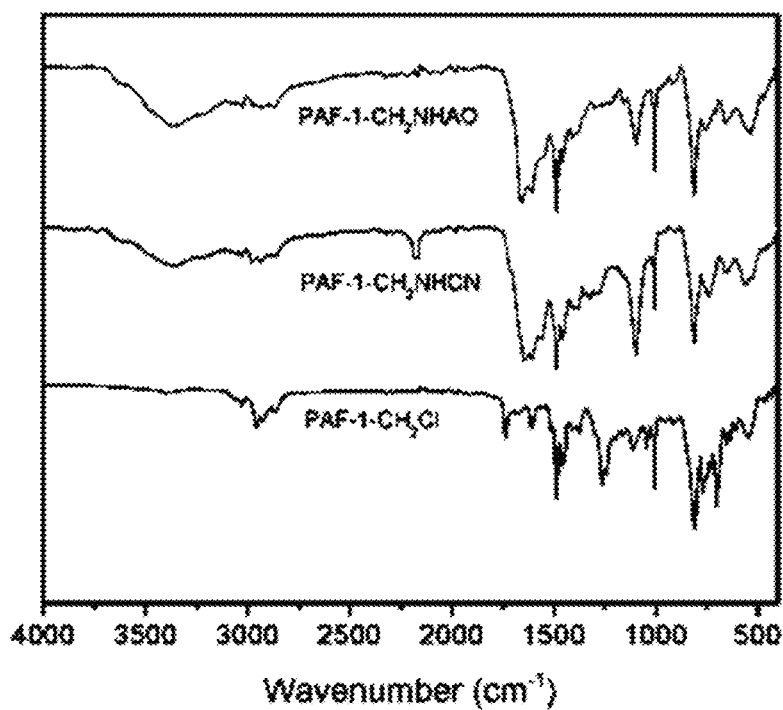
Figure 94:
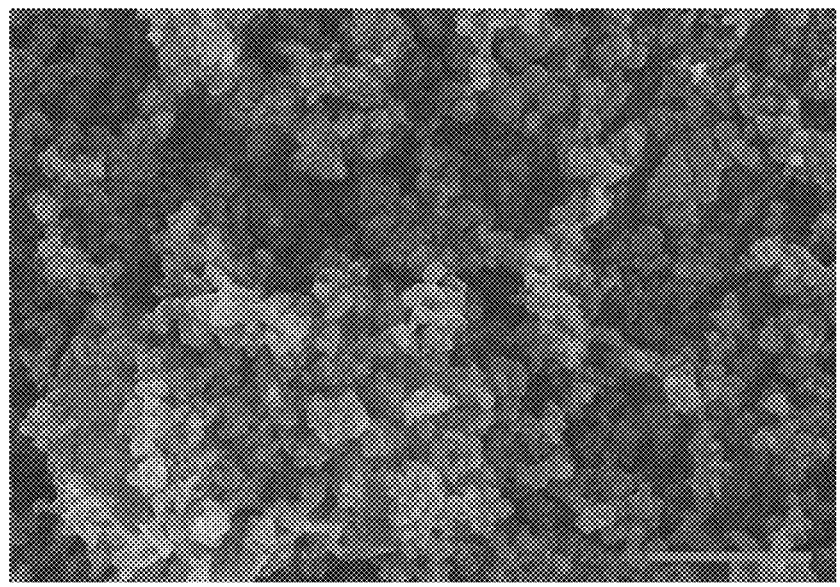
FIG. 94 shows scanning electron microscopy image of PAF-1-CH$_2$NHAO (scale bar 5 um).
Figure 95A:
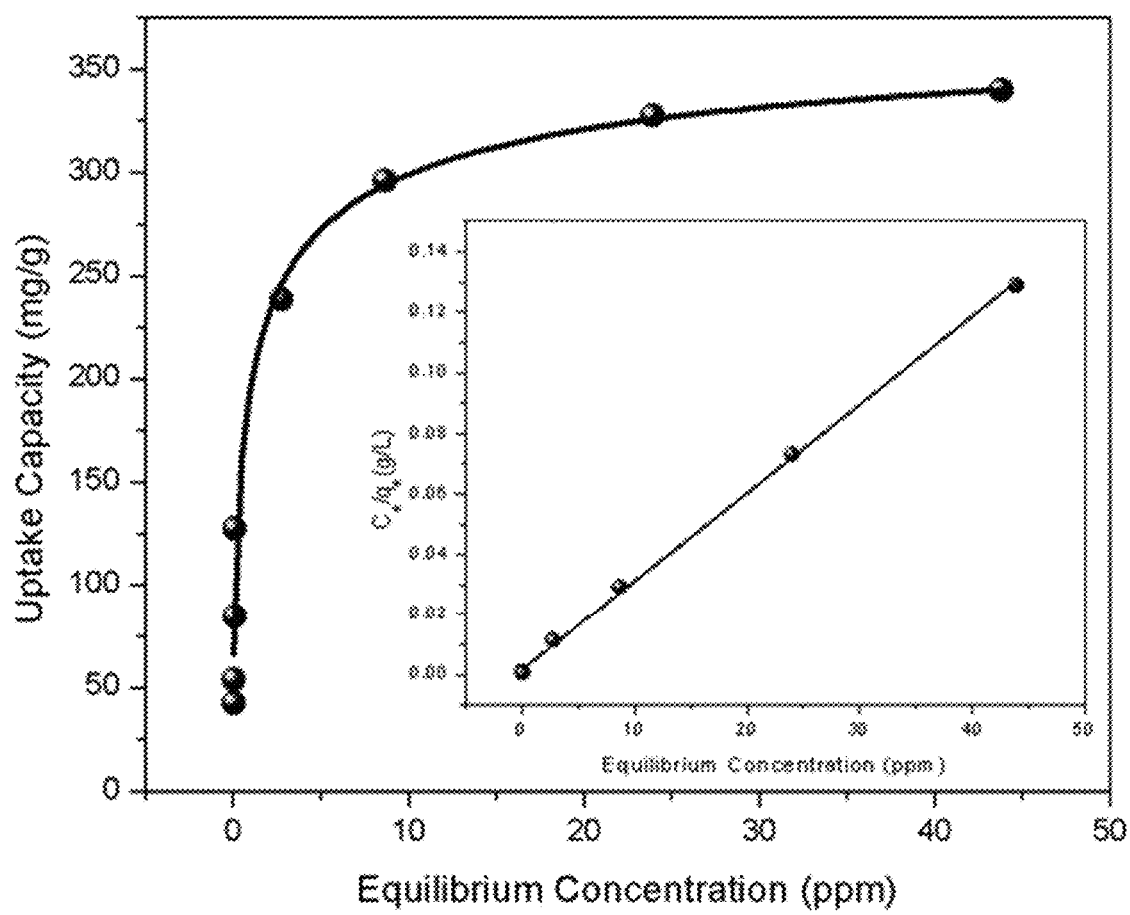
FIGS. 95A-95B show (FIG. 95A) Adsorption isotherm of PAF-1-NH(CH$_2$)$_2$AO with a $q_{max}$ of 385 mg/g and (FIG. 95B) adsorption isotherm of PAF-1-CH$_2$NHAO with a $q_{max}$ of 102 mg/g. ($r^2$>0.96).
Figure 95B:
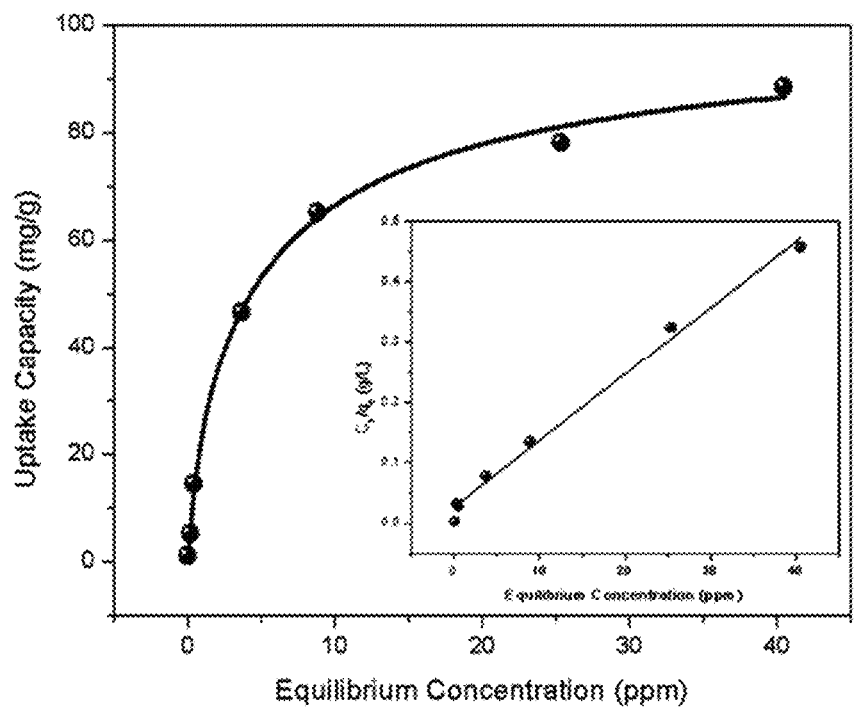
Figure 96:
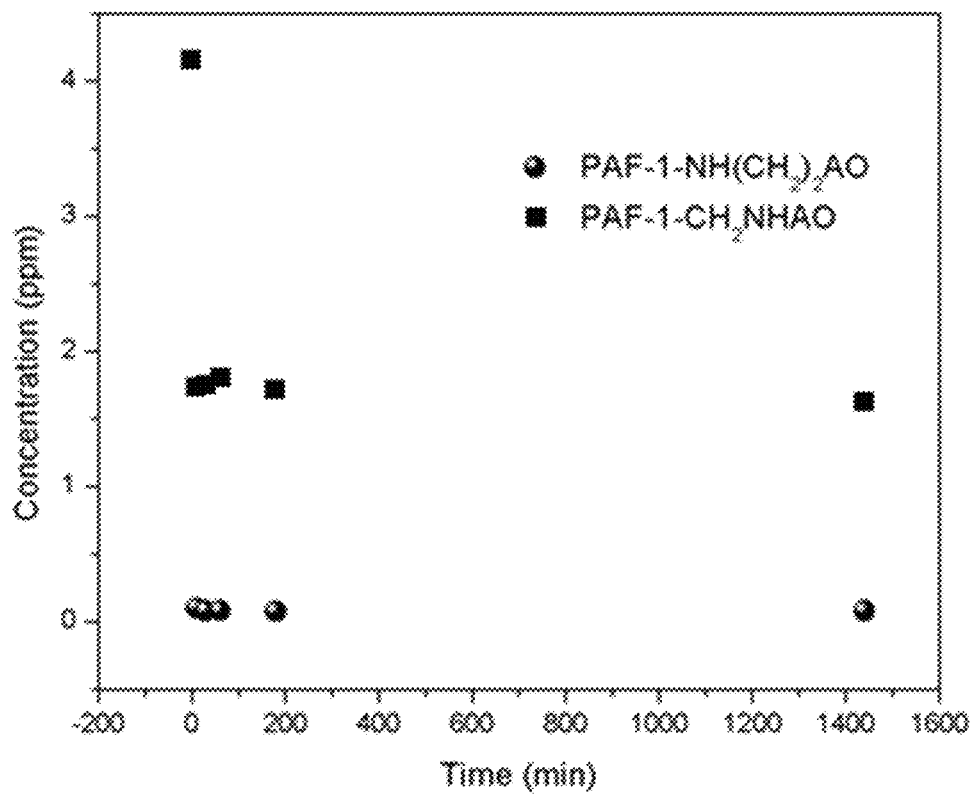
FIG. 96 shows kinetic analysis of the adsorbents in Example 12.
Figure 97A:
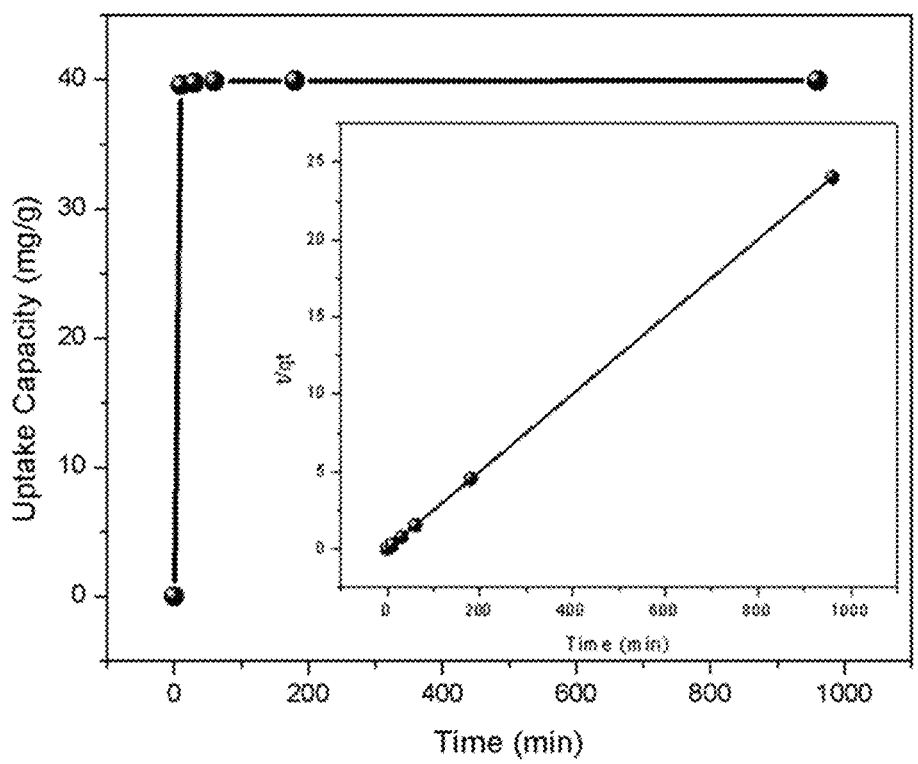
FIGS. 97A-97B show pseudo-second ordo kinetic plots of (FIG. 97A) PAF-1-NH(CH$_2$)$_2$AO and (FIG. 97B) PAF-1-CH$_2$NHAO ($r^2$>0.9999).
Figure 97B:
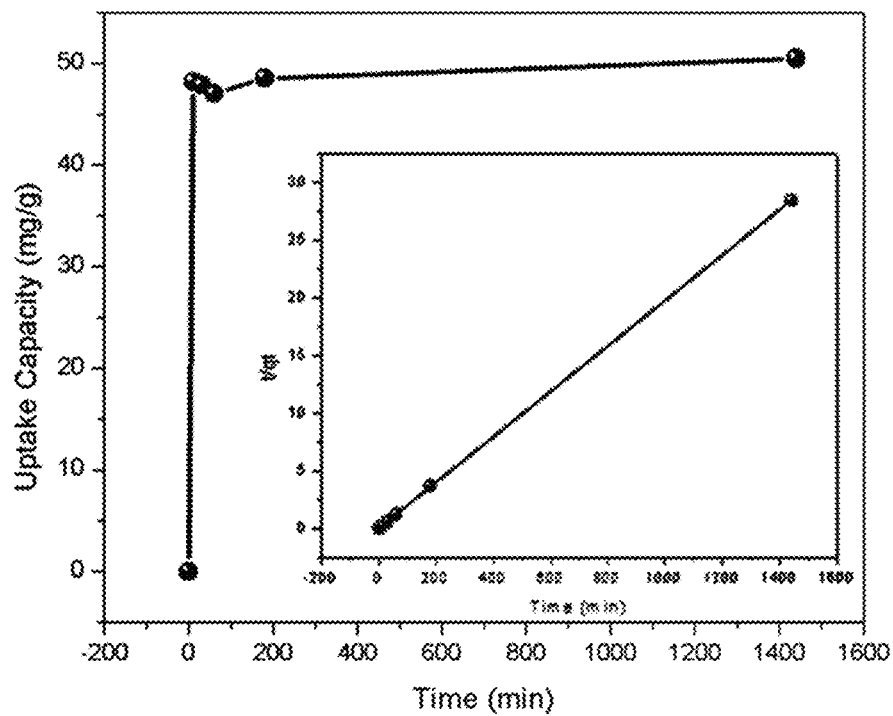
Figure 98A:
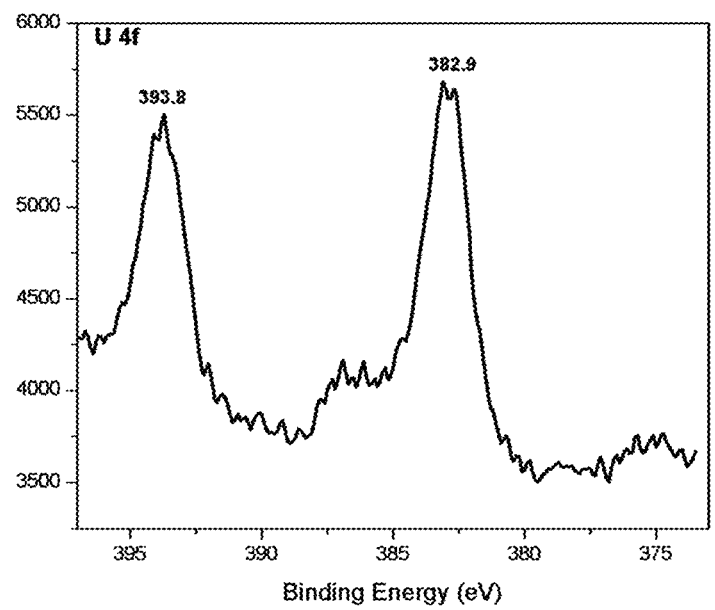
FIGS. 98A-98B show X-ray photoelectron spectroscopy of U 4f for (FIG. 98A) U@PAF-1-NH(CH$_2$)$_2$AO and (FIG. 98B) U@PAF-1-CH$_2$NHAO.
Figure 98B:
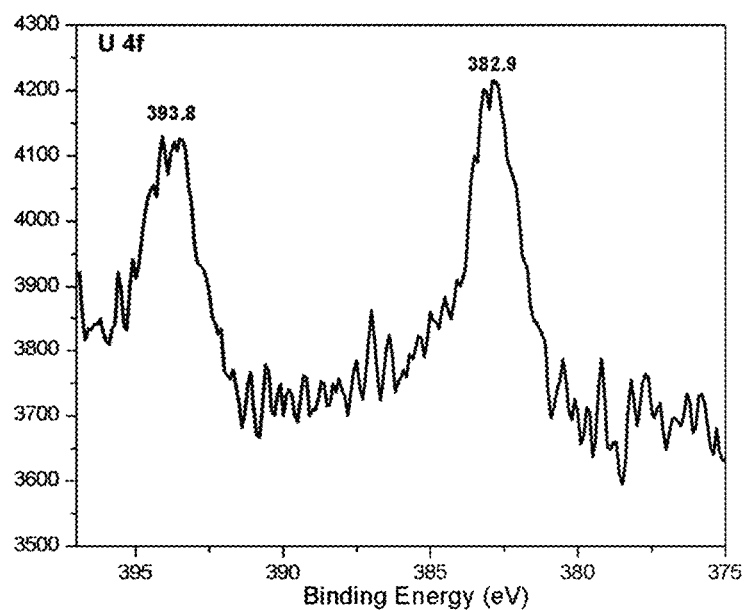
Figure 99A:
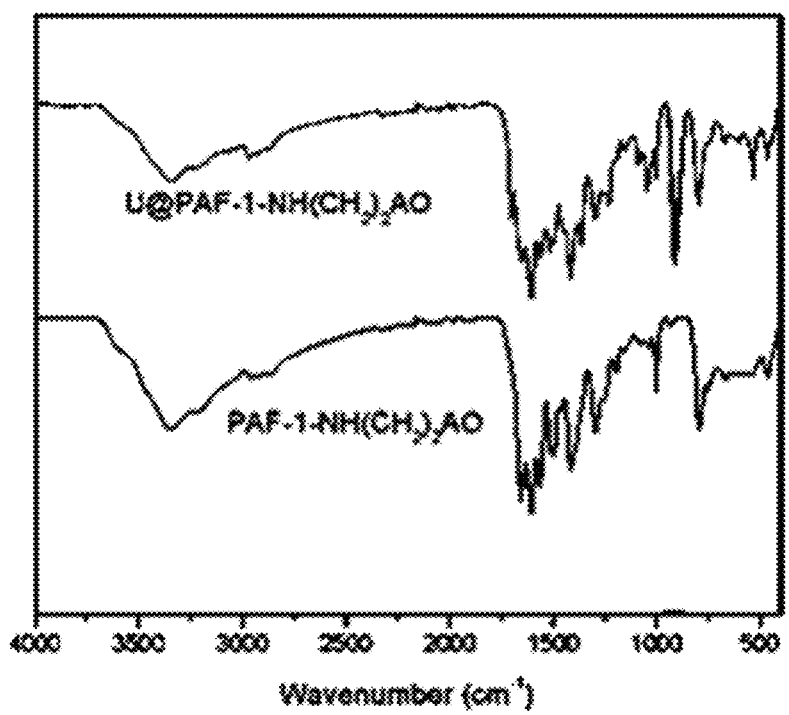
FIGS. 99A-99B show FT-IR measurement of pristine and uranium contact (FIG. 99A) PAF-1-NH(CH$_2$)$_2$AO and (FIG. 99B) PAF-1-CH$_2$NHAO, with an additional peak 905 cm$^{-1}$ corresponding to the adsorbed uranium.
Figure 99B:
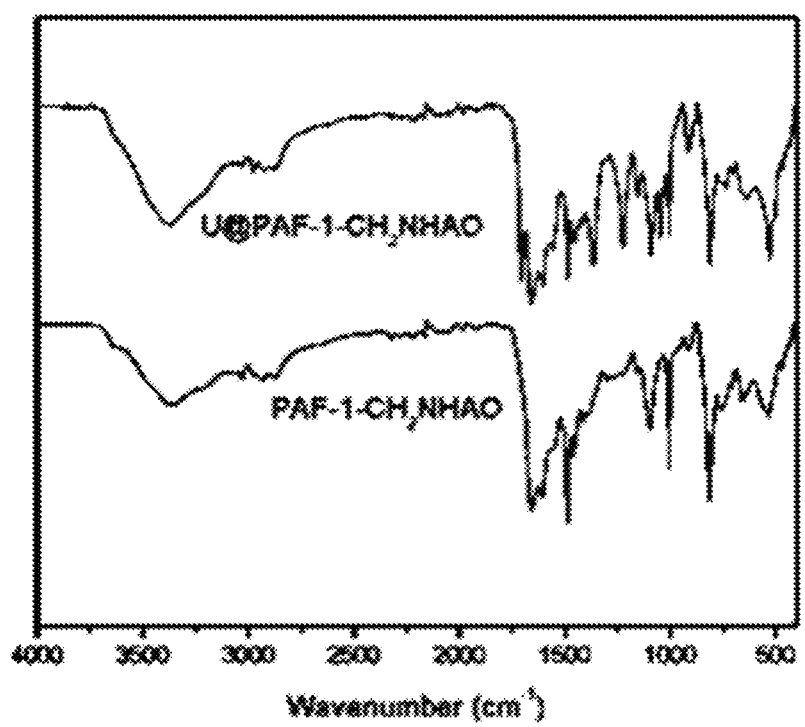

Based upon "crystal engineering",[116] linking the triangular MBBs would result in a hcb-topology network. Yamamoto homo-coupling reaction[119] of bromophenylethenyl-terminated triangular functional organic MBBs will give rise to the hcb-topology POP. Similarly, the synthesized POP will be then incorporated with the aforementioned uranyl chelating groups via stepwise post-synthetic modification utilizing selected organic reactions, thus affording hcb-topology POP-based uranium "nano-trap" containing 1D channels (FIG. 55). Systematically tuning and tailoring the pore sizes and pore chemistry of hcb-topology POP-based uranium "nano-traps" will be feasible utilizing a series of custom-designed triangular functional organic MBBs (FIG. 56).

POP-Based Uranium "Nano-Traps" Decorated with Amino Acid Groups

Recently, there reported the successful design of a uranyl-binding protein with femtomolar ($10^{-12}$ M) affinity and more than 10,000-fold selectivity over 17 other metal ions; this exceptionally high selectivity can be attributed to the pentagonal bipyramidal binding configuration of uranyl, in which the carboxylate groups of Glu and Asp directly bind the uranyl ion in the equatorial plane and the guanidinium group of Arg forms a hydrogen bond with an axial oxo of the uranyl as revealed by high-resolution crystallographic studies.[122] Inspired by this work and on the basis of constructing the aforementioned three classes of POP-based uranium "nanotraps", each is demonstrated with the ability to controllably and stepwise decorate the POP families with Glu, Asp, and Arg amino acid groups to afford uranium "nano-traps" with extremely high selectivity of uranyl over other metal ions.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "pore diameter" and "pore size", as used interchangeably herein, refer to a measure of the effective diameter of the pores in the composition. The pore diameter can be the effective diameter of the largest gas molecule that can pass through the majority of the pores in the composition. The pore diameter can be estimated from the average pore diameter obtained from crystallographic measurements. The pore diameter can be estimated from measured adsorption isotherms for an inert gas such as $N_2$ or Ar using non-local density functional theory (NLDFT) or using models such as the Horvath-Kawazoe model.

The term "porous organic polymer (POP)", as used herein, refers generally to high surface area materials formed from organic segments covalently bonded to form an extended porous structure. Porous organic polymers can include conjugated microporous polymers, porous aromatic frameworks, porous polymer networks, and porous organic frameworks. The porous organic polymer can be crystalline, semi-crystalline, or amorphous. The porous organic polymer can have a surface greater than about 20 $m^2/g$, 50 $m^2/g$, 100 $m^2/g$, 500 $m^2/g$, or greater than about 1,000 $m^2/g$. The porous organic polymer can have a surface area up to about 8,000 $m^2/g$, 7,000 $m^2/g$, 6,000 $m^2/g$, 5,000 $m^2/g$, or 4,000 $m^2/g$. As used herein, the term "porous organic polymer" does not include zeolite structures or mesoporous silica structures.

The term "stable", as used herein, refers to compositions that are stable over time, stable under aqueous conditions, stable under harsh conditions, stable under acidic conditions, and/or stable under basic conditions. A composition is stable over time when, under standard operating conditions such as elevated temperatures and/or pressures, the composition does not change pore size by more than 1%, 2%, 5%, or 10% and/or does not change maximum metal uptake capacity by more than 1%, 2%, 5%, or 10% for a period of at least 1, 2, 10, 20, or 30 days. A composition is stable under harsh conditions when the composition does not change pore size by more than 1%, 2%, 5%, or 10% after exposure to boiling water for at least 2, 3, 4, 5, or 6 hours. A composition is stable under harsh conditions when the composition has a distribution coefficient of the heavy metal that is greater than $1\times10^6$ mL $g^{-1}$, greater than $5\times10^6$ mL $g^{-1}$, greater than $1\times10^7$ mL $g^{-1}$, or greater than $2\times10^7$ mL $g^{-1}$ both under acidic conditions of pH less than 3.0, 2.0, or 1.0 and under basic conditions of pH great than 10.0, 11.0, or 12.0. A composition is stable under aqueous conditions when it does not change pore size by more than 1%, 2%, 5%, or 10% and/or does not change maximum metal uptake capacity by more than 1%, 2%, 5%, or 10% after being exposed to an air environment with at least 60%, at least 70%, at least 80%, or at least 90% relative humidity for at least 12 hours or for at least 1, 2, 3, 4, 5, or 10 days. A composition is stable under basic conditions when it does not change pore size by more than 1%, 2%, 5%, or 10% and/or does not change maximum metal uptake capacity by more than 1%, 2%, 5%, or 10% after exposure to concentrated NaOH solution, e.g. at least 1.0 M, 2.0M, 3.0 M, or 6.0 M NaOH, for a period of at least 120 minutes. A composition is stable under acid conditions when it does not change pore size by more than 1%, 2%, 5%, or 10% and/or does not change maximum metal uptake capacity by more than 1%, 2%, 5%, or 10% after exposure to concentrated HCl solution, e.g. at least 1.0 M, 2.0M, 3.0 M, or 6.0 M HCl, for a period of at least 120 minutes.

The term "small molecule", as used herein, generally refers to an organic molecule that is less than about 2,000 g/mol in molecular weight, less than about 1,500 g/mol, less than about 1,000 g/mol, less than about 800 g/mol, or less than about 500 g/mol. Small molecules are non-polymeric and/or non-oligomeric.

The term "derivative" refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include salts, prodrugs, or metabolites of the parent compound. Derivatives include compounds in which free amino groups in the parent compound have been derivatized to form amine hydrochlorides, p-toluene sulfoamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form salts, methyl and ethyl esters or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides.

The terms "reactive coupling group" and "reactive functional group" are used interchangeably herein to refer to any chemical functional group capable of reacting with a second functional group under the given conditions to form a covalent bond. Those skilled in the art will recognize that some functional groups may react under certain conditions but not under others. Accordingly, some functional groups may be reactive coupling groups only certain conditions, e.g. under conditions where the groups react to form a covalent bond. The selection of reactive coupling groups is within the ability of the skilled artisan. Examples of reactive coupling groups can include primary amines (—$NH_2$) and amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Examples of reactive coupling groups can include aldehydes (—COH) and aldehyde reactive linking groups such as hydrazides, alkoxyamines, and primary amines. Examples of reactive coupling groups can include thiol groups (—SH) and sulfhydryl reactive groups such as maleimides, haloacetyls, and pyridyl disulfides. Examples of reactive coupling groups can include photoreactive coupling groups such as aryl azides or diazirines. Examples of reactive coupling groups can include click reactive coupling groups capable of forming covalent bonds through click reactions. Well-known reactions include the hetero-Diels-Alder reaction, the thiol-ene coupling, the Staudinger ligation, native chemical ligation, and the amidation reaction between thio acids or thio esters and sulfonyl azides (referred to as 'sulfo-click'). As used herein, the terms "sulfo-click" and "sulfo-click chemistry" are used to refer to a reaction between thio acids and sulfonyl azides containing molecules, creating a covalent bonds between the two molecules. Examples of sulfo-click chemistry are described in U.S. Patent Application Publication 2011/0130568 and PCT Publication WO 2012/021486. The coupling reaction may include the use of a catalyst, heat, pH buffers, light, or a combination thereof.

The term "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

In preferred embodiments, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In preferred embodiments, the "alkylthio" moiety is represented by one of —S-alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. The terms "aroxy" and "aryloxy", as used interchangeably herein, can be represented by —O-aryl or O-heteroaryl, wherein aryl and heteroaryl are as defined below. The alkoxy and aroxy groups can be substituted as described above for alkyl.

The terms "amine" and "amino" (and its protonated form) are art-recognized and refer to both unsubstituted and substituted amines, e.g., a moiety that can be represented by the general formula:

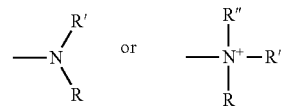

wherein R, R', and R" each independently represent a hydrogen, an alkyl, an alkenyl, —$(CH_2)_m$—$R_C$ or R and R' taken together with the N atom to which they are attached complete a heterocycle having from 4 to 8 atoms in the ring structure; $R_C$ represents an aryl, a cycloalkyl, a cycloalkenyl, a heterocycle or a polycycle; and m is zero or an integer in the range of 1 to 8. In preferred embodiments, only one of R or R' can be a carbonyl, e.g., R, R' and the nitrogen together do not form an imide. In still more preferred embodiments, the term "amine" does not encompass amides, e.g., wherein one of R and R' represents a carbonyl. In even more preferred embodiments, R and R' (and optionally R") each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R and R' is an alkyl group The term "amido" is art-recognized as an amino-substituted carbonyl and includes a moiety that can be represented by the general formula:

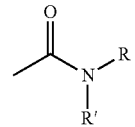

wherein R and R' are as defined above.

"Aryl", as used herein, refers to $C_5$-$C_{10}$-membered aromatic, heterocyclic, fused aromatic, fused heterocyclic, biaromatic, or biheteroecyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. One or more of the rings can be substituted as defined above for "aryl".

The term "aralkyl", as used herein, refers to an alkyl group substituted with an aryl group (e.g., an aromatic or heteroaromatic group).

The term "aralkyloxy" can be represented by —O-aralkyl, wherein aralkyl is as defined above.

The term "carbocycle", as used herein, refers to an aromatic or non-aromatic ring(s) in which each atom of the ring(s) is carbon.

"Heterocycle" or "heterocyclic", as used herein, refers to a monocyclic or bicyclic structure containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, ($C_1$-$C_{10}$) alkyl, phenyl or benzyl, and optionally containing 1-3 double bonds and optionally substituted with one or more substituents. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbonyl" is art-recognized and includes such moieties as can be represented by the general formula:

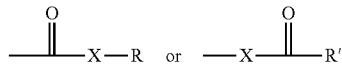

wherein X is a bond or represents an oxygen or a sulfur, and R and R' are as defined above. Where X is an oxygen and R or R' is not hydrogen, the formula represents an "ester". Where X is an oxygen and R is as defined above, the moiety is referred to herein as a carboxyl group, and particularly when R is a hydrogen, the formula represents a "carboxylic acid". Where X is an oxygen and R' is hydrogen, the formula represents a "formate". In general, where the oxygen atom of the above formula is replaced by sulfur, the formula represents a "thiocarbonyl" group. Where X is a sulfur and R or R' is not hydrogen, the formula represents a "thioester." Where X is a sulfur and R is hydrogen, the formula represents a "thiocarboxylic acid." Where X is a sulfur and R' is hydrogen, the formula represents a "thioformate." On the other hand, where X is a bond, and R is not hydrogen, the above formula represents a "ketone" group. Where X is a bond, and R is hydrogen, the above formula represents an "aldehyde" group.

The term "heteroatom" as used herein means an atom of any element other than carbon or hydrogen. Preferred heteroatoms are boron, nitrogen, oxygen, phosphorus, sulfur, and selenium. Other heteroatoms include silicon and arsenic As used herein, the term "nitro" means —$NO_2$; the term "halogen" designates —F, —C, —Br, or —I; the term "sulfhydryl" means —SH; the term "hydroxyl" means —OH; and the term "sulfonyl" means —$SO_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e., a compound that does not spontaneously undergo transformation such as by rearrangement, cyclization, elimination, etc.

Compositions for Uranium Capture and Methods of Making and Uses Thereof

A variety of composition are provided for uranium capture. The compositions include a porous organic polymer having a plurality of amidoxime or amidrazone groups covalently attached thereto. In some aspects, the composition includes a covalent organic framework (COF) having a plurality of two-dimensional polymers (2d-polymers). Each of the 2d-polymers can include repeat units according to the following formula

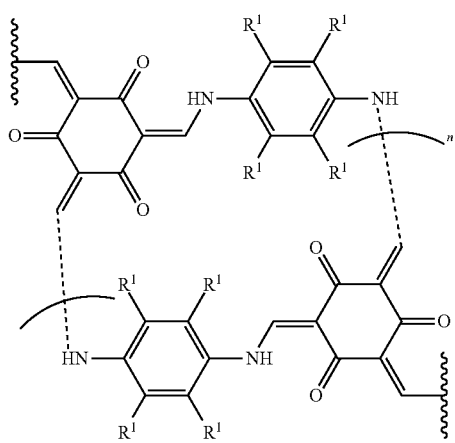

Each occurrence of $R^1$ can independently be a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone. In the structure, the integer n relates to the size of the ring structure forming the repeat units and can be any integer 2, 3, 4, 5, 6, 7, 8, 9, 10, 11, 12, or more. Each of the 2d-polymers in the plurality of 2d-polymers can stack via non-covalent interactions to form a plurality of pores. Suitable hydrogen bond donors can include amines.

In some aspects, a composition for uranium capture is provided having a porous aromatic framework (PAF) with a plurality of repeat units having a structure according to the following formula

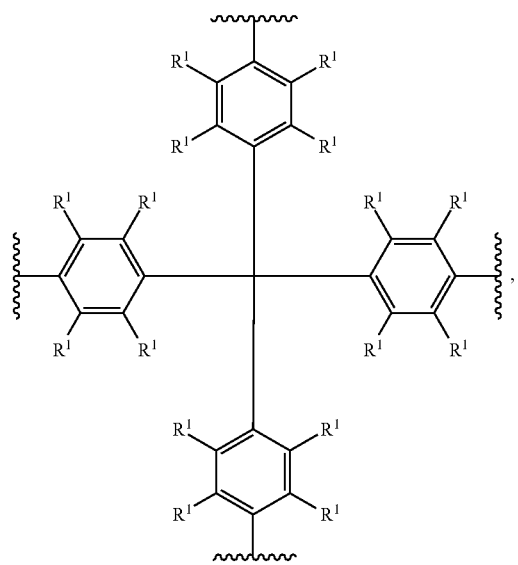

and a plurality of pores.

Each occurrence of $R^1$ can independently be a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone.

In some aspects, a composition is provided for uranium uptake, the composition having a porous organic polymer (POP) with (i) a plurality of repeat units each having a structure according to any one of Formula 1A-Formula 1C and (ii) a plurality of pores having a hierarchical pore size distribution over a range of pore sizes.

Formula 1A

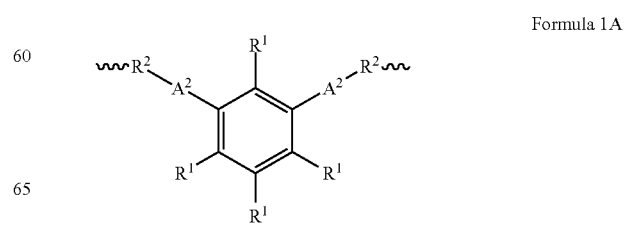

Formula 1B

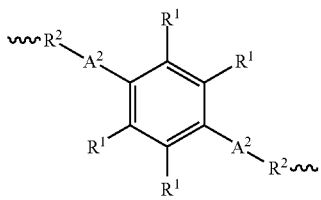

Formula 1C

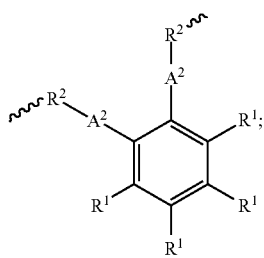

and

Each occurrence of $R^1$ can be independently a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone. Each occurrence of $R^2$ is independently an alkyl having 1 to 3 carbon atoms. Each occurrence of $R^3$ is independently none or a substituted or unsubstituted alkyl or heteroalkyl having 1 to 5 carbon atoms. Each occurrence of $A^2$ is independently none or a substituted or unsubstituted phenyl In some aspects, the repeat units in the plurality of repeat units each have a structure according to any one of Formula 2A-Formula 2C Formula 2A

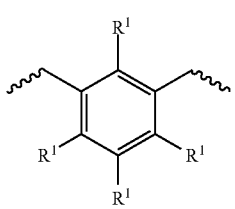

Formula 2B

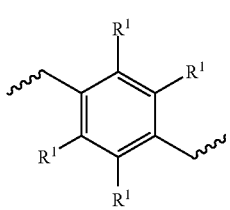

Formula 2C

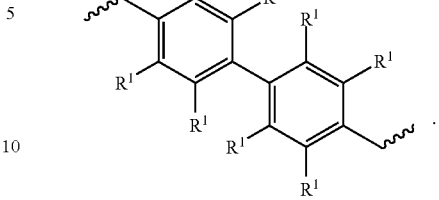

The POP can have a plurality of pores having a hierarchical pore size distribution over a range of pore sizes. In some aspects, the range of pore sizes is at least 5 nm, at least 8 nm, or at least 10 nm. In some aspects, the range of pore sizes is 5 nm wide, e.g. about 0.5 nm to 5.5 nm, about 1.0 nm to 6.0 nm, about 1.5 nm to 6.5 nm, about 2 nm to 7 nm, about 3 nm to 8 nm, about 4 nm to 9 nm, or about 5 nm to 10 nm. In some aspects, the range of pore sizes is 8 nm wide, e.g. about 0.5 nm to 8.5 nm, about 1.0 nm to 9.0 nm, about 1.5 nm to 9.5 nm, or about 2 nm to 10 nm. In some aspects, the range of pore sizes is 10 nm wide, e.g. about 0 nm to 10 nm or about 0.5 nm to 10.5 nm. In some aspects, the range of pore sizes is about 1 nm to 10 nm, about 1 nm to 8 nm, about 1 nm to 5 nm, or about 5 nm to 10 nm.

The hierarchical pore size distribution can be determined based upon a pore size distribution determined via non-local density functional theory or the Horvath-Kawazoe model using adsorption isotherms for an inert gas such as $N_2$ or Ar. In some aspects, the hierarchical pore size distribution is determined based upon at least 40%, at least 50%, at least 60%, at least 70%, or at least 80% of the pore sizes in the range of pore sizes having a pore volume of at least 0.005 $cm^3\ g^{-1}$, at least 0.01 $cm^3\ g^{-1}$, or at least 0.015 $cm^3\ g^{-1}$ in the pore size distribution. The pore size distribution can be based on a non-local density functional theory model applied to a nitrogen adsorption isotherm for the POP measured at about 77 K. In some aspects, the range of pore sizes is about 1 nm to about 10 nm; and at least 80% of the pore sizes in the pore size distribution have a pore volume of at least 0.01 $cm^3\ g^{-1}$.

The composition can have a maximum uranium uptake capacity of 1,000 $mg\ g^{-1}$ to 2,000 $mg\ g^{-1}$ at 1 atm and 296 K. The composition can have a distribution coefficient for uranium of $3 \times 10^7$ $mL\ g^{-1}$ to $1 \times 10^9$ $mL\ g^{-1}$. The compositions can attain at least 90% of the equilibrium adsorption capacity in less than 10 minutes when placed in an aqueous solution containing the uranium. The uranium uptake capacity can be stable and recyclable. The composition can be stable under basic conditions and/or stable under acidic conditions. The porous organic polymer can have a surface area from 1,000 $m^2/g$ to 8,000 $m^2/g$.

A variety of methods are provided for making the compositions described herein. The methods can provide efficient and cost-effective methods for making POPs for uranium capture. that have a hierarchical porosity. In some aspects, the methods include free-radical polymerization of a divinyl aryl rings having a nitrile group to form the porous organic polymer having nitrile moieties covalently attached thereto. The nitrile can be converted to the at least one nitrile into an amidoxime or an amidrazone.

In some aspects, methods are provided (i) condensing a plurality of 2,5-diamino-substituted phenyl monomers with a plurality of triformylphloroglucinol monomers to form a plurality of nitrile functionalized two-dimensional polymers (2d-polymers); and (ii) converting the at least one nitrile into an amidoxime or an amidrazone to form a plurality of two-dimensional polymers (2d-polymers), each comprising repeat units according to the following formula

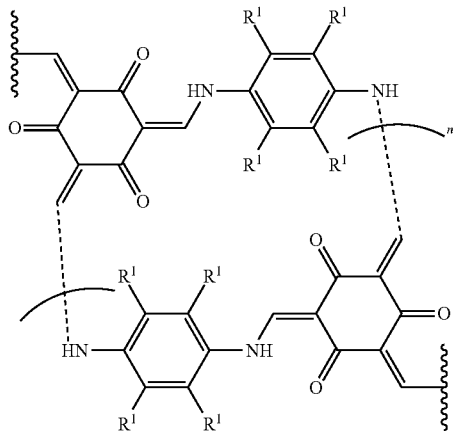

Each occurrence of $R^1$ in the 2d-polymer can independently be a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone. The integer, n, can be anything 2, 3, 4, 5, 6, 7, 8, 9, 10, 11, 12 or more. The 2,5-diamino-substituted phenyl monomers can have a structure according to the following formula:

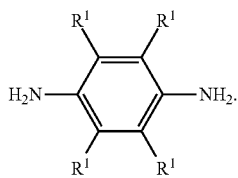

Each occurrence of $R^1$ in the 2,5-diamino-substituted phenyl monomer can be independently a hydrogen, a halide, an alkyl or heteroalkyl having 1 to 3 carbon atoms, a hydrogen-bond donor, or a nitrile so long as at least one occurrence of $R^1$ is a nitrile. Each of the 2d-polymers in the plurality of 2d-polymers can self assemble via non-covalent interactions to form a three-dimension structure comprising a plurality of pores.

In some aspects, a method of making the composition is provided including (i) forming a mixture comprising a precursor monomer and a free radical initiator in an aprotic solvent, wherein the precursor monomer has a structure according to the formula $CH_2=CHA^1CH=CH_2$ where $A^1$ is a conjugated core having one or more nitrile moieties covalently attached thereto; (ii) heating the mixture to a first elevated temperature for a first period of time to form the porous organic polymer having nitrile moieties covalently attached thereto; and (iii) converting the nitrile moieties into an amidoxime or an amidrazone to form the porous organic polymer having one or more amidoxime or amidrazone moieties covalently attached thereto.

The amidoxime can have a structure according to any one of the following formulas

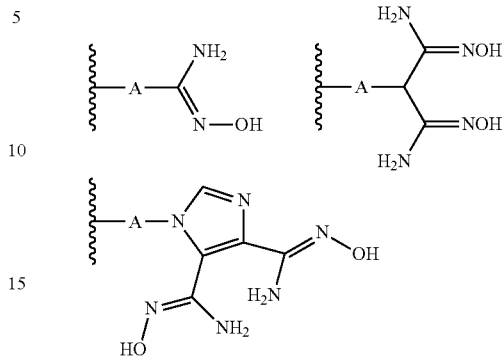

where each occurrence of A is independently none or an alkyl, alkenyl, or heteroalkyl having 12, 3, 4, or 5 carbon atoms.

The amidrazone can have a structure according to any one of the following formulas

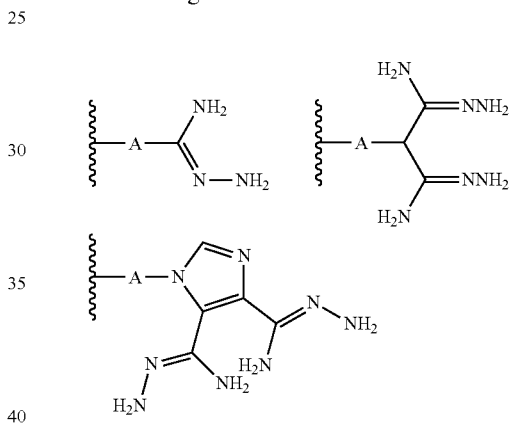

where each occurrence of A is independently none or an alkyl, alkenyl, or heteroalkyl having 1, 2, 3, 4, or 5 carbon atoms.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Unless indicated otherwise, Uranium adsorption tests were performed using the protocol reported in Prof. Sheng Dai's paper: Angew. Chem. Int. Ed. 2013, 52, 13458-13462. Typically, 13.0±1.0 mg of the functionalized POP samples were conditioned with 3% KOH and shook/stirred with 250 mL stock solution for 24 hours at room temperature, followed by filtration of supernatants before the determination of the concentration. The stock solution of simulated seawater was comprised of 438.607 mmol/L sodium chloride, 2.297 mmol/L sodium bicarbonate and 0.034 mmol/L uranyl nitrate in ultrapure water. The sorbent and the stock solution were placed in a wide mouth plastic bottle and shaken/stirred for 24 hours at room temperature followed by filtration of supernatants. The amount of metal ion uptake was determined from the concentration difference between the beginning and the end of the test on a Perkin Elmer Elan II DRC ICP-MS.

Example 1: Covalent Organic Frameworks as a Decorating Platform for Utilization and Affinity Enhancement of Chelating Sites for Radionuclide Sequestration Material Synthesis Synthesis of triformylphloroglucinol

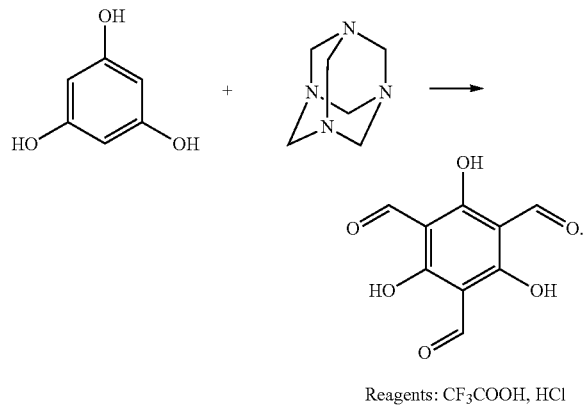

Reagents: CF$_3$COOH, HCl

Hexamethylenetetraamine (15.1 g, 108 mmol), phloroglucinol (6.0 g, 49 mmol) and trifluoroacetic acid (90 mL) were refluxed at 100° C. under N$_2$ for 2.5 h. After that, 3 M HCl (150 mL) was added slowly, and the mixture was heated at 100° C. for another 1 h. After cooling to room temperature, the solution was filtered through Celite, extracted with an excess of CH$_2$Cl$_2$, dried over MgSO$_4$, and the solution was evaporated under reduced pressure to afford the product as a light yellow solid. Yield: 1.53 g (14.5%). $^1$H NMR (400 MHz, d$_6$-DMSO, 298K, TMS): § 9.99 (s, 3H), 6.88 (br, 3H) ppm. $^{13}$C NMR (125 MHz, CDCl$_3$, 298K, TMS) 103.62, 173.76, 191.92 ppm.

Synthesis of 2,5-diaminobenzonitrile

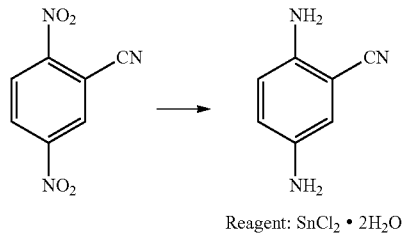 [SMILES: N#Cc1cc([N+](=O)[O-])ccc1[N+](=O)[O-] ; N#Cc1cc(N)ccc1N]

Reagent: SnCl$_2$ • 2H$_2$O

A mixture of 2,5-dinitrobenzonitrile (5.0 g, 25.9 mmol), SnCl$_2$·2H$_2$O (29.2 g, 130 mmol), and ethanol (100 mL) was heated at 80° C. under N$_2$ for 12 h. After being cooled, the mixture was poured into ice water and made basic by the addition of 1 M NaOH aqueous solution. The residual was extracted with ethyl acetate, washed with brine, dried over K$_2$CO$_3$, and evaporated under reduced pressure, giving the crude compound, which was purified by flash chromatography with hexane/EtOAc/Et$_3$N (5:1:0.05 v:v:v) as eluent to afford the title compound as a brown solid. Yield: 3.75 g (92%). $^1$H NMR (400 MHz, d$_6$-DMSO, 298K, TMS): δ6.69-6.72 (m, 1H), 6.61 (d, 1H, J=8.0 Hz), 6.55 (d, 1H, J=2.4 Hz), 5.08 (br, 2H), 4.60 (br, 2H) ppm. $^{13}$C NMR (125 MHz, d$_6$-DMSO, 298K, TMS) 143.45, 139.7, 122.94, 119.1, 117.5, 115.36, 94.83 ppm.

Synthesis of 2-amino-5-((4-aminophenyl)diazenyl)benzonitrile

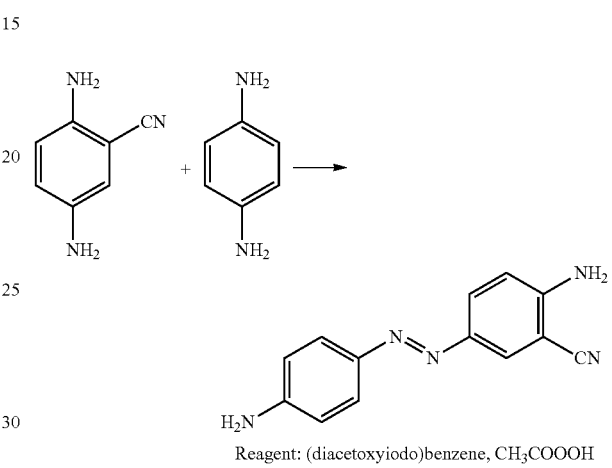

Reagent: (diacetoxyiodo)benzene, CH$_3$COOOH

A mixture of 2,5-diaminobenzonitrile (5 mmol, 665 mg), p-phenylenediamine (2.5 mmol, 270 mg), (diacetoxyiodo)benzene (0.15 equiv, 0.75 mmol, 190 mg), and CH$_3$COOOH (4 mL) in CH$_2$Cl$_2$ (40 mL) in a round-bottomed flask was stirred at room temperature for 48 h. The residual was evaporated under reduced pressure, giving the crude compound which was purified by flash chromatography with hexane/EtOAc/Et$_3$N (5:1:0.05 v:v:v) as eluent to afford the title compound as an orange solid. Yield: 195 mg (33%), $^1$H NMR (400 MHz, d$_6$-DMSO, 298K, TMS): δ6.80-6.84 (m, 2H), 6.66-6.73 (m, 3H), 6.56 (d, 2H, J=8.4 Hz), 5.13 (br, 4H) ppm. $^{13}$C NMR (125 MHz, d$_6$-DMSO, 298K, TMS): 150.72, 147.25, 145.67, 145.06, 120.88, 119.94, 119.56, 117.25, 116.66, 115.28, 103.13.

Synthesis of COF-TpDb

A Pyrex tube measuring o.d.×i.d.=9.5×7.5 mm$^2$ was charged with triformylphloroglucinol (21 mg, 0.10 mmol) and 2,5-dinitrobenzonitrile (19.9 mg, 0.15 mmol) in 1.1 mL of a 5:5:1 v:v:v solution of 1,4-dioxane:mesitylene:6 M aqueous acetic acid. The tube was flash frozen at 77 K (liquid N$_2$ bath), evacuated, and flame sealed. Upon sealing the length of the tube was reduced to ca. 15 cm. The reaction mixture was heated at 120° C. for 5 days to afford an orange-red precipitate which was isolated by filtration and washed with anhydrous tetrahydrofuran using Soxhlet extraction for 2 days. The product was dried under vacuum at 50° C. to afford COF-TpDb (38.1 mg, 78%). CHN found: C, 66.1; H, 3.8; N, 13.6%.

Synthesis of COF-TpDb-AO

COF-TpDb-AO was synthesized by treatment of COF-TpDb (200 mg) with NH$_2$OH·HCl (82 mg) and trimethylamine (120 mg) in methanol (5 mL) at 70° C. for 2 hours, and then another portion of NH$_2$OH·HCl (41 mg) and trimethylamine (60 mg) was introduced. After being heated for another 2 hours, the reaction was cooled to room temperature and COF-TpDb-AO was obtained by filtration, washing with water, and drying at 50° C. under vacuum. CHN found: C, 60.2; H, 4.2; N, 16.5%.

Synthesis of COF-TpAab

A Pyrex tube measuring o.d.×i.d.=9.5×7.5 mm$^2$ was charged with triformylphloroglucinol (21 mg, 0.10 mmol) and 2-amino-5-((4-aminophenyl)diazenyl)benzonitrile (35.55 mg, 0.15 mmol) in 1.1 mL of a 5:5:1 v:v:v solution of 1,4-dioxane: mesitylene: 6 M aqueous acetic acid. The tube was flash frozen at 77 K (liquid N$_2$ bath), evacuated and flame sealed. Upon sealing the length of the tube was reduced to ca. 15 cm. The reaction mixture was heated at 120° C. for 5 days to afford an orange precipitate which was isolated by filtration and washed with anhydrous tetrahydrofuran using Soxhlet extraction for 2 days. The product was dried under vacuum at 50° C. to afford COF-TpAab (40.5 mg, 81%). CHN found: C, 67.4; H, 3.7; N, 17.1%.

Synthesis of COF-TpAab-AO

COF-TpAab-AO was synthesized by treatment of COF-TpAab (200 mg) with NH$_2$OH·HCl (80 mg) and trimethylamine (120 mg) in methanol (5 mL) at 70° C. for 2 h, and then another portion of NH$_2$OH·HCl (40 mg) and trimethylamine (60 mg) was introduced. After being heated for another 2 h, the reaction was cooled to room temperature and COF-TpAab-AO was obtained by filtration, washing with water, and drying at 50° C. under vacuum. CHN found: C, 62.4; H, 4.1; N, 18.9%.

Synthesis of POP-TpDb

To the mixture of triformylphloroglucinol (42 mg, 0.20 mmol) and 2,5-dinitrobenzonitrile (39.8 mg, 0.3 mmol) in a 25 mL Schlenk tube, dimethyl sulfoxide (DMSO, 4.0 mL) was introduced under N$_2$ atmosphere. After being stirred at room temperature for 12 h and then 120° C. for 48 h, the title product was isolated by filtration, washed with DMF and acetone, and dried under vacuum at 50° C. CHN found: C, 66.1; H, 3.8; N, 13.5%.

Synthesis of POP-TpDb-AO

The procedures for the synthesis of POP-TpDb-AO are similar to those of COF-TpDb-AO, except POP-TpDb is used instead of COF-TpDb. CHN found: C, 60.1; H, 4.3; N, 16.4%.

Synthesis of POP-TpAab

To the mixture of triformylphloroglucinol (42 mg, 0.20 mmol) and 2-amino-5-((4-aminophenyl)diazenyl)benzonitrile (71.1 mg, 0.3 mmol) in a 25 mL Schlenk tube, dimethyl sulfoxide (4.0 mL) was introduced under N$_2$ atmosphere. After being stirred at room temperature for 12 h and then 120° C. for 48 h, the title product was isolated by filtration, washed with DMF and acetone, and dried under vacuum at 50° C. CHN found: C, 67.2; H, 3.9; N, 17.0%.

Synthesis of POP-TpAab-AO

The procedures for the synthesis of POP-TpAab-AO are similar to those of COF-TpAab-AO, except POP-TpAab is used instead of COF-TpAab. CHN found: C, 62.5; H, 4.0; N, 18.8%.

Sorption Experiments

The aqueous solutions of uranium with different concentrations were obtained by diluting the stock metal solution with the proper amount of distilled water unless otherwise indicated. The pH values of the solutions were adjusted by HNO$_3$ or NaOH aqueous solution. The concentrations of uranium during all the experiments were detected by inductively coupled plasma-optical emission spectroscopy (ICP-OES) and inductively coupled plasma-mass spectrometry (ICP-MS) for extra low concentrations. All the adsorption experiments were performed at ambient conditions. A sample of uranium solution without sorbent material was analyzed for each sorption experiment as a negative control.

Uranium Sorption Isotherms

To obtain the uranium adsorption isotherms for various adsorbents, COF-TpDb-AO (4.5 mg), POP-TpDb-AO (4.5 mg), COF-TpAab-AO (5 mg), or POP-TpAab-AO (5 mg) were added into 10 mL aqueous solutions with different concentrations of uranium. Adsorbents were suspended fully by brief sonication and then the mixtures were stirred vigorously overnight, by which time it was assumed that adsorption equilibrium had been reached. The treated solutions were filtered through a 0.45 μm membrane filter. The supernatant was analyzed using ICP analysis to determine the remaining uranium concentration. The adsorbed amount at equilibrium ($q_e$, mg g$^{-1}$) was calculated by $$q_e = \frac{(C_0 - C_e) \times V}{m}$$

where V is the volume of the treated solution (mL), m is the amount of used adsorbent (g), and $C_0$ and $C_e$ are the initial concentration and the final equilibrium concentration of uranium, respectively.

Uranium Sorption Kinetics from Distilled Water

Uranium aqueous solution (400 mL, 9.25 ppm), and adsorbent (5 mg) were added to an Erlenmeyer flask with a magnetic stir bar. The mixture was stirred at room temperature for 3 h. At appropriate time intervals, aliquots (5 mL) were taken from the mixture, and the adsorbents were separated by a syringe filter (0.45 μm membrane filter). The uranium concentrations in the resulting solutions were analyzed by ICP-OES. The adsorption capacity at different intervals was calculated as follows:

Adsorption capacity (mg/g)=$(C_0-C_t) \times V/m$ where V is the volume of the treated solution (mL) and m is the amount of used adsorbent (mg), and $C_0$ and $C_t$ are the initial concentration and the concentration of uranium at t (min), respectively.

$K_d$ Value Calculation

The distribution coefficient ($K_d$) value as used for the determination of the affinity and selectivity of sorbents for U, is given by the equation:

$$K_d = \left(\frac{C_0 - C_e}{C_e}\right) \times \frac{V}{m}$$

where V is the volume of the treated solution (mL), m is the amount of adsorbent (g), $C_O$ is the initial concentration of uranium, and $C_e$ is the equilibrium concentration of uranium. In the present work, 5 ppm uranium aqueous solutions (pH~6) were treated by various adsorbents overnight at a V/m ratio of 10000 mL g$^{-1}$.

Uranium Removal Kinetics from Various Water Samples (Potable Water, River Water, and Well Water)

Uranium spiked water samples (100 mL, 1 ppm) and adsorbents (10 mg) were added to an Erlenmeyer flask with a magnetic stir bar. The mixture was stirred at room temperature. At appropriate time intervals, aliquots (5 mL) were taken from the mixture, and the adsorbents were separated by a syringe filter (0.45 µm membrane filter). The uranium concentrations in the resulting solutions were analyzed by ICP-MS. The percentage removal of uranium species was calculated as follows:

$$\text{Removal percentage (\%)} = \frac{C_0 - C_t}{C_0} \times 100$$

Uranium Adsorption Kinetics from Seawater

Sea water spiked with 20 ppm uranium (200 mL), and adsorbents (5 mg) were added to an Erlenmeyer flask with a magnetic stir bar. The mixture was stirred at room temperature. At appropriate time intervals, aliquots (5 mL) were taken from the mixture, and the adsorbents were separated by a syringe filter (0.45 µm membrane filter). The uranium concentrations in the resulting solutions were analyzed by ICP-OES or ICP-MS.

Structure Simulation

The crystalline structures of the COFs were constructed using Materials Studio and the geometry and unit cell were optimized by the Forcite method. Universal force field and Quasi-Newton algorithm were used for calculation. The XRD pattern simulations were performed in a software package for crystal determination from PXRD pattern, implemented in MS modeling. Pawley refinement was performed to optimize the lattice parameters iteratively until $R_{WP}$ value converges. The pseudo-Voigt profile function was used for whole profile fitting and Berrar-Baldinozzi function was used for asymmetry correction during the refinement processes. The final $R_{WP}$ values were 3.05% and 2.02% for COF-TpDb and COF-TpAab, respectively.

TABLE 1

Atomistic coordinates for the AA-stacking mode of COF-TpDb optimized using the Forcite method (space group P-6, a = b = 23.3147 Å; c = 3.4315 Å, α = β = 90° and γ = 120°).

| Atom | x/a | y/b | z/c |
| --- | --- | --- | --- |
| O1 | 0.74382 | 0.27755 | 0 |
| N2 | 0.54318 | 0.13997 | 0 |
| C3 | 0.70945 | 0.30321 | 0 |
| C4 | 0.63589 | 0.25885 | 0 |
| C5 | 0.61199 | 0.19181 | 0 |
| C6 | 0.52010 | 0.06936 | 0 |
| C7 | 0.56425 | 0.04452 | 0 |
| C8 | 0.45124 | 0.02289 | 0 |
| C9 | 0.40237 | 0.04368 | 0 |
| H10 | 0.61718 | 0.07611 | 0 |
| H11 | 0.64810 | 0.17611 | 0 |
| H12 | 0.50623 | 0.15207 | 0 |
| N13 | 0.36318 | 0.06030 | 0 |
| O14 | 0.25268 | 0.71848 | 0 |
| N15 | 0.45196 | 0.86065 | 0 |
| C16 | 0.28866 | 0.69461 | 0 |

TABLE 1-continued

Atomistic coordinates for the AA-stacking mode of COF-TpDb optimized using the Forcite method (space group P-6, a = b = 23.3147 Å; c = 3.4315 Å, α = β = 90° and γ = 120°).

| Atom | x/a | y/b | z/c |
| --- | --- | --- | --- |
| C17 | 0.36189 | 0.74083 | 0 |
| C18 | 0.38380 | 0.80744 | 0 |
| C19 | 0.47289 | 0.93051 | 0 |
| C20 | 0.42830 | 0.95465 | 0 |
| C21 | 0.54088 | 0.97655 | 0 |
| H22 | 0.57652 | 0.95966 | 0 |
| H23 | 0.37548 | 0.92174 | 0 |
| H24 | 0.34659 | 0.82174 | 0 |
| H25 | 0.49079 | 0.85105 | 0 |

TABLE 2

Atomistic coordinates for the AA-stacking mode of COF-TpAab optimized using the Forcite method (space group P-6, a = b = 34.7109 Å; c = 3.4396 Å, α = β = 90° and γ = 120°).

| Atom | x/a | y/b | z/c |
| --- | --- | --- | --- |
| O1 | 0.30476 | 0.57877 | 0 |
| N2 | 0.39342 | 0.59522 | 0 |
| C3 | 0.31801 | 0.61850 | 0 |
| C4 | 0.39958 | 0.63964 | 0 |
| C5 | 0.42707 | 0.58179 | 0 |
| C6 | 0.47432 | 0.61082 | 0 |
| C7 | 0.50262 | 0.59276 | 0 |
| C8 | 0.48574 | 0.54695 | 0 |
| C9 | 0.43978 | 0.51835 | 0 |
| C10 | 0.41111 | 0.53554 | 0 |
| C11 | 0.36691 | 0.65098 | 0 |
| H12 | 0.43279 | 0.66657 | 0 |
| C13 | 0.49665 | 0.65866 | 0 |
| H14 | 0.36144 | 0.56830 | 0 |
| H15 | 0.37570 | 0.51215 | 0 |
| H16 | 0.53843 | 0.61458 | 0 |
| H17 | 0.42588 | 0.48264 | 0 |
| O18 | 0.70496 | 0.42270 | 0 |
| N19 | 0.62129 | 0.41740 | 0 |
| C20 | 0.68736 | 0.38235 | 0 |
| C21 | 0.60924 | 0.37103 | 0 |
| C22 | 0.58987 | 0.43328 | 0 |
| C23 | 0.54329 | 0.40464 | 0 |
| C24 | 0.51462 | 0.42202 | 0 |
| C25 | 0.53152 | 0.46794 | 0 |
| C26 | 0.57767 | 0.49669 | 0 |
| C27 | 0.60644 | 0.47948 | 0 |
| C28 | 0.63776 | 0.35448 | 0 |
| H29 | 0.57428 | 0.34718 | 0 |
| H30 | 0.52808 | 0.36897 | 0 |
| H31 | 0.65425 | 0.44254 | 0 |
| H32 | 0.64195 | 0.50242 | 0 |
| H33 | 0.47900 | 0.39956 | 0 |
| H34 | 0.59155 | 0.53239 | 0 |
| N35 | 0.51598 | 0.53027 | 0 |
| N36 | 0.51547 | 0.69718 | 0 |
| N37 | 0.50125 | 0.48459 | 0 |

X-Ray Absorption Fine Structure (XAFS) Spectroscopy Sample Preparation and Data Collection The uranium species included samples were obtained by treatment of COF-TpDb-AO and POP-TpDb-AO (50 mg) with 200 mL of UO2(NO3)$_3$ aqueous solutions (20 ppm, pH~6) for 3 h. Approximately 20-25 mg of sample was enclosed in a nylon washer of 4.953 mm inner diameter (area of 0.193 cm$^2$) and sealed on one side with transparent "Scotch" tape. The sample was pressed by hand to form a uniform pellet, then sealed on the open side with a second piece of tape.

XAFS spectra were collected at Stanford Synchrotron Radiation Lightsource (SSRL), Beamline 11-2. Spectra were collected at the U $L_{III}$-edge (17166 ev) in transmission mode for COF-TpDb-AO and in fluorescence mode for POP-TpDb-AO. The X-ray beam was monochromatized by a Si(111) monochromater with higher order harmonics eliminated through a Rh-harmonic rejection mirror. All spectra were collected at room temperature. For COF-TpDb-AO, the incident beam intensity ($I_0$) and transmitted beam intensity ($I_t$) were measured by ionization chambers with 100% $N_2$ gas composition. Beam dimensions were 2 mm×1 mm. For POP-TpDb-AO spectra were collected with a Canberra 100-pixel Ge solid-state monolith detector. Sollar slits were used to decrease noise from x-ray scattering and a Sr-filter was used to maximize fluorescence signal. Beam dimensions were 2 mm×0.5 mm. Samples were placed on the beam and positions optimized to investigate the most homogeneous region and afford the best signal. Data were collected over four regions: −230 to −30 eV (10 eV step size, dwell time of 0.25 seconds), −30 to −5 eV (5 eV step size, dwell time of 0.5 seconds), −5 to 30 eV (1 eV step size), 3 Å$^{-1}$ to 13 Å$^{-1}$ (0.05 Å$^{-1}$ step size), with dwell time increasing as a function of k from 2 seconds at 3 Å$^{-1}$ to 16 seconds at 13 Å$^{-1}$.

The data were reformatted using SixPack[23] then processed and analyzed using the Athena and Artemis programs of the IFEFFIT package based on FEFF 6.[24-25] Reference data were aligned to maximum of the first derivative of the normalized μ(E) data, which was subsequently calibrated to the literature $E_0$ for the U $L_{III}$-edge (17166 eV). The datasets were then aligned in $E_0$ to each other. Spectra were averaged in μ(E) prior to normalization. The background was removed and the data were assigned an $R_{bkg}$ value of 0.8.

All data were fit simultaneously with k-weighting of 1, 2, and 3, and the final refinement was conducted with a k-weighting of 2. Structural parameters that were determined by the fits include the number of units for each system, the change in half-path length, $R_{\mathit{eff}}(\Delta R_i)$, the relative mean square displacement of the scattering element ($\sigma^2_i$), the passive electron reduction factor ($S_0^2$), and the energy shift of the photoelectron ($\Delta E_0$). Given the minimal variations anticipated for the chemical environment of the axial oxygens of the uranyl cation and porous frameworks, parameters $\Delta R$ U—$O_{ax}$, $\sigma^2$ U—$O_{ax}$, $\Delta R$ U—$O_{oxime}$, $\Delta R$ U—$N_{oxime}$, $\sigma^2$ U—$O_{oxime}$/U—$N_{oxime}$, $\Delta R$ U—$N_{amine}$, $\sigma^2$ U—$N_{amine}$, $\Delta R$ U—C, and $\sigma^2$ U—C are shared among datasets. The fit range ($\Delta R$), data range ($\Delta k$), number of independent points (Nidp), number of variables (Nvar), degrees of freedom (v), reduced chi-squared value ($\chi v2$), and R-factor (R) are in Table for the two-shell fit and Table for the four-shell fit. To adhere to the Nyquist criterion,[26-27] the number of independent points was not to exceed ⅔ the number of variables.

TABLE 3

Initial scattering paths used in the refinement of uranyl-contacted COF-TpDb-AO and POP-TpDb-AO.

| Scattering Path | $N_{degen}$ | R (Å) | ΔR (Å) | $\sigma^2$ (×10$^3$ Å$^2$) |
|---|---|---|---|---|
| U → $O_{ax}$ | 2 | 1.80 | ΔR-$O_{ax}$ | $\sigma^2$-$O_{ax}$ |
| U → $O_{oxime}$ | $CN_n$ | 2.35 | ΔR-$O_{oxime}$ | $\sigma^2$-oxime |
| U → $N_{oxime}$ | $CN_n$ | 2.44 | ΔR-$N_{oxime}$ | $\sigma^2$-oxime |
| U → $N_{amine}$ | $CN_n$ | 2.99 | ΔR-$N_{amine}$ | $\sigma^2$-$N_{amine}$ |
| U → C | $CN_n$ | 3.57 | ΔR-C | $\sigma^2$-C |
| U → $O_{ax(1)}$ → $O_{ax(2)}$ | 2 | 3.59 | 2 × ΔR-$O_{ax}$ | 2 × $\sigma^2$-$O_{ax}$ |
| U → $O_{ax(1)}$ → U → $O_{ax(2)}$ | 2 | 3.59 | 2 × ΔR-$O_{ax}$ | 2 × $\sigma^2$-$O_{ax}$ |

TABLE 3-continued

Initial scattering paths used in the refinement of uranyl-contacted COF-TpDb-AO and POP-TpDb-AO.

| Scattering Path | $N_{degen}$ | R (Å) | ΔR (Å) | $\sigma^2$ (×10$^3$ Å$^2$) |
|---|---|---|---|---|
| U → $O_{ax(1)}$ → U → $O_{ax(1)}$ | 2 | 3.59 | 2 × ΔR-$O_{ax}$ | 4 × $\sigma^2$-$O_{ax}$ |
| U → $O_{oxime}$ → $N_{oxime}$ | 2 × $CN_n$ | 3.11 | 0.5 × (ΔR-$O_{oxime}$ + ΔR-$N_{oxime}$) | 1.5 × $\sigma^2$-oxime |
| U → $O_{ax}$ → $O_{oxime}$ | 4 × $CN_n$ | 3.58 | 0.5 × (ΔR-$O_{ax}$ + ΔR-$O_{oxime}$) | 0.75 × ($\sigma^2$-$O_{ax}$ + $\sigma^2$-oxime) |
| U → $O_{ax}$ → $N_{oxime}$ | 4 × $CN_n$ | 3.60 | 0.5 × (ΔR-$O_{ax}$ + ΔR-$N_{oxime}$) | 0.75 × ($\sigma^2$-$O_{ax}$ + $\sigma^2$-oxime) |

TABLE 4

Best fit values for COF-TpDb-AO and POP-TpDb-AO.

| Scattering Path | $N_{degen}$ COF | $N_{degen}$ POP | R (Å) | $\sigma^2$ (×10$^3$ Å$^2$) |
|---|---|---|---|---|
| U → $O_{ax}$ | 2 | 2 | 1.778 ± 0.007 | 2 ± 1 |
| U → $O_{eq}$ | 2.3 ± 0.5 | 2.6 ± 0.6 | 2.27 ± 0.02 | 6 ± 6 |
| U → $N_{eq}$ | 2.3 ± 0.5 | 2.6 ± 0.6 | 2.44 ± 0.03 | 6 ± 6 |
| U → $N_{nitrate}$ | 2.3 ± 0.5 | 2.6 ± 0.6 | 2.88 ± 0.02 | 5 ± 2 |
| U → C | 2.3 ± 0.5 | 2.6 ± 0.6 | 3.60 ± 0.05 | 9 ± 6 |
| U → $O_{ax(1)}$ → $O_{ax(2)}$ | 2 | 2 | 3.55 ± 0.01 | 4 ± 1 |
| U → $O_{ax(1)}$ → U → $O_{ax(2)}$ | 2 | 2 | 3.55 ± 0.01 | 4 ± 1 |
| U → $O_{ax(1)}$ → U → $O_{ax(1)}$ | 2 | 2 | 3.55 ± 0.01 | 9 ± 2 |
| U → $O_{oxime}$ → $N_{oxime}$ | 5 ± 1 | 5 ± 1 | 3.06 ± 0.04 | 8 ± 8 |
| U → $O_{ax}$ → $O_{oxime}$ | 9 ± 2 | 10 ± 2 | 3.53 ± 0.02 | 6 ± 6 |
| U → $O_{ax}$ → $N_{oxime}$ | 9 ± 2 | 10 ± 2 | 3.59 ± 0.03 | 6 ± 6 |

TABLE 5

Parameters and metrics for the simultaneous two-shell refinement of COF-TpDb-AO and POP-TpDb-AO.

| Metric | Value |
|---|---|
| $S_0^2$ COF | 0.79 ± 0.11 |
| $S_0^2$ POP | 1.06 ± 0.15 |
| $E_0$ | 4.8 ± 2.3 |
| $Xv^2$ | 0.91 |
| R-factor | 0.2% |
| R-range | 1-3.5 |
| k-range | 3.0-10.5 |
| $N_{idp}$ | 23.6 |
| $N_{var}$ | 14 |
| D.O.F. | 9 |

Result and Discussion

Figure 8:
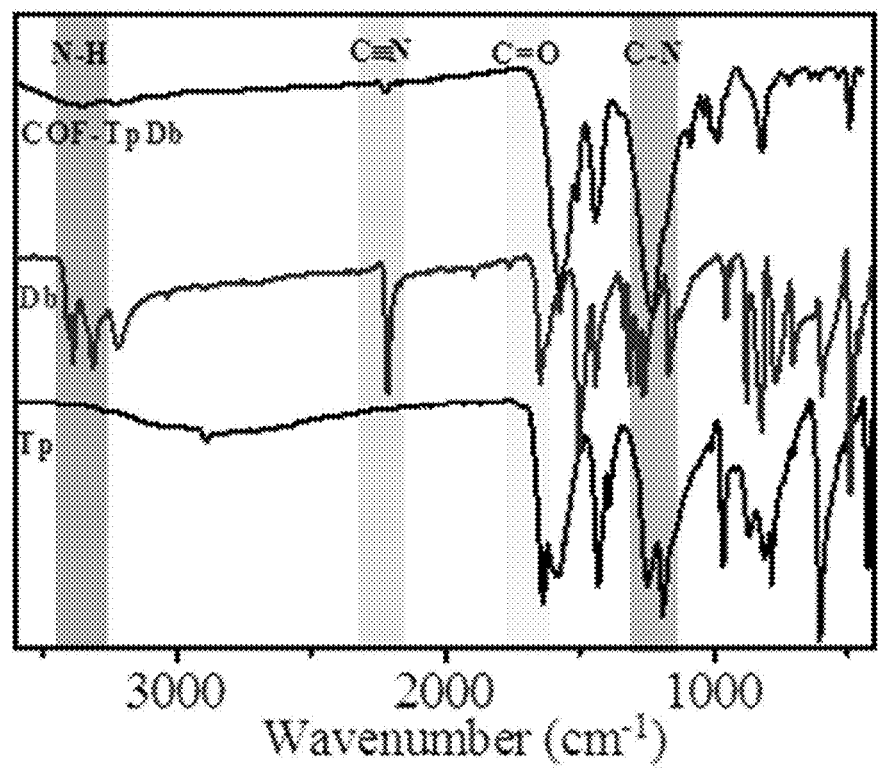
FIG. 8 shows IR spectra.

A two-step synthesis was employed due to the incompatibility of the amidoxime group during COF synthesis as it is prone to react with the building units and therefore is likely to inhibit the COF formation. Given that amidoxime groups are readily formed through the reaction of hydroxylamine with cyano groups, a nitrile functionalized COF was first obtained by condensing 2,5-diaminobenzonitrile (db) with triformylphloroglucinol (Tp) under solvothermal conditions to yield COF-TpDb (FIGS. 1A-1D). The resultant COF was then amidoximated by treatment with hydroxylamine in methanol to afford the amidoxime functionalized COF material (COF-TpDb-AO). The chemical composition and structure of COF-TpDb was determined by Fourier transform infrared (FT-IR) and solid-state $^{13}$C NMR spectroscopy. The disappearance of the characteristic primary N—H stretching bands (3300-3400 cm$^{-1}$) of the parent amines and the C=O stretching frequency around 1660 cm$^{-1}$ for aldehydes in the FT-IR spectrum of COF-TpDb indicates the complete consumption of the starting materials. In addition, the absence of the C=N stretching peaks at around 1634 cm$^{-1}$ and the emergence of a new C—N stretch at 1230 cm$^{-1}$ verify the transformation of the enol to keto tautomer (FIG. 8).[16] Furthermore, the peak observed at 2213 cm$^{-1}$, which is ascribed to the CN stretching band, indicates the existence of cyano groups in COF-TpDb (FIG. 2F). The amount of cyano groups in COF-TpDb was determined to be 4.2 mmol g$^{-1}$ by CHN analysis. Solid-state $^{13}$C NMR spectrum of COF-TpDb provides a separate line of evidence for the existence of the keto tautomer and cyano functionality, supported by the presence of the peak at about 183 ppm and 95 ppm, which are attributed to the keto (C=O) and CN group, respectively (FIG. 2G).

Figure 2A:
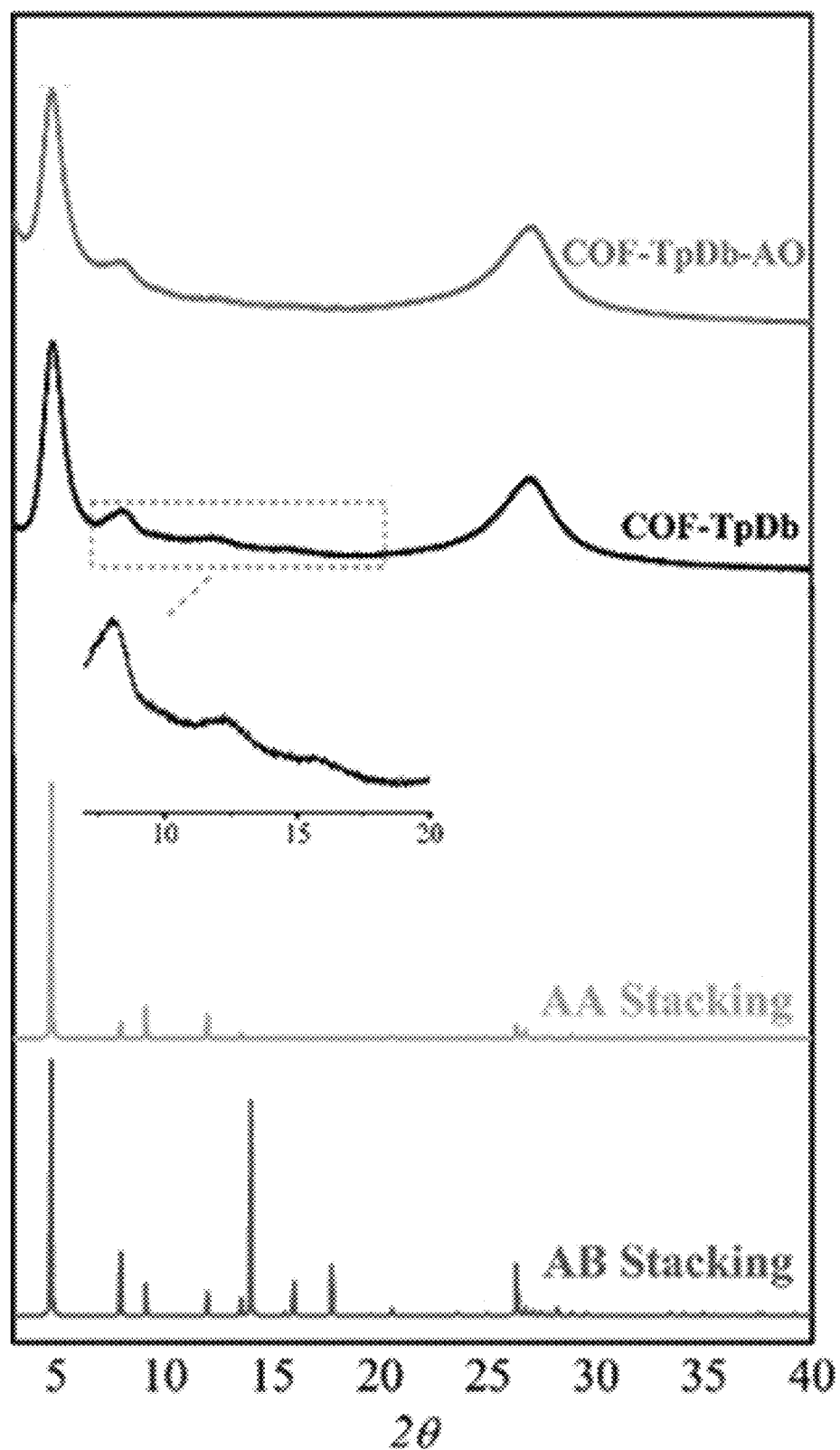
FIGS. 2A-2G show (FIG. 2A) PXRD profiles.
Figure 2B:
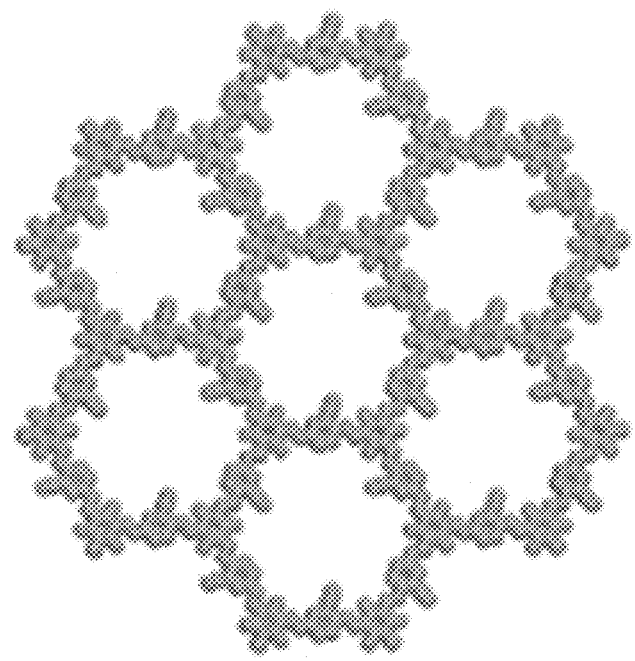
Figure 2C:
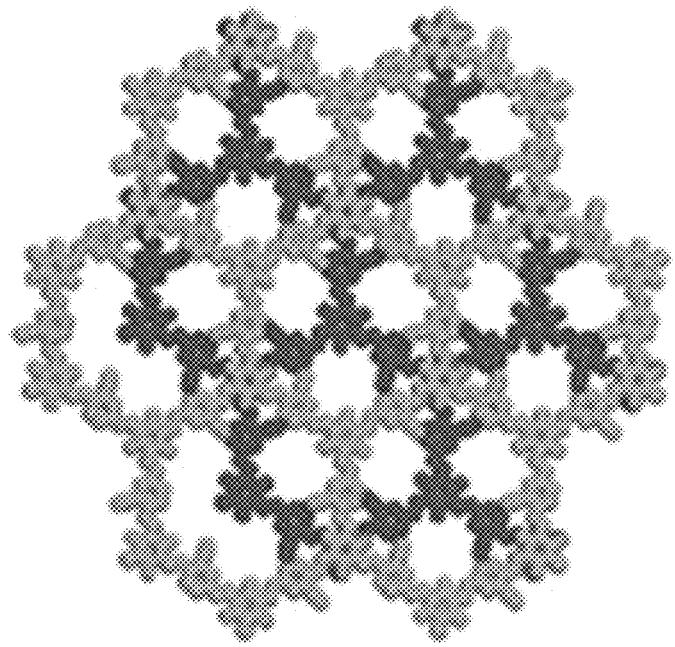
Figure 2D:
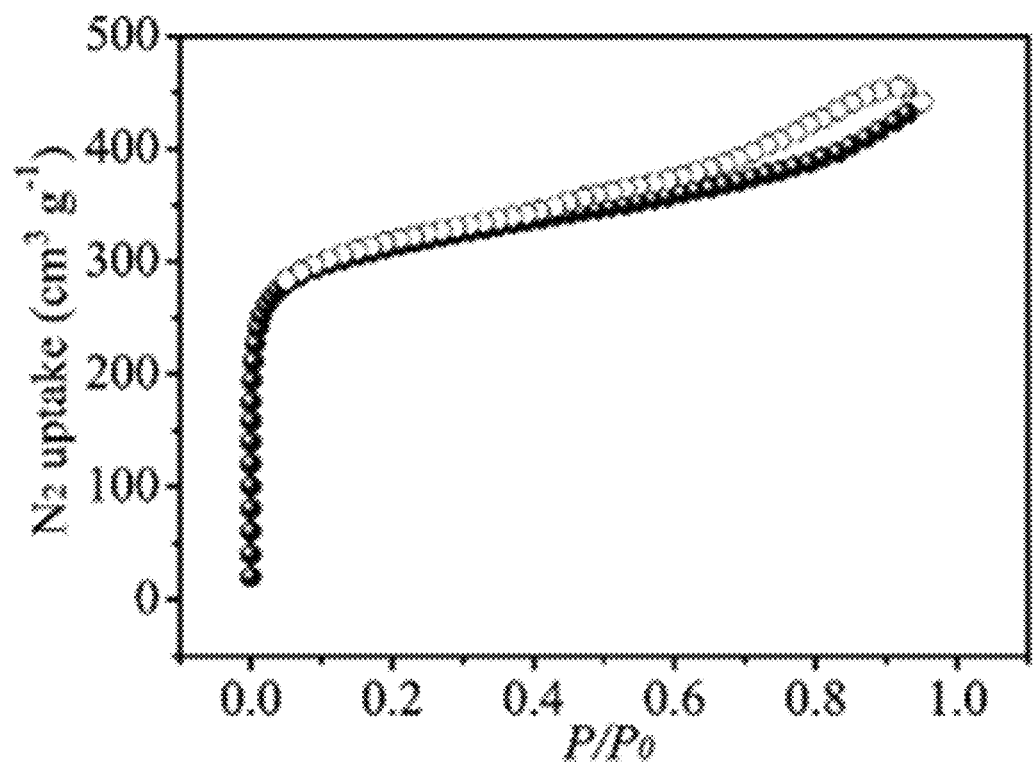
Figure 9:
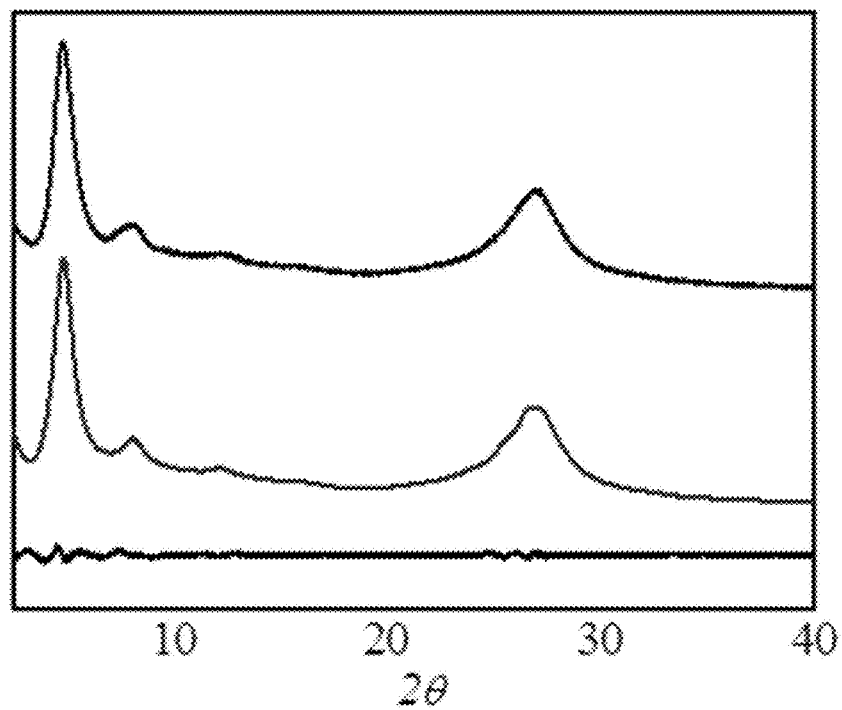
FIG. 9 shows PXRD profiles of COF-TpDb (blue: experimental, red: Pawley refinement, black: their difference.)
Figure 10:
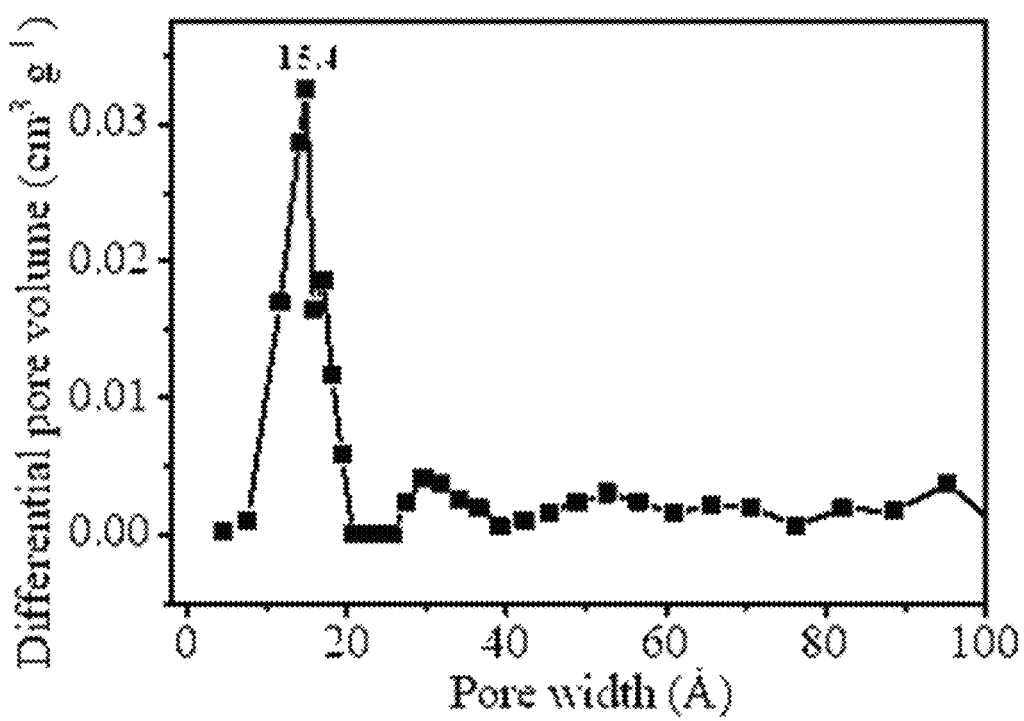
FIG. 10 shows pore size distribution of COF-TpDb calculated based on NLDFT.

To analyze the structure of COF-TpDb, powder X-ray diffraction (PXRD) experiments were conducted (FIG. 2A). In the experimental PXRD profile of COF-TpDb, a strong peak at 4.8° together with some relatively weaker peaks at 8.1°, 12.3°, 15.8°, and ca. 26.9° were observed, which were assigned to (100), (110), (210), (220), and (001) diffractions (FIG. 2A). To elucidate the lattice packing, theoretical simulations using Materials Studio were performed by constructing structural models (Tables 1 and 2). Full profile pattern matching (Pawley) refinements were carried out on the experimental PXRD and the refined PXRD pattern is in good agreement with the experimental results, as evidenced by the negligible difference (FIG. 9). The experimental data matched well with the simulated PXRD patterns of the proposed model in an eclipsed orientation (AA stacking, FIG. 2B). In contrast, staggered orientations (AB stacking, FIG. 2C) show significant deviations from the observed PXRD patterns. These results show that COF-TpDb has one-dimensional channels, with a diameter of 15.8 Å, stacking along the c-axis with an interlayer distance of 3.4 Å. To investigate the details of the pore characteristics of COF-TpDb, N$_2$ sorption measurements at 77 K were performed. The Brunauer-Emmett-Teller (BET) surface area of COF-TpDb was evaluated to be 1164 m$^2$ g$^{-1}$ (FIG. 2D) with a pore size distribution centered at 15.4 Å (FIG. 10) calculated by using the nonlocal density functional theory (NLDFT) method, which is in good agreement with the theoretical value.

Figure 2E:
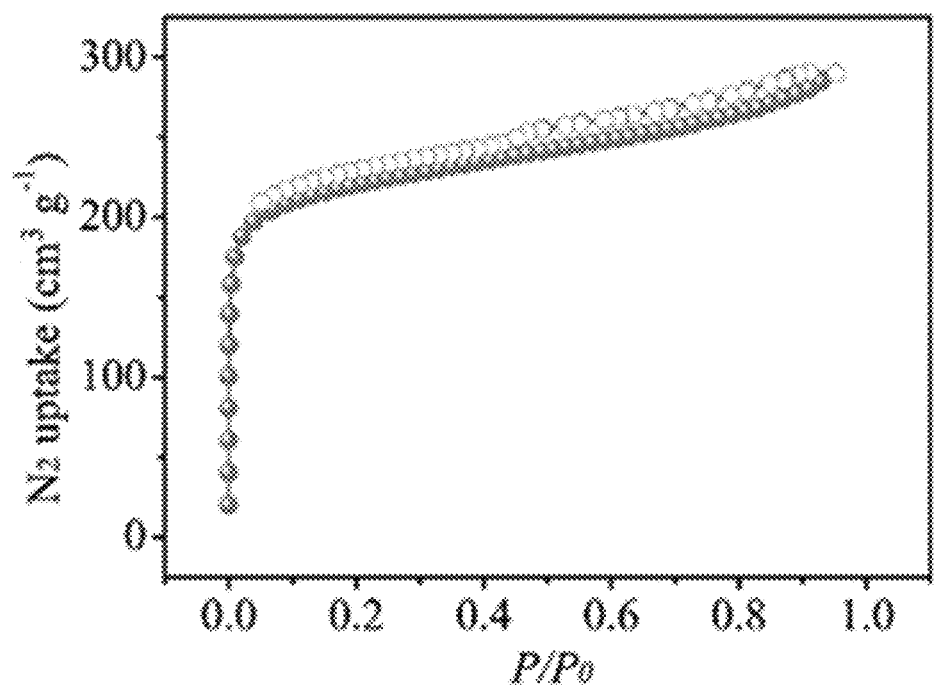
Figure 2F:
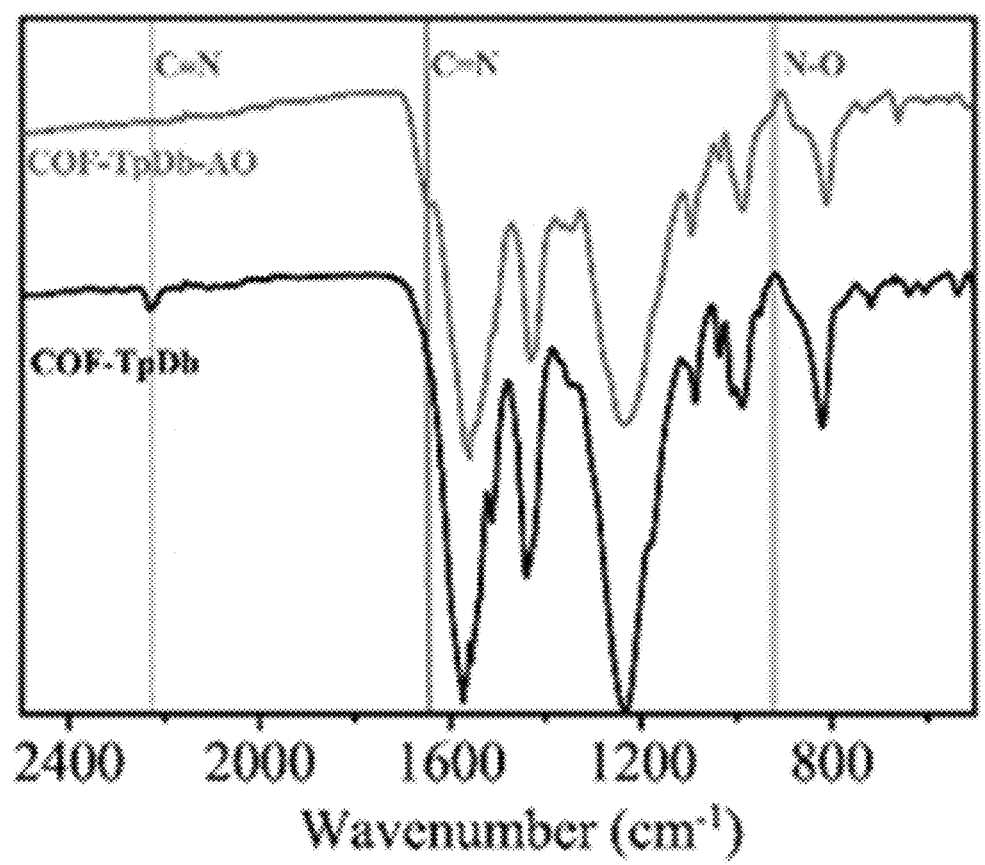
Figure 2G:
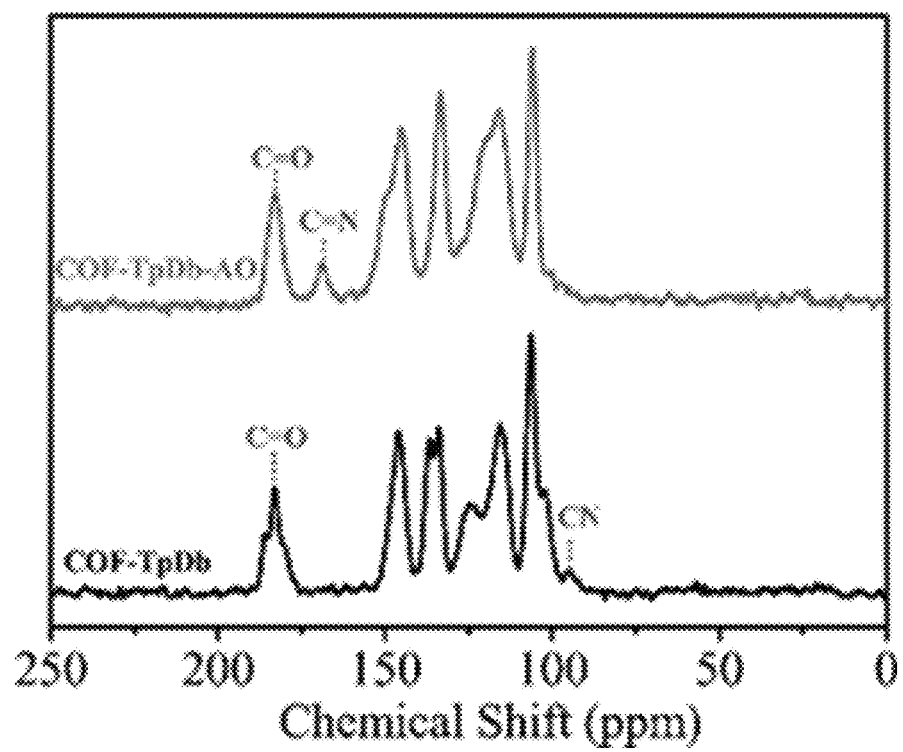
Figure 11A:
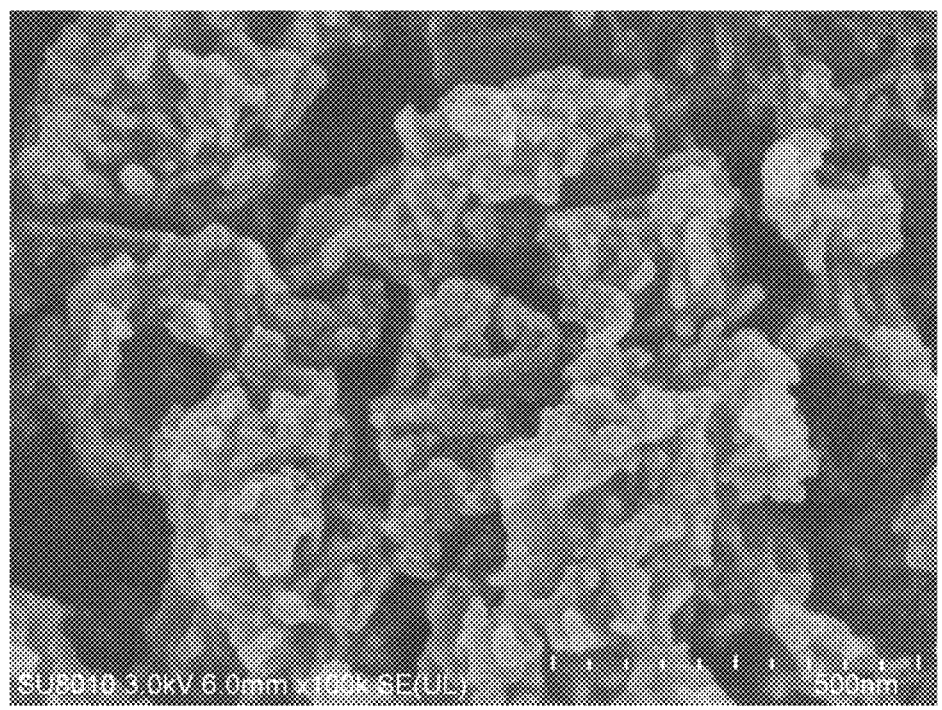
FIGS. 11A-11B show (FIG. 11A) SEM images of COF-TpDb and (FIG. 11B) COF-TpDb-AO.
Figure 11B:
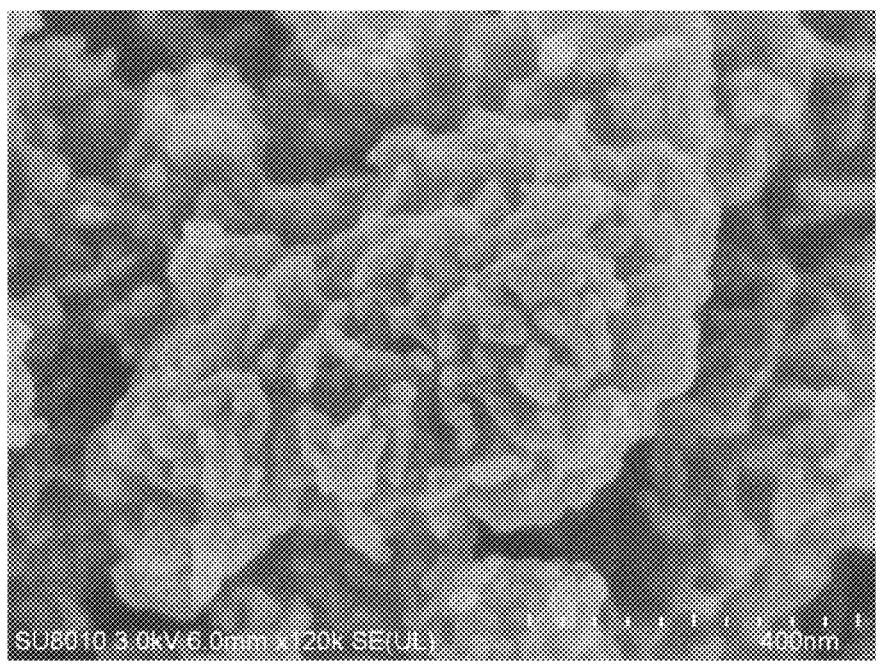
Figure 12:
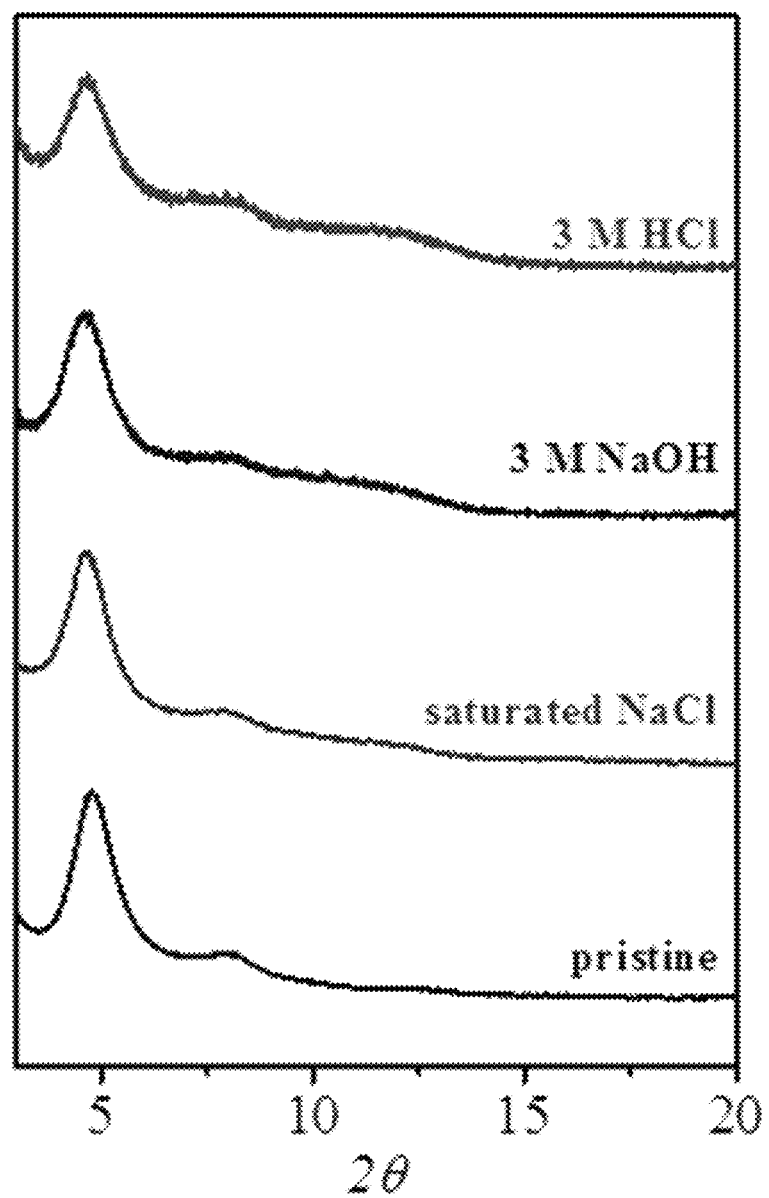
FIG. 12 shows PXRD patterns of COF-TpDb-AO before and after treatment for 24h in saturated NaCl as well as acid and base aqueous solutions.

With a porous and crystalline nitrile functionalized framework available, the cyano groups were converted to amidoxime by reacting with hydroxylamine. The PXRD pattern of the obtained material exhibits a diffraction pattern comparable to the one of COF-TpDb with an intense reflection at 4.8° (FIG. 2A). N$_2$ sorption measurements were conducted to verify pore accessibility after the post-synthetic conversion, affording isotherms similar to those of COF-TpDb. The BET surface area was calculated to be 826 m$^2$ g$^{-1}$, indicating the retention of porosity after the amidoximation process (FIG. 2E). Scanning electron microscope (SEM) images of COF-TpDb-AO show a rough surface composed of thin rods, which is similar to the observed morphology of COF-TpDb, suggesting the structural integrity during the chemical transformation process (FIGS. 11A-11B). To study the post-synthetic conversion and the amidoxime formation, FT-IR and $^{13}$C MAS NMR spectroscopy were carried out. Successful amidoximation was indicated by the disappearance of the C≡N stretch (2213 cm$^{-1}$) and the appearance of C=N (1646 cm$^{-1}$) and N—O (924 cm$^{-1}$), characteristic peaks of the amidoxime group in the FT-IR spectrum of COF-TpDb-AO (FIG. 2F). Furthermore, $^{13}$C MAS NMR analysis confirmed this efficient transformation, as indicated by the disappearance of the peak at 95 ppm that is related to CN groups together with the concomitant emergence of a peak at 169 ppm that is ascribed to open-chain amidoxime groups (FIG. 2G).[17] Moreover, the stability of COF-TpDb-AO is also very impressive, as demonstrated by the fact that it could retain the crystalline structure within a wide pH range (3 M NaOH or 3 M HCl) and high ionic strength (saturated NaCl), which is vitally important for practical applications (FIG. 12).

Figure 13A:
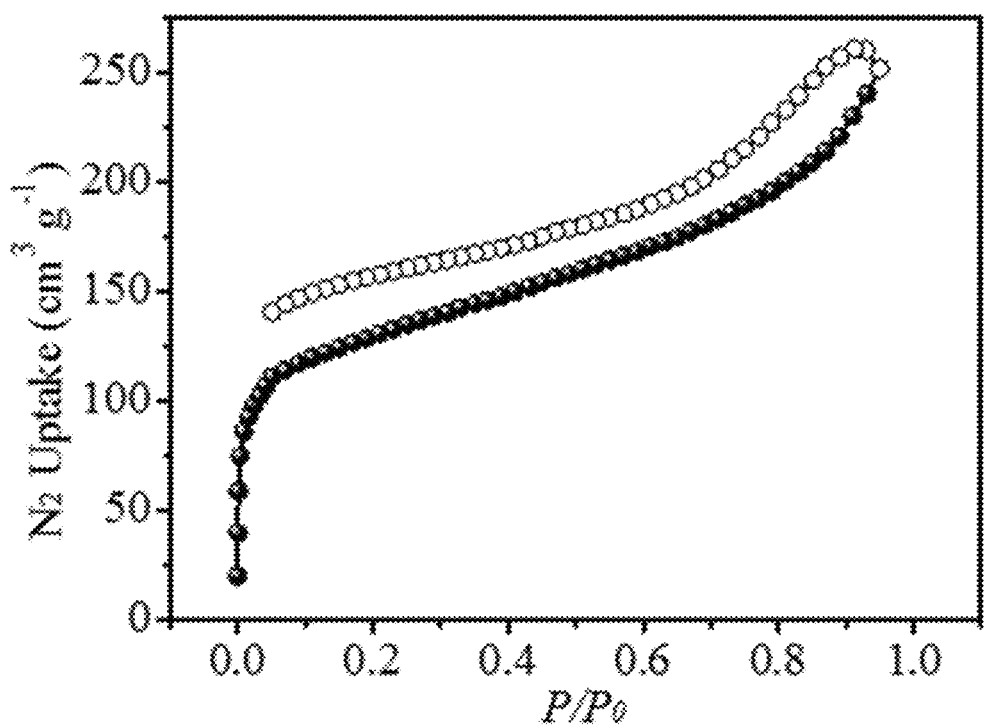
FIGS. 13A-13B show (FIG. 13A) N$_2$ sorption isotherms collected at 77K. The BET surface areas of POP-TpDb-AO was calculated to be 466 m$^2$ g$^{-1}$.
Figure 13B:
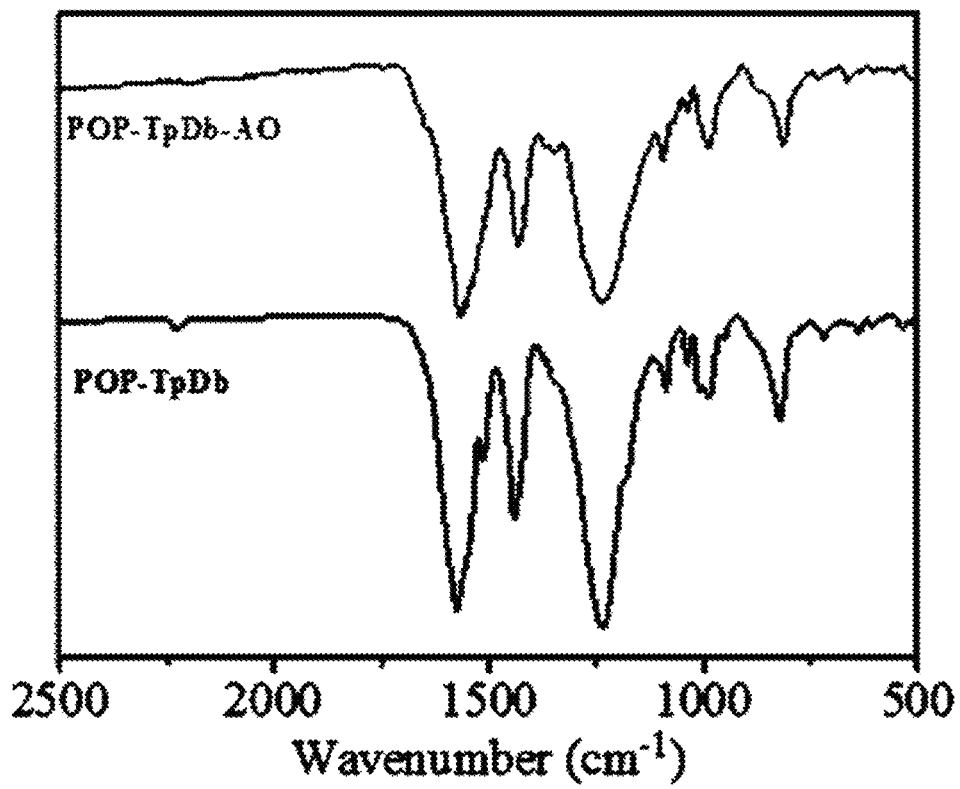

Given the hydrolytic stability, robust 2D architecture, and channelized alignment of the chelating groups, the ability of COF-TpDb-AO to trap uranium was investigated. Experiments were initially performed to estimate the uranium uptake capacity from aqueous solutions. To determine whether the long-range order pore structures of the adsorbents influence the sequestration performance, head-to-head comparisons were made with the amorphous analogue, POP-TpDb-AO (FIGS. 13A-13B). This material was synthesized by condensation of triformylphloroglucinol with 2,5-diaminobenzonitrile and then amidoximated as described above. Elemental analysis and FT-IR spectroscopy were performed to determine the content of amidoxime species in the adsorbent material (see experimental section and FIG. 13B). Both the COF-based adsorbent and its amorphous POP analogue showed very similar N element contents in conjunction with comparable FT-IR spectra before and after the amidoximation process, indicative of a similar number of amidoxime functionalities.

Figure 3A:
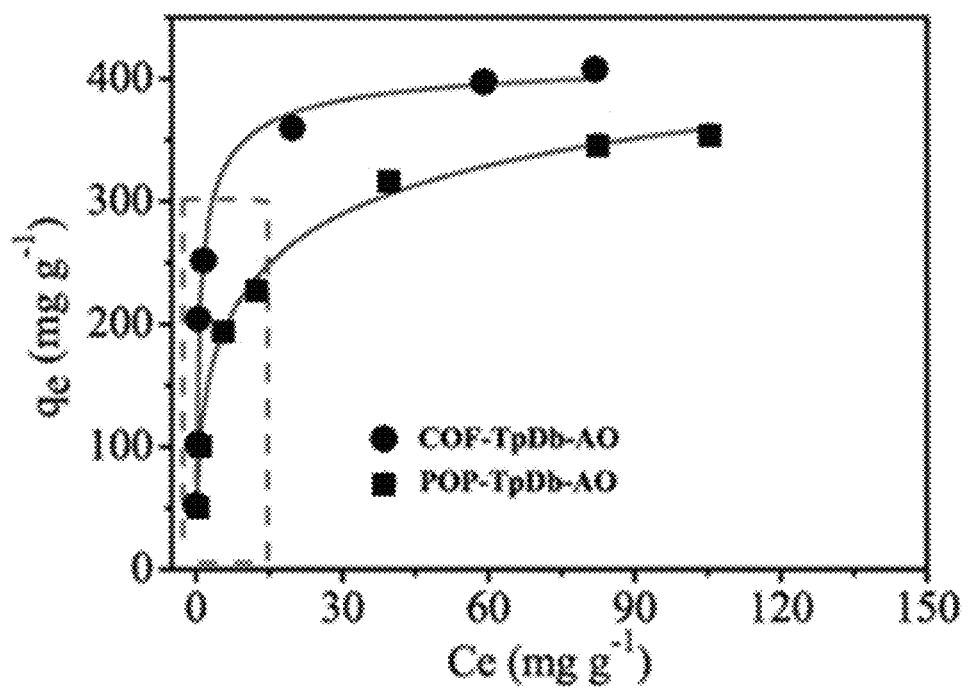
FIGS. 3A-3C show (FIG. 3A) Uranium sorption isotherms for COF and POP based sorbents. The lines are fit with the Langmuir model; all the fits have $R^2$ values higher than 0.98.
Figure 3B:
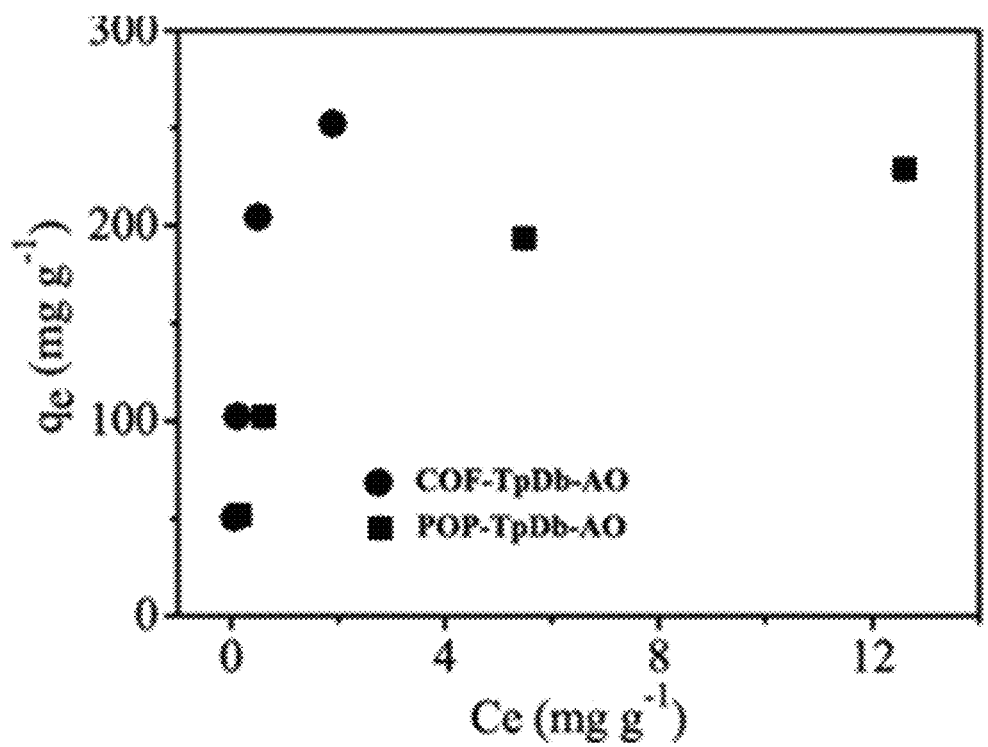
Figure 14A:
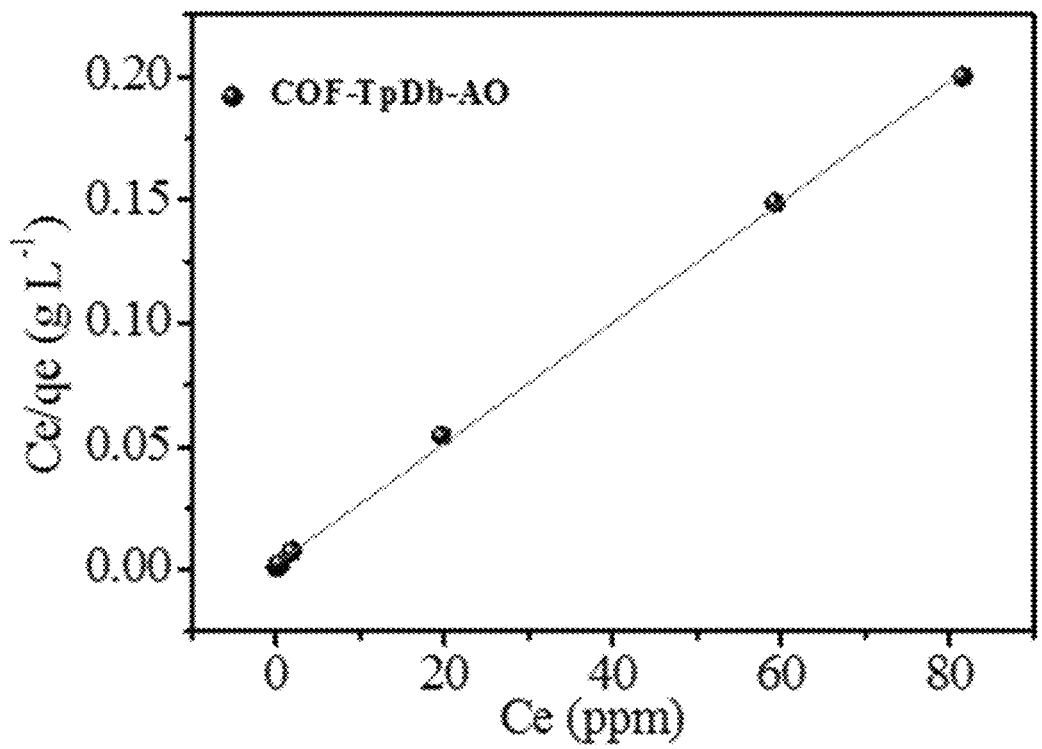
FIGS. 14A-14B show linear regression by fitting the equilibrium data with the Langmuir adsorption model shown in FIG. 3A.
Figure 14B:
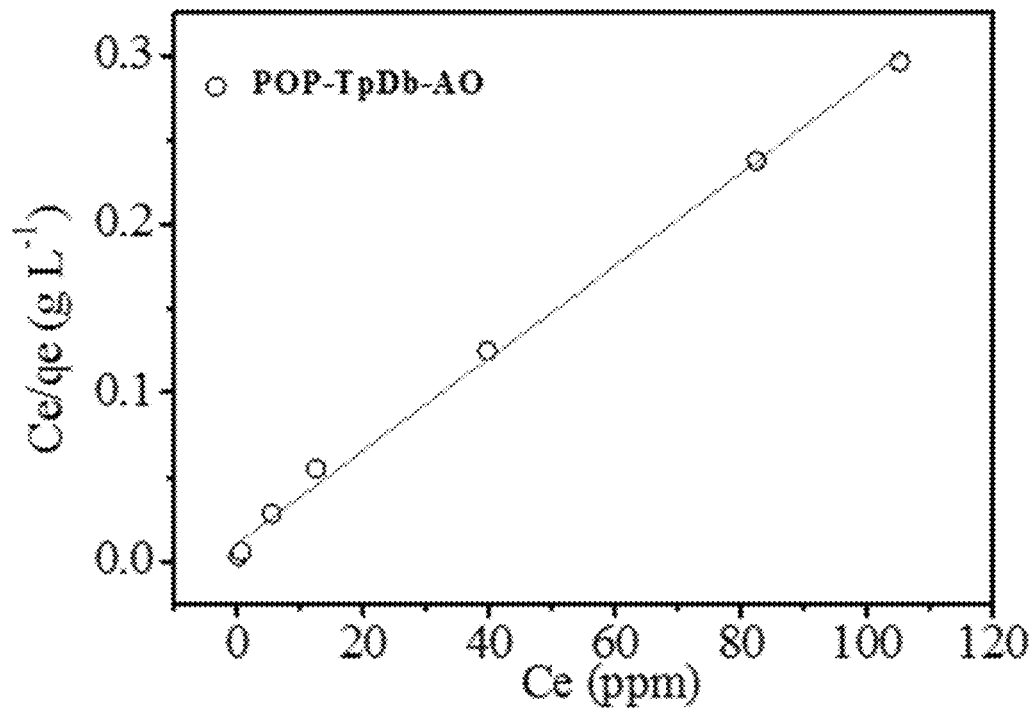
Figure 15:
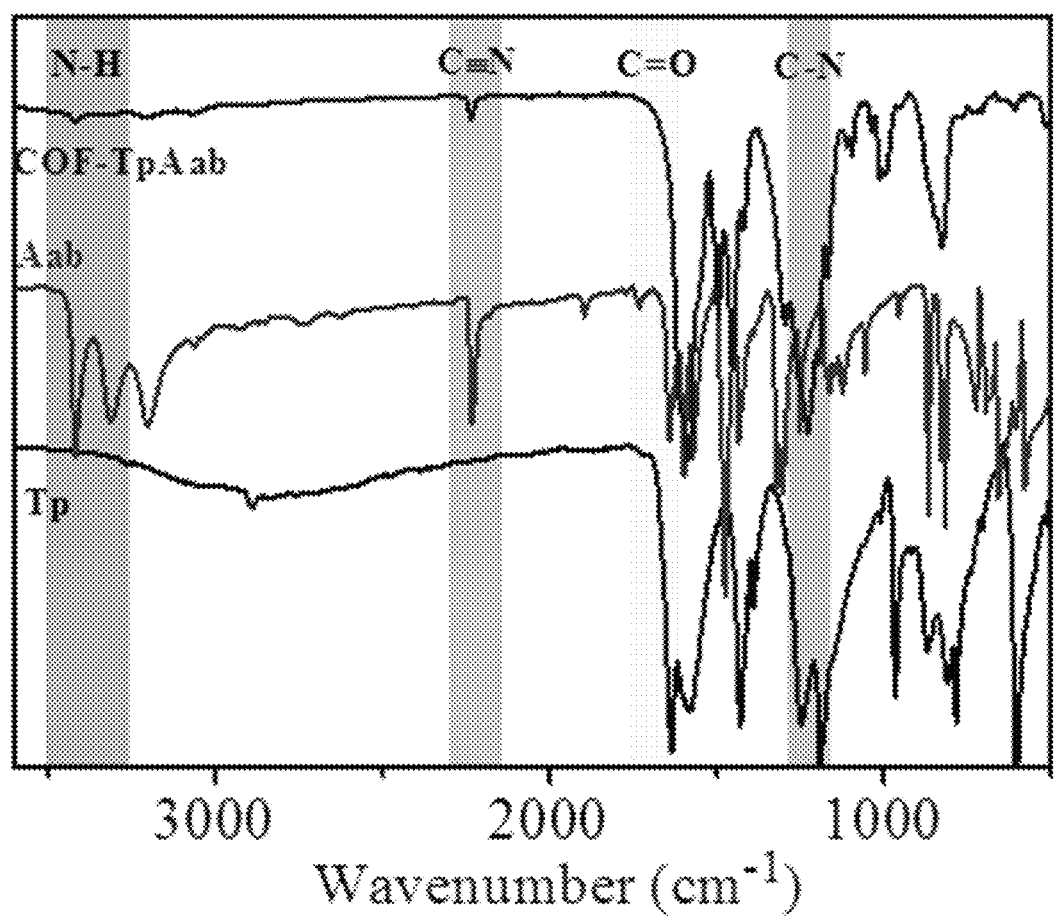
FIG. 15 shows IR spectra.
Figure 16A:
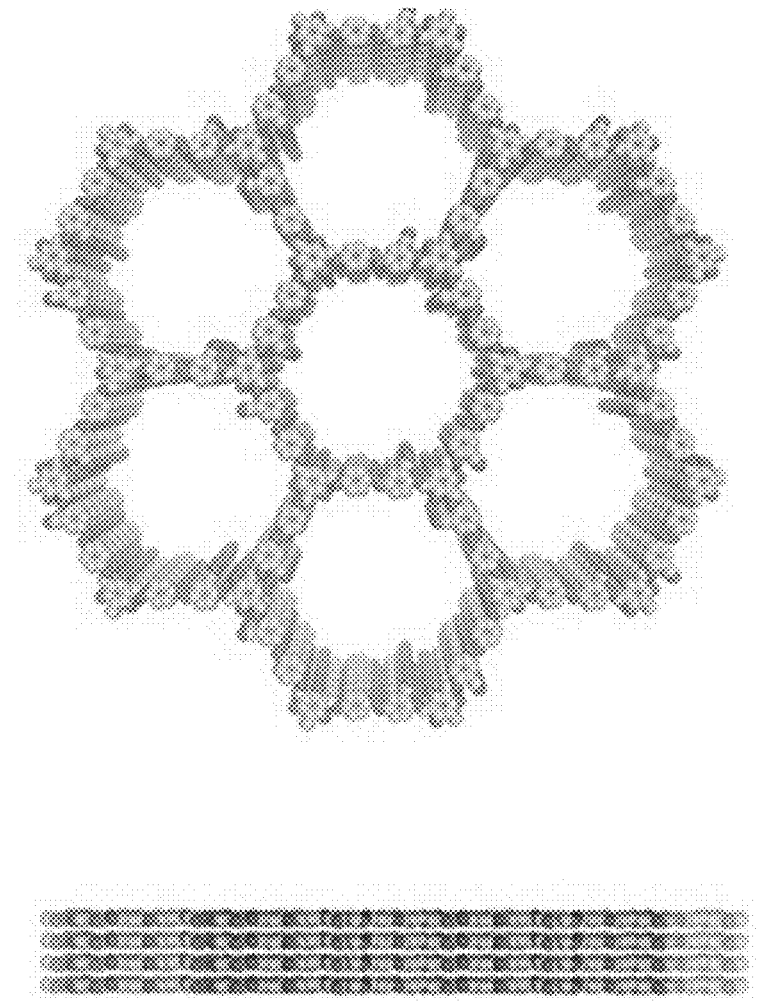
FIGS. 16A-16B show (FIG. 16A) a view of the slipped AA stacking structure of COF-TpAab (O, red; N, blue; C, gray) and (FIG. 16B) simulated and experimental PXRD patterns.
Figure 16B:
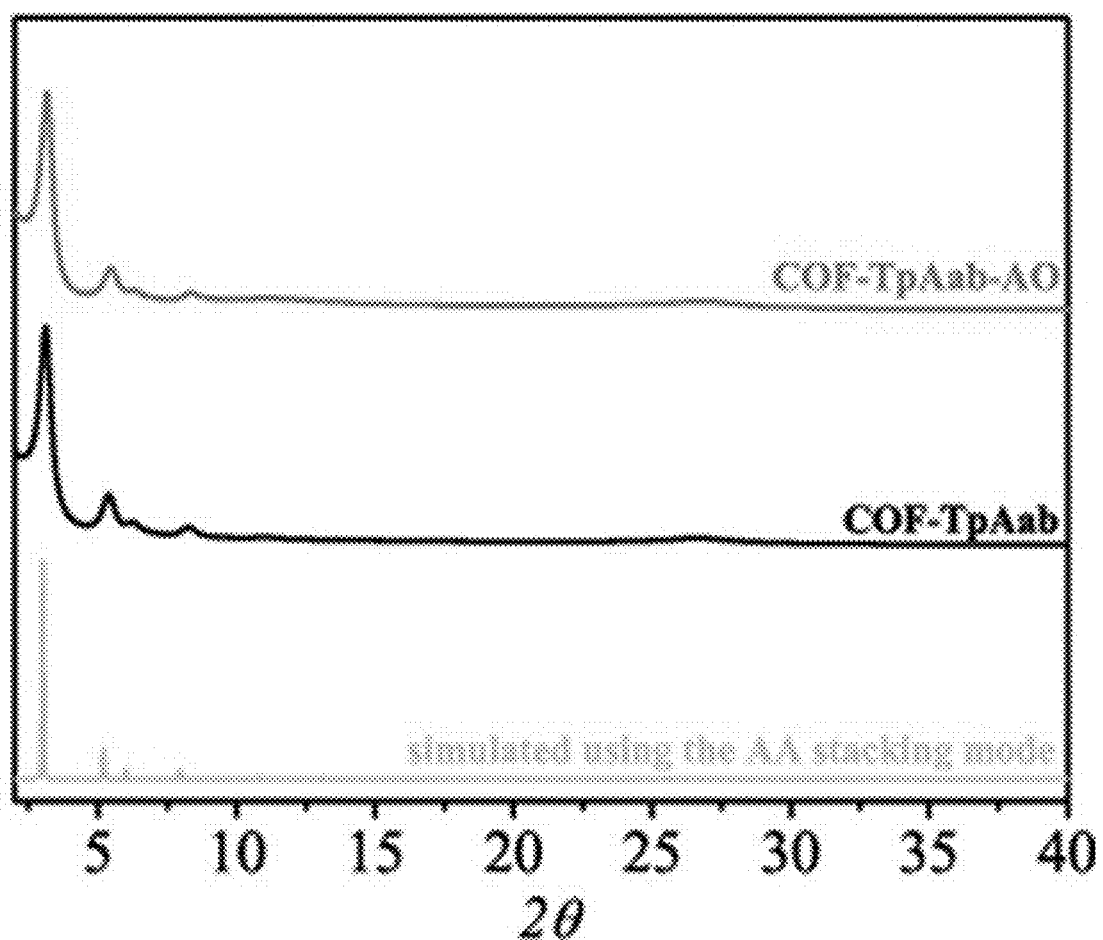
Figure 17:
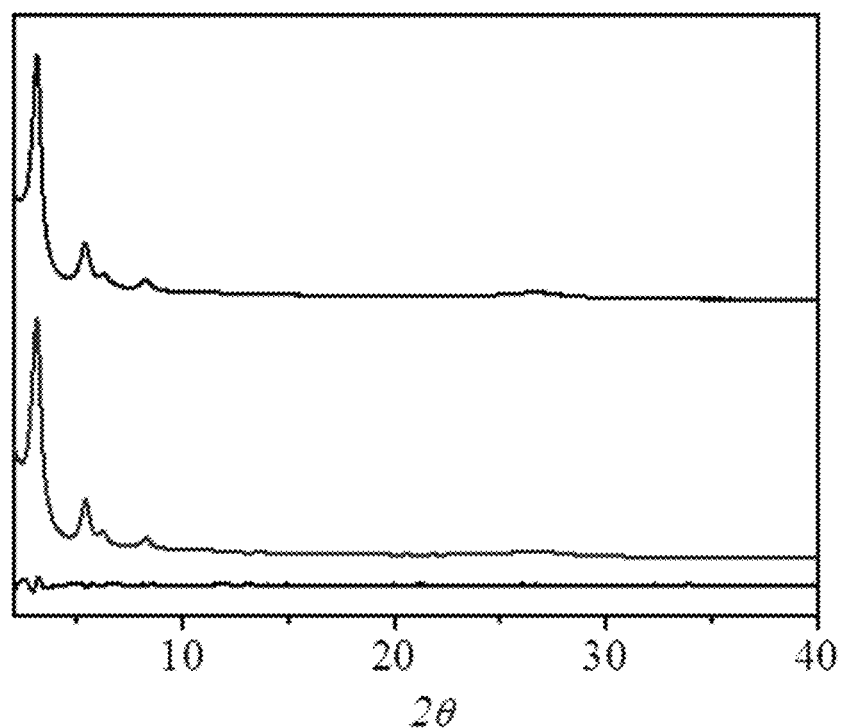
FIG. 17 shows PXRD profiles of COF-TpAab.
Figure 18:
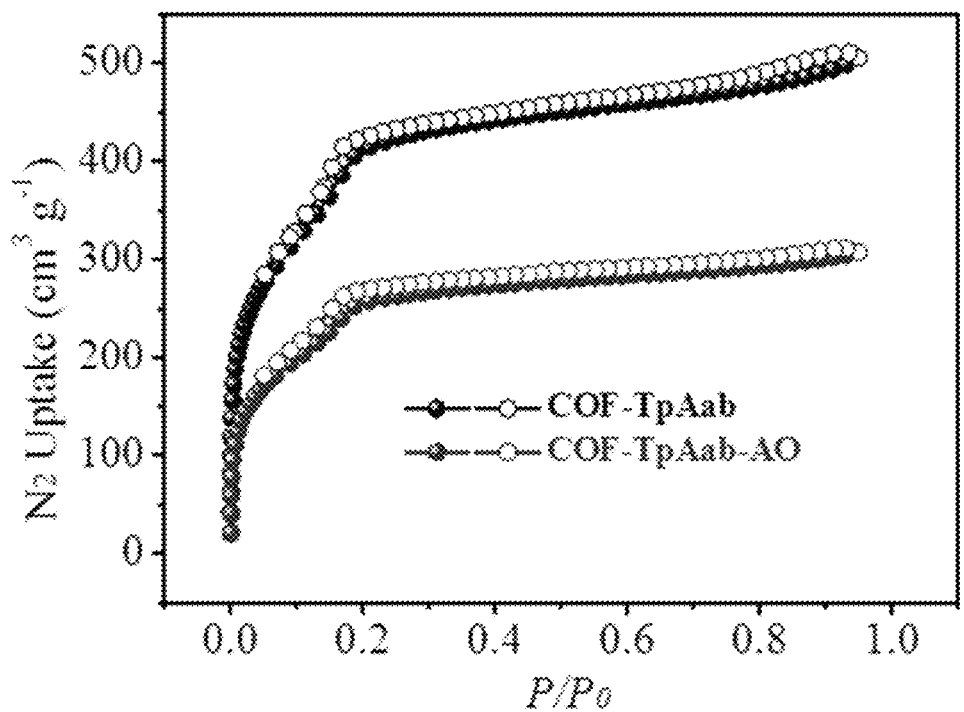
FIG. 18 shows N$_2$ sorption isotherms collected at 77 K. The BET surface areas of COF-TpAab and COF-TpAab-AO were calculated to be 1255 m$^2$ g$^{-1}$ and 777 m$^2$ g$^{-1}$, respectively.
Figure 19:
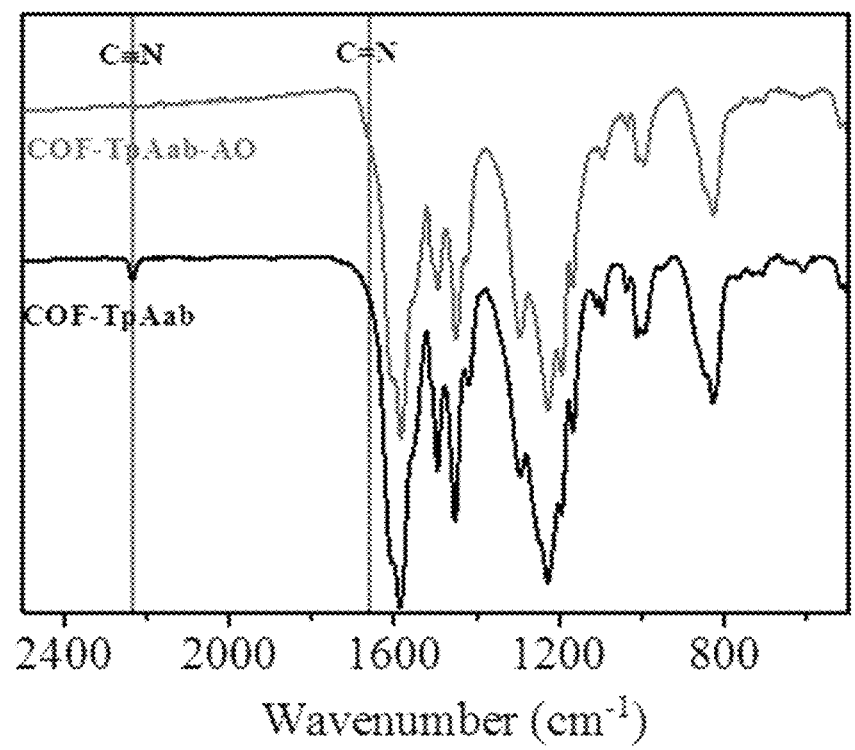
FIG. 19 shows IR spectra. The disappearance of the C≡N stretch indicates the accomplishment of the amidoximation.
Figure 20:
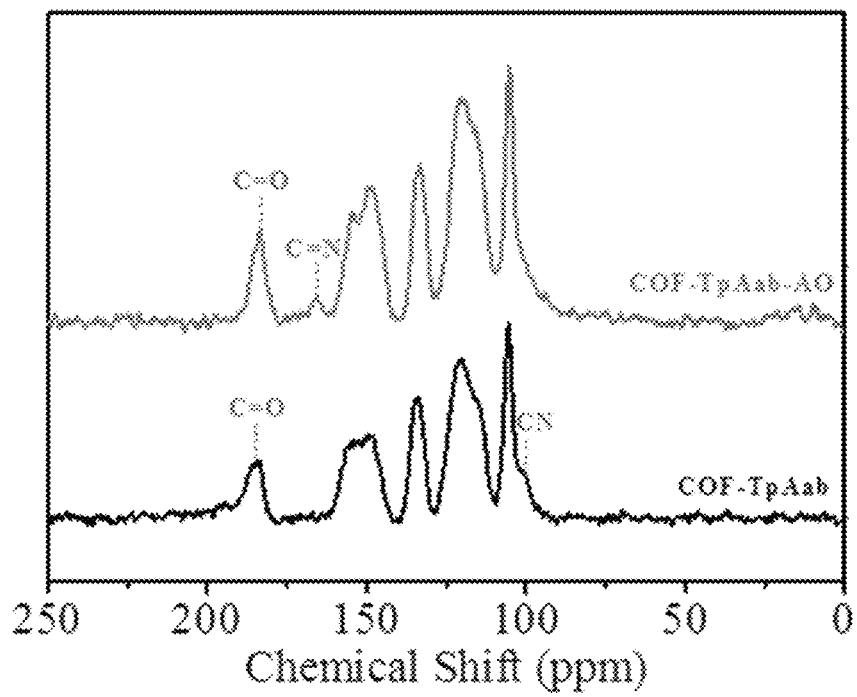
FIG. 20 shows solid-state 13C NMR spectra. The disappearance of the peak belonging to CN in conjugation with the appearance of the peak ascribed to C≡N, further confirming the accomplishment of amidoximation.
Figure 21A:
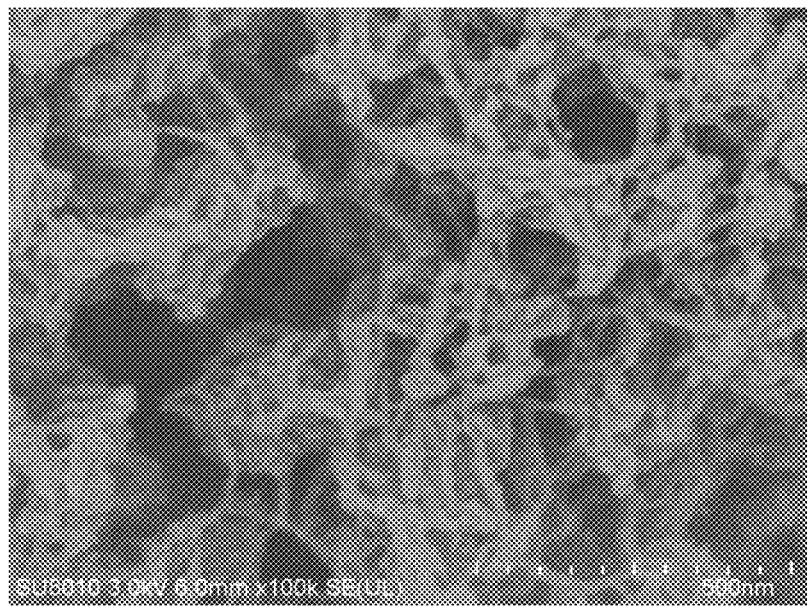
FIGS. 21A-21B show (FIG. 21A) SEM images of COF-TpAab and (FIG. 21B) COF-TpAab-AO. These samples exhibit similar morphologies, suggesting the structural integrity during the amidoximation process.
Figure 21B:
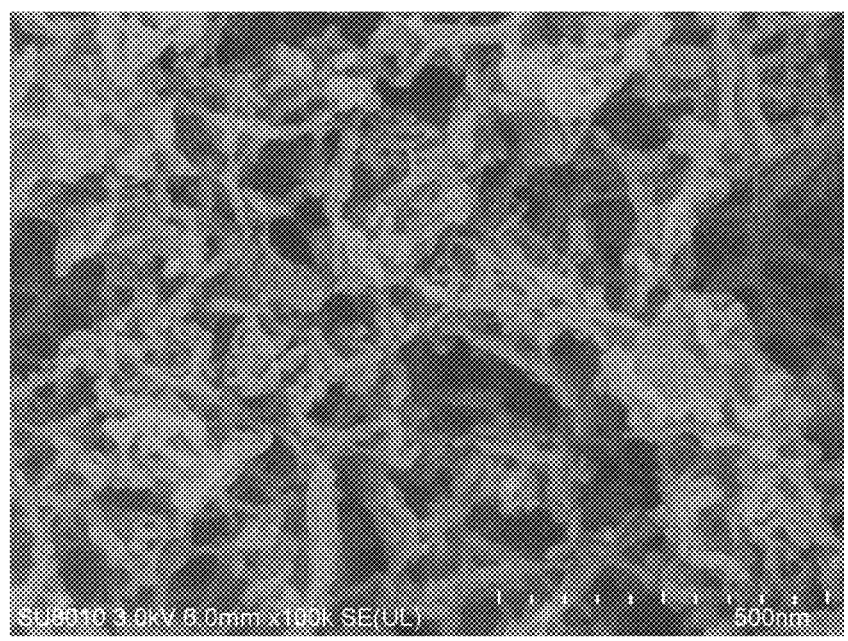
Figure 22A:
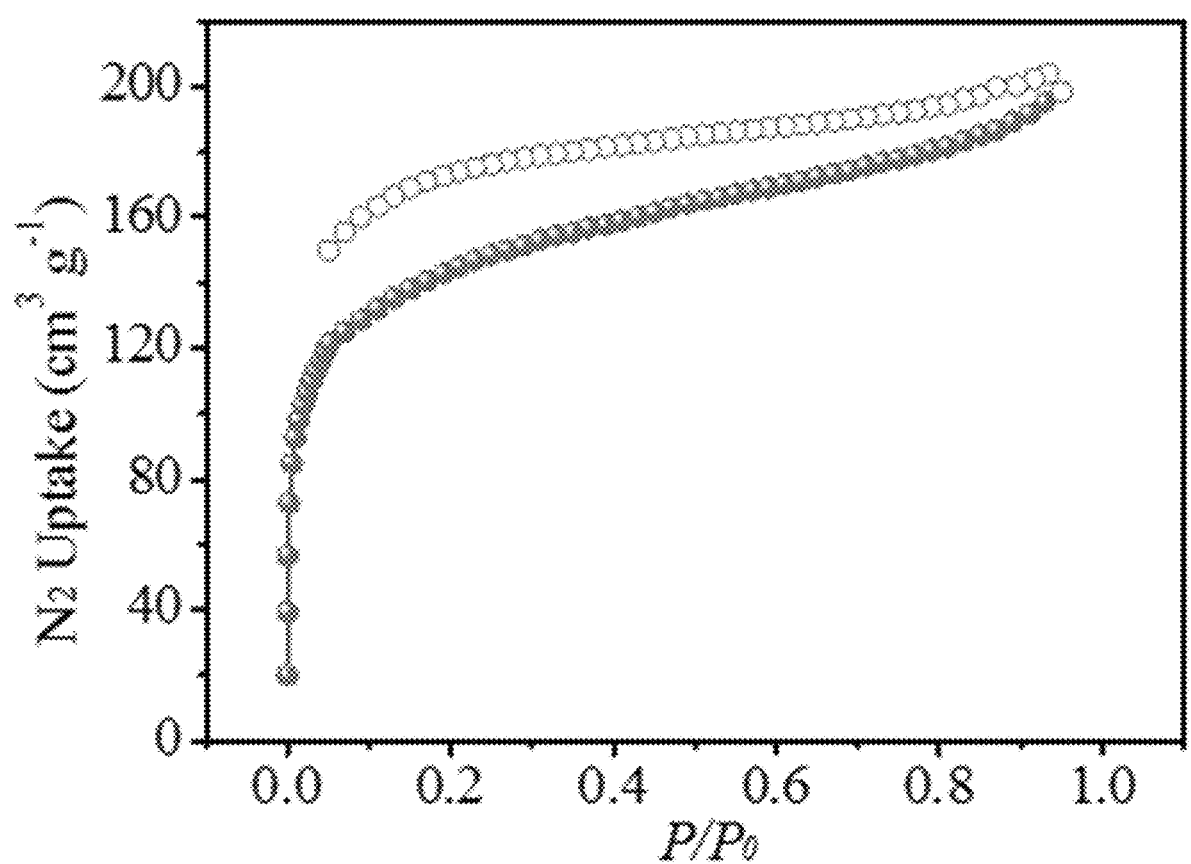
FIGS. 22A-22B show (FIG. 22A) N$^2$ sorption isotherms collected at 77 K. The BET surface areas of POP-TpAab-AO were calculated to be 513 m$^2$ g$^{-1}$.
Figure 22B:
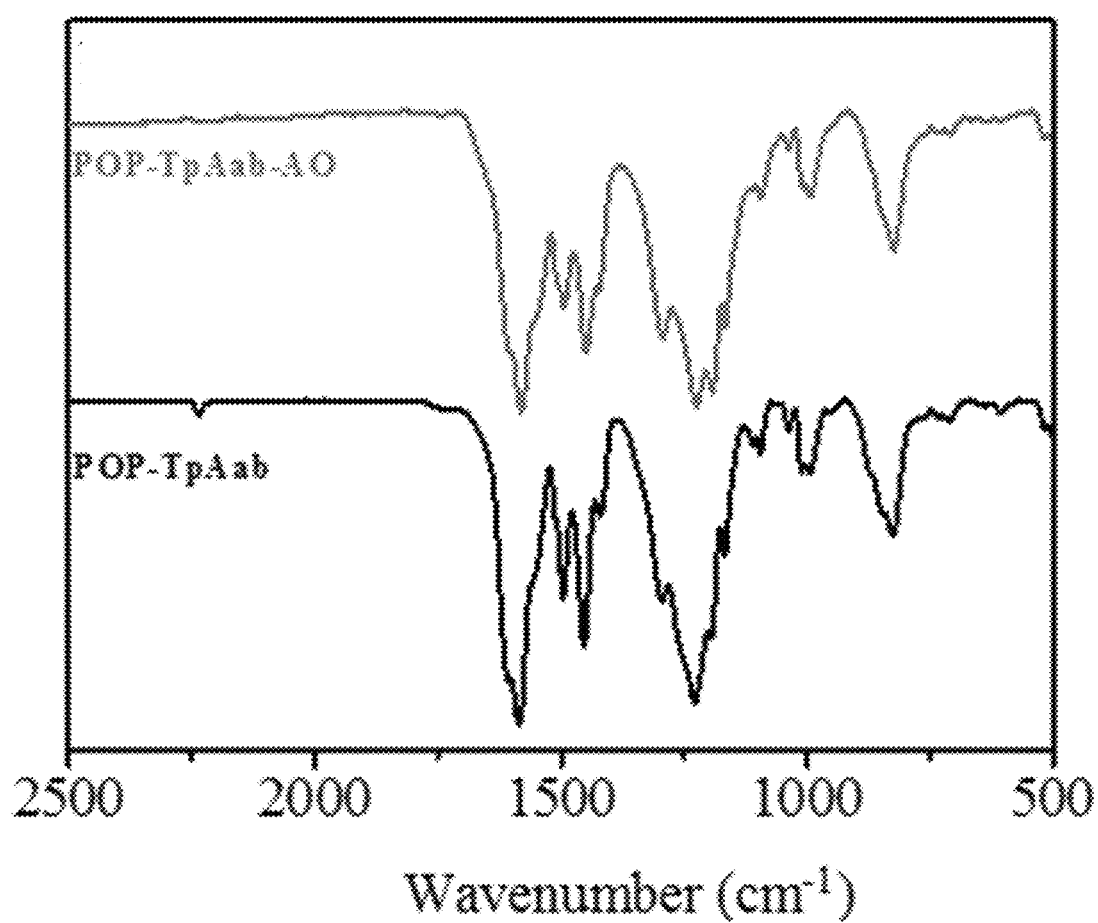
Figure 23A:
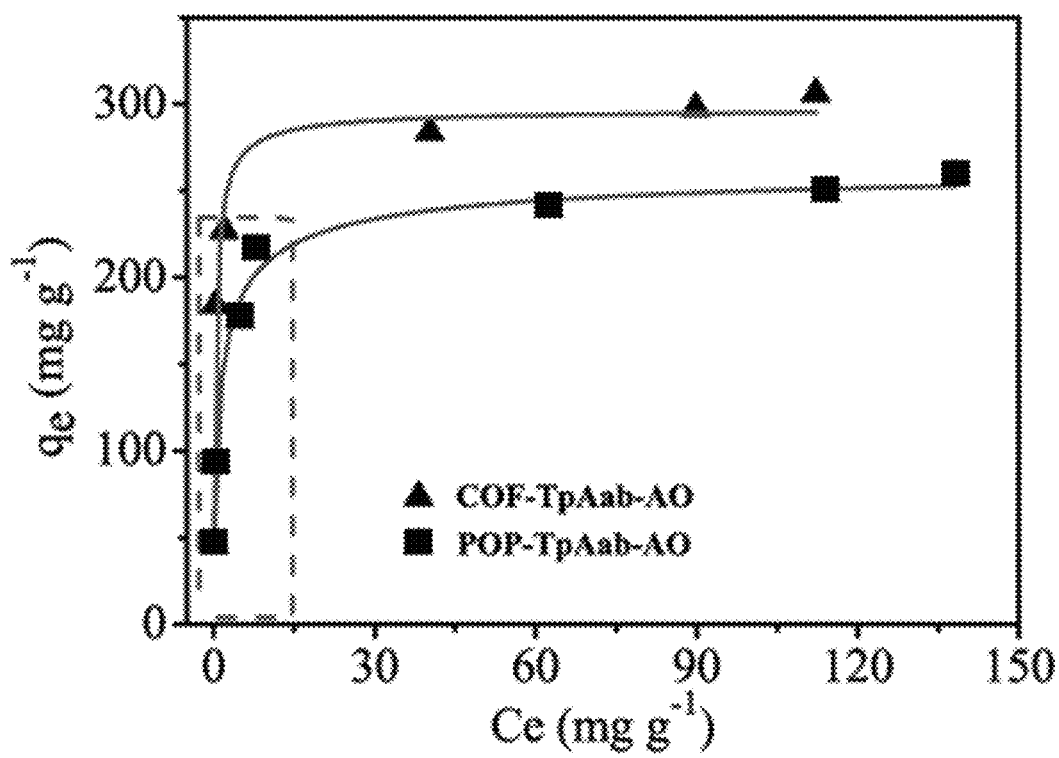
FIGS. 23A-23C show (FIG. 23A) Uranium sorption isotherms for COF and POP based sorbents. The lines are fit with the Langmuir model; all the fits have R$^2$ values higher than 0.98 (see FIGS. 24A-24B).
Figure 23B:
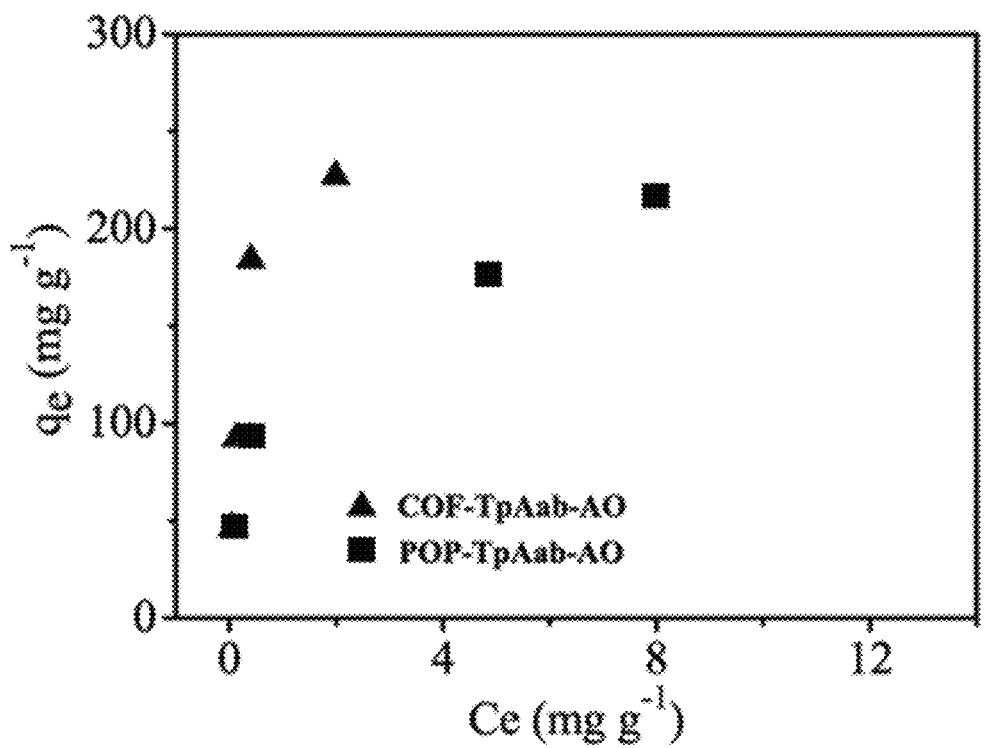
Figure 23C:
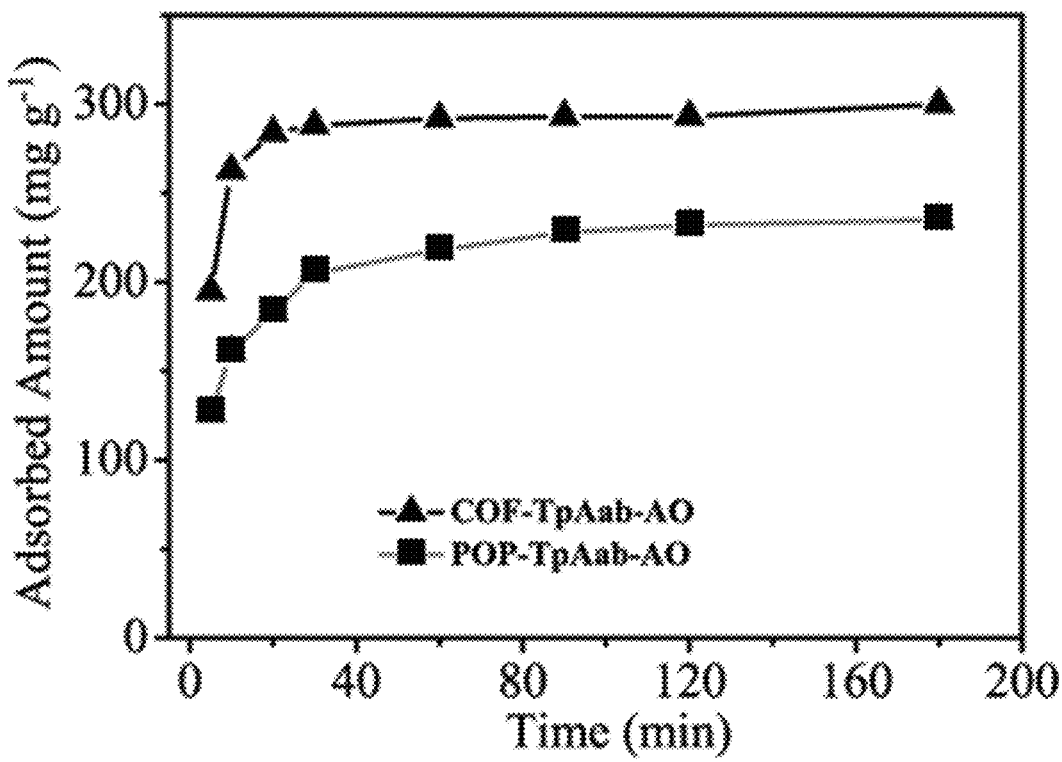
Figure 24A:
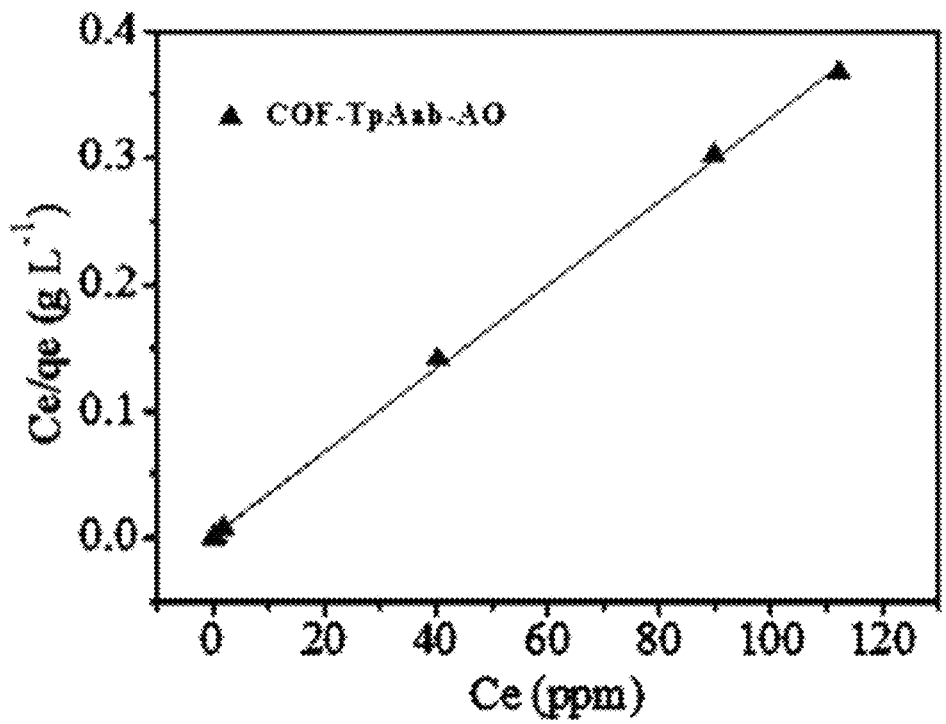
FIGS. 24A-24B show linear regression by fitting the equilibrium data with the Langmuir adsorption model shown in FIGS. 23A-23B)
Figure 24B:
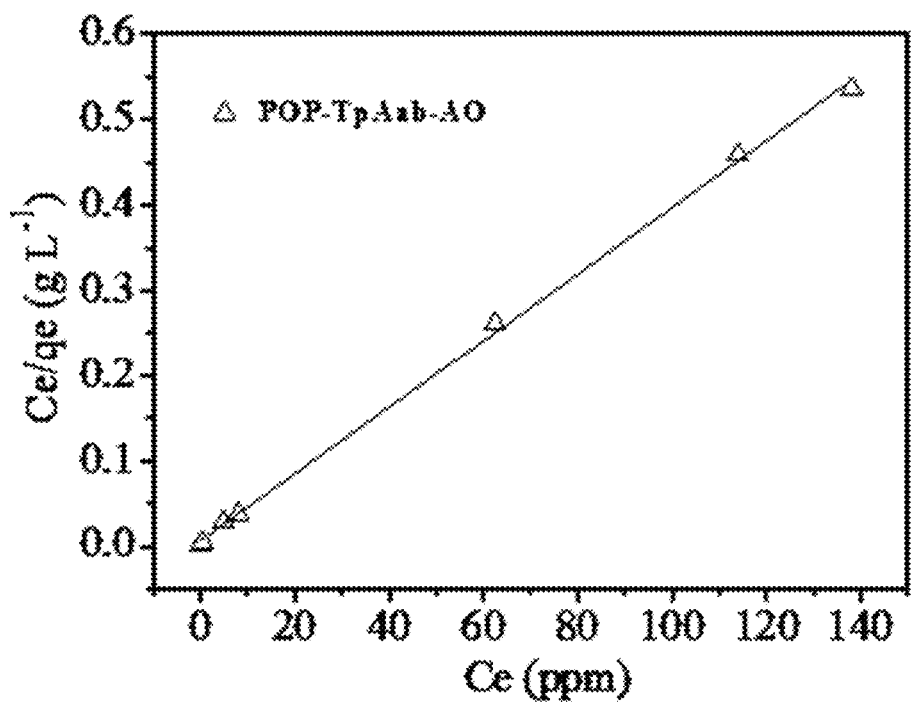

The amounts of uranium species enriched by these materials as a function of uranium concentration in supernatant at the equilibrium state were determined by varying the initial concentrations from 23.1 to 265.2 ppm at a pH value around 6 with an adsorbent to solution ratio of 0.45 mg mL$^{-1}$. To guarantee the adsorptions reached equilibrium, an overnight stirring step was used. As shown in FIG. 3A, a continuous increase of uranium sorption with augmentation of the initial uranium concentrations was observed. All the adsorption isotherms were found to follow a Langmuir model with correlation coefficients higher than 0.98 (FIGS. 14A-14B). The COF-based adsorbent showed superior performance in adsorption of uranium in terms of saturation adsorption capacity as compared to the amorphous porous polymer analogue, suggesting a role of the material's architecture. Specifically, in the initial uranium concentration range of 23.1 to 265.2 ppm, the saturation adsorption capacities were determined to be 408 and 355 mg g$^{-1}$, for COF-TpDb-AO and POP-TpDb-AO, respectively. Moreover, the shape of the isotherms for these adsorbents is somewhat varied, especially at low $C_e$ concentrations. The COF-based adsorbent exhibits a much steeper adsorption profile for uranyl ions (FIG. 3B), suggesting that it possesses higher affinities towards uranyl ions in comparison with the corresponding amorphous porous polymer.

Figure 3C:
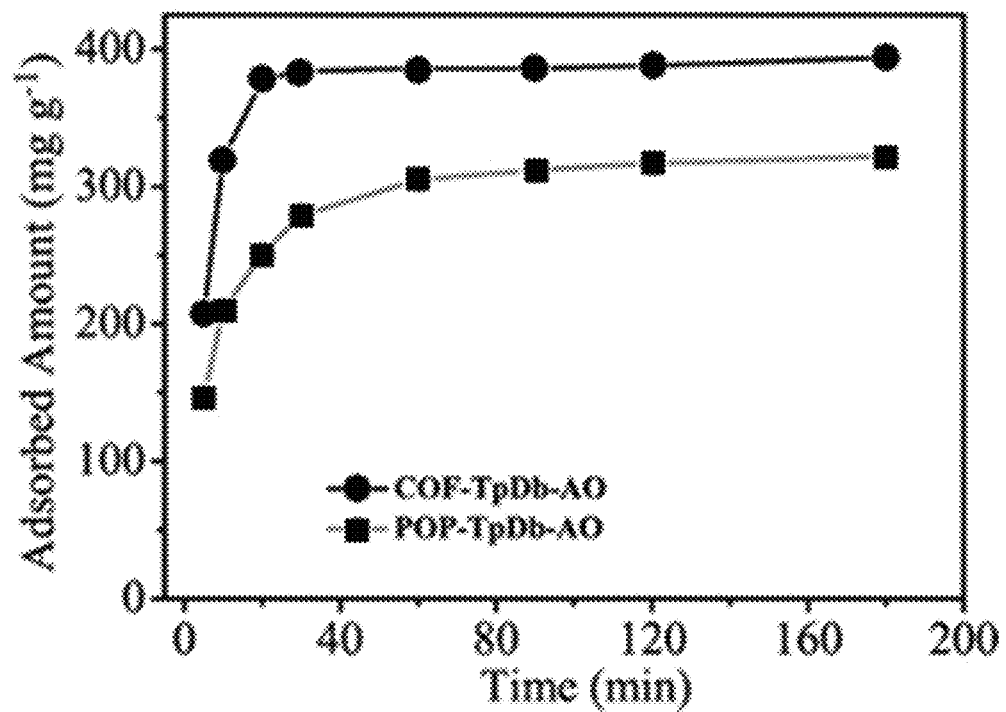
Figure 4A:
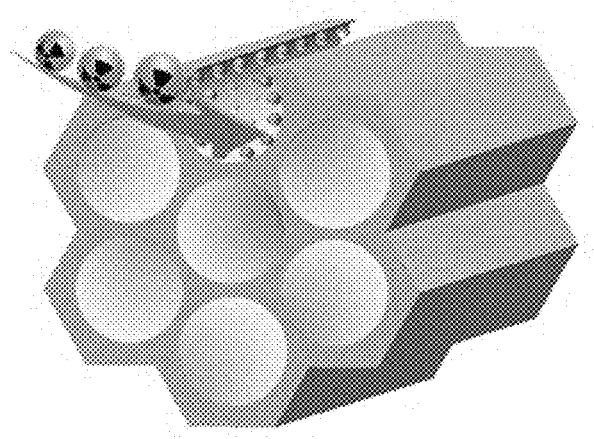
FIGS. 4A-4B show (FIG. 4A) Schematic illustration of chelating groups in COF materials. The uniform pore morphology of the COFs leads to the functionalized material with unrestricted access of ions to all of the chelating sites.
Figure 4B:
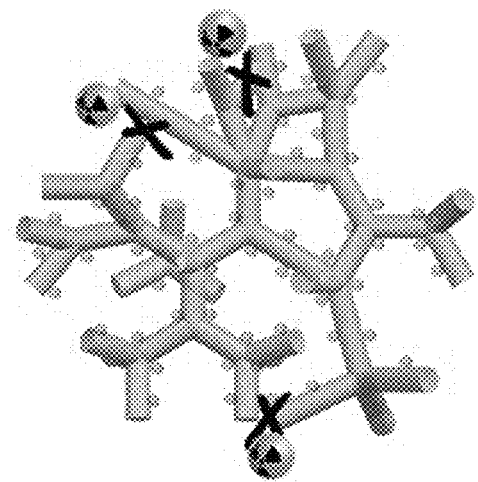

To further underscore the advantage of using COFs as a platform for the deployment of efficient adsorbent materials, adsorption kinetics between the COF-based sorbent and amorphous counterpart were compared, considering that this parameter largely defines the adequate flow rate for decontamination of polluted water and the subsequent efficiency of the process. The impact of contact time on uranium adsorption was investigated by immersing the adsorbents in the uranium spiked solution for a period ranging from 5 min to 3 h. As depicted in FIG. 3C, in comparison to COF-based adsorbent, the POP analogue displayed inferior adsorption kinetics. Under identical conditions, COF-TpDb-AO can reach 81% and 95% of its equilibrium adsorption capacity within 10 min and 30 min, respectively. However, it took 90 min for POP-TpDb-AO to accomplish around 95% of its equilibrium adsorption capacity. Notably, in addition to rapid saturation, COF-TpDb-AO also possessed a higher capacity, yielding an equilibrium value of 394 mg g$^{-1}$, while its amorphous analogue only achieved 322 mg g$^{-1}$. Taking into account that the COF and POP-based sorbents have the same chemical compositions, the high uptake capacity and rapid sorption should be ascribed to their difference in pore architecture. In COF-based sorbents, the amidoxime groups that are uncovered on the regular and ordered pore channels are highly accessible, thereby facilitating the chelating groups to trap uranyl ions. In contrast, the irregular pore channels in amorphous POPs are discontinuous, making them more susceptible to blockage and therefore greatly compromising their adsorption performance, as shown schematically in FIGS. 4A-4B.

Apart from the accessibility of binding sites, the pore architecture is assumed to result in different orientations and distribution of the functionalities, which may affect their cooperation with each other, thereby leading to different binding strengths toward the guests. To evaluate the affinity of these materials to uranyl ions, the distribution coefficient values ($K_d$) were measured. Under the conditions of 5 ppm uranium at pH~ 6.0 with a V/m of 10000 mL g$^{-1}$, the $K_d$ values for these samples were calculated and found to equal 3.6×10$^8$ (0.14 ppb) and 3.3×10$^7$ (1.51 ppb) for COF-TpDb-AO and POP-TpDb-AO, respectively (number given in parenthesis is the residual uranium concentration), with the COF showing more than an order of magnitude improvement in performance over its amorphous analogue. Recent publications leveraged density functional theory (DFT) calculations and crystallography to predict an η$^2$ binding interaction to be most thermodynamically favored between amidoxime and uranyl.[18] In addition, a chelating di(oximate) uranyl complex was also collected where no tautomerization was observed, indicating that neighboring amidoxime groups could bind uranyl ions in a 2:1 ratio.[19]

Figure 5:
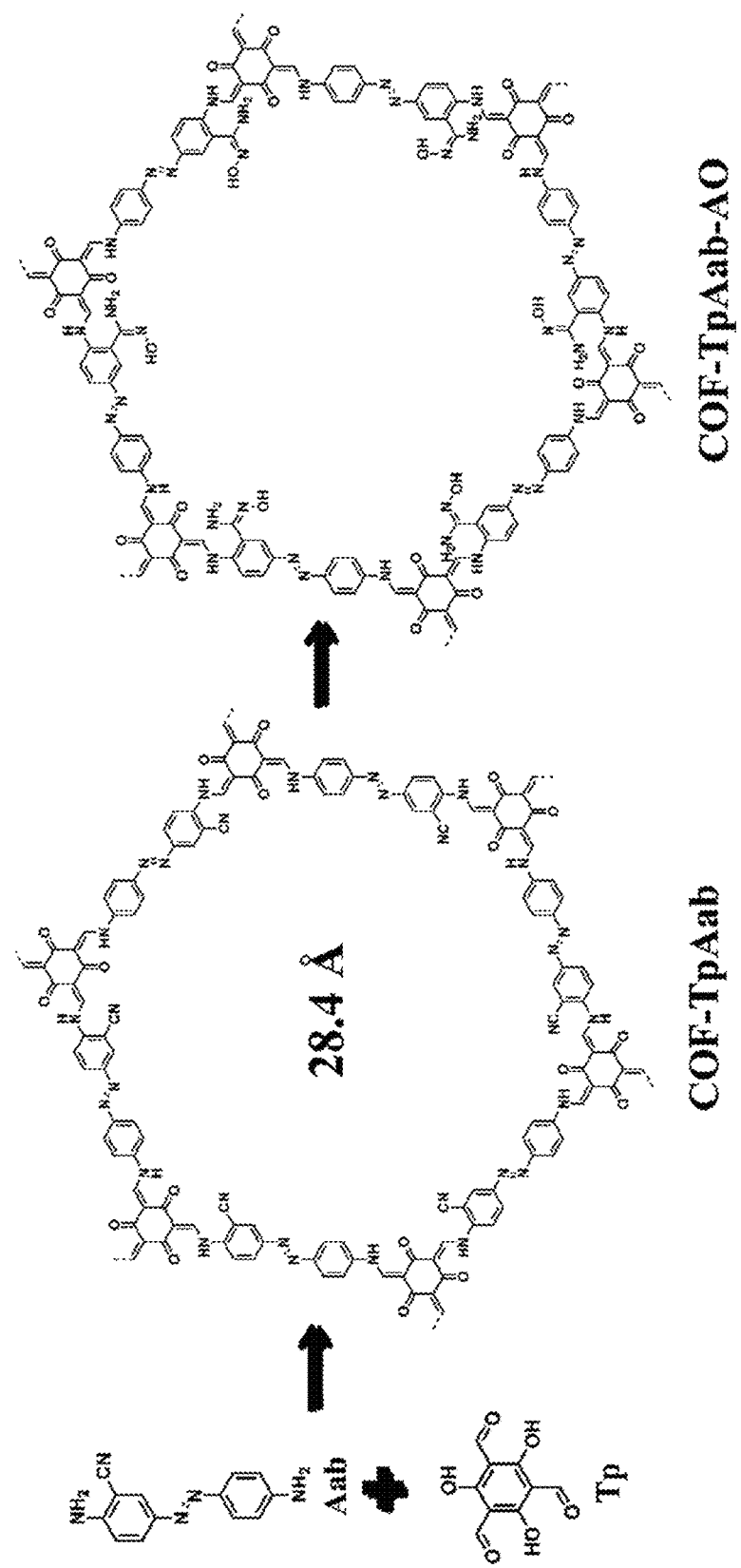
FIG. 5 shows synthetic scheme of COF-TpAab through the condensation of Tp and Aab and corresponding chemical transformation from the cyano to amidoxime group, yielding COF-TpAab and COF-TpAab-AO, respectively.
Figure 6A:
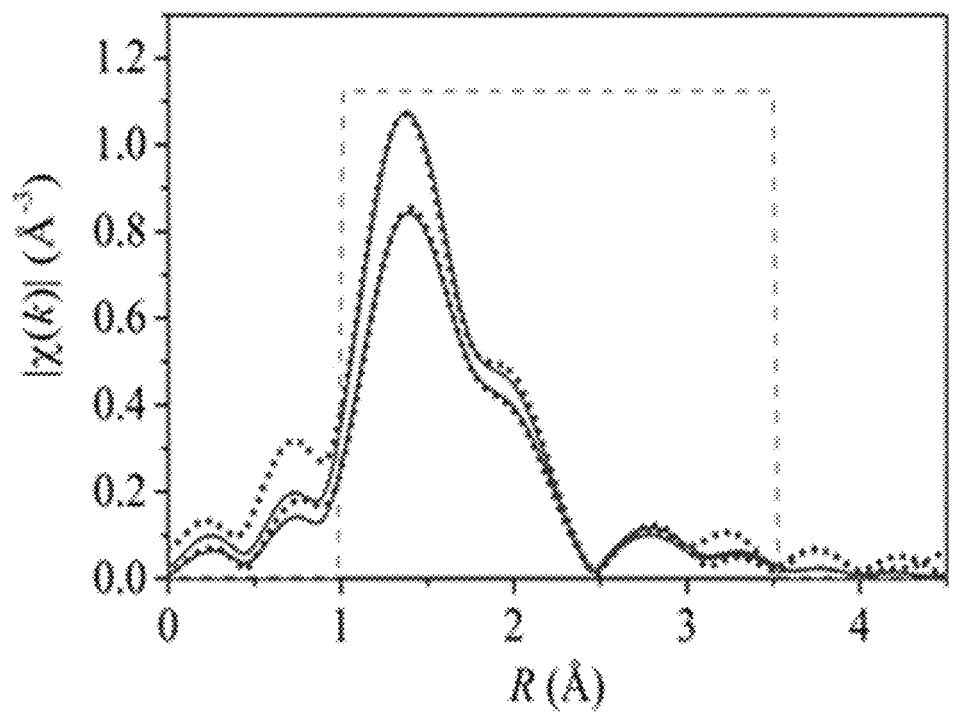
FIGS. 6A-6C shows (FIG. 6A) Fourier transform of the U $L_{III}$-edge EXAFS spectra of POP-TpDb-AO and COF-TpDb-AO in R-space.
Figure 6B:
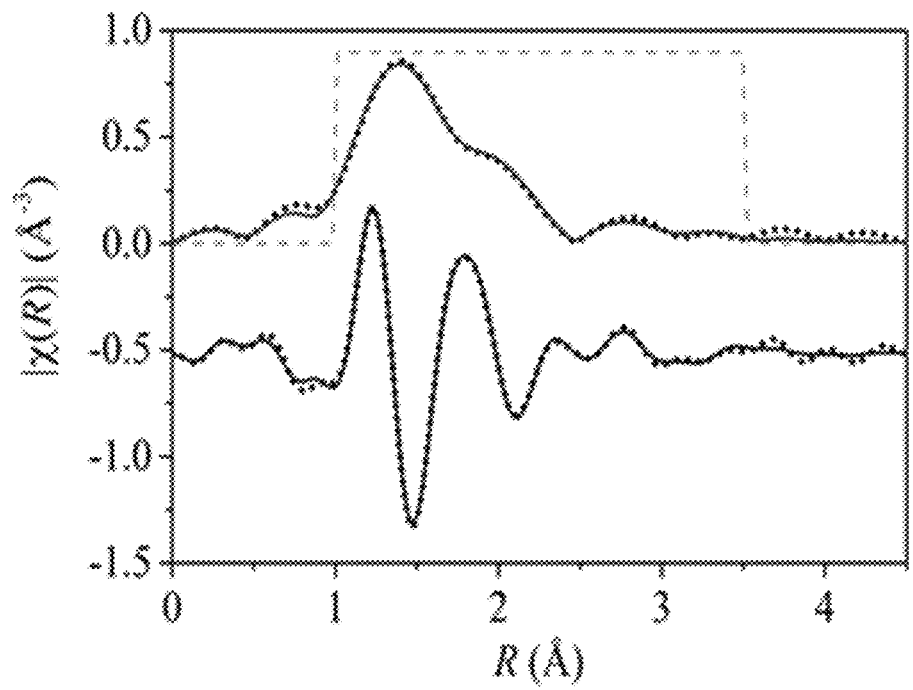
Figure 6C:
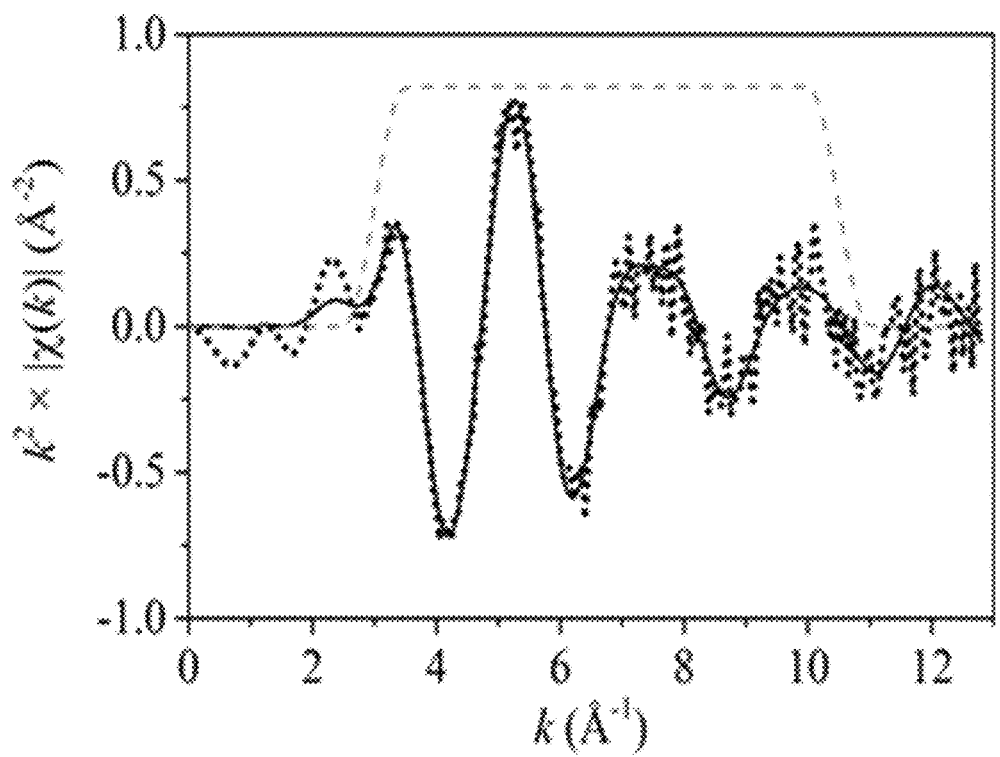

To further illustrate the benefit of COFs as an appealing functionality decorating platform for radionuclide sequestration, another amidoxime functionalized COF material (COF-TpAab-AO, FIG. 5) and corresponding amorphous analogue (POP-TpAab-AO) were prepared for comparison. The detailed characterization of these materials are shown in FIGS. 15-22B. Again, the COF-based sorbent favored superior adsorption performance to that of its amorphous analogue in terms of both uranium uptake capacity and removal efficiency (FIGS. 23A-23C and FIGS. 24A-24B). Specifically, COF-TpAab-AO and POP-TpAab-AO afforded the uranium saturation uptake capacities of 305 and 256 mg g$^{-1}$, respectively. In addition, COF-TpAab-AO was three times faster than that of POP-TpAab-AO to reach their 95% equilibrium capacities. Furthermore, a pronounced improvement of affinity toward uranium was also observed, as demonstrated by a higher $K_d$ value of the COF in relation to that of the POP by a factor of 10 (2.2×10$^8$ vs 1.8×10$^7$).

Figure 25:
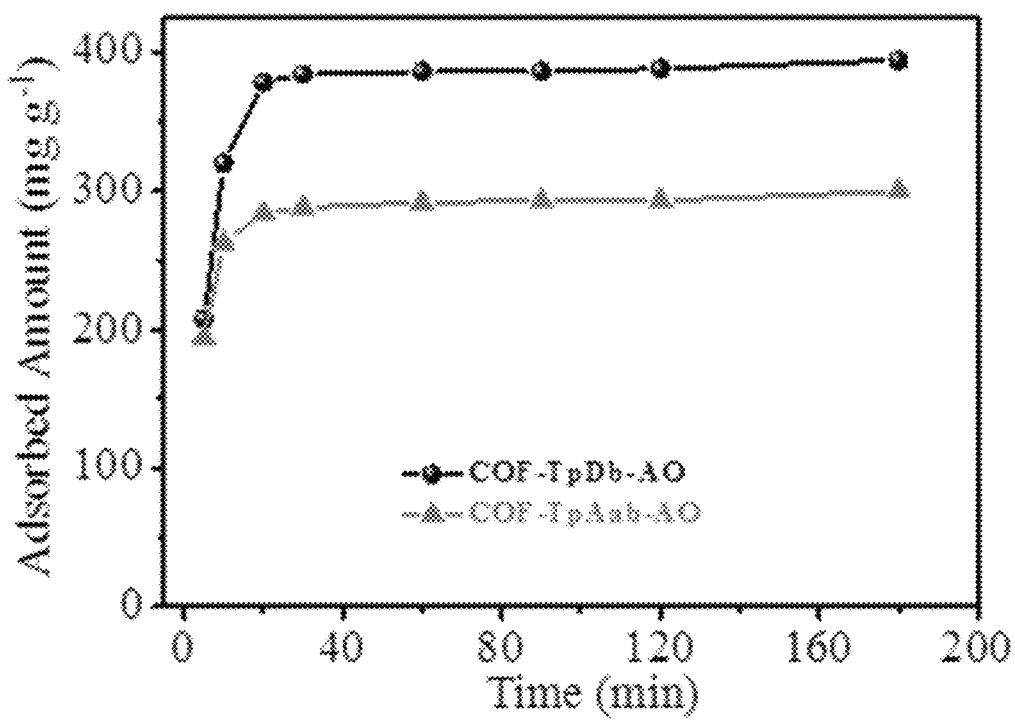
FIG. 25 shows the comparison of uranium adsorption kinetics from aqueous solution over COF-TpDb-AO and COF-TpAab-AO with an initial concentration of 9.25 ppm (400 mL), at pH~6, and adsorbent material (5 mg).

It is worthy to mention that a slightly faster uptake of COF-TpAab-AO compared with COF-TpDb-AO, in terms of the rate to reach equilibrium capacity is observed, which is likely related to pore size (FIG. 25). Diffusion of uranium species within COF-TpAab-AO with a larger pore size is expected to be more rapid than that within COF-TpDb-AO. Nonetheless, the difference is not obvious between the two COF adsorbents, thus suggesting that the chelating groups on both COF walls can be readily accessible and the adsorption in COFs is not a diffusion limited process. COF-TpDb-AO and COF-TpAab-AO can reach 81% and 87% of their equilibrium adsorption capacity within 10 min, respectively, and both of them can reach over 95% within 30 min. These results thereby highlight that the ordered and regular pore channels of COFs enable the functionalities decorated to be more accessible.

Figure 26A:
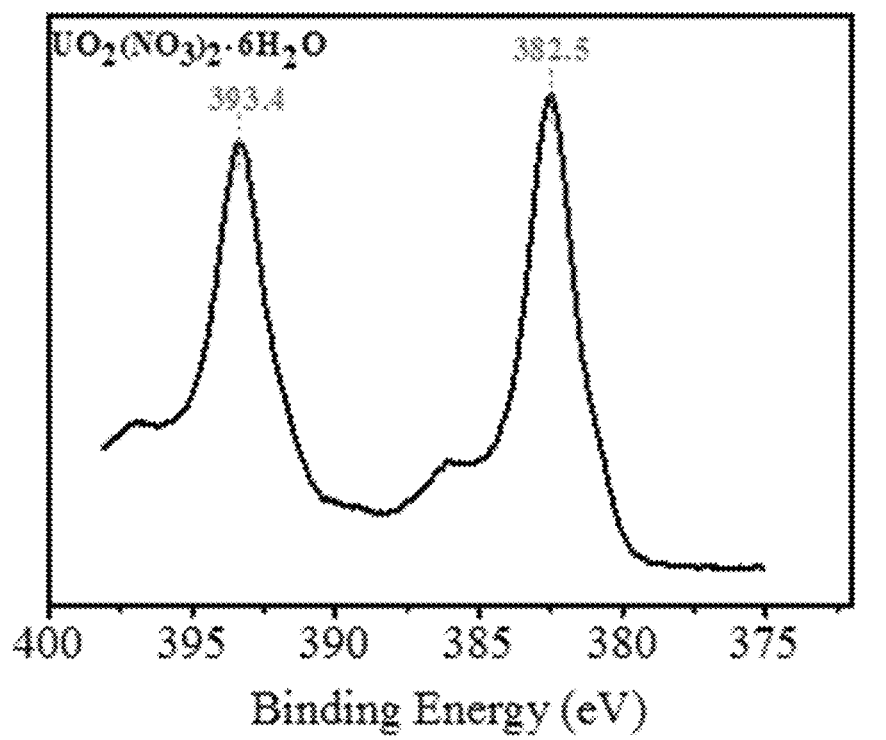
FIGS. 26A-26B show U4f XPS spectra. The U 4f5/2 binding energies for U@COF-TpDb-AO is at 392.4 eV, which is significantly lower than that of UO2(NO3)2·6H2O (393.4 eV), thus indicating that strong interactions exist between the uranium species and COF-TpDb-AO.
Figure 26B:
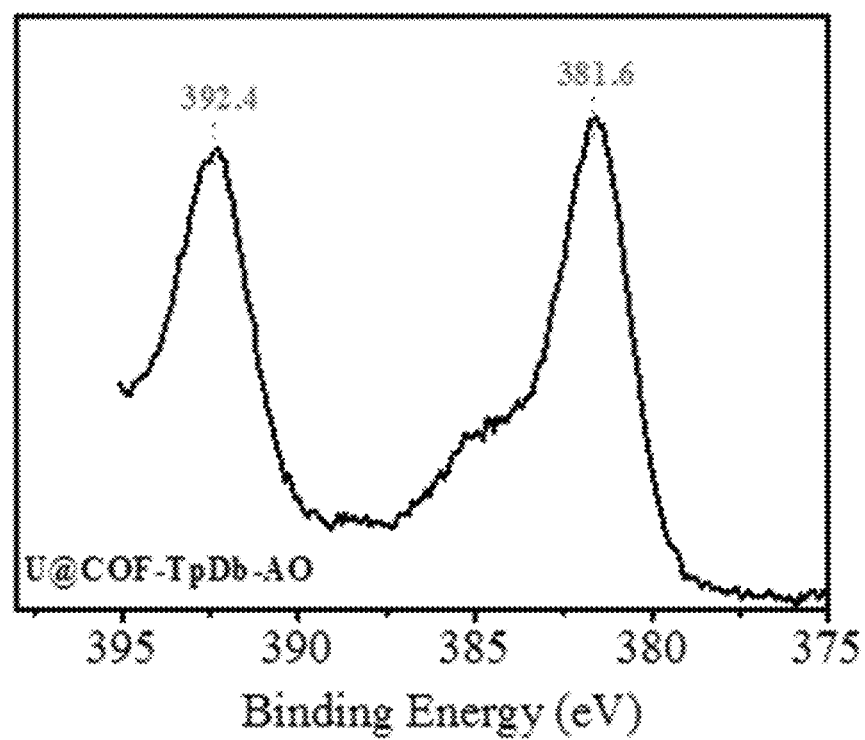
Figure 27:
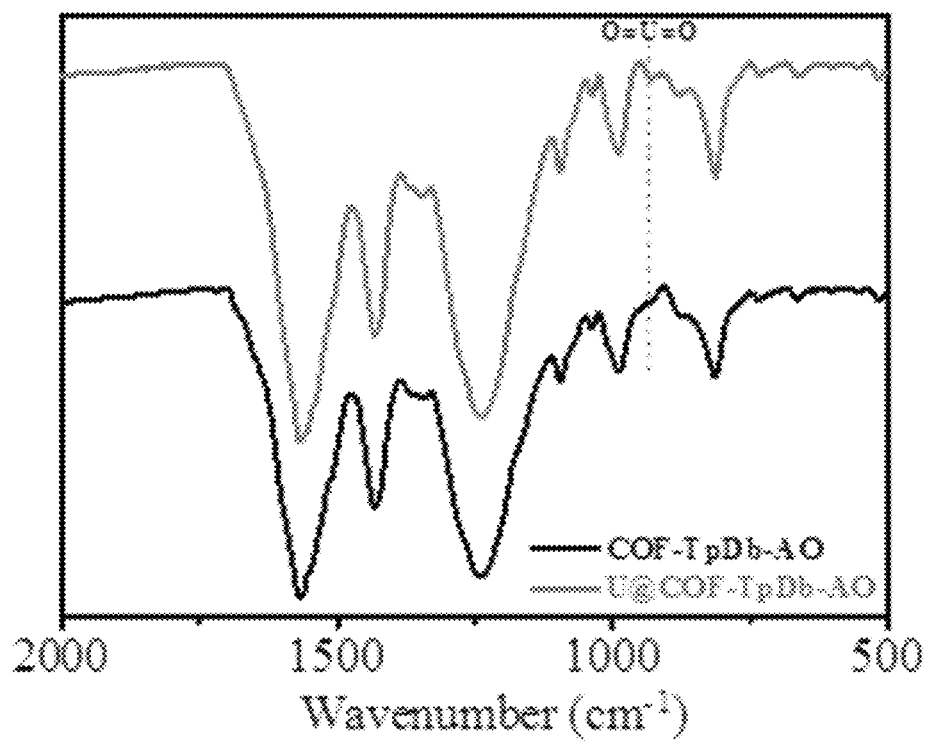
FIG. 27 shows IR spectra of COF-TpDb-AO and U@COF-TpDb-AO, respectively. The obvious red shift of the antisymmetric vibration of [O=U=O]2+ in COF-TpDb-AO (933 cm-1) in comparison with that in UO2(NO3)$_2$·6H2O (~960 cm-1)[1] from the IR studies further confirms that strong interactions exist between the uranium species and COF-TpDb-AO.
Figure 28A:
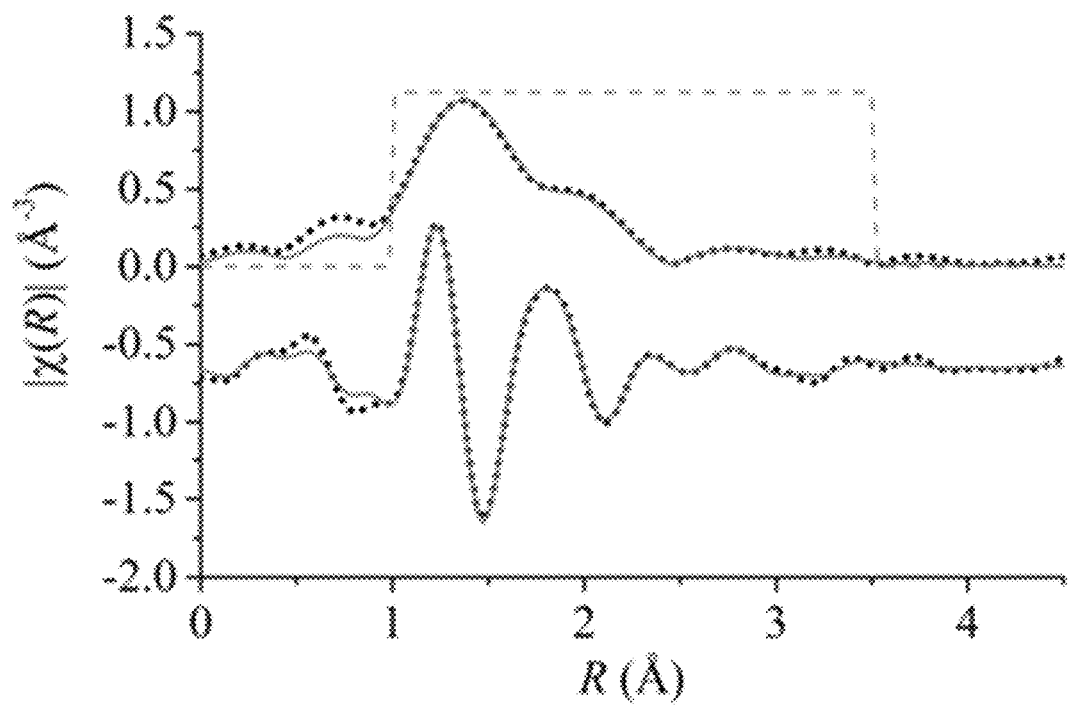
FIGS. 28A-28B show (FIG. 28A) Fourier transform of the UIII-edge EXAFS spectrum of POP TpDb-AO in R-space. The magnitude of the Fourier transform and the real component are fit with a line.
Figure 28B:
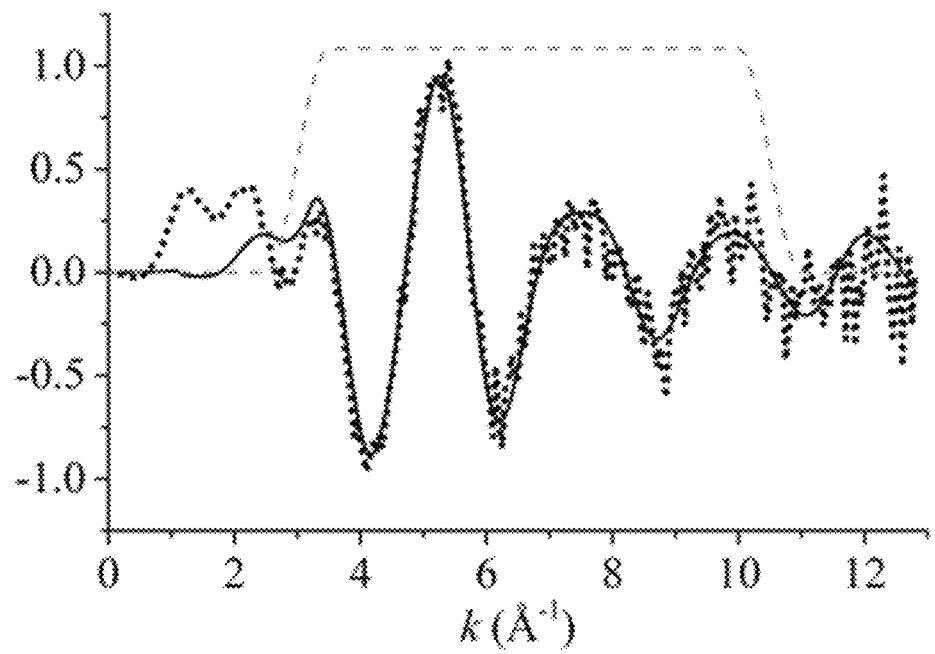

To trace the interaction between COF and uranium species, elemental distribution mapping and X-ray photoelectron spectroscopy studies were performed. Uranium species included COF-TpDb-AO (U@COF-TpDb-AO) was chosen as a representative sample for these studies. Elemental distribution mapping shows the presence of significant amounts of captured uranium and its homogeneous distribution in the sample (FIGS. 26A-26B). XPS spectra exhibited strong U 4f peaks, giving the U 4f$_{5/2}$ binding energies at 392.4 eV for U@COF-TpDb-AO, which is significantly lower than that of UO$_2$(NO$_3$)$_2$·6H$_2$O (393.4 eV). These results indicate that strong interactions exist between the uranium species and COF-TpDb-AO (FIG. 27). The obvious red shift of the antisymmetric vibration of [O=U=O]$^{2+}$ in COF-TpDb-AO (933 cm$^{-1}$) in comparison with that in UO$_2$(NO$_3$)$_2$·6H$_2$O (~960 cm$^{-1}$) from the IR studies further confirms the XPS results.[20]

To gain more insight into the coordination environment of uranium in both COF-TpDb-AO and POP-TpDb-AO, X-ray absorption fine structure (XAFS, FIGS. 6A-6C) spectroscopy were collected collected at the U L$_{III}$-absorption edge (17.166 keV). Fits of the extended XAFS (EXAFS) data for COF-TpDb-AO and POP-TpDb-AO were performed simultaneously and are shown in FIGS. 6A-6C, FIGS. 28A-28B, and Table 3-Table 5 (see Supporting Information for experimental details and analysis). Inspection of the data suggests the U(VI) coordination environment is similar between the two porous frameworks, and reasonable fits are obtained from applying the same uranyl-benzamidoxime η$^2$ binding motif model to both COF-TpDb-AO and POP-TpDb-AO. Two distinct U—O distances are required within the equatorial coordination plane, consistent with η$^2$ binding;[18] however, the spectral resolution of the data (~0.2 Å) precludes definitive assignment of the uranium coordination environment. Nevertheless, the successful simultaneous fitting of the EXAFS data sets with the same structure model demonstrates a common uranium binding mode, supporting structural differences in the adsorbent framework are responsible for the divergent performance.

Figure 29:
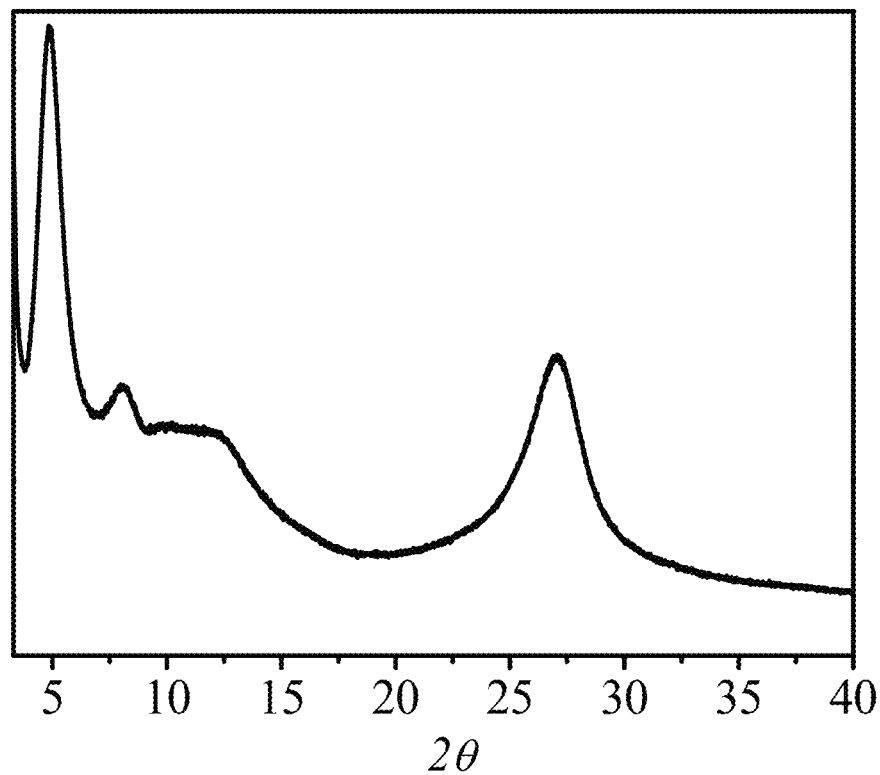
FIG. 29 shows XRD pattern of U@COF-TpDb-AO.

The ability to regenerate and recycle the adsorbent for recovery of uranium would afford great advantages to reducing overall cost and facilitate industrial application. Significantly, the possibility of reusing regenerated COF-based sorbents is established over several cycles with negligible loss in uranium extraction capacity suggesting adequate chemical and structural stability of the adsorbent materials. For example, COF-TpDb-AO can readily be regenerated by Na$_2$CO$_3$ solution and maintain its original adsorption capacity for at least three cycles, affording 394, 387, and 395 mg g$^{-1}$, respectively. Moreover, the retained crystallinity of COF-TpDb-AO after the uranium adsorption is evident by the PXRD pattern as shown in FIG. 29. These results thus reveal the exceptional potential of COFs to serve as high performance radionuclide scavengers.

Figure 7:
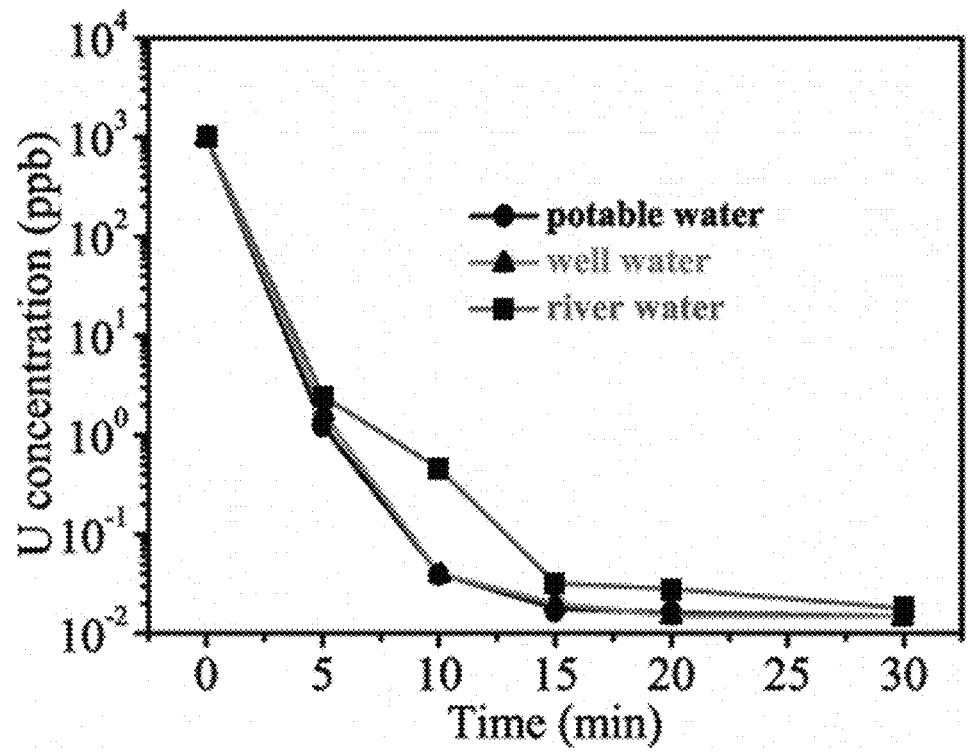
FIG. 7 shows the kinetics of uranium removal efficiency of COF-TpDb-AO from various water samples spiked with uranium (1000 ppb) at V:m=10000 mL g$^{-1}$.

Applicability in real water samples was evaluated including potable water, well water, and river water, in which uranium was intentionally added at a dilute concentration (1000 ppb). A single treatment with COF-based materials reduced the uranium concentrations in these water samples to less than 0.1 ppb, which is two orders of magnitude lower than the U.S. Environmental Protection Agency elemental limits for hazardous wastes and even drinking water standards (30 ppb). In addition to the impressive removal performance, it is outstanding from the viewpoint of kinetic efficiency, reaching equilibrium capacity within 30 min, whereas over 99.7% of uranium species were removed within 5 min with a high V/m ratio of 10000 mL g$^{-1}$ (FIG. 7). These results highlight the vast potential of COF-based adsorbents as promising candidates in accomplishing radionuclide removal from water.

Figure 30:
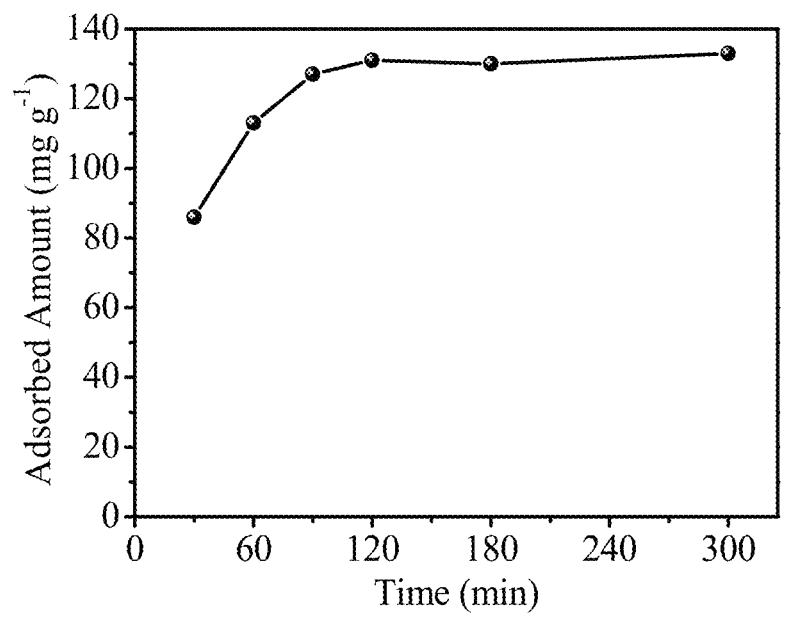
FIG. 30 shows the kinetics of uranium adsorption from seawater spiked with 20 ppm uranium at a V/m=40000 mL g-1. COF-TpDb-AO showed high uptake capacities, giving rise to as high as 127 mg uranium per gram of adsorbent. In addition to this, the kinetics of uranium capture in seawater samples was also found to be very fast and the adsorption equilibrium was reached within 90 min, encouraging for the potential use of COF-TpDb-AO for the enrichment of uranium from seawater.

After demonstrating the ability of COF-TpDb-AO to capture uranium with good affinity and selectivity in the aforementioned situations, performance was examined in seawater samples for the specific application of mining uranium from seawater for nuclear fuel production.[21] This is an ambitious task as seawater is characterized by substantially high ionic strength and a variety of interfering ions. To test the applicability of the adsorbents for the enrichment of uranium from seawater, the tests were performed using seawater samples spiked with 20 ppm uranium. COF-TpDb-AO showed high uptake capacities, giving rise to as high as 127 mg uranium per gram of adsorbent. In addition to this, the kinetics of uranium capture in seawater samples was also found to be very fast and the adsorption equilibrium was reached within 90 min (FIG. 30), encouraging for the potential use of COF-TpDb-AO for the enrichment of uranium from seawater.

Conclusion

In summary, this work has demonstrated, using an example of radionuclide capture, the greatly improved accessibility and affinity of the binding sites towards guest ions in the adsorbents designed from well-defined channels, relative to those prepared from materials with disordered pore networks. The contact area offered by the COF scaffolds maximizes the interaction of the covalently attached chelating groups with uranium species. In addition, the chelating groups aligned in periodic arrays on the walls are proximate with each other, which facilitate their cooperation, thereby leading to high affinities towards uranyl ions. As a result, the adsorbents based on COF materials have shown excellent adsorption performance in comparison with that of amorphous polymers in terms of uptake capacity, kinetics, and removal efficiency in uranium capture. Furthermore, COF-TpDb-AO proves to be feasible for decontamination of the uranium-polluted environmental water samples as well as enrichment of uranium from seawater with great efficiency. Moreover, these materials have been shown to be reusable over several cycles while maintaining good structural and chemical stability, demonstrating the great potential that such porous adsorbents could replace more traditional technologies. Our work thereby highlights new opportunities in using COFs as a novel platform for the deployment of adsorbent materials for environmental remediation by taking advantage of their amenability to design and unique structures.

Example 2: Bio-Inspired Uranium 'Nano-Traps' for Uranium Extraction

Nature has adapted over millennia to recognize specific metal ions with high sensitivity, where well-folded protein scaffolds for chelating ions are assisted by second-sphere interactions[43, 44]. From a chemistry perspective, general principles that are used to mimic nature for realizing these additional mutations, include enforcing a correct geometry, exerting charge stabilization, and providing proper hydrogen bond interactions to the distal sites off of the metal centers[45, 46]. In this context, it is anticipated that both the stability and selectivity of uranyl chelates will be enhanced when these concepts are included, in addition to coordinative binding with the metal center.

Taking the abovementioned into account, this disclosure presents a promising approach to meet these challenges by creating uranium 'nano-traps' that integrate the metrics of nature and artificial systems with the following features: (I) bio-inspired uranium coordination environment where the de novo introduced assistant group reinforces the interaction between the chelating site and uranyl, thus enhancing the affinity; (II) spatially continued yet highly accessible binding sites, thereby facilitating their cooperation and affording high uranium uptake capacity; (III) high surface area with hierarchical porosity to enable fast kinetics of uranium adsorption; and (IV) robustness under various pH environments and high ionic strength solutions, allowing for long-term stable performance and potential recycling. Such uranium 'nano-traps' can be targeted by constructing judiciously designed chelating systems into porous organic polymers (POPs) due to their exceptional chemical stability as well as flexible molecular design and tunable pore structures[47-52]. These features provide excellent opportunities to introduce hierarchical porosity and offer a high density of the chelating moieties in the resultant adsorbent materials to achieve both efficient binding kinetics and high adsorption capacities to meet the challenges posed by the enormous volumes of wastewater or seawater[29, 30].

Supplementary Methods

Synthesis of Porous Adsorbent Material Constructed by Benzamidoxime Moieties (POP-AO)

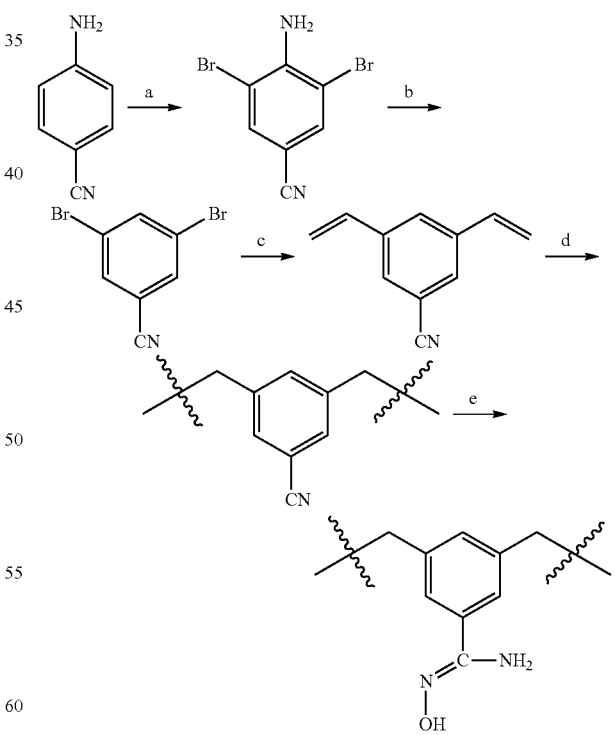

Reagents:
(a) Br$_2$;
(b) H$_2$SO$_4$, NaNO$_2$, Cu;
(c) potassium vinyltrifluoroborate, Pd(OAc)$_2$;
(d) AIBN;
(e) NH$_2$OH·HCl 4-amino-3,5-dibromobenzonitrile. To a solution of 4-aminobenzonitrile (6.0 g, 51 mmol) in acetic acid (100 mL), Br$_2$ (6.0 mL, 117 mmol) was added slowly. After being stirred at room temperature overnight, the mixture was poured into ice, and the crude bromo-derivative was filtered, washed with NaHSO$_3$ solution, dissolved in CH$_2$Cl$_2$, dried by K$_2$CO$_3$, and purified by flash chromatography with hexane/ethyl acetate (5:1) as eluent to give the title compound as a white solid. Yield: 13.2 g (95%). $^1$H NMR (400 MHz, CDCl$_3$, 298K, TMS): δ 7.62 (s, 2H), 5.09 (s, 2H) ppm.

3,5-dibromobenzonitrile. Concentrated sulphuric acid (10 mL) was added gradually to a solution of 4-amino-3,5-dibromobenzonitrile (4.1 g, 15 mmol) in benzene (15 mL) and ethanol (100 mL) at room temperature, after which the reaction mixture was refluxed for 3 h. To the residue, a solution of sodium nitrite (2.8 g, 40 mmol) in a small amount of water was added gradually at 0° C., followed by copper powder (0.96 g, 15 mmol). After being stirred at room temperature overnight and refluxed for a further 3 h, the insoluble materials were removed by filtration. The filtrate was extracted with ethyl acetate, washed with water, dried over Na$_2$SO$_4$, and evaporated under reduced pressure to give the crude compound which was purified by flash chromatography with hexane/ethyl acetate (20:1) as eluent to afford the title compound as a white solid. Yield: 3.4 g (87%). $^1$H NMR (400 MHz, CDCl$_3$, 298K, TMS): δ 7.89 (t, 1H, J=1.4 Hz), 7.72 (t, 2H, J=0.8 Hz) ppm.

3,5-divinylbenzonitrile. 3,5-dibromobenzonitrile (2.0 g, 7.7 mmol), potassium vinyltrifluoroborate (2.06 g, 18.5 mmol), K$_2$CO$_3$ (4.25 g, 30.8 mmol), PPh$_3$ (0.08 g, 0.308 mmol), and Pd(OAc)$_2$ (0.034 g, 0.154 mmol) were dissolved in a mixture of toluene (25 mL), THF (25 m L), and H$_2$O (5 mL) and the resulting mixture was refluxed at 90° C. under N$_2$ atmosphere for 12 h. The residue was extracted with ethyl acetate, washed with brine, dried over Na$_2$SO$_4$, and evaporated under reduced pressure to give the crude compound which was purified by flash chromatography with hexane/ethyl acetate (20:1) as eluent to afford the title compound as a transparent liquid. Yield: 1.1 g (92%). $^1$H NMR (500 MHz, CDCl$_3$, 298K, TMS): δ 7.89 (s, 1H), 7.55 (d, 2H, J=1.5 Hz), 6.66-6.72 (m, 2H), 5.83 (d, 2H, J=17.5 Hz), 5.41 (d, 2H, J=11.0 Hz) ppm. $^{13}$C NMR (125 MHz, CDCl$_3$, 298K, TMS) 113.09, 116.80, 116.69, 128.20, 128.66, 134.77, 138.98.

Synthesis of porous polymer constructed by benzonitrile moieties (POP-CN). 3,5-divinylbenzonitrile (1.0 g) was dissolved in DMF (10 mL), followed by the addition of azobisisobutyronitrile (AIBN, 0.025 g). The mixture was transferred into a 20 mL autoclave and maintained for 24 h at 100° C. A white solid product (1.0 g, 100% yield) was obtained after being washed with ethanol and dried under vacuum at 50° C. for 24 h.

Synthesis of porous adsorbent material constructed by benzamidoxime moieties (POP-AO). As a typical synthesis recipe, POP-CN (0.2 g) was swollen in ethanol (20 mL) for 10 min, followed by the addition of NH$_2$OH·HCl (0.5 g) and N(CH$_2$CH$_3$)$_3$ (0.75 g). After being stirred at 70° C. for 48 h to convert the nitrile into amidoxime, the mixture was filtered, washed with excess water, and finally dried at 50° C. under vacuum. The white solid obtained was denoted as POP-AO. POP-AO was treated with 3% (w/w) potassium hydroxide aqueous solution at room temperature for 36 h before adsorption tests.

Synthesis of porous adsorbent material constructed by 4-amino-benzamidoxime moieties (POP-pNH$_2$-AO).

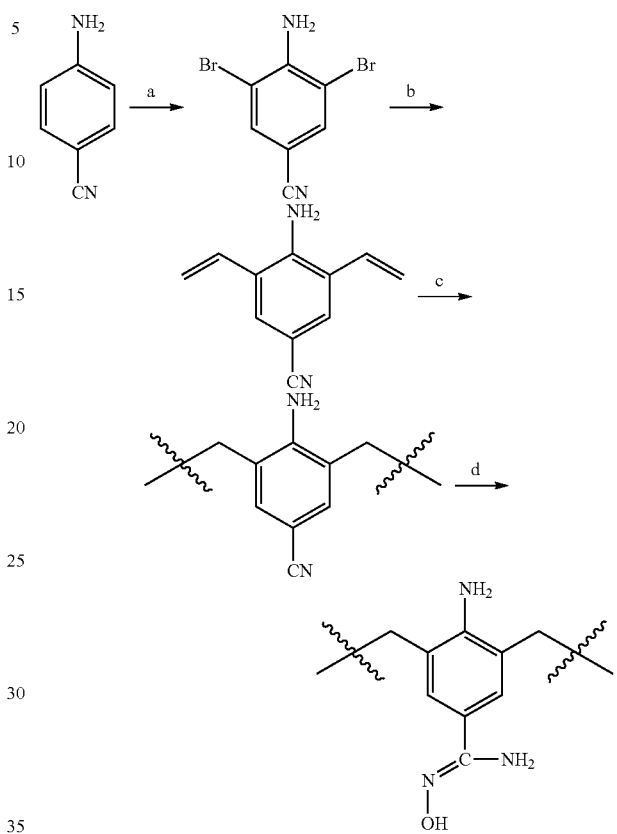

Reagents:
(a) Br$_2$, AcOH;
(b) potassium vinyltrifluoroborate, Pd(OAc)$_2$;
(c) AIBN;
(d) NH$_2$-OH·HCl 4-amino-3,5-dibromobenzonitrile. To a solution of 4-aminobenzonitrile (6.0 g, 51 mmol) in acetic acid (100 mL), Br$_2$ (6.0 mL, 117 mmol) was added slowly. After being stirred at room temperature overnight, the mixture was poured into ice, and the crude bromo-derivative was filtered, washed with NaHSO$_3$ solution, dissolved in CH$_2$Cl$_2$, dried by K$_2$CO$_3$, and purified by flash chromatography with hexane/ethyl acetate (5:1) as eluent to give the title compound as a white solid. Yield: 13.2 g (95%). $^1$H NMR (400 MHz, CDCl$_3$, 298K, TMS): δ 7.62 (s, 2H), 5.09 (s, 2H) ppm.

4-amino-3,5-divinylbenzonitrile. 4-amino-3,5-dibromobenzonitrile (2.0 g, 7.2 mmol), potassium vinyltrifluoroborate (2.06 g, 18.5 mmol), K$_2$CO$_3$ (4.25 g, 30.8 mmol), PPh$_3$ (0.08 g, 0.308 mmol), and Pd(OAc)$_2$ (0.034 g, 0.154 mmol) were dissolved in a mixture of toluene (25 mL), THF (25 m L), and H$_2$O (5 mL) and the resulting mixture was refluxed at 90° C. under N$_2$ atmosphere for 12 h. The residue was extracted with ethyl acetate, washed with brine, dried over Na$_2$SO$_4$, and evaporated under reduced pressure, giving the crude compound which was purified by flash chromatography with hexane/ethyl acetate (5:1) as eluent to afford the title compound as a yellow solid. Yield: 1.05 g (85%). $^1$H NMR (500 MHz, CDCl$_3$, 298K, TMS): δ 7.43 (s, 2H), 6.64-6.69 (m, 2H), 5.66 (d, 2H, J=17.0 Hz), 5.70 (d, 2H, J=16.0 Hz), 5.46 (d, 2H, J=11.0 Hz) ppm. $^{13}$C NMR (125 MHz, CDCl$_3$, 298K, TMS) 100.75, 119.08, 119.93, 124.7, 130.83, 131.17, 144.81.

Synthesis of porous polymer constructed with 4-aminobenzonitrile (POP-pNH$_2$—CN): 4-amino-3,5-divinylbenzonitrile (1.0 g) was dissolved in DMF (10 mL), followed by the addition of AIBN (25 mg). The mixture was transferred into a 20 mL autoclave and maintained for 24 h at 100° C. A yellow solid product (1.0 g, 100% yield) was obtained after being washed with ethanol and dried under vacuum at 50° C. for 24 h.

Synthesis of porous adsorbent material constructed by 4-amino-benzamidoxime moieties (POP-pNH$_2$-AO). As a typical synthesis recipe, POP-pNH$_2$—CN (0.2 g) was swollen in ethanol (20 mL) for 10 min, followed by the addition of NH$_2$OH·HCl (0.5 g) and N(CH$_2$CH$_3$)$_3$ (0.75 g). After being stirred at 70° C. for 48 h to convert the nitrile into amidoxime, the mixture was filtered, washed with excess water, and finally dried at 50° C. under vacuum. The light brown solid obtained was denoted as POP-pNH$_2$-AO. POP-pNH$_2$-AO was treated with 3% (w/w) potassium hydroxide aqueous solution at room temperature for 36 h before adsorption tests.

Synthesis of porous adsorbent material constructed by 2-amino-benzamidoxime moieties (POP-oNH$_2$-AO).

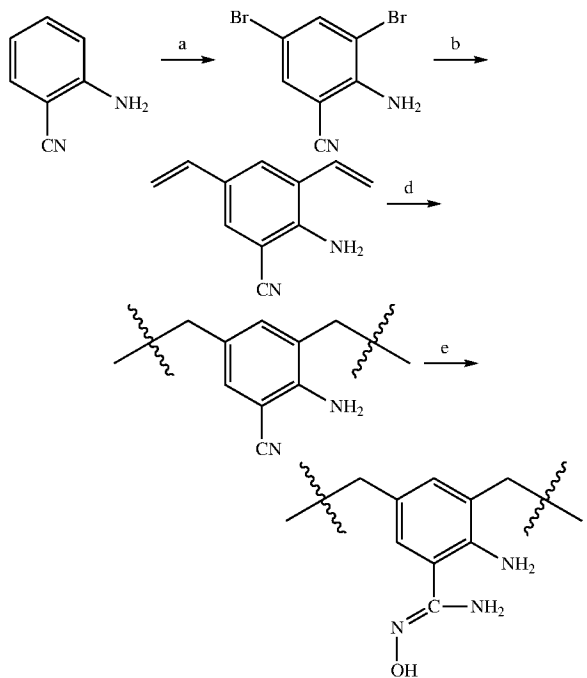

Reagents:
(a) Br$_2$, AcOH;
(b) potassium vinyltrifluoroborate, Pd(OAc)$_2$;
(c) AIBN;
(d) NH$_2$-OH•HCl 2-amino-3,5-dibromobenzonitrile. To a solution of 2-aminobenzonitrile (6.0 g, 51 mmol) in acetic acid (100 mL), Br$_2$ (6.0 mL, 117 mmol) was added slowly. After being stirred at room temperature overnight, the mixture was poured into ice, and the crude product was filtered, washed with NaHSO$_3$ solution, dissolved in CH$_2$Cl$_2$, dried by K$_2$CO$_3$, and purified by flash chromatography with hexane/ethyl acetate (5:1) as eluent to give the title compound as a light yellow solid. Yield: 12.8 g (92%). $^1$H NMR (400 MHz, d$_6$-DMSO, 298K, TMS): δ7.86 (d, 1H, J=2.4 Hz), 7.72 (d, 1H, J=2.4 Hz), 6.25 (s, 2H) ppm.

2-amino-3,5-divinylbenzonitrile. 2-amino-3,5-dibromobenzonitrile (2.0 g, 7.2 mmol), potassium vinyltrifluoroborate (2.06 g, 18.5 mmol), K$_2$CO$_3$ (4.25 g, 30.8 mmol), PPh$_3$ (0.08 g, 0.308 mmol), and Pd(OAc)$_2$ (0.034 g, 0.154 mmol) were dissolved in a mixture of toluene (25 mL), THF (25 mL), and H$_2$O (5 mL) and the resulting mixture was refluxed at 90° C. under N$_2$ atmosphere for 12 h. The residue was extracted with ethyl acetate, washed with brine, dried over Na$_2$SO$_4$, and evaporated under reduced pressure, giving the crude compound which was purified by flash chromatography with hexane/ethyl acetate (5:1) as eluent to afford the title compound as yellow solid. Yield: 0.95 g (77%). $^1$H NMR (400 MHz, d$_6$-DMSO, 298K, TMS): δ 7.63 (d, 1H, J=1.6 Hz), 7.48 (d, 1H, J=2 Hz), 6.49-6.95 (m, 2H), 6.04 (s, 2H), 5.64-5.75 (m, 2H), 5.03-5.28 (m, 2H) ppm. $^{13}$C NMR (100 MHz, d$_6$-DMSO, 298K, TMS): 148.22, 135.28, 131.62, 130.53, 128.61, 126.29, 123.74, 118.30, 116.59, 112.06, 95.64.

Synthesis of porous polymer constructed with 2-aminobenzonitrile (POP-oNH$_2$—CN). 2-amino-3,5-divinylbenzonitrile (1.0 g) was dissolved in DMF (10 mL), followed by the addition of AIBN (25 mg). The mixture was transferred into a 20 mL autoclave and maintained for 24 h at 100° C. A yellow solid product (1.0 g, 100% yield) was obtained after being washed with ethanol and dried under vacuum at 50° C. for 24 h.

Synthesis of porous adsorbent material constructed by 2-amino-benzamidoxime moieties (POP-oNH$_2$-AO). As a typical synthesis recipe, POP-oNH$_2$—CN (0.2 g) was swollen in ethanol (20 mL) for 10 min, followed by the addition of NH$_2$OH·HCl (0.5 g) and N(CH$_2$CH$_3$)$_3$ (0.75 g). After being stirred at 70° C. for 48 h to convert the nitrile into amidoxime, the mixture was filtered, washed with excess water, and finally dried at 50° C. under vacuum. The light brown solid obtained was denoted as POP-oNH$_2$-AO. POP-oNH$_2$-AO was treated with 3% (w/w) potassium hydroxide aqueous solution at room temperature for 36 h before adsorption tests.

Sorption Experiments

The aqueous solutions with different uranium concentrations were obtained by diluting the stock UO$_2$(NO$_3$)$_2$·6H$_2$O solution with the proper amount of distilled water unless otherwise indicated. The pH levels of the solutions were adjusted by HNO$_3$ or NaOH aqueous solution. The concentrations of uranium during all the experiments were detected by inductively coupled plasma-optical emission spectroscopy (ICP-OES) and inductively coupled plasma-mass spectrometry (ICP-MS) for extra low concentrations. All the adsorption experiments were performed at ambient conditions.

Uranium sorption isotherms. To obtain the uranium adsorption isotherms for various adsorbents, POP-AO (5 mg), POP-pNH$_2$-AO (5 mg), or POP-oNH$_2$-AO (5 mg) was added into 10 mL aqueous solutions with different concentrations of uranium in the range of 36 to 356 ppm. Adsorbents were suspended fully by a brief sonication and then the mixtures were stirred vigorously overnight, by which time it was assumed that adsorption equilibrium had been reached. The treated solutions were filtrated through a 0.45-um membrane filter. The supernatant was analyzed using ICP analysis to determine the remaining uranium concentration. The adsorbed amount at equilibrium ($q_e$, mg g$^{-1}$) was calculated by:

$$q_e = \frac{(C_i - C_e) \times V}{m}$$

where V is the volume of the treated solution (mL) and m is the amount of adsorbent used (g), and $C_i$ and $C_e$ are the initial concentration and the final equilibrium concentration of uranium, respectively.

Uranium sorption kinetics from distilled water. Uranium aqueous solution (400 mL, 7.56 ppm) and adsorbents (3 mg) were added to an Erlenmeyer flask with a magnetic stir bar. The mixture was stirred at room temperature for 3 h. At appropriate time intervals, aliquots (5 mL) were taken from the mixture, and the adsorbents were separated by syringe filter (0.45 μm membrane filter). The uranium concentrations in the resulting solutions were analyzed by ICP-OES. The adsorption capacity at different intervals was calculated as follows:

$$\text{Adsorption capacity (mg/g)} = (C_i - C_t) \times V/m$$

where V is the volume of the treated solution (mL) and m is the amount of used adsorbent (mg), and $C_i$ and $C_t$ are the initial concentration and the concentration of uranium at t (min), respectively.

Uranium removal kinetics from distilled water. Uranium aqueous solution (250 mL, 3560 ppb) and adsorbents (5 mg) were added to an Erlenmeyer flask with a magnetic stir bar. The mixture was stirred at room temperature for 1 h. At appropriate time intervals, aliquots (5 mL) were taken from the mixture, and the adsorbents were separated by syringe filter (0.45 μm membrane filter). The uranium concentrations in the resulting solutions were analyzed by ICP-MS. The percentage removal of $UO_2^{2+}$ was calculated as follows:

$$\text{Removal percentage (\%)} = \frac{C_i - C_t}{C_0} \times 100$$

Uranium removal kinetics from potable water. Potable water spiked with 1000 ppb uranium (250 mL) and adsorbents (5 mg) were added to an Erlenmeyer flask with a magnetic stir bar. The mixture was stirred at room temperature for 1 h. At appropriate time intervals, aliquots (5 mL) were taken from the mixture, and the adsorbents were separated by syringe filter (0.45 μm membrane filter). The uranium concentrations in the resulting solutions were analyzed by ICP-MS.

Uranium sorption kinetics from simulated seawater. Simulated sea water (25.6 g $L^{-1}$ NaCl and 0.198 g $L^{-1}$ $NaHCO_3$) spiked with 10.3 ppm uranium (400 mL) and adsorbents (3 mg) were added to an Erlenmeyer flask with a magnetic stir bar. The mixture was stirred at room temperature for 300 min. At appropriate time intervals, aliquots (5 mL) were taken from the mixture, and the adsorbents were separated by syringe filter (0.45 μm membrane filter). The uranium concentrations in the resulting solutions were analyzed by ICP-OES.

Uranium removal kinetics from simulated seawater. Simulated sea water (25.6 g $L^{-1}$ NaCl and 0.198 g $L^{-1}$ $NaHCO_3$) spiked with 4056 ppb uranium (10 mL) and adsorbents (5 mg) were added to an Erlenmeyer flask with a magnetic stir bar. The mixture was stirred at room temperature. At appropriate time intervals, aliquots were taken from the mixture, and the adsorbents were separated by syringe filter (0.45 μm membrane filter). The uranium concentrations in the resulting solutions were analyzed by ICP-MS.

Uranium enrichment from real seawater. Adsorbent material (5 mg) was immersed in a tank containing 5 gallons of seawater and shaken at 100 rpm at room temperature. After 56 days, the adsorbent was collected by filtration, washed with water, and dried at 80° C. under vacuum for 24 h. The amount of uranium enriched in the adsorbent was determined by ICP-MS analysis after being digested by aqua regia.

X-Ray Crystallography

The X-ray diffraction data was measured on Bruker D8 Venture PHOTON 100 CMOS system equipped with a Cu $K_\alpha$ INCOATEC ImuS micro-focus source (λ=1.54178 Å). Indexing was performed using APEX3[78] (Difference Vectors method). Data integration and reduction were performed using SaintPlus 6.01[79]. Absorption correction was performed by multi-scan method implemented in SADABS[80]. Space groups were determined using XPREP implemented in APEX3[1]. Structures were solved using SHELXT and refined using SHELXL-2016[80-84] (full-matrix least-squares on $F^{79}$) through OLEX2 interface program[85]. All non-hydrogen atoms were refined anisotropically. Hydrogen atoms of —CH and —$CH_3$ groups were placed in geometrically calculated positions and were included in the refinement process using riding model with isotropic thermal parameters: Uiso(H)=1.2 (1.5)Ueq(—CH, (—$CH_3$)). Hydrogen atoms of —OH and —$NH_2$ groups were refined with DFIX/DANG or using riding model. Pseudo translational effects present in the data are due to the presence and perfect alignment of heavy uranium cations in c direction. Structure solution based on data integrated with halved c unit cell parameter resulted however with heavy disorder of uranium chelating ligand and O atoms. Crystal data and refinement conditions are shown in Table 7.

Computational Methods

Electronic structure calculations. Quantum chemical calculations were performed with the Gaussian 09 D.01 software[86]. Density functional theory (DFT) approach was used for calculations using the M06[87] density functional with the standard Stuttgart small-core (SSC) 1997 relativistic effective core potential (RECP)[88] and the associated contracted [8s/7p/6d/4f] basis set for uranium atom, along with the 6-311++G(d,p) basis set for the light atoms. Frequency calculations were performed at the B3LYP/SSC/6-31+G(d)[89] level to ensure that geometries (optimized at the same B3LYP/SSC/6-31+G(d) level) were minima and to compute zero-point energies and thermal corrections. Using the gas-phase geometries, implicit solvent corrections were obtained at 298 K with the SMD[90] solvation model as implemented in Gaussian 09 at the B3LYP/SSC/6-31+G(d) level of theory. The results are reported using the lowest energy clusters identified at the M06/SSC/6-311++G(d,p) level for a given stoichiometry and binding motif. The preference for using a combination of the M06 and the B3LYP functionals with the SMD solvation model was based on the results of our previous studies[91, 92], which showed that the chosen level of theory provides the best overall performance in predicting the log β values of uranyl complexes with anionic oxygen and amidoxime donor ligands.

Ligand-$UO_2^{2+}$ interactions. Assessment of second-order stabilization energies ($E^{(2)}$, kcal/mol) in $UO_2(AO)_2$, $UO_2(pNH_2\text{-}AO)_2$, and $UO_2(oNH_2\text{-}AO)_2$ complexes was performed with the natural bond orbital (NBO) method[93] at M06/SSC/6-311++G(d,p) using commercial stand-alone NBO 6.0 program[94]. It is worth noting that total electron densities derived from effective core potential (ECP) calculations may lead to artifacts in the topological analysis[95], however, NBO derived properties appear to be less critical in this respect and showed a remarkable consistency between ECP and scalar relativistic all-electron calculation schemes[96], justifying our choice towards ECP for the description of chemical bonding. The donor-acceptor interaction energy (second-order stabilization energies ($E^{(2)}$) in the NBOs was estimated via second-order perturbation theory analysis of the Fock matrix[93]. For each donor orbital (i) and acceptor orbital (j), the stabilization energy $E^{(2)}$ associated with i→j delocalization is given by:

$$E^{(2)}_{i,j} = -o_i \frac{\langle i|\hat{F}_{(i,j)}|j\rangle^2}{\varepsilon_j - \varepsilon_i}$$

where $o_i$ is the donor orbital occupancy, $\hat{F}_{(i,j)}$ is the Fock operator, and $\varepsilon_i$ and $\varepsilon_j$ are the orbital energies.

Calculations of $pK_a$, complexation free energies and stability constants. For the $pK_a$ predictions a protocol described in reference 97 was used which showed the best overall performance for a set of 13 oxygen donor and 3 amidoxime-based ligands, with a RMSD of 0.46 $pK_a$. This methodology[97] involves MP2/aug-cc-pVTZ//MP2/aug-cc-pVDZ calculations with the SMD[90] solvation model.

Complexation free energies in aqueous solution, $\Delta G_{aq}$, and stability constants, log β, were calculated using the methodology described in our previous work on $UO_2^{2+}$ complexes[91, 92]. According to the thermodynamic cycle shown in Supplementary Scheme 1, $\Delta G_{aq}$ is given by:

$$\Delta G_{aq} = \Delta G°_g + \Delta\Delta G*_{solv} + (n-1)\Delta G^{o\rightarrow *} + nRT \ln([H_2O])$$

where $\Delta G°_g$ is the free energy of complexation in the gas phase and $\Delta\Delta G*_{solv}$ is the difference in the solvation free energies for a complexation reaction:

$$\Delta\Delta G*_{solv} = \Delta G*_{solv}([ML(H_2O)_{m-n}]^{x+y}) + n\Delta G*_{solv}(H_2O) - \Delta G*_{solv}([M(H_2O)_m]^x) - \Delta G*_{solv}(L^y)$$

where $L^y$ denotes the ligand with a charge of y and M is $UO_2^{2+}$. The standard state correction terms must be introduced to connect $\Delta G°_g$, $\Delta\Delta G*_{solv}$, and $\Delta G_{aq}$, which are defined using different standard state conventions. The free energy change for the conversion of 1 mol of solute from the gas phase at a standard state of 1 atm (24.46 L mol$^{-1}$) to the aqueous phase at a standard state of 1 mol L$^{-1}$ at 298.15 K is given by $\Delta G°* = 1.89$ kcal mol-1. Likewise, RT ln([H$_2$O])=2.38 kcal mol$^{-1}$ (T=298.15 K) is the free energy change for the conversion of 1 mol of solvent from the aqueous phase at 1 mol L$^{-1}$ to pure water at a standard state of 55.34 mol L$^{-1}$. Lastly, the stability constant (log β) is related to free energy change for the complexation reaction by the following equation:

$$\log \beta = \frac{-\Delta G_{aq}}{2.303 \cdot RT}$$

Supplementary Scheme 1: Thermodynamic cycle used to calculate $\Delta G_{aq}$.

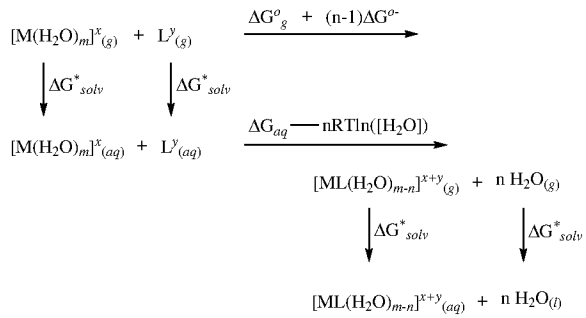

Speciation diagrams were calculated using the HySS[98] program and formation constants for uranyl-carbonate complexes and uranyl hydroxy species are given in Table 11.

EXAFS

Sample Preparation. Approximately 20-25 mg of sample was enclosed within a nylon washer of 4.953 mm inner diameter (area of 0.193 cm$^2$), sealed on one side with transparent "Scotch" tape. The sample was pressed thoroughly by hand to form a firm, uniform pellet, and then sealed on the open side with a second piece of tape. The entire sample was placed into a Mylar baggie. Small pieces of Kapton tape were used to seal the three open edges of the Kapton baggie. This method was approved in advance by the APS Radiation Safety Review Board for achieving the double containment necessary for analysis of radioactive samples.

Data Collection. The X-ray absorption data were collected at Beamline 10BM-B at the Advanced Photon Source (APS) at Argonne National Laboratory. Spectra were collected at the uranium L$_3$-edge (17166 eV) in transmission mode. The X-ray white beam was monochromatized by a Si(111) monochromator and detuned by 50% to reduce the contribution of higher-order harmonics to below the level of noise. The K-edge of an yttrium foil (17038 eV) was used as the reference for energy calibration and measured simultaneously for all samples. The incident beam intensity (I$_0$), transmitted beam intensity (I$_t$), and reference (I$_r$) were all measured by 20 cm ionization chambers with gas compositions of 80% N$_2$ and 20% Ar, 95% Ar and 5% N$_2$, and 100% N$_2$, respectively. All spectra were collected at room temperature.

Samples were centered on the beam and adjusted to find the most homogeneous location in the sample for data collection. The beam was reduced to dimensions of 400× 3100 µm for all data collection. Data were collected over six regions: −250 to −30 eV (10 eV step size, dwell time of 0.25 seconds), −30 to −5 eV (5 eV step size, dwell time of 0.5 seconds), −5 to 30 eV (1 eV step size), 3 Å$^{-1}$ to 6 Å$^{-1}$ (0.05 Å$^{-1}$ step size, dwell time of 2 seconds), 6 Å$^{-1}$ to 9 Å$^{-1}$ (0.05 Å$^{-1}$ step size, dwell time of 4 seconds), and 9 Å$^{-1}$ to 15 Å$^{-1}$ (0.05 Å$^{-1}$ step size, dwell time of 8 seconds). Three scans were collected for each sample.

The data were processed and analyzed using the Athena and Artemis programs of the IFEFFIT package based on FEFF 6[99-100]. Reference foil data were aligned to the first zero-crossing of the second derivative of the normalized µ(E) data, which was subsequently calibrated to the literature E$_0$ for the yttrium K-edge (17038 eV). Spectra were averaged in µ(E) prior to normalization. The background was removed and the data were assigned an Rbkg value of 1.0.

Fitting. All data were initially fit with k-weighting of 1, 2, and 3, then finalized with k$^3$-weighting in R-space. Structural parameters that were determined by the fits include the degeneracy of the scattering path (N$_{degen}$), the change in half-path length, R$_{eff}$ (ΔR$_i$), the relative mean square displacement of the scattering element (δ$^2_i$), the passive electron reduction factor (S$_0^2$), and the energy shift of the photoelectron, (ΔE$_0$). S$_0^2$ was found to converge to 1.0±0.10 for all fits and was thus fixed at that value for all models. For each fit, the number of independent points was not permitted to exceed ⅔ the number of variables, in keeping with the Nyquist criterion[101-102].

Fits of the data were attempted in a bottom-up fashion using the structure models. Fitting atomic degeneracy was achieved through the introduction of a variable which scaled the amplitude reduction factor, S$_0^2$. While more distant scattering paths were progressively included, refined values for previously established scattering paths were used as initial guesses, but allowed to vary freely to avoid introduction of systematic error. The final model used for all fits contained direct scattering paths off two axial oxygen, a variable number of light scatterers in the equatorial plane (O and N backscatterers are indistinguishable by EXAFS), a variable number of carbon scatterers at 2.89 Å representative of carbonate, and a variable number of carbon scatterers at 3.57 Å representative of amidoxime ligands bound in an $\eta^2$ configuration. A summary of the refined fit parameters for all systems is displayed below in Table 12.

TABLE 7

Crystal data and structure refinement for $UO_2(oNH_2\text{-}AO)_2(MeOH)_2$.

| | |
|---|---|
| Identification code | CCDC 1547954 |
| Empirical formula | $C_{20}H_{40}N_6O_{10}U$ |
| Moiety formula | $[UO_2(C_7H_8N_3O)_2(CH_3OH)_2]\cdot(CH_3OH)_4$ |
| Temperature/K | 100.0 |
| Crystal system | monoclinic |
| Space group | C2/c |
| a/Å | 22.6512(6) |
| b/Å | 6.7491(2) |
| c/Å | 20.7330(5) |
| α/° | 90 |
| β/° | 118.7730(10) |
| γ/° | 90 |
| Volume/Å$^3$ | 2778.23(13) |
| Z | 4 |
| $\rho_{calc}$g/cm$^3$ | 1.823 |
| μ/mm$^{-1}$ | 16.975 |
| F(000) | 1496.0 |
| Crystal size/mm$^3$ | 0.08 × 0.03 × 0.02 |
| Radiation | CuKα (λ = 1.54178) |
| 2Θ range for data collection/° | 8.908 to 136.472 |
| Index ranges | −27 ≤ h ≤ 27, −8 ≤ k ≤ 8, −22 ≤ l ≤ 24 |
| Reflections collected | 12939 |
| Independent reflections | 2541 [$R_{int}$ = 0.0580, $R_{sigma}$ = 0.0373] |
| Data/restraints/parameters | 2541/29/209 |
| Goodness-of-fit on F$^2$ | 1.095 |
| Final R indexes [I >= 2σ (I)] | $R_1$ = 0.0246, w$R_2$ = 0.0465 |
| Final R indexes [all data] | $R_1$ = 0.0458, w$R_2$ = 0.0517 |
| Largest diff. peak/hole/e Å$^{-3}$ | 0.87/−0.45 |

TABLE 8

Geometric Parameters of X-ray Structures for (A) $[UO_2(AO)_2(MeOH)_2]$ and (B) $[UO_2(oNH_2\text{—}AO)_2(MeOH)_2]$.

| | A | B |
|---|---|---|
| distances [Å] | | |
| U=O | 1.796 | 1.784 |
| U—N | 2.438 | 2.417 |
| U—O | 2.352 | 2.448 |
| O—N | 1.422 | 1.412 |
| C=N | 1.293 | 1.304 |
| U—OH | 2.304 | |
| angles [deg] | | |
| U—O—N | 76.1 | 75.3 |
| U—N—O | 69.5 | 70.3 |
| O=U—O | 87.9 | 87.3 |
| O=U—N | 92.8 | 89.3 |
| O—N=C | 114.2 | 115.8 |

TABLE 9

Selected bond lengths (Å) of the $UO_2(AO)_2$ and $UO_2(oNH_2\text{—}AO)_2$ complexes calculated at the M06/SSC/6-311++G(d, p) level in comparison with the experimental $UO_2(AO)_2$ and $UO_2(oNH_2\text{—}AO)_2$ crystallographic structures.

| | U—O(oximate group) | U—N(oximate group) | U—O (methanol) |
|---|---|---|---|
| X-ray diffraction $UO_2(AO)_2$ | 2.36 | 2.44 | 2.42 |
| M06/SSC/6-311++G(d, p) $UO_2(AO)_2$ | 2.36 | 2.44 | 2.57 |
| X-ray diffraction $UO_2(oNH_2\text{—}AO)_2$ | 2.35 | 2.41 | 2.45 |
| M06/SSC/6-311++G(d, p) $UO_2(oNH_2\text{—}AO)_2$ | 2.35 | 2.46 | 2.53 |

TABLE 10

Comparison of the strengths of ligand-uranyl interactions in complexes using natural bond orbital (NBO) method. Second-order stabilization energies ($E^{(2)}$, kcal/mol) suggest that ortho-amine-substituted ligand (oNH$_2$—AO) provides stronger donor-acceptor interactions with uranyl than para-amine-substituted (pNH$_2$—AO) and benzamidoxime (AO) ligands.

| | Donor NBO → Acceptor NBO in $UO_2^{2+}$ complexes (kcal/mol) | | | | |
|---|---|---|---|---|---|
| Complex | $LP_{N\rightarrow n^*U}$ (oximate group) | $LP_{O\rightarrow n^*U}$ (oximate group) | $LP_{O\rightarrow n^*U}$ (methanol) | Total | Charge on $UO_2^{2+}$ unit |
| $UO_2(AO)_2(MeOH)_2$ | 175.5 | 254.5 | 106.0 | 536.0 | +0.52 |
| $UO_2(pNH_2\text{—}AO)_2(MeOH)_2$ | 196.1 | 278.3 | 116.4 | 590.8 | +0.51 |
| $UO_2(oNH_2\text{—}AO)_2(MeOH)_2$ | 178.8 | 309.3 | 131.7 | 619.8 | +0.49 |

TABLE 11

Simulating speciation diagrams. Equilibrium constants included in simulations for AO, pNH2-AO, and oNH2—AO; all at 25° C. and ionic strength ($\mu$) = 0.

| Aqueous species, reactions | log β |
|---|---|
| $H^+ + OH^- \leftrightarrows H_2O$ | 14.00[a] |
| $H^+ + CO_3^{2-} \leftrightarrows HCO_3^-$ | 10.33[b] |
| $2H^+ + CO_3^{2-} \leftrightarrows H_2CO_3^-$ | 16.68[b] |
| $H^+ + AO^- \leftrightarrows AOH$ | 12.37[c] |
| $H^+ + pNH_2\text{-}AO^- \leftrightarrows pNH_2\text{-}AOH$ | 12.49[c] |
| $H^+ + oNH_2\text{-}AO^- \leftrightarrows oNH_2\text{-}AOH$ | 11.31[c] |
| $UO_2^{2+} + AO^- \leftrightarrows UO_2(oNH_2\text{-}AO)^+$ | 12.56[c] |
| $UO_2^{2+} + 2AO^- \leftrightarrows UO_2(oNH_2\text{-}AO)_2$ | 21.45[c] |
| $UO_2^{2+} + pNH_2\text{-}AO^- \leftrightarrows UO_2(pNH_2\text{-}AO)^+$ | 13.35[c] |
| $UO_2^{2+} + 2pNH_2\text{-}AO^- \leftrightarrows UO_2(pNH_2\text{-}AO)_2$ | 22.47[c] |
| $UO_2^{2+} + oNH_2\text{-}AO^- \leftrightarrows UO_2(oNH_2\text{-}AO)^+$ | 12.94[c] |
| $UO_2^{2+} + 2oNH_2\text{-}AO^- \leftrightarrows UO_2(oNH_2\text{-}AO)_2$ | 22.55[c] |
| $UO_2^{2+} + CO_3^{2-} \leftrightarrows UO_2(CO_3)$ | 9.94[d] |
| $UO_2^{2+} + 2CO_3^{2-} \leftrightarrows UO_2(CO_3)_2^{2-}$ | 16.61[d] |
| $UO_2^{2+} + 2CO_3^{2-} \leftrightarrows UO_2(CO_3)_3^{4-}$ | 21.84[d] |
| $UO_2^{2+} + OH^- \leftrightarrows UO_2(OH)^+$ | 5.25[e] |
| $UO_2^{2+} + 2OH^- \leftrightarrows UO_2(OH)_2$ | 12.15[e] |
| $UO_2^{2+} + 3OH^- \leftrightarrows UO_2(OH)_3^-$ | 20.25[e] |
| $UO_2^{2+} + 4OH^- \leftrightarrows UO_2(OH)_4^{2-}$ | 32.40[e] |
| $2UO_2^{2+} + OH^- \leftrightarrows (UO_2)_2(OH)^{3+}$ | 11.3[e] |
| $2UO_2^{2+} + 2OH^- \leftrightarrows (UO_2)_2(OH)_2^{2+}$ | 22.4[e] |
| $UO_2^{2+} + 2OH^- \leftrightarrows (UO_2)_2(OH)_2$ (s) | −22.0[a] |

[a]Thuéry, P. & Nierlich, M. Crystal structure of a uranyl/p-tert-butylcalix[5]arene complex. J. Inclusion Phenom. Mol. Recognit. Chem. 27, 13-20, (1997).
[b]Smith, R. M. & Martell, A. E. Critical stability constants. Plenum Press: New York, (1981).
[c]This work. Values were predicted from correlations shown in FIGS. 43-54.
[d]Ramamoorthy, S. & Santappa, M. Stability constants of some uranyl complexes. Bull. Chem. Soc. Jpn. 41, 1330-1333, (1968).
[e]Grenthe, I.; Drozdzynski, J.; Fujino, T.; Buck, E. C.; Albrecht-Schmitt, T. E. & Wolf, S. F. The chemistry of the actinide and transactinide elements, 3rd ed.; Morss, L. R.; Edelstein, N. M. & Fuger, J. Eds. Springer: Netherlands, 1,599-601, (2006).

TABLE 12

Refined parameters for fitted EXAFS data.

| | POP-AO | POP-pNH$_2$-AO | POP-oNH$_2$-AO |
|---|---|---|---|
| $S_o^2$ | 1 | 1 | 1 |
| $\Delta E_0$ (eV) | 0 ± 2 | 0 ± 3 | 0 ± 2 |
| $CN_O$ | 7.2 ± 2.8 | 6.5 ± 2.6 | 6.4 ± 2.1 |
| $CN_{C(CO3)}$ | 0.8 ± 0.6 | 1.0 ± 0.8 | 1.0 ± 0.6 |
| $CN_{C(AO)}$ | 2.5 ± 1.2 | 2.3 ± 0.8 | 1.4 ± 1.1 |
| $\Delta r_{oyl}$ (Å) | 0.013 ± 0.008 | 0.017 ± 0.009 | 0.014 ± 0.007 |
| $\Delta r_O$ (Å) | 0.04 ± 0.02 | 0.04 ± 0.02 | 0.04 ± 0.02 |
| $\Delta r_{C(CO3)}$ (Å) | 0.02 ± 0.04 | 0.03 ± 0.05 | 0.02 ± 0.04 |
| $\Delta r_{C(AO)}$ (Å) | −0.11 ± 0.03 | −0.11 ± 0.04 | −0.11 ± 0.05 |
| $\sigma^2_{oyl}$ (×10$^{-3}$ Å$^2$) | 2.7 ± 0.4 | 2.6 ± 0.6 | 2.8 ± 0.4 |
| $\sigma^2_O$ (×10$^{-3}$ Å$^2$) | 16 ± 5 | 13 ± 4 | 14 ± 4 |
| $\sigma^2_C$ (×10$^{-3}$ Å$^2$) | 2.9 ± 0.1 | 3 ± 1 | 3.0 ± 0.7 |

TABLE 13

Uranium sorption performance of representative adsorbents in the literature.

| Adsorbents | Water (mg g$^{-1}$) | Artificial seawater (mg g$^{-1}$) | Seawater (mg g$^{-1}$) |
|---|---|---|---|
| MSPh-III (phosphonic acid-modified mesoporous material)[a] | 182 | 66.7 | — |
| Mesoporous Carbon Materials[b] | 97 | 67 | — |
| PAO/PVDF[c] | — | 1.6 | — |
| S-CP40[*E]-AO[d] | — | 57 | — |
| Am-p(AN-c-MAc)[e] | 51.5 | — | — |
| MOF-76[f] | 298 | — | — |
| Sx-LDH[g] | 330 | — | — |
| MIL-101-DETA[h] | 350 | — | — |
| (MIL-101(Cr)-triazole-COOH[i] | 304 | — | — |
| V$_2$CT$_x$[j] | 174 | 377 | — |
| ND-AO[k] | 212 | 121 | — |
| Am-p(AN-c-MAc) particles[l] | 51.5 | — | — |
| KIT-6-80-P[m] | 56 | — | — |
| AF series adsorbents[n] | — | 200 | — |
| F-AA2 fiber[o] | — | 50 | — |
| FJSM-SnS[p] | 338 | — | — |
| Sx-LDH[q] | 330 | — | 0.00072 |
| zero-valent iron[r] | 2400 | (50-300 ppm) 240-1410 | — |
| K$_2$MnSn$_2$S$_6$ (KMS-1)[s] | 382 | — | 0.00029 |
| p(2DVB-VBC)-2PAN[t] | — | 80 | 1.99 |
| This work (POP-oNH$_2$-AO) | 530 | 290 | 4.36 |

[a]Vivero-Escoto, J. L.; Carboni, M.; Abney, C. W.; deKrafft, K. E. & Lin, W. Organo-functionalized mesoporous silicas for efficient uranium extraction. Micropor. Mesopor. Mater. 180, 22-31 (2013).
[b]Carboni, M.; Abney, C. W.; Taylor-Pashow, K. M. L.; Vivero-Escoto, J. L. & Lin, W. Uranium sorption with functionalized mesoporous carbon materials, Ind. Eng. Chem. Res. 52; 15187-15197 (2013).
[c]Xie, S.; Liu; X.; Zhang, B.; Ma, H.; Ling, C.; Yu, M.; Li, L. & Li, J. Electrospun nanofibrous adsorbents for uranium extraction from seawater. J. Mater. Chem. A 3; 2552-2558 (2015).
[d]Gunathilake, C.; Górka, J.; Dai, S. & Jaroniec, M. Amidoxime-modified mesoporous silica for uranium adsorption under seawater conditions. J. Mater. Chem. A 3, 11650-11659 (2015).
[e]Sahiner, N.; Yu, H.; Tan, G.; He, J.; John, V. T. & Blake, D. A. ACS Appl. Mater. Interfaces 4; 163-170 (2012).
[f]Yang, W.; Bai, Z,-Q.; Shi, W.-Q,; Yuan, L.-Y.; Tian, T.; Chai, Z.-F,; Wang, H. & Sun, Z,-M. MOF-76: from a luminescent probe to highly efficient UVI sorption material. Chem. Commun. 49, 10415-10417 (2013).
[g]Ma; S,; Huang, L.; Ma, L.; Shim, Y.; Islam; S. M,; Wang, P.; Zhao, L.-D.; Wang, S.; Sun, G.; Yang; X. & Kanztzidis, M. G. Efficient uranium capture by polysulfide/layered double hydroxide composites. J. Am. Chem. Soc. 13, 3670-3677 (2015).
[h]Bai, Z.-Q.; Yuan, L.-Y.; Zhu; L.; Liu, Z.-R.; Chu; S.-Q.; Zheng, L.-R.; Zhang, J.; Chai, Z.-F. & Shi, W.-Q. Introduction of amino groups into acid-resistant MOFs for enhanced U(VI) sorption. J. Mater. Chem. A 3, 525-534 (2015).
[i]Li, L.; Ma, W,; Shen, S.; Huang, H.; Bai, Y. & Liu, H. A combined experimental and theoretical study on the extraction of uranium by amino-derived metal-organic frameworks through post-synthetic strategy. ACS Appl. Mater. Interfaces 8, 31032-31041 (2016).
[j]Wang, L.; Yuan, L.; Chen, K.; Zhang, Y.; Deng, Q.; Du, S.; Huang, Q.; Zheng, L.; Zhang, J.; Chai, Z.; Barsoum, M. W.; Wang, X. & Shi, W. Loading actinides in multilayered structures for nuclear waste treatment: the first case study of uranium capture with vanadium carbide MXene, ACS Appl. Mater. Interfaces 8, 16396-16403 (2016).
[k]Li, Y.; Wang, L.; Li, B.; Zhang; M.; Wen, R.; Guo, X.; Li, X,; Zhang, J. & Li; S. Pore-Free matrix with cooperative chelating of hyperbranched ligands for high-performance separation of uranium. ACS Appl. Mater. Interfaces 8, 28853-28861 (2016).
[l]Sahiner, N.; Yu; H.; Tan, G.; He, J.; John, V. T. & Blake, D. A. Highly porous acrylonitrile-based submicron particles for U022+ absorption in an immunosensor assay. ACS Appl. Mater. Interfaces 4, 163-170 (2012).
mLebed, P. J.; Savoie, J.-D.; Florek; J.; Bilodeau, F.; Lariviere, D. & Kleitz, F. Large pore mesostructured organosilica-phosphonate hybrids as highly efficient and regenerable sorbents for uranium sequestration, Chem, Mater. 24, 4166-4176 (2012).
[n]Das, S.; Oyola, Y.; Mayes, R. T,; Janke, C. J.; Kuo, L.-J.; Gill, G.; Wood, J. R. & Dai, S. Extracting uranium from seawater; promising AF series adsorbents. Int. Eng, Chem. Res. 55; 4110-4117 (2015).
[o]Chatterjee, S.; Bryantsev, V. S.; Brown, S.; Johnson, J. C.; Grant, C. D.; Matyes; R. T,; Hay, B. P.; Dai, S. & Saito, T. Synthesis of naphthalimidedioxime ligand-containing fibers for uranium adsorption from seawater. Int. Eng. Chem. Res. 55, 4161-4169 (2015).
[p]Feng, M.-L.; Sarma, D.; Qi, X.-H.; Du; K.-Z.; Huang, X.-Y. & Kanatzidis, M. G. Efficient removal and recovery of uranium by a layered organic-inorganic hybrid thiostannate. J. Am. Chem. Soc. 138, 12578-12585 (2016).
[q]Ma; S.; Huang, L.; Ma, L.; Shim, Y.; Islam; S. M.; Wang, P.; Zhao, L.-D.; Wang, S.; Sun, G.; Yang; X. & Kanatzidis; M. G. Efficient uranium capture by polysulfide/layered double hydroxide composites. J. Am. Chem. Soc. 137; 3670-3677 (2015).
[r]Ling, L. & Zhang, W.-x. Enrichment and encapsulation of uranium with iron nanoparticle. J. Am, Chem. Soc. 137; 2788-2791 (2015).
[s]Manos, M. J. & Kanatzidis, M. G. Layered metal sulfides capture uranium from seawater. J. Am. Chem. Soc. 134, 16441-16446 (2012).
[t]Yue, Y.; Mayes, R. T.; Kim, J.; Fulvio, P. F.; Sun, X.-G.; Tsouris, C.; Chen, J,; Brown, S. & Dai, S. Seawater uranium sorbents: preparation from a mesoporous copolymer initiator by atom-transfer radical polymerization. Angew. Chem. Int. Ed. 52, 13458-13462 (2013).

Methods

Materials and Measurements.

Commercially available reagents were purchased in high purity and used without purification. $^1$H NMR spectra were recorded on a Bruker Avance-400 (400 MHz) spectrometer. Chemical shifts are expressed in ppm downfield from TMS at δ=0 ppm, and J values are given in Hz. $^{13}$C (100.5 MHz)

cross-polarization magic-angle spinning (CP-MAS) NMR experiments were recorded on a Varian infinity plus 400 spectrometer equipped with a magic-angle spin probe in a 4-mm $ZrO_2$ rotor. Nitrogen sorption isotherms at the temperature of liquid nitrogen were measured using Micromeritics ASAP 2020M and Tristar system. The samples were outgassed for 1000 min at 80° C. before the measurements. Scanning electron microscopy (SEM) and energy dispersive X-ray spectroscopy (EDX) mapping were performed on a Hitachi SU 8000. Transmission electron microscope (TEM) image was performed using a Hitachi HT-7700 or JEM-2100F field emission electron microscope (JEOL, Japan) with an acceleration voltage of 110 kV. XPS spectra were performed on a Thermo ESCALAB 250 with Al Kα: irradiation at θ=90° for X-ray sources, and the binding energies were calibrated using the C1s peak at 284.9 eV. IR spectra were recorded on a Nicolet Impact 410 FTIR spectrometer. ICP-OES was performed on a Perkin-Elmer Elan DRC II Quadrupole. ICP-MS was performed on a Perkin-Elmer Elan DRC II Quadrupole Inductively Coupled Plasma Mass Spectrometer. Details of X-ray Absorption Fine Structure (XAFS) Spectroscopy, X-ray Crystallography, and Computational studies are given in the supplementary information.

Synthesis of nitrile-based porous organic polymers (POP-CN, POP-pNH$_2$—CN, and POP-oNH$_2$—CN)

In a typical run, 3,5-divinylbenzonitrile was dissolved in DMF (10 mL), followed by the addition of free radical initiator AIBN (0.025 g). The mixture was transferred into 20 mL autoclave and maintained for 24 h at 100° C. A white solid product (quantitative yield) was obtained after being washed with ethanol and dried under vacuum at 50° C. for 24 h, which was denoted as POP-CN. The synthetic procedures of POP-pNH$_2$—CN and POP-oNH$_2$—CN are similar to those of POP-CN, except that 4-amino-3,5-divinylbenzonitrile or 2-amino-3,5-divinylbenzonitrile (1.0 g) was used instead of 3,5-divinylbenzonitrile.

Synthesis of Amidoxime Functionalized Porous Polymers

As a typical synthesis recipe, 0.2 g of POP-CN was swollen in 20 mL of ethanol for 10 min, followed by the addition of 0.5 g of $NH_2OH \cdot HCl$ and 0.75 g of $N(CH_2CH_3)_3$. After being stirred at 70° C. for 48 h to convert the nitrile into amidoxime, the mixture was filtered, washed with excess water, and finally dried at 50° C. under vacuum. The white solid obtained was denoted as POP-AO. POP-AO was treated with 3% (w/w) potassium hydroxide aqueous solution at room temperature for 36 h before adsorption tests. POP-pNH$_2$-AO and POP-oNH$_2$-AO were synthesized follow the same procedures except that POP-pNH$_2$—CN or POP-oNH$_2$—CN was used instead of POP-CN.

Discussion

Given the well-known strong interaction between the amidoxime group and uranyl in conjunction with its cost-effective synthesis[53-55], as well as the excellent hydrogen bonding and electron donating capabilities of the amino group[56, 57], they were the coordinative site and reinforcing group of choice, respectively, to demonstrate the proof-of-concept. Considering the importance of spatial distribution of amine and amidoxime for their cooperation, a series of functionalized monomers with an amino substituent in different positions relative to amidoxime were designed to construct into hierarchical porous polymers (Table 6). Through detailed studies, the resultant adsorbent constructed with an amino group in the ortho position relative to amidoxime displayed extraordinary affinity for uranyl, making it one of the best uranium adsorbents reported thus far. The secondary coordination sphere effects provided by the amino group, including hydrogen bonding interaction and charge stabilization exerted by its electron donating property, account for the observed performance enhancement of the coordinative interaction between amidoxime and uranyl. These findings shed light on the basis for a new and economically competitive strategy for boosting the binding affinity between the adsorbent and metal species for their use in extraction and remediation technology.

TABLE 6

Structure of building units and textural parameters of various amidoxime functionalized hierarchical porous polymers.

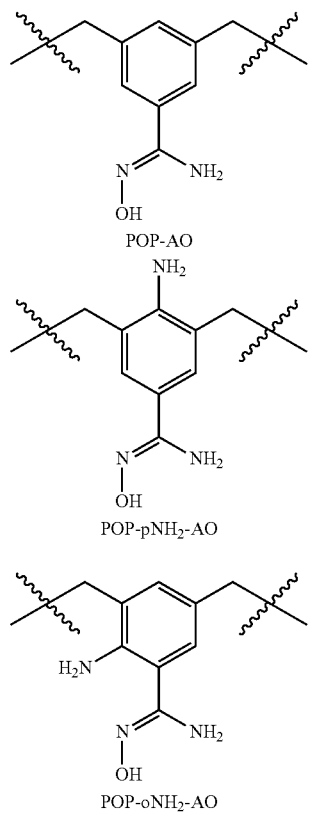

| POP | BET surface area ($m^2$ $g^{-1}$) | Pore volume ($cm^3$ $g^{-1}$) |
|---|---|---|
| POP-AO | 696 | 0.52 |
| POP-pNH$_2$-AO | 397 | 0.22 |
| POP-oNH$_2$-AO | 415 | 0.22 |

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Synthesis of Bio-Inspired Uranium 'Nano-Traps'

In view of materials synthesis for practical applications, free-radical induced polymerization of vinyl-functionalized monomers holds great potential, on account of the monomer tunability together with the adapted and cost-effective synthesis[58-59]. Given that a monomer containing amidoxime (AO) group is not suitable for direct polymerization due to the radical scavenging capability of hydroxylamine, a family of vinyl-functionalized cyano compounds with different amine locations were designed for self-polymerization into highly porous materials followed by post-transformation of the cyano group into amidoxime. Under solvothermal conditions in dimethylformamide (DMF) at 100° C., the polymerization of the monomers in the presence of azobisisobutyronitrile (AIBN), afforded the nitrile-based polymers, which were then amidoximated by treatment with hydroxylamine to afford the AO functionalized polymers. It is noteworthy that this process gives rise to the adsorbents in nearly quantitative yields and the vinyl-functionalized cyano compounds can be readily obtained from commercially available reagents in one or two steps. These easy-to-achieve properties give them great promise for practical applications.

Physiochemical Characterization and Local Structure Analysis.

Figure 31A:
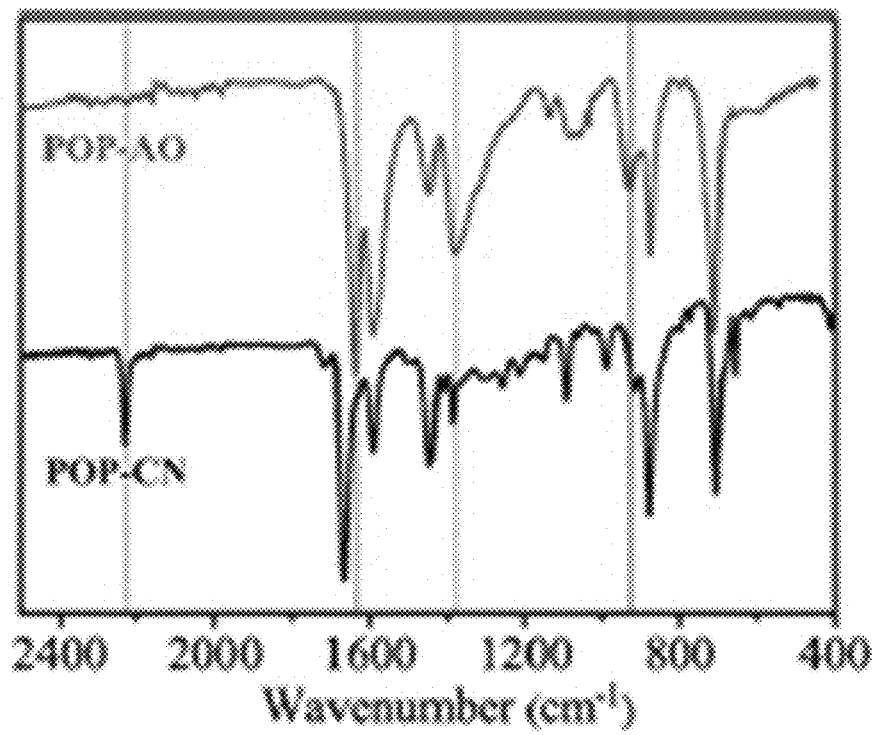
FIGS. 31A-31E show structural characterization.
Figure 31B:
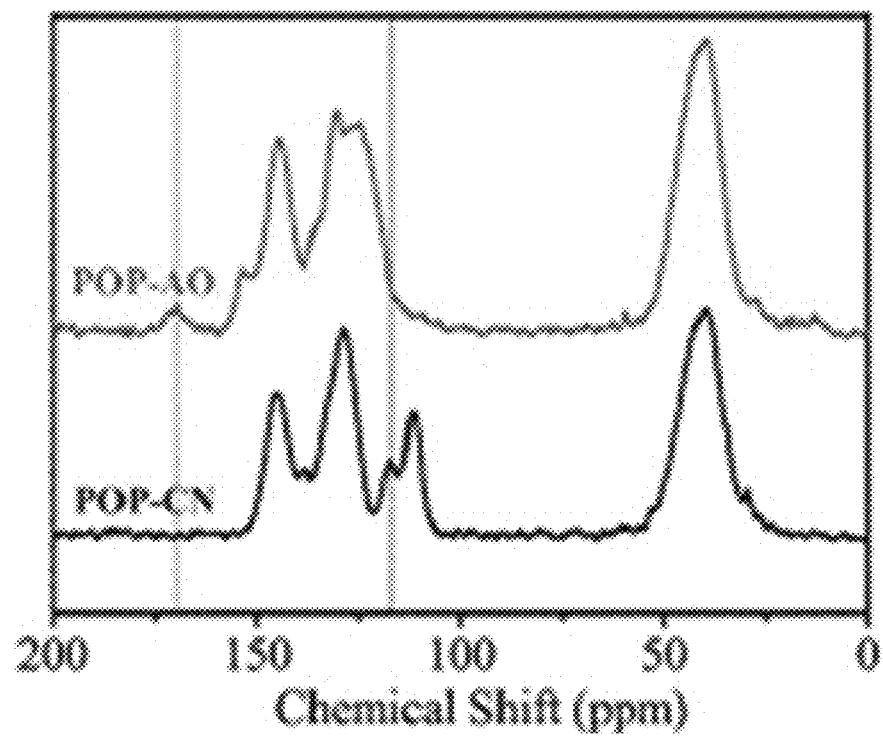
Figure 31C:
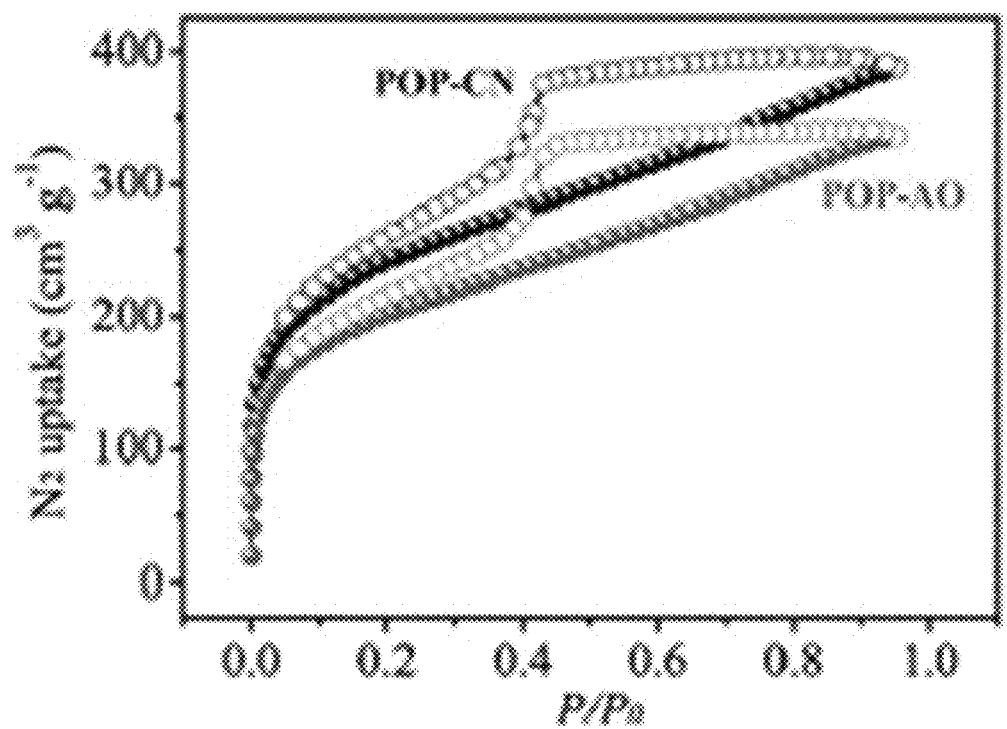
Figures 31D, 31E:
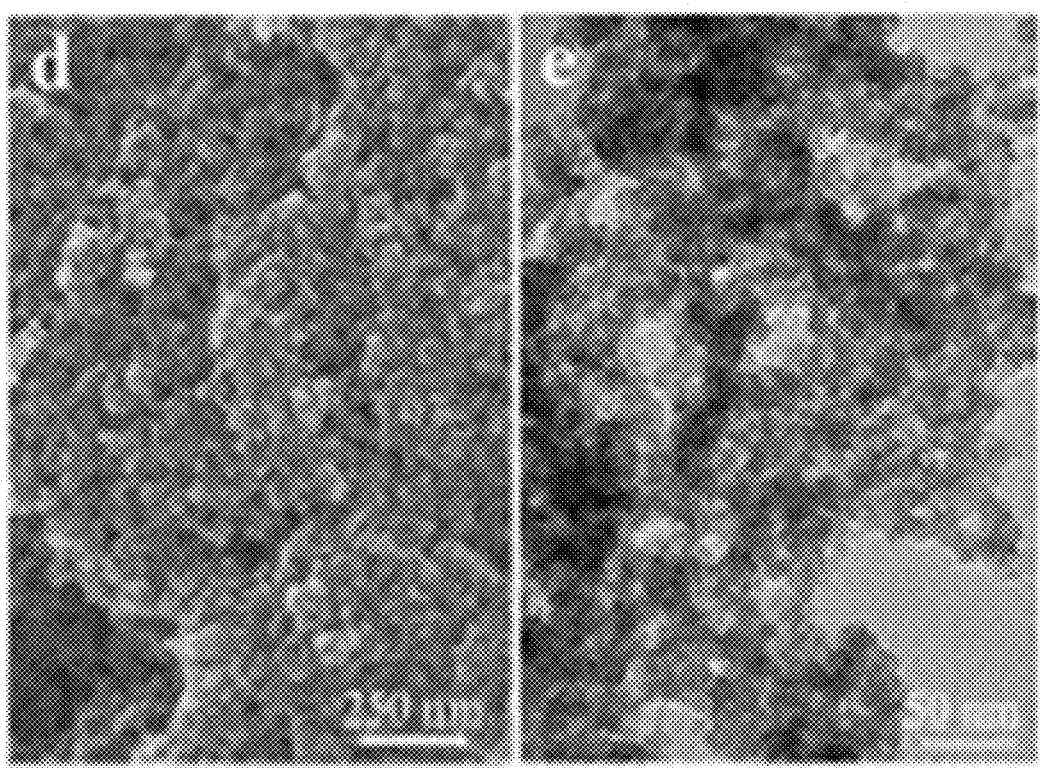

As a representative sample among the synthesized amidoxime based POPs, the POP bearing benzamidoxime moieties (POP-AO) is illustrated thoroughly (See FIGS. 31A-31E and the characterization of POP-pNH$_2$-AO and POP-oNH$_2$-AO are detailed in FIGS. 34-39). To verify the transformation of nitrile into amidoxime, Fourier transform infrared spectroscopy (FT-IR) and cross-polarization magnetic-angle spinning (CP/MAS) $^{13}$C nuclear magnetic resonance (NMR) analysis were performed. The disappearance of the nitrile stretch (2230 cm$^{-1}$) coupled with the appearance of C=N (1638 cm$^{-1}$), C—N (1381 cm$^{-1}$), and N—O (933 cm$^{-1}$), characteristic peaks of the amidoxime group, is indicative of the high throughput transformation of nitrile functionality in POP-CN to amidoxime (FIG. 31A).[60] In addition, $^{13}$C CP/MAS NMR spectrum shows the disappearance of the cyano group at 120 ppm, replaced by the open-chain amidoxime group at 169 ppm (FIG. 31B). To investigate the porosity and pore structures, N$_2$ sorption isotherms were measured at 77 K of the pre- and post-amidoxime polymers. As shown in FIG. 31C, both POP-CN and POP-AO exhibit similar sorption behavior of type I plus type IV, suggesting their hierarchical porous structures comprised of both micropores and mesopores. The adsorption at low pressure (P/P$_0$<0.01) is due to the filling of micropores, while the hysteresis loops at higher relative pressure (P/P$_0$=0.4-0.9) is assigned to the presence of mesoporosity in the sample[61-62]. The BET surface areas of POP-CN and POP-AO were calculated to be 834 m$^2$ g$^{-1}$ and 696 m$^2$ g$^{-1}$, respectively. The hierarchical porosity in these materials can be easily discerned from the scanning electron microscope (SEM) and transmission electron microscope (TEM) images (FIGS. 31D-31E). Materials with hierarchical structures are favorable for mass transport, thereby leading to enhanced adsorption kinetics[61-62].

Uranium Sorption Studies.

Figure 32A:
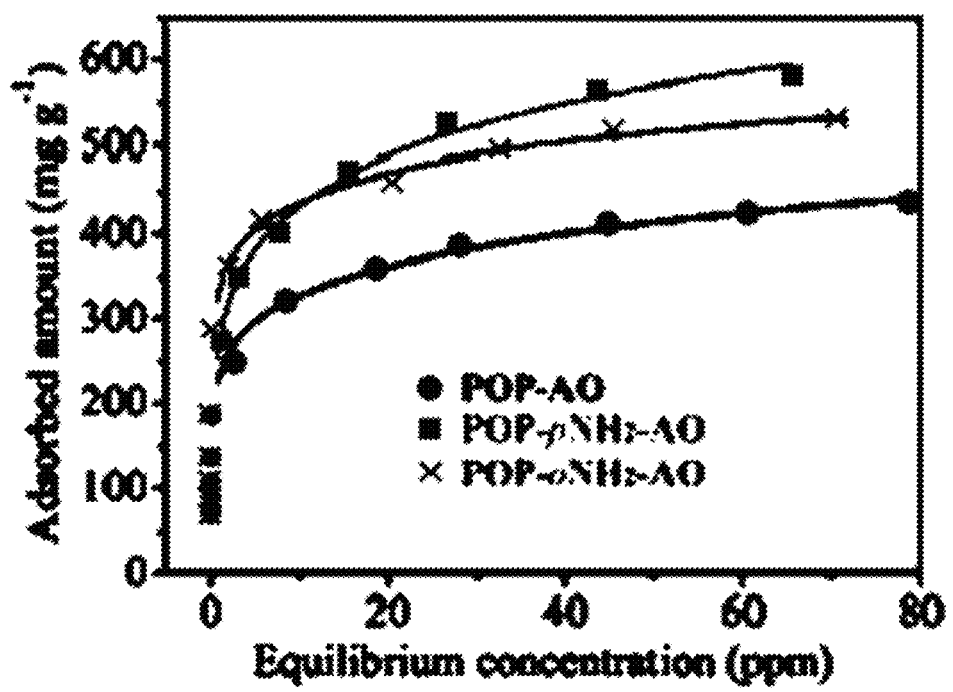
FIGS. 32A-32D show uranium adsorption isotherms and kinetics investigations.
Figure 32B:
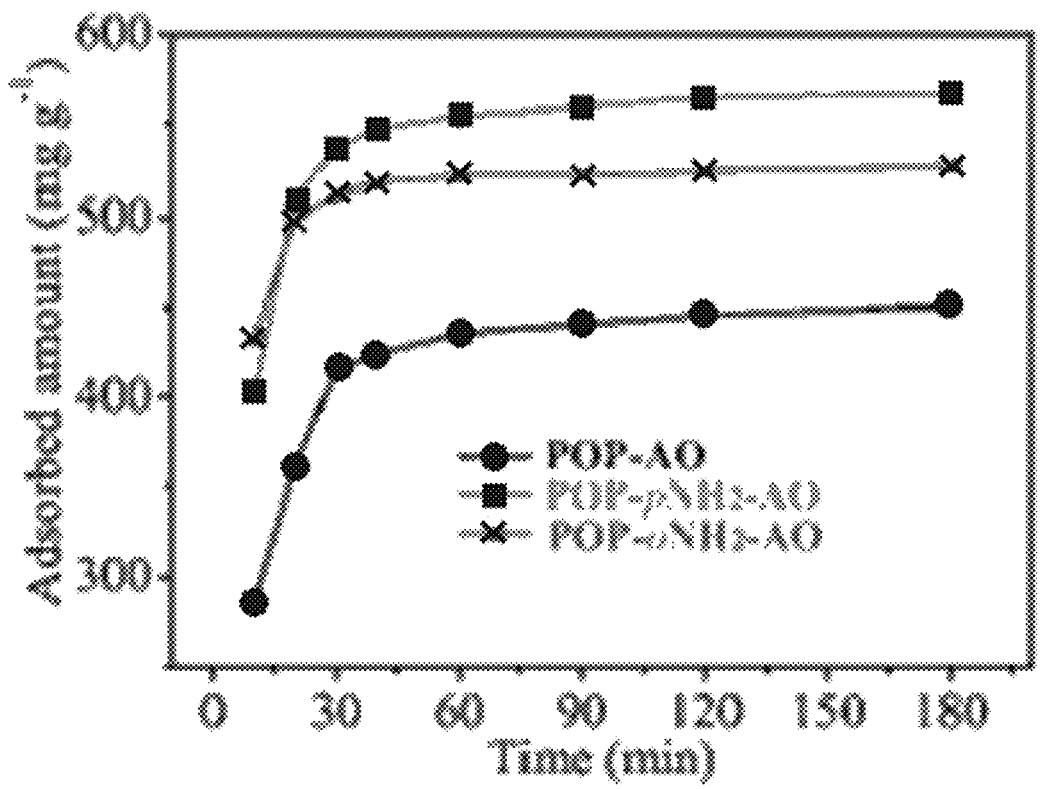
Figure 40:
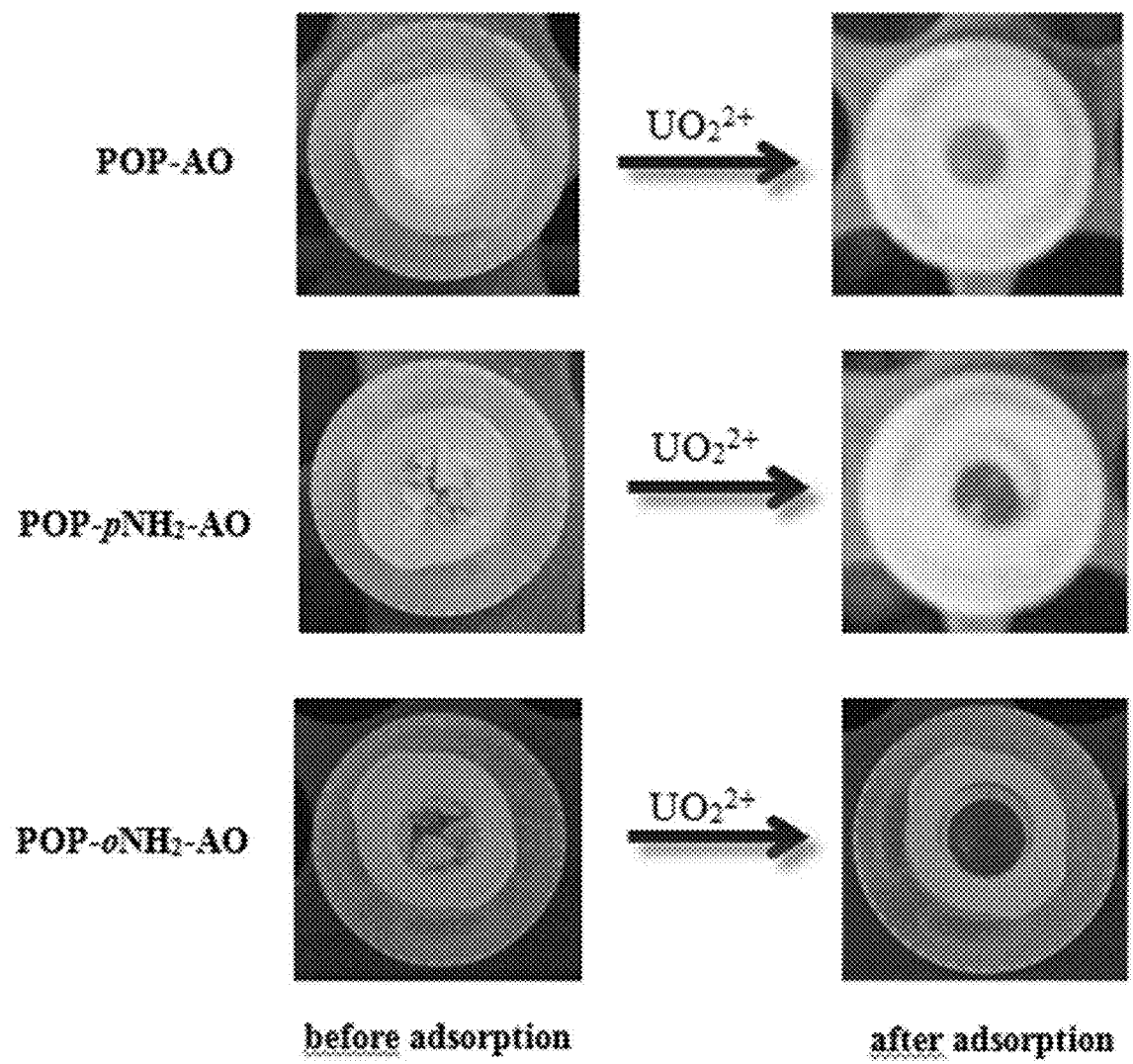
FIG. 40 shows photos of various adsorbent materials before and after uranium inclusion.
Figure 41A:
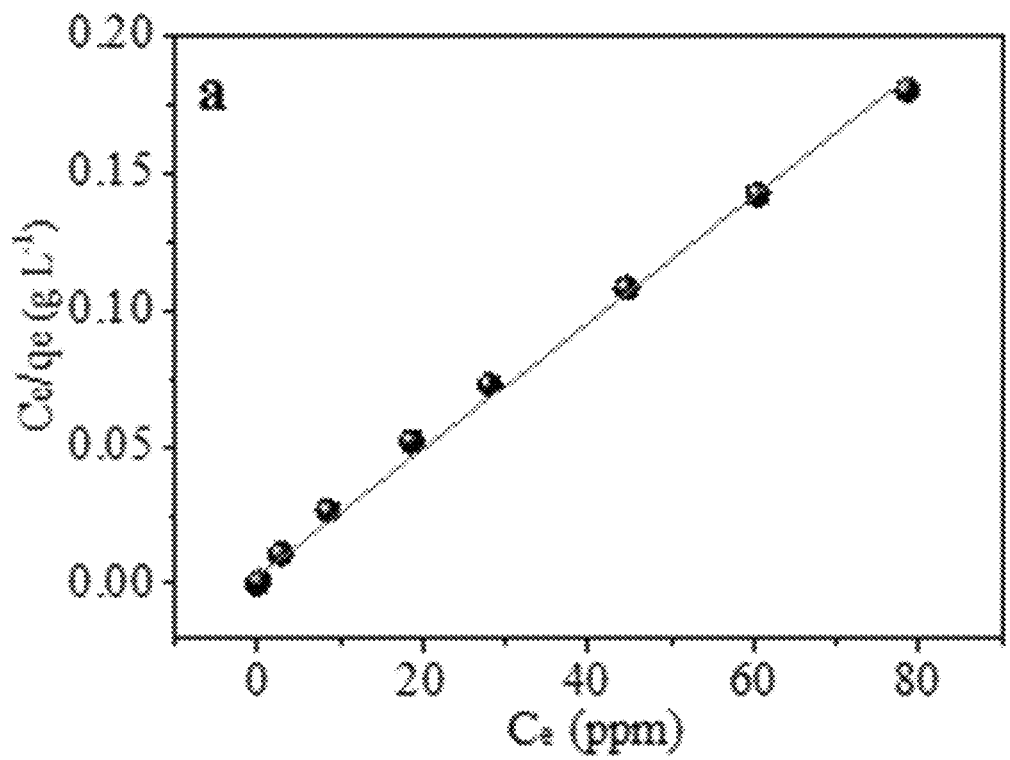
FIGS. 41A-41C show linear regression by fitting the equilibrium data with the Langmuir adsorption model shown in FIG. 32A of the main text.
Figure 41B:
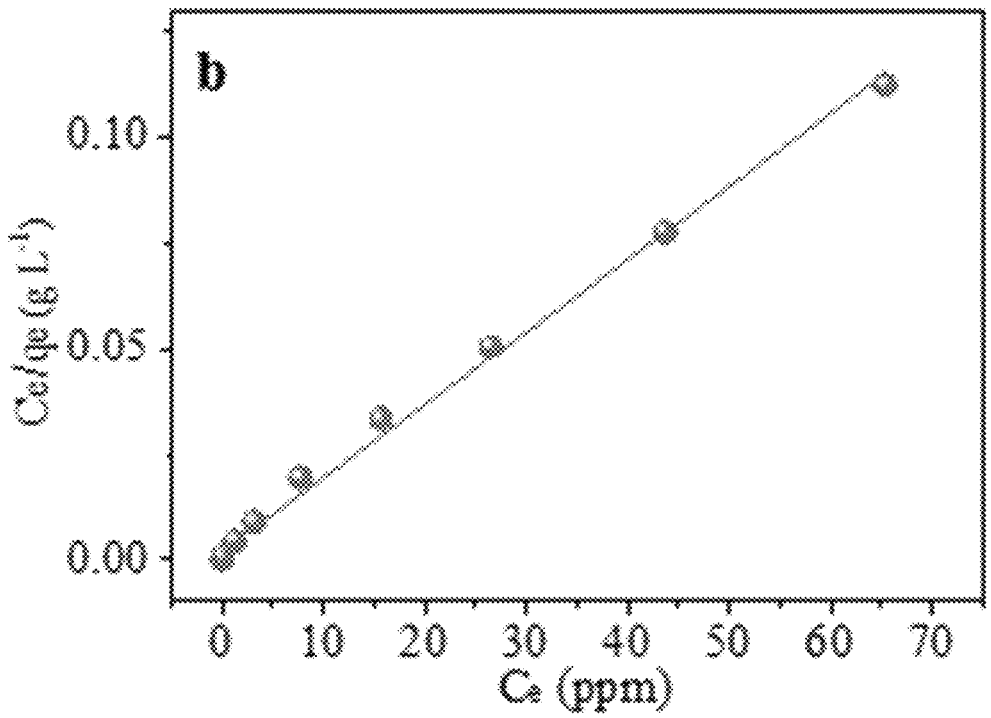
Figure 41C:
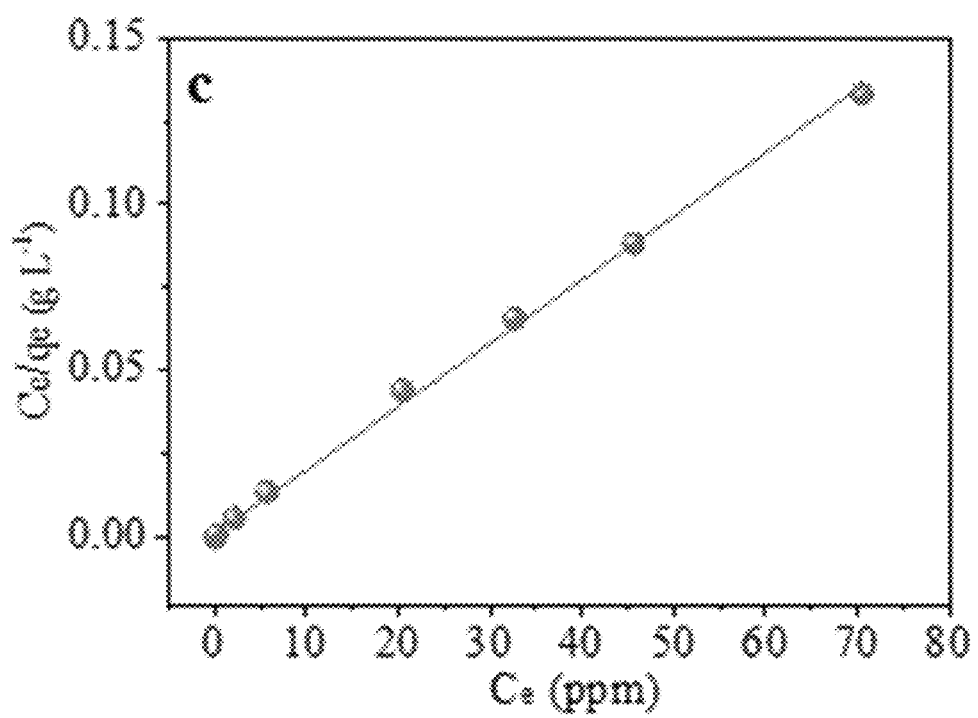

To evaluate the uranium recovery ability, the POPs were initially investigated for extraction of uranium from aqueous solutions. Before testing, the adsorbents were treated with a 3% (w/w) aqueous KOH solution at room temperature for 36 h.[63] Equilibrium values were collected by varying the concentrations of uranium in solution at a sorbent/solvent ratio of 0.5 mg mL$^{-1}$ and measuring the subsequent solution concentration after 12 h to guarantee that equilibrium was reached. All three materials exhibited a dramatic color change upon exposure to uranium solutions, turning from white or light brown to orange-red (FIG. 40).[64] The equilibrium adsorption data were well fitted with the Langmuir model, yielding correlation coefficients higher than 0.99 (FIG. 32A and FIG. 41A-41C). In the uranium concentration range of 36 to 356 ppm, these materials were determined to have adsorption capacities of 440, 580, and 530 mg of uranium per gram of adsorbent for POP-AO, POP-pNH$_2$-AO, and POP-oNH$_2$-AO, respectively[65]. More significantly, the adsorbents can be easily regenerated by treating the uranyl-laden materials with a Na$_2$CO$_3$ (1 M) solution. For example, the adsorption performance of POP-oNH$_2$-AO was maintained for at least two cycles, giving rise to uranium uptake capacities as high as 520 and 530 mg g$^{-1}$, respectively. It is worth noting that, in addition to high adsorption capacities, these POP based sorbents also possessed extremely rapid capture capabilities, as evidenced by all three adsorbents reaching greater than 90% of their equilibrium capacity after 1 h of contact time (FIG. 32B). Particularly, in the case of POP-oNH$_2$-AO, approximately 95% of the equilibrium capacity can be achieved within 20 min. This is in stark contrast to the lengthy contact times required for other adsorbents, which routinely range from several hours to as much as several days.[66] Not wishing to be bound by any particular theory, the high adsorption capacities and rapid kinetics may be the result of synergistic effects arising from densely populated chelating groups coupled with hierarchical pores allowing for rapid diffusion of uranyl throughout the materials. Notably, by contrast with the uranium adsorption isotherms and kinetics of POP-AO, much steeper adsorption profiles and faster kinetics are given by POP-pNH$_2$-AO and POP-oNH$_2$-AO, which are suggestive of their stronger affinity towards uranyl, thereby facilitating the adsorption of uranyl. Considering the superior performance of POP-oNH$_2$-AO and POP-pNH$_2$-AO to that of POP-AO, it is thus indicated that the introduction of the amino group can enhance the sorption performance of amidoxime-based sorbents.

Figure 32C:
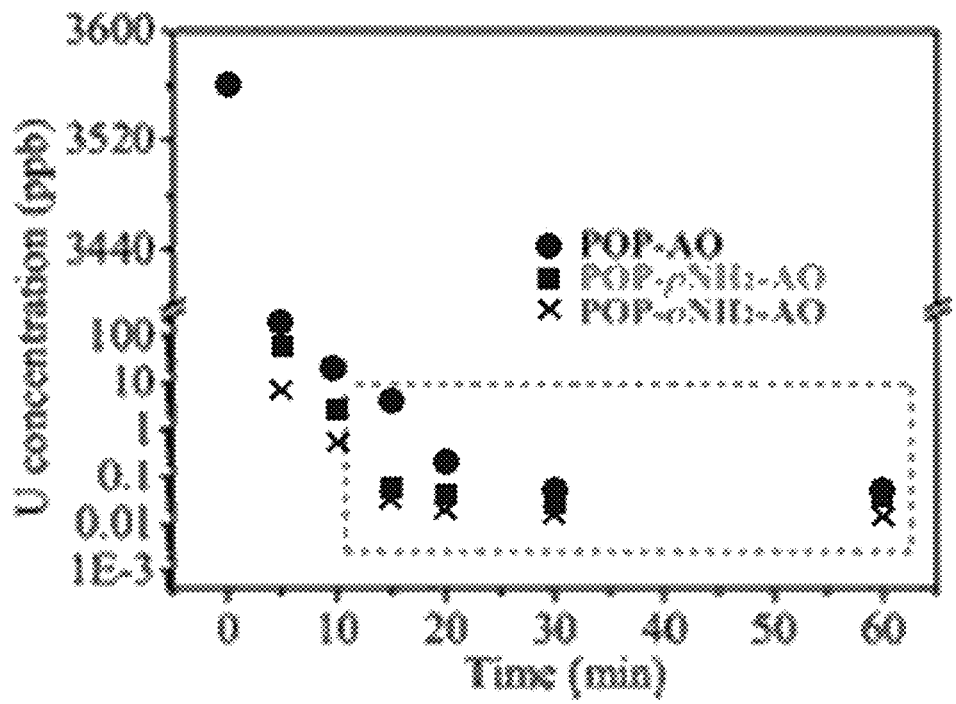
Figure 32D:
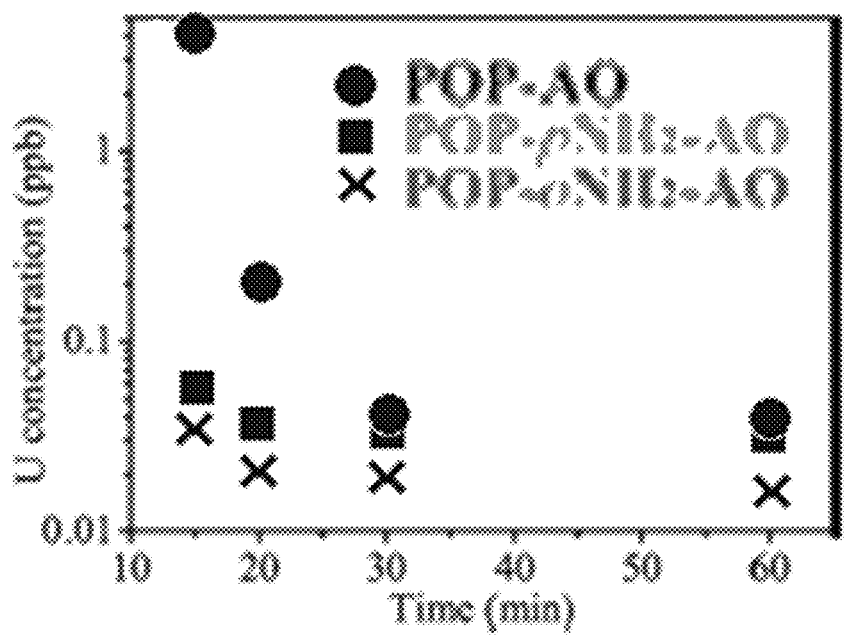

In this context, to study the contribution of the amino group, tests were focused on the uranyl-sequestration efficiency of these adsorbents along with the kinetics of this process (FIGS. 32C-32D). Remarkably, more than 99.99% of the uranium was removed within 10 min after treating uranium-spiked water (3560 ppb at pH~6.0) with POP-oNH$_2$-AO and POP-pNH$_2$-AO. At this time, the remaining uranium concentration after treatment with POP-AO was about two orders of magnitude higher than that of the amine contained sorbents and there was still a large disparity in concentration after reaching equilibrium, underscoring the benefit of the introduction of the amino functionality to enhance the uranyl adsorption performance. I$_t$ is noteworthy that POP-oNH$_2$-AO clearly outperforms POP-pNH$_2$-AO with regard to both kinetics and removal efficiency. Taking into account that they have similar surface areas, as well as density and chemical functionality, the disparity in adsorption performance should be ascribed to the difference from the relative position of the amino group to the amidoxime.

Figure 42:
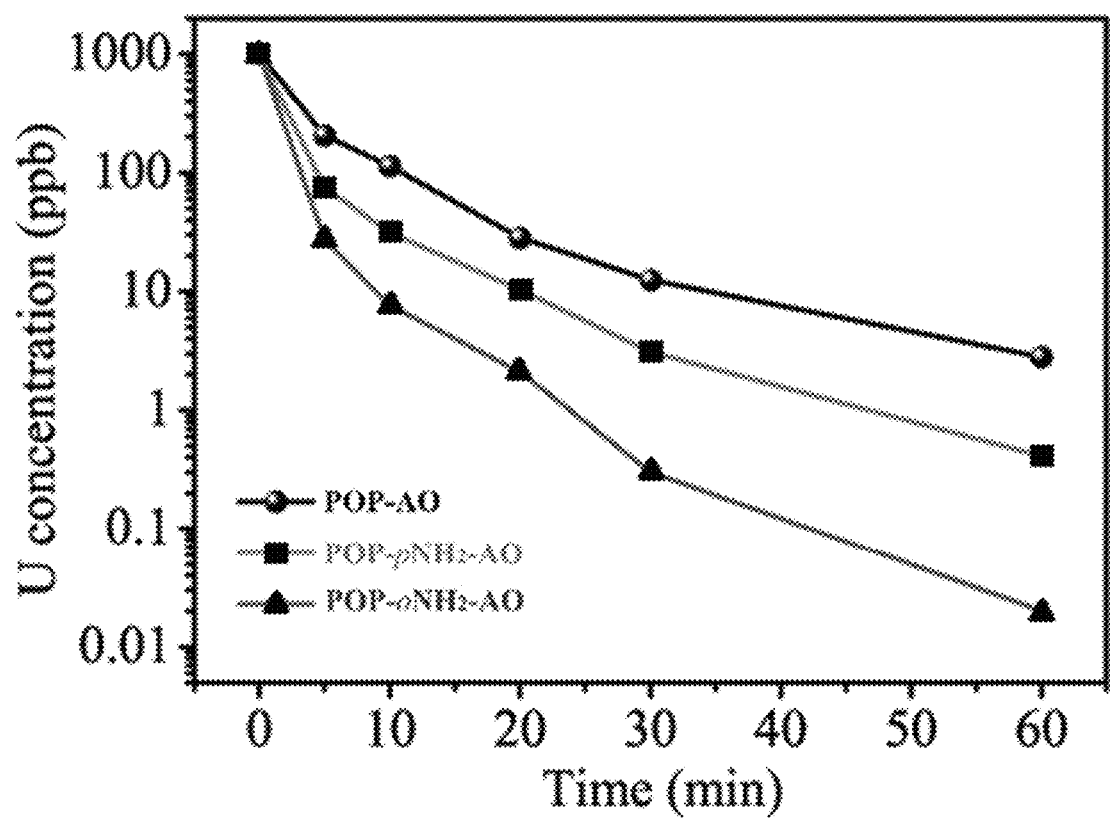
FIG. 42 shows uranium removal efficiency from real world water. The kinetics of uranium removal efficiency of POP-AO, POP-pNH$_2$-AO, and POP-oNH$_2$-AO from potable water spiked with uranium (1000 ppb) at V:m=50000 mL g$^{-1}$.
Figure 43:
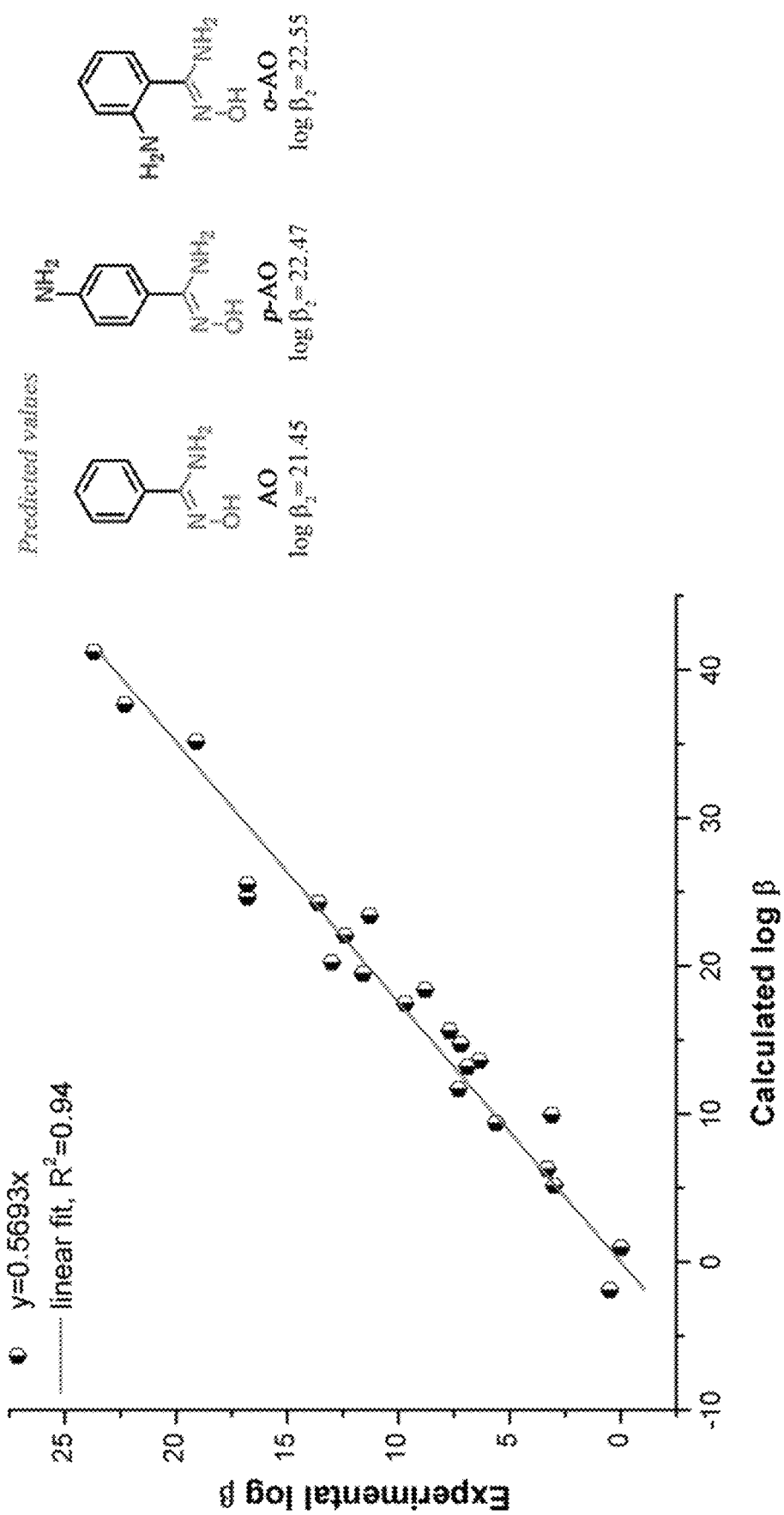
FIG. 43 shows assessing stability constants for the amine-substituted benzamidoxime ligands. The oNH$_2$-AO ligand shows strong complexation with the uranyl species, which is exemplified by high stability constants (log $\beta_1$=12.94; log $\beta_2$=22.55) in aqueous solution. The analogous stability constants for the pNH$_2$-AO and AO ligands were calculated to be lower (log $\beta_1$=13.35; log $\beta_2$=22.47 and log $\beta_1$=12.56; log $\beta_2$=21.45, respectively), suggesting that the amino group and hydrogen bonding interactions play an important role in the complexation process.

To confirm the superior performance of the adsorbent with an amino group in the vicinity of amidoxime, their capability for remediation of real world water samples was compared. Given the vital importance of drinking water safety, potable water was used, which was intentionally contaminated by traces of uranium (1000 ppb) as an example. As shown in FIG. 42, the decontamination of uranium can be rapidly accomplished by POP-oNH$_2$-AO and the residual uranium concentration decreased to as low as 2 ppb within 5 min [pH~7, volume (V) of solution to mass (m) of adsorbent (V:m=50000 mL g$^{-1}$)], well-below the acceptable limit of 30 ppb defined by the US Environmental Protection Agency (EPA) for potable water.[43] In contrast, nearly two and four times longer duration time are required in order to reduce uranium concentrations to the same level using POP-pNH$_2$-AO and POP-AO, respectively. This improved performance emphasizes the significance of the amino group and its position towards uranyl extraction. The efficient detoxification of radioactive uranium presented herein is of great importance and this study may lead to the development of techniques to treat potable water suffering from uranium poisoning.

Uranium Capture from Simulated Seawater.

Figure 33A:
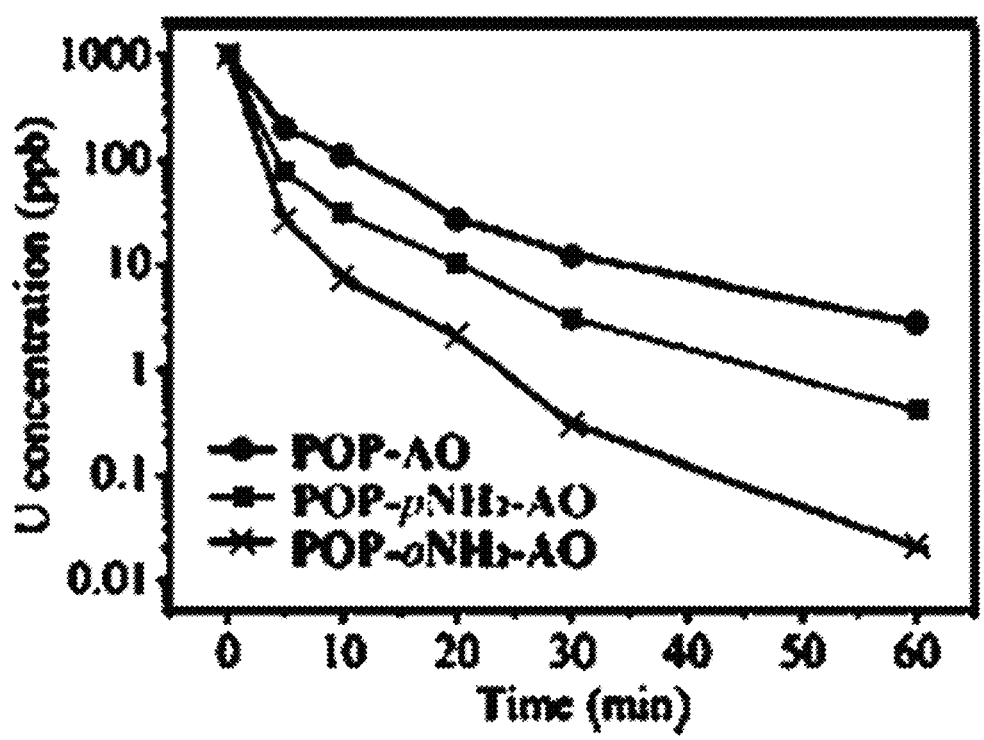
Figure 34:
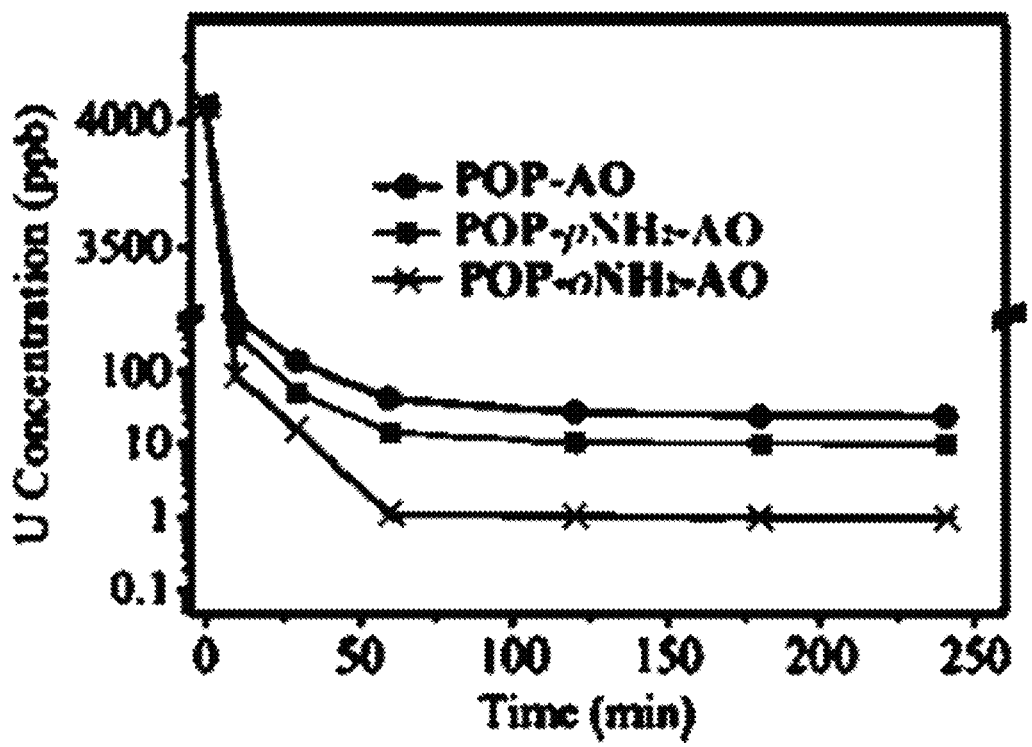
FIG. 34 shows N$_2$ sorption isotherms collected at 77 K. The BET surface area of POP-pNH$_2$—CN and POP-pNH$_2$-AO were calculated to be 631 cm$^3$ g$^{-1}$ and 397 cm$^3$ g$^{-1}$, respectively.
Figure 34:
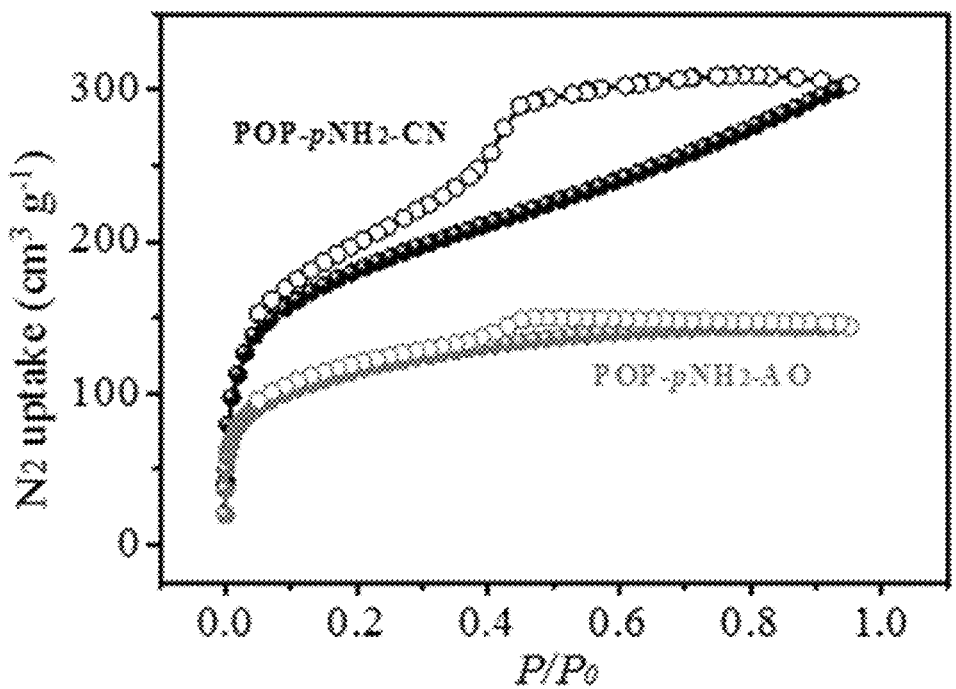
Figure 35A:
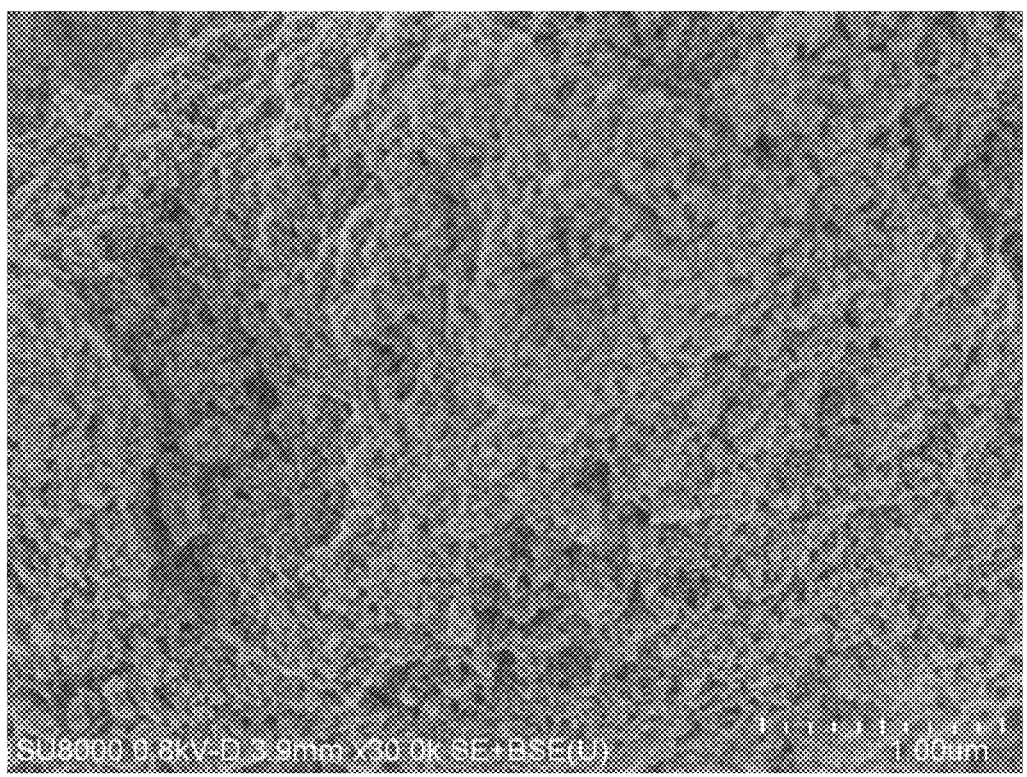
FIGS. 35A-35B show SEM (FIG. 35A) and TEM (FIG. 35B) images of POP-pNH$_2$-AO.
Figure 35B:
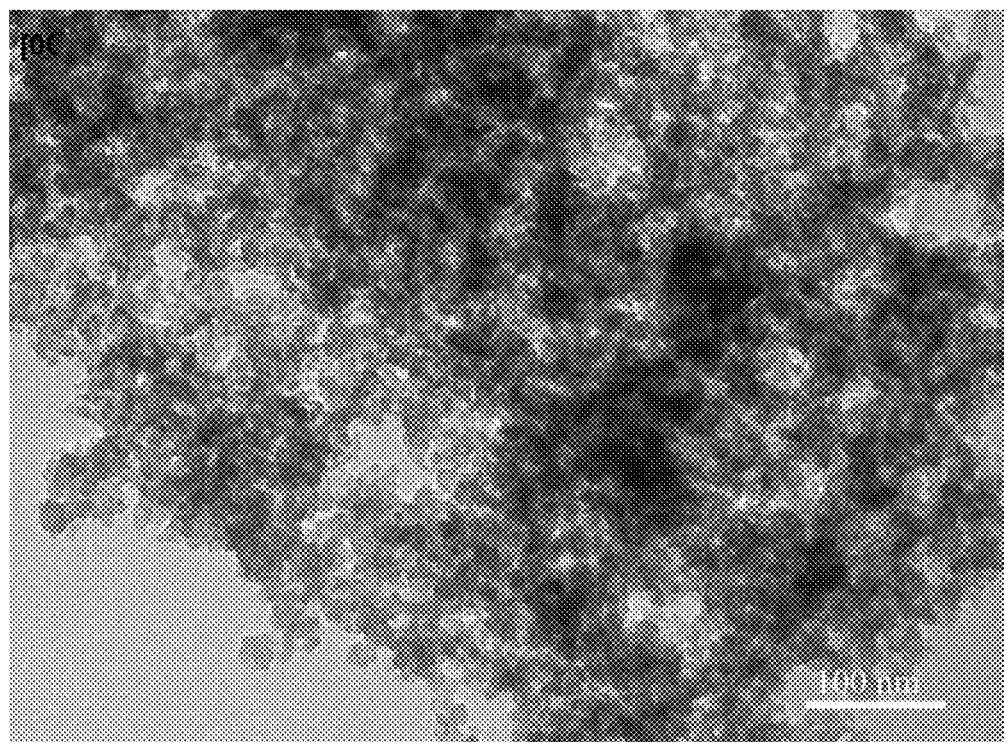
Figure 36:
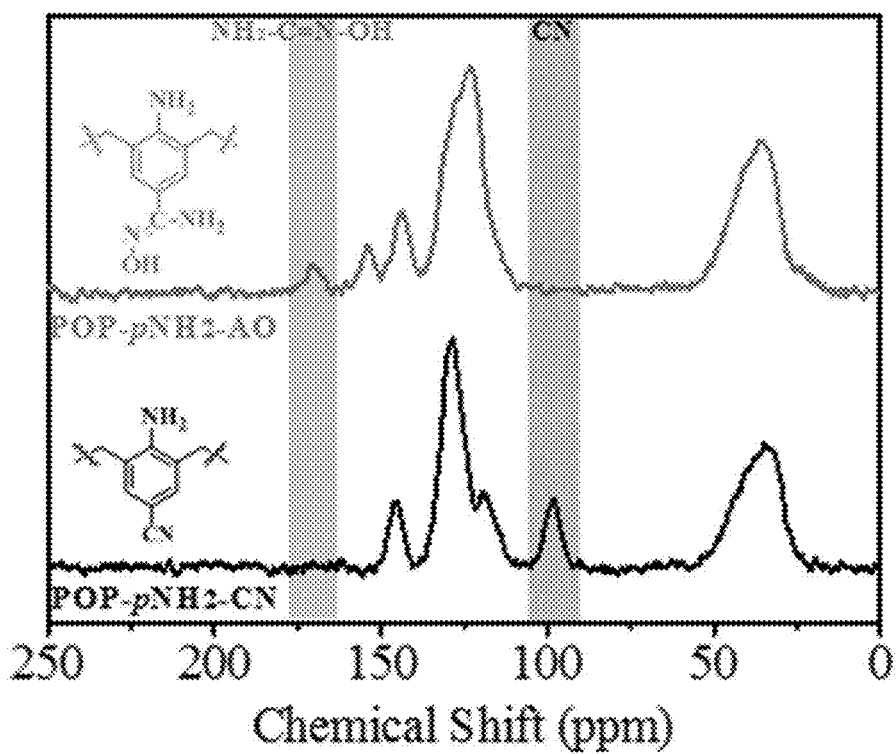
FIG. 36 shows 13C CP/MAS NMR spectra. The successful transformation from nitrile group into amidoxime group is verified by the disappearance of the peak at 98 ppm, which is related to CN groups and the concomitant emergence of the peak at 171 ppm, which is attributed to the amidoxime groups.
Figure 37:
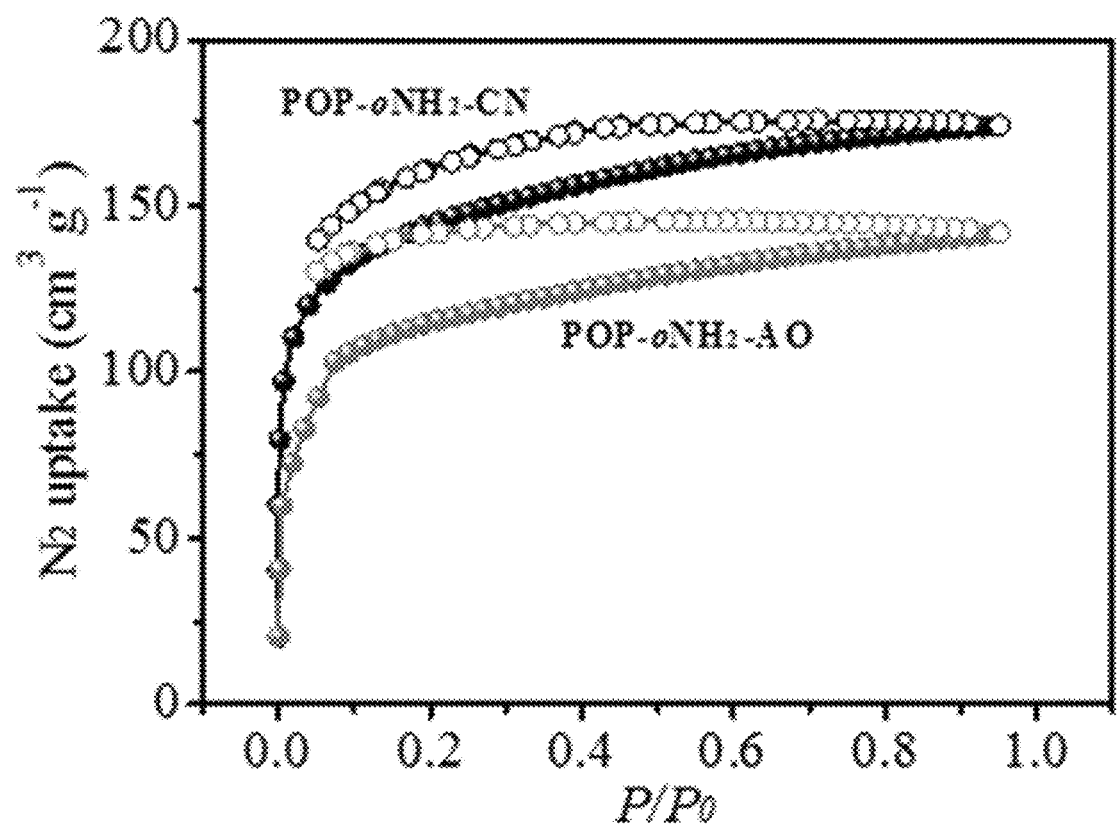
FIG. 37 shows $N_2$ sorption isotherms collected at 77 K. The BET surface area of POP-oNH$_2$—CN and POP-oNH$_2$-AO were calculated to be 525 cm$^3$ g$^{-1}$ and 415 cm$^3$ g$^{-1}$, respectively.
Figure 38A:
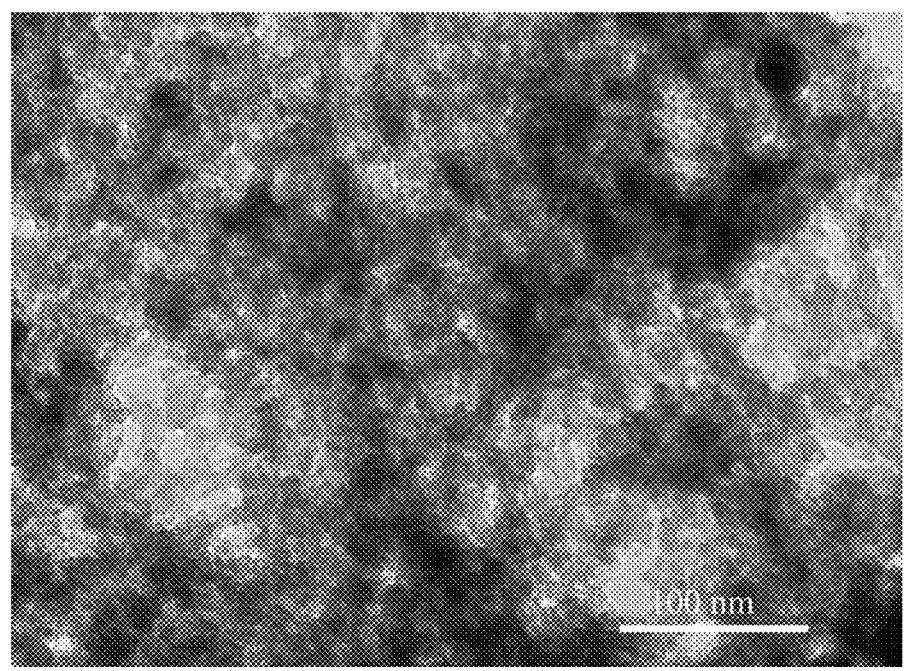
FIGS. 38A-38B show SEM (FIG. 38A) and TEM (FIG. 38B) images of POP-oNH$_2$.
Figure 38B:
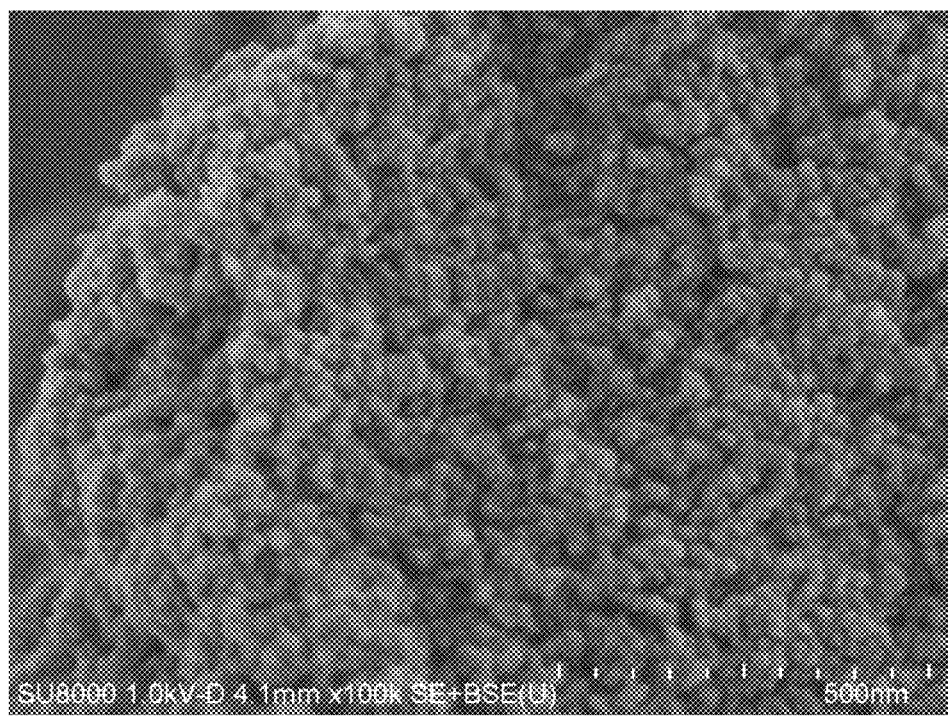
Figure 39:
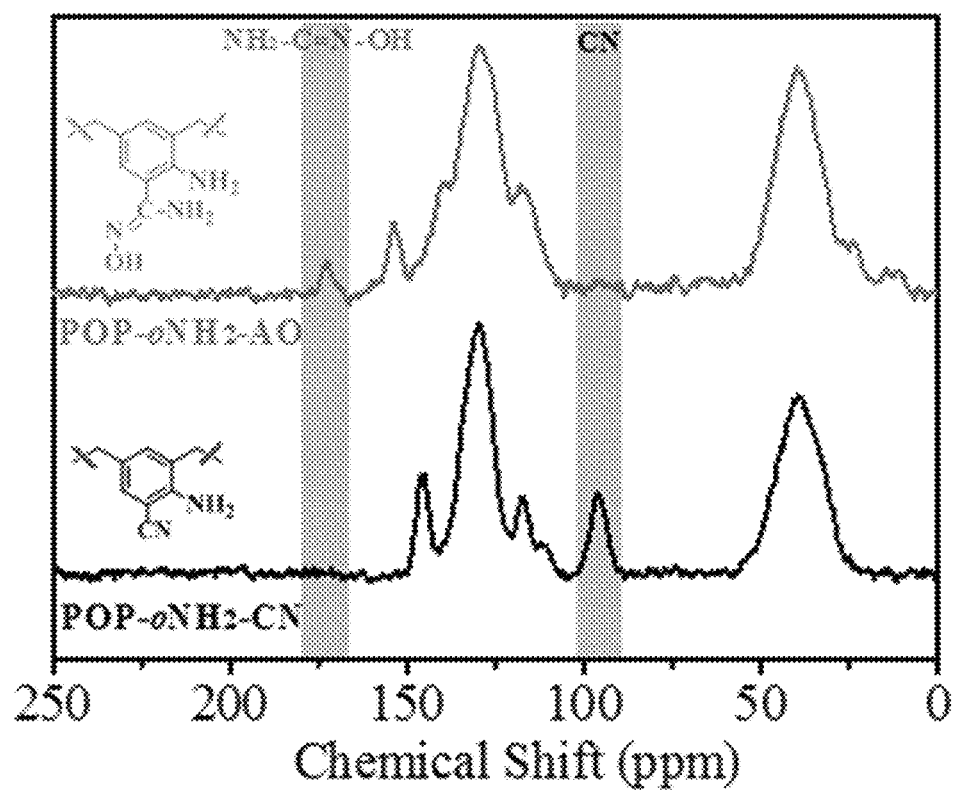
FIG. 39 show $^{13}$C CP/MAS NMR spectra. Successful transformation of the nitrile group into the amidoxime group is verified by the disappearance of the peak at 96 ppm, which is related to the nitrile groups and the concomitant emergence of the peak at 173 ppm, which is attributed to the amidoxime groups.

Given that nuclear power will be crucial for future low carbon energy generation, there is a strong motivation to develop adsorbent materials that efficiently seize uranium stocks from seawater, a sustainable alternative to traditional mining practices for nuclear fuel ores. In this regard, to demonstrate their prospective recovery of uranium from seawater, this series of polymers was initially applied to test uranium sequestration from a solution spiked with ~10.3 ppm of uranium in the presence of excess Na$^+$ and HCO$_3^-$ (NaCl 25.6 g L$^{-1}$ and NaHCO$_3$ 0.198 g L$^{-1}$) to simulate seawater. Experiments found that POP-oNH$_2$-AO exhibited an exceptional ability to adsorb uranium species rapidly with a capacity up to 290 mg g$^{-1}$; whereby equilibrium was reached within 300 min (FIG. 33A). Moreover, POP-oNH$_2$-AO can efficiently decrease the uranium concentration to an extremely low level (ca. 1 ppb, removal capacities-99.9%, V:m=2000 mL g$^{-1}$, FIG. 33B), which is promising as a uranium adsorbent material for applications in enriching naturally occurring uranium in seawater. Under identical conditions, POP-pNH$_2$-AO and POP-AO give rise to adsorption capacities of 250 and 200 mg g$^{-1}$, respectively. In addition to the relatively lower adsorption amount in comparison with POP-oNH$_2$-AO, they also exhibit inferior removal efficiencies, supported by the higher residual uranium concentrations of around 10 and 25 ppb, respectively. The distribution coefficient value ($K_d$) is useful for evaluating the affinity of an adsorbent to metal species under specific conditions; the $K_d$ values of these materials were thus calculated with 4056 ppb uranium in simulated seawater solution (10 mL) in the presence of adsorbents (5 mg). Impressively, POP-oNH$_2$-AO demonstrated the highest $K_d$ value of 8.36×10$^6$ mL g$^{-1}$ among the samples tested in this work (calculated after reaching equilibrium), which is an order of magnitude higher than the other two materials (POP-pNH$_2$-AO, $K_d$=8.18×10$^5$ mL g$^{-1}$ and POP-AO, $K_d$=3.28×10$^5$ mL g$^{-1}$). As calculated by the equation below:

$$K_d = \left(\frac{C_i - C_e}{C_e}\right) \times \frac{V}{m}$$

where V is the volume of the treated solution (mL), m is the amount of adsorbent (g), $C_i$ is the initial concentration of uranium, and $C_e$ is the equilibrium concentration of uranium.

Crystallographic and Density Functional Theory Calculation Studies.

Improvements towards uranium adsorption with an amidoxime-based sorbent are evident with the addition of an amino group together with its relative location, as it showed a tenfold improvement from para to ortho substitution in terms of $K_d$ value. To discern these phenomena, structure-property relationships of functional groups of the POP-AO, POP-pNH$_2$-AO, and POP-oNH$_2$-AO adsorbents were examined. In this regard, small molecular ligands, benzamidoxime (AO), 4-aminobenzamidoxime (pNH$_2$-AO), and 2-aminobenzamidoxime (oNH$_2$-AO) were synthesized and tested for the complexation with uranyl. Single crystals of UO$_2$(AO)$_2$(MeOH)$_2$ and UO$_2$(oNH$_2$-AO)$_2$(MeOH)$_2$ were readily obtained by slowly evaporating a 1 mL methanol solution containing dissolved AO/oNH$_2$-AO and UO$_2$(NO$_3$)$_2$·6H$_2$O (2:1 molar ratio) with 50 uL trimethylamine, however, any attempts to prepare UO$_2$(pNH$_2$-AO)$_2$(MeOH)$_2$ suitable for X-ray crystallographic studies were unsuccessful. As seen from X-ray structures of the UO$_2$(AO)$_2$(MeOH)$_2$ and UO$_2$(oNH$_2$-AO)$_2$(MeOH)$_2$ complexes, there is $\eta^2$ (O, N) binding of the amidoxime moiety to uranyl, which is consistent with the coordination motif observed in DFT calculations and previously reported uranyl-amidoxime species[40]. The corresponding U—O and U—N bond lengths in UO$_2$(oNH$_2$-AO)$_2$(MeOH)$_2$ were found to be 0.01 Å and 0.02 Å shorter than those of UO$_2$(AO)$_2$(MeOH)$_2$ (Table 7 and Table 8), confirming the stronger bonding between uranyl and the oNH$_2$-AO ligand. Furthermore, the UO$_2$(oNH$_2$-AO)$_2$(MeOH)$_2$ complex is additionally stabilized by relatively short (2.665 Å) hydrogen bonds between the amino groups of oNH$_2$-AO and solvent molecules. DFT calculations, confirm that this interaction persists in the absence of packing forcers and long-range electrostatic effects (see Table 9, and Table 10 for additional details). A complex not involved in the hydrogen-bonding interaction with the amino groups was observed, but this was 4.7 kcal mol$^{-1}$ less stable. Natural bond orbital (NBO) analysis clearly identifies only conventional ligand-UO$_2^{2+}$ dative σ-bonds in UO$_2$(AO)$_2$(MeOH)$_2$, yielding the second-order stabilization energies (E$^{(2)}$) of 176-278 kcal mol$^{-1}$. In addition to coordinative binding, the uranyl complex with oNH$_2$-AO ligands also exhibits strong second-sphere hydrogen bonding interactions (E$^{(2)}$=40.0 kcal/mol), as exemplified by the overlap between nitrogen p-type lone pair of the amino group and the σ* orbital of the methanol O—H bond. This phenomenon of hydrogen bond stabilization is reminiscent of that seen in biological systems and protein receptors[68]. Although the stability gain contributed by hydrogen-bonding interactions may not be particularly large, especially when compared with the magnitude of the metal binding interactions, these secondary interactions, nevertheless, can play a decisive role in achieving stronger coordination of oNH$_2$-AO with uranyl compared to AO and pNH$_2$-AO.

Figure 44:
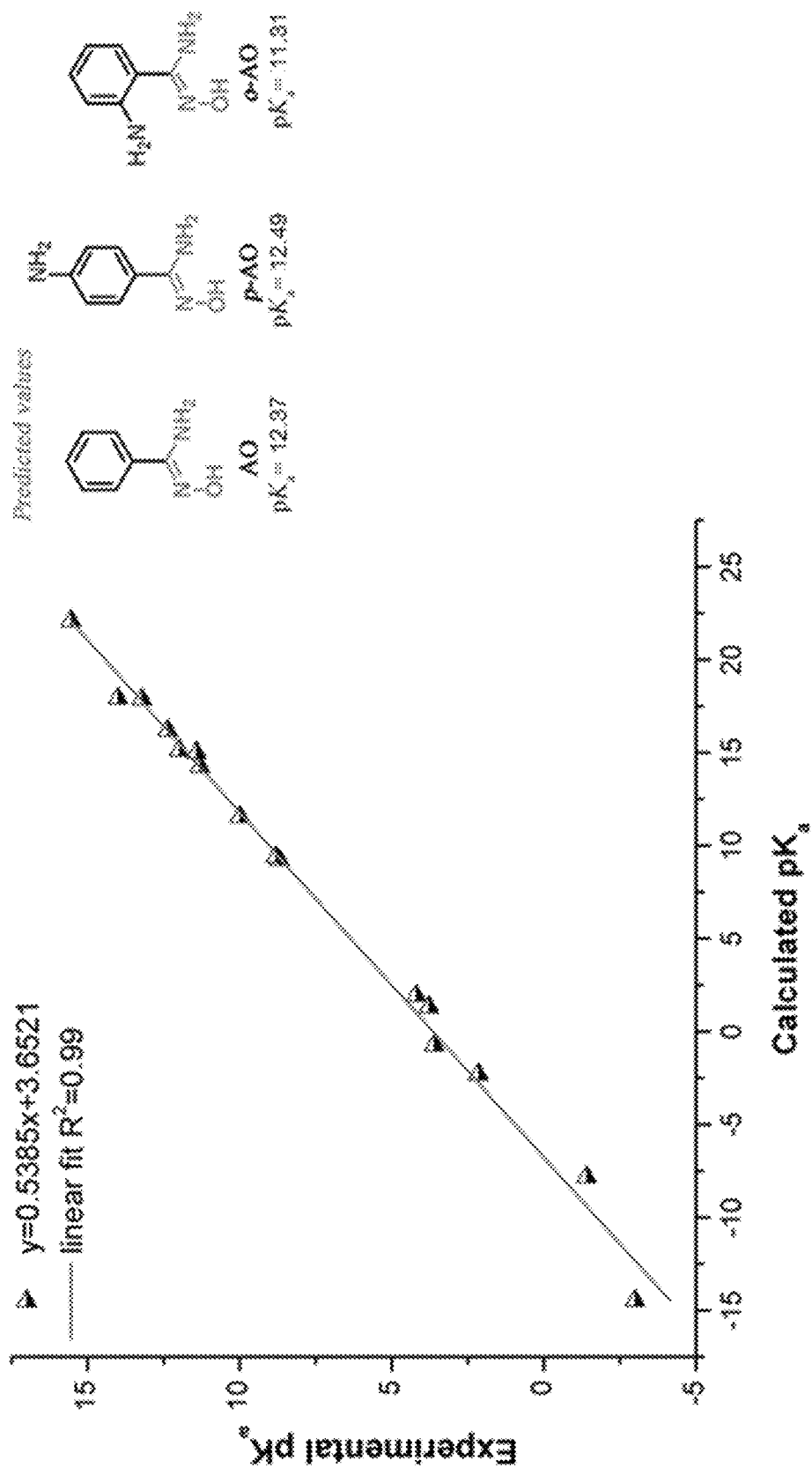
FIG. 44 shows assessing pK$_a$ for the amine-substituted benzamidoxime ligands. oNH$_2$-AO possesses the lowest pK$_a$ value among amidoxime-type ligands, meaning that it would require less energy for deprotonating to bind the UO$_2^{2+}$ ion as compared to the pNH$_2$-AO and AO ligands. This property can be considered as another advantage of oNH$_2$-AO over pNH$_2$-AO and AO. Correlation scheme in FIG. 43 and the corresponding computational protocols for predicting pK$_a$ values of uranyl complexes were established in the previous study (for details see: Mehio, N., et al. Acidity of the amidoxime functional group in aqueous solution: a combined experimental and computational study. J. Phys. Chem. B 119, 3567-3576, (2015).

The analysis of bond distances and orbital interactions in the representative uranyl crystal and DFT optimized structures provides useful metrics for rationalizing the difference in adsorption behavior of AO, pNH$_2$-AO, and oNH$_2$-AO-based polymers. Thermodynamic analysis of complexation in aqueous environments can provide a further step towards understanding the differences in the performance of the studied polymers. To this end, the key thermodynamic parameters, such as pK$_a$ of the ligands and stability constants (log ß) of the respective uranyl complexes, were computationally obtained through our recently developed protocols that achieve high accuracy in predicting aqueous pK$_a$ (root-mean-square deviation from experiment (RMSE)<0.5 pK$_a$ units)[69] and log ß (RMSE<1.0 log units)[70] (see the Methods section and FIGS. 43-44). The results confirm that the highest stability is attained in the uranyl complex with the oNH$_2$-AO ligand (log ß$_2$=22.55). Since the electron-donating effect of the amino group at the ortho position of the aromatic ring is weaker than that at the para position, a slightly lower stability of the complex with the pNH$_2$-AO ligands (log ß$_2$=22.47) is a direct consequence of the absence of the second-sphere inter ligand hydrogen-bonding interactions that are only manifested in the complex with oNH$_2$-AO. The predicted pK$_a$ values are particularly revealing in rationalizing the complexation properties of the studied ligands. It was found that oNH$_2$-AO is the least basic ligand, with pK$_a$=11.31 that is >1 log unit lower than in AO (pK$_a$=12.37) and pNH$_2$-AO (pK$_a$=12.49). This difference in the basicity can be attributed to the presence of a strong intramolecular hydrogen bond between the amino group at the ortho position and amidoximate, which significantly stabilizes the anionic form of oNH$_2$-AO (FIG. 44). Similar effect was observed in salicylaldoxime, where the decreased basicity of the phenolate group was attributed to hydrogen-bonding interaction with the aldoxime group.[70] Since the complexation of amidoxime with uranyl takes place by displacing a proton[71], the low pK$_a$, can be considered as another advantage of oNH$_2$-AO over pNH$_2$-AO and AO.

In order to compare the effectiveness of AO, pNH$_2$-AO, and oNH$_2$-AO to sequester uranyl in the presence of competing ions, species distribution diagrams were generated by incorporating ligands' pK$_a$ values and the stability constants with uranyl. For amidoxime ligands equilibrium constants were calculated in the present work, while for carbonate and hydroxides they were taken from the literature (Table 11)[72,73]. The uranyl and carbonate concentrations were kept at 4.38×10$^{-5}$ M and 0.0023 M, respectively, to reproduce the composition of the seawater simulant used in our experiments (FIGS. 33A-33B). At these conditions and pH~7-8, the dominant species in the solution are the UO$_2$(CO$_3$)$_2^{2-}$ and UO$_2$(CO$_3$)$_3^{4-}$ species, and it is with the CO$_3^{2-}$ anion that the AO, pNH$_2$-AO, and oNH$_2$-AO ligands must compete to bind the UO$_2^{2+}$ cation. The speciation diagrams show that in the presence of 0.001 M ligand concentration, 100% UO$_2^{2+}$ is complexed by oNH$_2$-AO, while pNH$_2$-AO and AO are able to displace only ~75% and ~50% UO$_2^{2+}$, respectively, from the uranyl tricarbonate complex, which is qualitatively consistent with the experimental observations in simulated seawater discussed above. Therefore, the computational results clarify that the superior uranium extraction performance of the POP-oNH$_2$-AO sorbent is due to the synergistic effects between the electron donating and hydrogen bonding capability of the amino group of the oNH$_2$-AO functionality, promoting stronger complexation with UO$_2^{2+}$.

Figure 45:
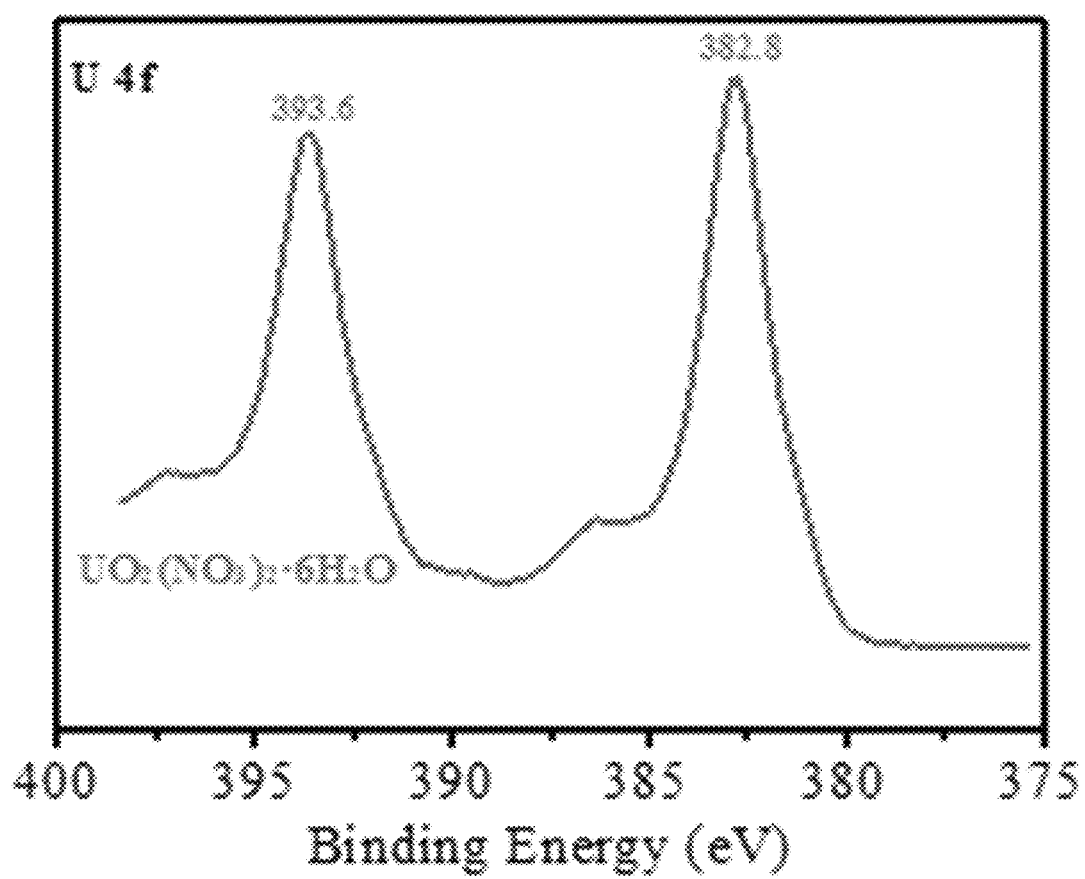
FIG. 45 shows U4f XPS spectrum of UO$_2$(NO$_3$)$_2$·6H$_2$O.
Figure 46A:
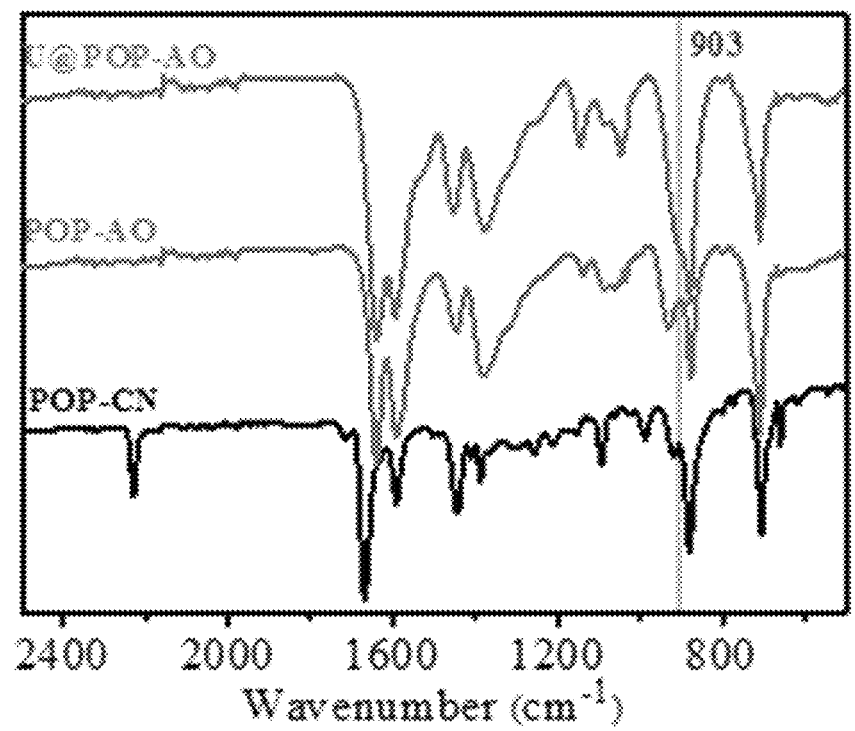
FIGS. 46A-46C show IR spectra.
Figure 46B:
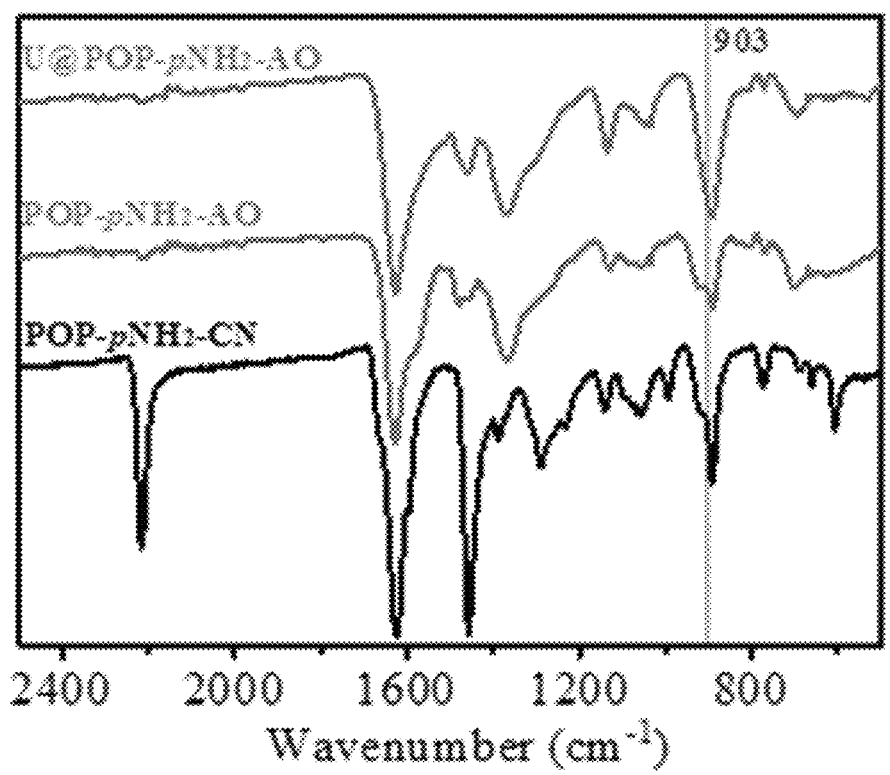
Figure 46C:
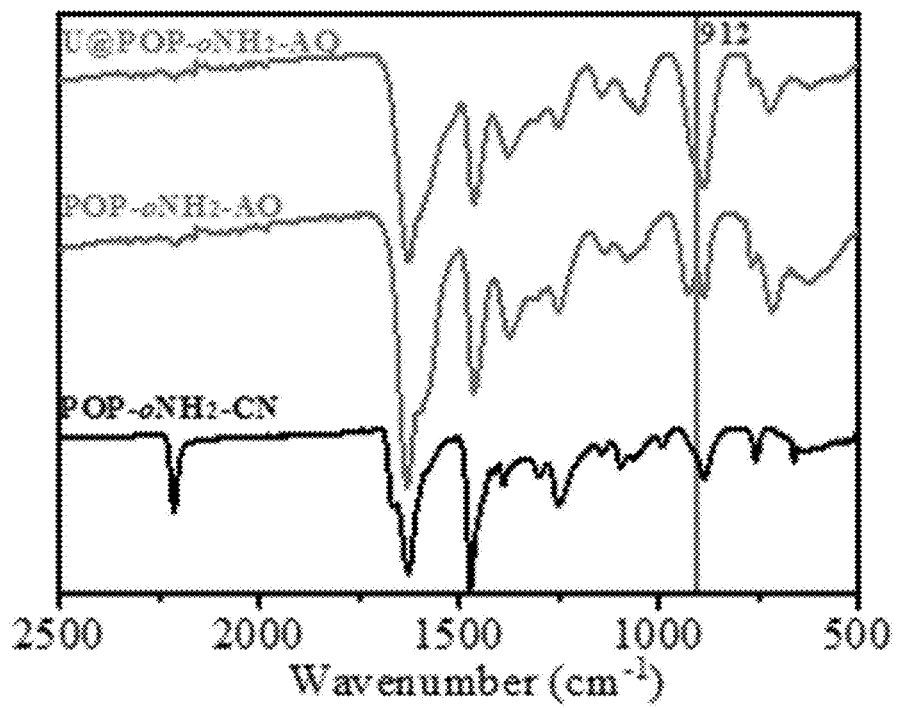
Figure 47:
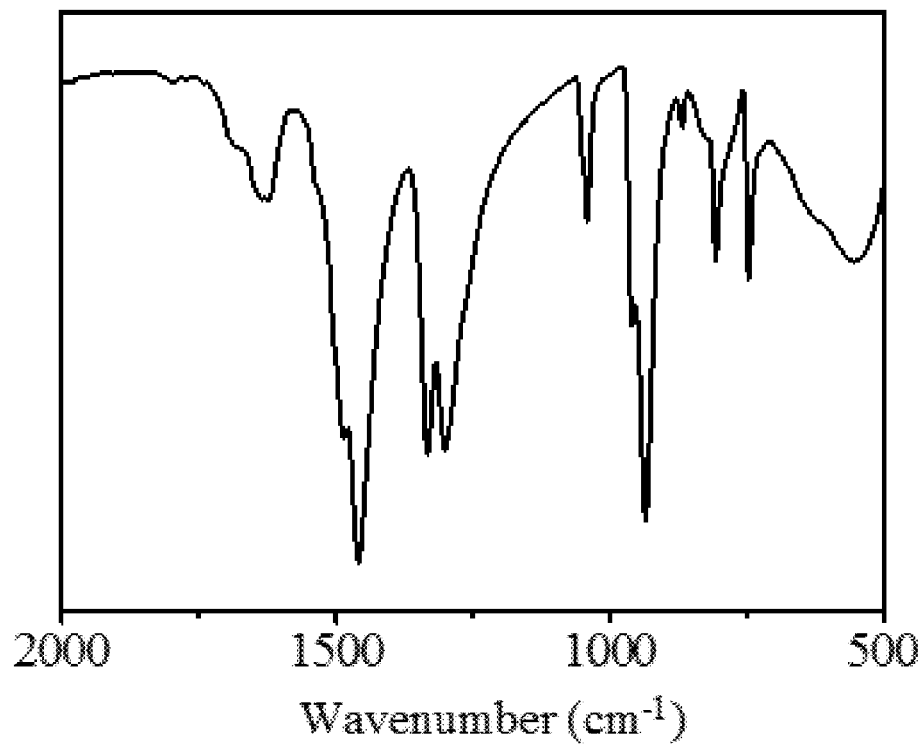
FIG. 47 shows an IR spectrum of UO$_2$(NO$_2$)$_2$·6H$_2$0.
Figure 48A:
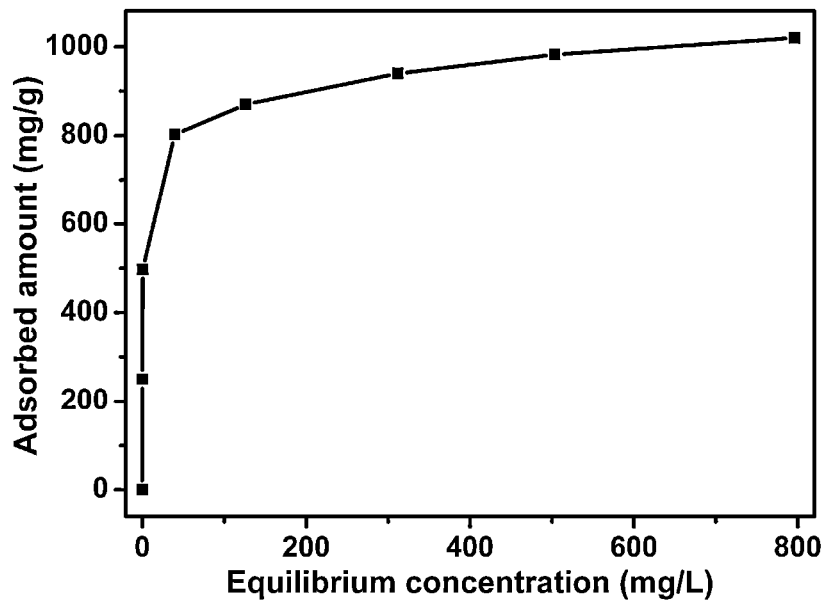
FIGS. 48A-48B show (FIG. 48A) Langmuir U adsorption isotherm of POP-based uranium "nano-trap"
Figure 48B:
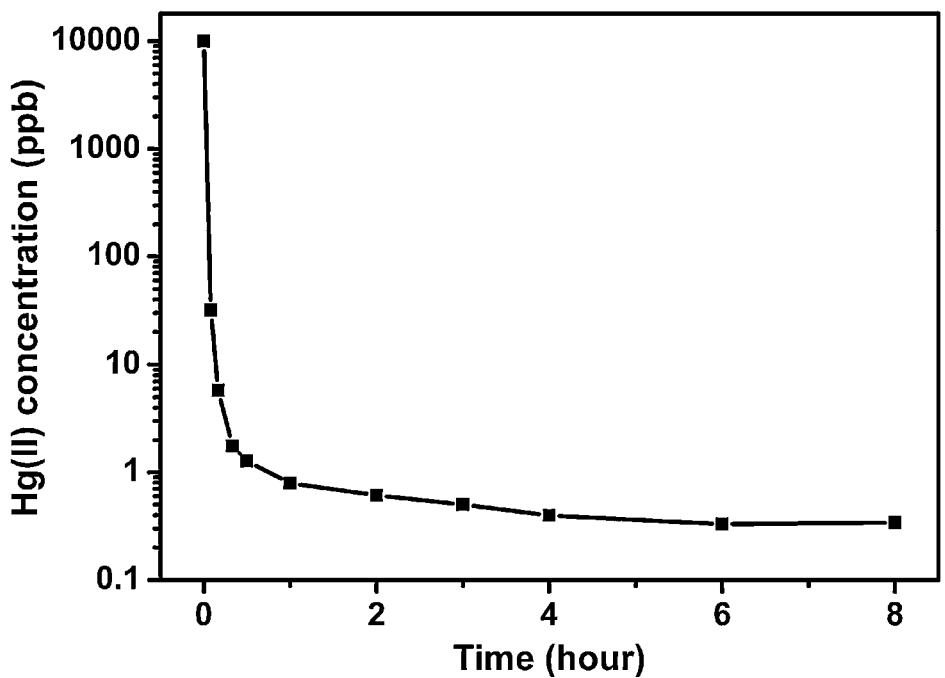

Investigation of uranyl binding interactions in the adsorbents. The presented single-crystal X-ray and computational data provide great confidence in the metal binding behavior of AO, pNH$_2$-AO, and oNH$_2$-AO small molecules; however, polymer morphology might have a profound effect on the established binding modes. Thus, direct validation of the U-binding environment on representative adsorbents is indispensable for achieving definitive conclusion. The materials were further investigated for their complexing behavior towards uranyl. To detect uranium inclusion within these adsorbents, XPS spectroscopy and elemental distribution mapping attached by SEM were performed (FIG. 45). The appearance of U 4f signals in these "reacted" samples (U@POP-AO, U@POP-pNH$_2$-AO, and U@POP-oNH$_2$-AO) verified the existence of uranium species. Elemental distribution mapping results showed a homogeneous distribution of captured uranium species throughout each sample. To examine the chemical binding of uranyl in these adsorbents, IR spectroscopy was carried out. In the IR spectra, the new bands at ~903 cm$^{-1}$ for POP-AO and POP-pNH$_2$-AO as well as 912 cm$^{-1}$ for POP-oNH$_2$-AO in the uranium included samples are assigned to the antisymmetric vibration of [O=U=O]$^{2+}$ (FIGS. 46A-46C). These peaks have a significant red-shift compared to the corresponding peak in UO$_2$(NO$_3$)$_2$·6H$_2$O (~960 cm$^{-1}$, FIG. 47)[74], indicating that strong interactions exist between uranyl and the functional groups in these polymers.

To gain further insight, X-ray absorption fine structure (XAFS) spectroscopy was applied to investigate the uranyl binding environment in these three amidoxime-functionalized POPs. Analysis of the extended XAFS (EXAFS) spectra reveal that all POPs bind uranyl in a similar fashion. Fits of the EXAFS spectra were achieved by calculation of theoretical scattering paths with FEFF 6 using structure models obtained from small molecules. Direct scattering paths were considered for all atoms in the uranyl first and second coordination sphere, while multiple scattering paths from the axial U=O were also included. A bottom-up approach was utilized to fit the data, where the coordination number (N), change in scattering half-path length (Δr), and mean squared relative displacement (σ$^2$) were local parameters, while amplitude reduction factor (S$_0^2$) and change in absorption edge (ΔE$_0$) were global parameters to all scattering paths.

As revealed by the refined fits of all three data sets, consistent bond lengths and coordination numbers were obtained for each sample, confirming the X-ray determined and computationally predicted η2-binding mode for all adsorbents.[75-76] Furthermore, analysis of the refined coordination numbers support a local uranyl environment containing two amidoxime ligands and one carbonate, largely supporting a 2:1 binding mode (Table 12 and Table 13), which reinforces the reasonability of DFT calculation.

Encouraged by the aforementioned results, the adsorption ability of the naturally occurring UO$_2^{2+}$ in seawater was examined, 5 mg of adsorbent was immersed separately in a tank containing 5 gallons of seawater and shaken at room temperature. After 56 days of seawater exposure the amount of uranium enriched in the adsorbent was determined by ICP-MS analysis after being digested by aqua regia. POP-oNH$_2$-AO, POP-pNH$_2$-AO, and POP-AO demonstrate uranium uptakes of 4.36, 2.27, and 1.32 mg per gram of adsorbent, respectively, confirming the superior performance of POP-oNH$_2$-AO and thereby showing great promise for practical applications (comparison with the representative reported results in uranium capture are listed in Table 13). Worthy of note, the uptake capacity of POP-oNH$_2$-AO is approximately three times higher than the reported value for a benchmark adsorbent reported by Japanese scientists.[77] The results obtained indicate a remarkable efficiency for POP-oNH$_2$-AO to extract this extremely low level of uranium and are encouraging for the use of POP-oNH$_2$-AO for mining nuclear fuel from seawater.

In summary, this disclosure provides a promising strategy for the synthesis of highly efficient uranium adsorbent materials. To improve the uptake capacity of the porous adsorbents, the monomer units were designed to allow the synthesis of a high surface area material while conserving a sufficiently high density of chelating groups. To enhance the affinity of chelating groups to uranyl ions, an amino group was de novo introduced to improve coordinative binding interactions by providing a secondary coordination sphere, which alters the electron density of the complex to lower the overall charge on uranyl and provides an additional site allowing a hydrogen bond to align uranyl species in a favorable coordination mode. Adsorption results showed that the porous adsorbent synthesized using 2-aminobenzamidoxime, yielding POP-oNH$_2$-AO, acted as a highly efficient uranyl scavenger that was effective in capturing uranium from polluted water and for selectively extracting it from seawater. The underlying principles contributed to its superior performance were revealed by collaborative experiments including spectroscopic, crystallographic, and DFT calculation studies. This proof-of-concept study is important because it affords an amenable route to bridge natural and artificial systems. Moreover, this strategy is practically feasible and thus provides a new direction towards the development of efficient, economic, and applicable adsorbents for uranium capture. Studies aimed at extending this strategy to incorporate other types of reinforcement groups into the coordinative functionalities of the adsorbent materials for metal species sequestration applications are currently underway in our laboratory to further understand the synergistic adsorption effect.

Example 3: Synthesis of PAF-1-CH$_2$AO

PAF-1 (200.0 mg), paraformaldehyde (1.0 g), glacial AcOH (6.0 ml), H$_3$PO$_4$ (3.0 ml) and conc. HCl (20.0 ml), the flask was sealed and heated to 90° C. for 3 days. The resulting solid was collected, washed with water and methanol, and then dried under vacuum to produce yellow solid of PAF-1-CH$_2$Cl.

PAF-1-CH$_2$Cl, NaCN (1.2 g), EtOH (100 ml), N$_2$ and stirred at 75° C. for 3 days. The resulting solid was collected, washed with water and methanol, and then dried under vacuum to produce PAF-1-CH$_2$CN as yellow powder.

PAF-1-CH$_2$CN (220.0 mg), K$_2$CO$_3$ (500.0 mg), NH$_2$OH (50 wt. % in H$_2$O) (15 mL), ethanol (35 mL), N$_2$ and reflux for 12 h. The resulting solid was collected, washed with water and methanol, and then dried under vacuum to produce PAF-1-CH$_2$AO as yellow powder.

Uranium uptake capacity: 160 mg g$^{-1}$

Example 4: PAF-1-CH$_2$NHAO

PAF-1 (200.0 mg), paraformaldehyde (1.0 g), glacial AcOH (6.0 ml), H$_3$PO$_4$ (3.0 ml) and conc. HCl (20.0 ml), the flask was sealed and heated to 90° C. for 3 days. The resulting solid was collected, washed with water and methanol, and then dried under vacuum to produce yellow solid of PAF-1-CH$_2$Cl.

PAF-1-CH$_2$Cl, NaNHCN, EtOH (100 ml), N$_2$ and stirred at 75° C. for 3 days. The resulting solid was collected, washed with water and methanol, and then dried under vacuum to produce PAF-1-CH$_2$NHCN.

PAF-1-CH$_2$NHCN (220.0 mg), K$_2$CO$_3$ (500.0 mg), NH$_2$OH (50 wt. % in H$_2$O) (15 mL), ethanol (35 mL), N$_2$ and reflux for 12 h. The resulting solid was collected, washed with water and methanol, and then dried under vacuum to produce PAF-1-CH$_2$NHAO.

Uranium uptake capacity: 160 mg g$^{-1}$

Example 5: PAF-1-CH$_2$CH(AO)$_2$

PAF-1 (200.0 mg), Dichloromethane (40 mL), SnCl$_4$ (1.0 M in methylene chloride) (3.0 ml) and Dichloromethyl methyl ether (2.0 ml), stirred at room temperature for 3 days.

PAF-1-CHO (200 mg), Malononitrile (300 mg), 1,4-Diazabicyclo[2.2.2]octane (100 mg) and ethanol (40 ml), heated to 78° C. for 24 h.

PAF-1-CH$_2$CH(CN)$_2$ (220.0 mg), K$_2$CO$_3$ (500.0 mg), NH$_2$OH (50 wt. % in H$_2$O) (15 mL), ethanol (35 mL), N$_2$ and reflux for 12 h. The resulting solid was collected, washed with water and methanol, and then dried under vacuum to produce PAF-1-CH$_2$CH(AO)$_2$.

Uranium uptake capacity: 110 mg g$^{-1}$

Example 6: PAF-1-NH(CH$_2$)$_2$AO

PAF-1 (100 mg) was suspended in Ac$_2$O (50 mL). To this suspension at an ice bath, 3.0 g of HNO$_3$ was gradually added, and the reaction mixture was then stirred at room temperature for 2 days. Subsequently, the mixture was poured into a large amount of water, and the solid was filtrated, washed with water substantially, and then dried to give PAF-1-NO$_2$.

PAF-1-NO$_2$ (100 mg) and SnCl$_2$·2H$_2$O (3.26 g) were suspended in 20 mL ethanol. The mixture was heated at 70° C. for 8 h. The solid was centrifuged and suspended in 20 mL concentrated hydrochloric acid. Afterwards, the solid was centrifuged, washed three times with 15 mL H$_2$O each and one time with ethanol. The product was dried to produce PAF-1-NH$_2$. PAF-1-NH$_2$ (300 mg), Acrylonitrile (50 mL), Hydroquinone (330 mg), AlCl$_3$ (anhydrous) (10 g), stirred at 75° C. for 3 days.

PAF-1-NH(CH$_2$)$_2$CN (220.0 mg), K$_2$CO$_3$ (500.0 mg), NH$_2$OH (50 wt. % in H$_2$O) (15 mL), ethanol (35 mL), N$_2$ and reflux for 12 h. The resulting solid was collected, washed with water and methanol, and then dried under vacuum to produce PAF-1-NH(CH$_2$)$_2$AO.

Uranium uptake capacity: 180 mg g$^{-1}$

Example 7: PAF-1-N=C=C—P

PAF-1-N=C=C—P was prepared according to the procedures reported in Prof. Wenbin Lin's paper: Chem. Sci. 2013, 4, 2396-2402.

Uranium uptake capacity: 90 mg g$^{-1}$

Example 8: Enhancing the U Adsorption Performance Via Adjusting the Density and Position of the Coordinate Sites in the Sorbents

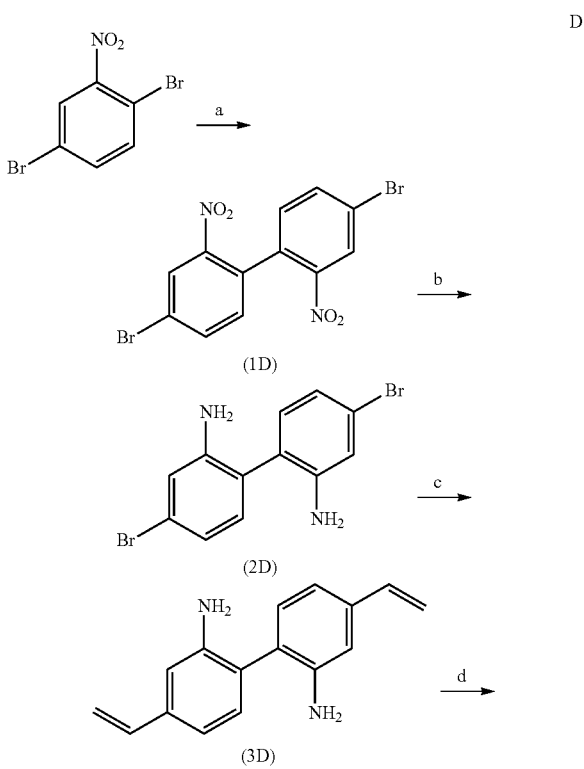

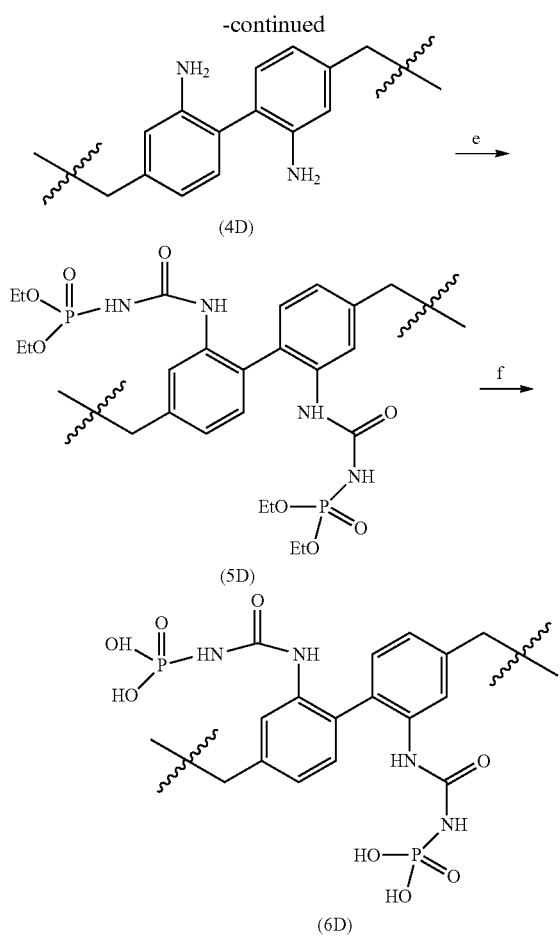

Reagent:
(a) Cu;
(b) Sn, concentrated HCl;
(c) potassium vinyltrifluoroborate;
(d) AIBN, DMF;
(e) OCN-P(O)(OEt)$_2$;
(f) Me$_3$SiBr 4,4'-dibromo-2,2'-dinitrobiphenyl (1D): To a solution of 2,5-dibromonitrobenzene (14.0 g, 42.7 mmol) in DMF (60 mL) was added copper powder (6.0 g, 89.5 mmol), and the reaction mixture was heated at 125° C. for 3 h. After that, DMF was evaporated under high vacuum, the residue was dissolved in toluene and the insoluble materials were removed by filtration through Celite. The filtrate was washed with brine and 10% NaHCO$_3$ and evaporated to dryness to yield the crude product which was purified by flash chromatography with hexane/ethyl acetate (2:1) as eluent to afford the title compound as yellow solid. Yield: 6.2 g (72%). $^1$H NMR (400 MHz, d$_6$-DMSO, 298K, TMS): δ 8.41 (s, 2H), 8.03-8.06 (m, 2H), 7.45 (d, 2H, J=8 Hz) ppm.

4,4'-dibromobiphenyl-2,2'-diamine (2D): To a solution of 1(4.0 g, 10 mmol) in 50 mL of ethanol was added concentrated HCl (30 mL), and tin powder (5.0 g, 42 mmol), and the reaction mixture was then heated to reflux at 100° C. for 2 h. After cooling, the mixture was poured into ice water (400 mL) and then made alkaline with 20% w/w aqueous NaOH solution. The product was next extracted with diethyl ether, and the organic layer was washed with brine, dried over Na$_2$SO$_4$, filtered, and then evaporated to dryness to give the product as light-brown solid that could be used without further purification. Yield: 3.16 g (93%). $^1$H NMR (400 MHz, d$_6$-DMSO, 298K, TMS): δ 6.91 (s, 2H), 6.79 (d, 2H, J=8 Hz), 6.71 (d, 2H, J=8 Hz), 4.88 (s, 4H) ppm.

4,4'-divinylbiphenyl-2,2'-diamine (3D): 2 (3.4 g, 10 mmol), potassium vinyltrifluoroborate (3.2 g, 24 mmol), K$_2$CO$_3$ (6.6 g, 48 mmol), PPh$_3$(0.1 g, 0.4 mmol) and Pd(OAc)$_2$ (0.045 g, 0.2 mmol) were dissolved in the mixture of toluene (30 mL), THF (30 m L) and H$_2$O (6 mL) and the resulting mixture was refluxed at 90° C. under N$_2$ atmosphere for 24 h. The residue was extracted with ethyl acetate, washed with brine, dried over Na$_2$SO$_4$, and evaporated under reduced pressure, giving the crude compound which was purified by flash chromatography with hexane/ethyl acetate (2:1) as eluent to afford the title compound as yellow solid. Yield: 1.92 g (82%). $^1$H NMR (400 MHz, d$_6$-DMSO, 298K, TMS): δ 6.89 (d, 2H, J=8 Hz), 6.83 (s, 2H), 6.74 (d, 2H, J=8 Hz), 6.56-6.64 (m, 2H), 5.67 (d, 2H, J=16 Hz), 5.17 (d, 2H, J=12 Hz), 4.62 (s, 4H) ppm.

Synthesis of polymer (4D): 3 (1.0 g) was dissolved in DMF (10 mL), followed by the addition of free radical initiator azobisisobutyronitrile (AIBN, 0.025 g). After stirring for 3 h at room temperature, the mixture was transferred into a 20 mL autoclave and maintained for 24 h at 100° C. A brown solid product (1.0 g, 100% yield) was obtained by extracting of the DMF solvent with EtOH and drying in vacuum at 50° C. for 24 h.

Synthesis of polymer (5D): Polymer 4 (0.5 g) was added to OCN—P(O)(OEt)$_2$ (0.91 g) dry DMSO (20 mL) solution. The mixture was stirred 72 h at 50° C. under N$_2$ atmosphere. Polymer 5 was obtained after filtrating, washing with CH$_2$Cl$_2$, and drying in vacuum for 24 h at 50° C.

Synthesis of polymer (6D): Polymer 5 (0.5 g) was suspended in CH$_2$Cl$_2$ (20 mL), to which Me$_3$SiBr (2.5 mL) was added. After 12 h, the material is isolated by filtration, washed with CH$_2$Cl$_2$ and dispersed in CH$_2$Cl$_2$. Water (5 mL) was added and the solution was stirred for another 3 h. Polymer 5 was obtained after filtrating, washing with DMF, EtOH, and CH$_2$Cl$_2$ and drying in vacuum for 24 h at 50° C.

TABLE 14

Textural parameters of polymer 4D and 6D.

| Polymer | BET Surface Area (m$^2$/g) | Pore Volume (cm$^3$/g) |
|---|---|---|
| 4D | 556 | 0.40 |
| 6D | 371 | 0.43 |

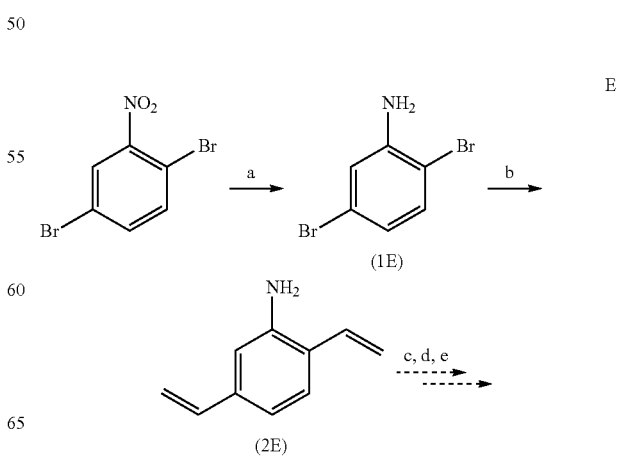

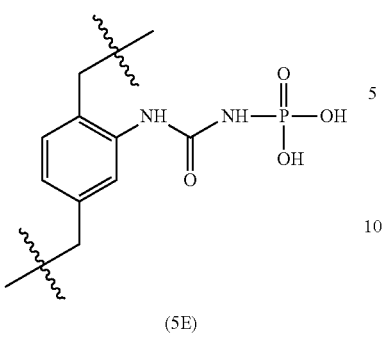

(5E)

Reagent:
(a) Sn, concentrated HCl;
(b) potassium vinyltrifluoroborate;
(c) AIBN, DMF (3E);
(d) OCN-P(O)(OEt)$_2$ (4E);
(e) Me$_3$SiBr (5E)

Synthesis of 2,5-dibromoaniline (1E): To a solution of 1,4-dibromo-2-nitrobenzene (2.5 g, 10 mmol) in 50 mL of ethanol was added concentrated HCl (30 mL), and tin powder (5.0 g, 42 mmol), and the reaction mixture was then heated to reflux at 70° C. for 12 h. After cooling, the mixture was poured into ice water (400 mL) and then made alkaline with 20% w/w aqueous NaOH solution. The product was next extracted with diethyl ether, and the organic layer was washed with brine, dried over Na$_2$SO$_4$, filtered, and then evaporated to dryness, giving the crude compound which was purified by flash chromatography with hexane/ethyl acetate (5:1) as eluent to afford the title compound as white solid. Yield: 2.38 g (95%). $^1$H NMR (400 MHz, d$_6$-DMSO, 298K, TMS): δ 7.23 (d, 1H, J=8 Hz), 6.92 (s, 1H), 6.55-6.58 (m, 1H), 5.55 (s, 2H) ppm.

Synthesis of 2,5-divinylaniline (2E): 1E (2.5 g, 10 mmol), potassium vinyltrifluoroborate (3.3 g, 24 mmol), K$_2$CO$_3$ (5.52 g, 40 mmol), and Pd(PPh$_3$)$_4$ (275 mg, 0.25 mmol) were dissolved in the mixture of toluene (25 mL), THF (25 mL) and H$_2$O (5 mL) and the resulting mixture was refluxed at 90° C. under N$_2$ atmosphere for 36 h. The residue was extracted with ethyl acetate, washed with brine, dried over Na$_2$SO$_4$, and evaporated under reduced pressure, giving the crude compound which was purified by flash chromatography with hexane/ethyl acetate (5:1) as eluent to afford the title compound as light brown solid. Yield: 1.17 g (81%). $^1$H NMR (400 MHz, CDCl$_3$, 298K, TMS): δ 7.25 (d, 1H, J=8 Hz), 6.84 (d, 1H, J=8 Hz), 6.71 (s, 1H), 6.58-6.77 (m, 2H), 5.61-5.71 (m, 2H), 5.19-5.31 (m, 2H), 3.71 (s, 2H) ppm.

Synthesis of Polymer 5E:

The synthetic procedures are similar to that of polymer 6D.

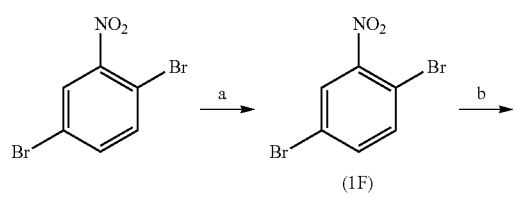

(1F)

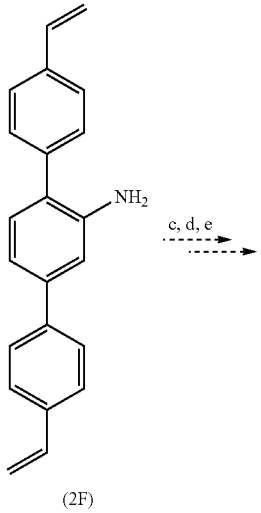

(2F)

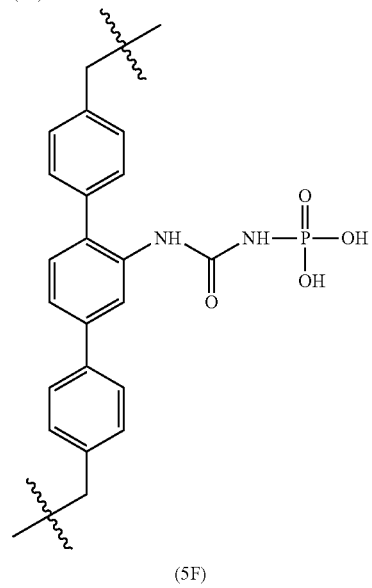

(5F)

Reagent:
(a) Sn, concentrated HCl;
(b) (4-vinylphenyl)boronic acid;
(c) AIBN, DMF (3F);
(d) OCN-P(O)(OEt)$_2$ (4F);
(e) Me$_3$SiBr (5F)

TABLE 15

Textural parameters of polymer 3E and 5E.

| Polymer | BET Surface Area (m$^2$/g) | Pore Volume (cm$^3$/g) |
|---|---|---|
| 3E | 732 | 0.59 |
| 5E | 578 | 0.54 |

Synthesis of 2,5-dibromoaniline (1F): To a solution of 1,4-dibromo-2-nitrobenzene (2.5 g, 10 mmol) in 50 mL of ethanol was added concentrated HCl (30 mL), and tin powder (5.0 g, 42 mmol), and the reaction mixture was then heated to reflux at 70° C. for 12 h. After cooling, the mixture was poured into ice water (400 mL) and then made alkaline with 20% w/w aqueous NaOH solution. The product was next extracted with diethyl ether, and the organic layer was washed with brine, dried over Na$_2$SO$_4$, filtered, and then evaporated to dryness, giving the crude compound which was purified by flash chromatography with hexane/ethyl acetate (5:1) as eluent to afford the title compound as white solid. Yield: 2.38 g (95%). $^1$H NMR (400 MHz, CDCl$_3$, 298K, TMS): δ 7.23 (d, 1H, J=8 Hz), 6.92 (s, 1H), 6.55-6.58 (m, 1H), 5.55 (s, 2H) ppm.

Synthesis of 2,5-divinylaniline (2F)

1F (2.5 g, 10 mmol), (4-vinylphenyl)boronic acid (3.6 g, 24 mmol), K$_2$CO$_3$ (5.52 g, 40 mmol), and Pd(PPh$_3$)$_4$ (275 mg, 0.25 mmol) were dissolved in the mixture of toluene (25 mL), THF (25 mL) and H$_2$O (5 mL) and the resulting mixture was refluxed at 90° C. under N$_2$ atmosphere for 36 h. The residue was extracted with ethyl acetate, washed with brine, dried over Na$_2$SO$_4$, and evaporated under reduced pressure, giving the crude compound which was purified by flash chromatography with hexane/ethyl acetate (5:1) as eluent to afford the title compound as white solid. Yield: 2.64 g (89%). $^1$H NMR (400 MHz, d$_6$-DMSO, 298K, TMS): δ 7.42-7.58 (m, 8H), 7.07 (t, 2H, J=4 Hz), 6.94 (d, 1H, J=4 Hz), 6.72-6.80 (m, 2H), 5.85 (d, 2H, J=16 Hz), 5.26 (d, 2H, J=8 Hz), 4.92 (s, 2H) ppm.

Synthesis of polymer 5F

The synthetic procedures are similar to that of polymer 6D.

TABLE 16

Textural parameters of polymer 3F and 5F.

| Polymer | BET Surface Area (m$^2$/g) | Pore Volume (cm$^3$/g) |
|---|---|---|
| 3F | 900 | 0.71 |
| 5F | 813 | 0.70 |

Langmuir Sorption Isotherms Tests:

Langmuir sorption isotherms were obtained as follows: Samples of 10 mL water were prepared with uranyl concentrations of 40, 50, 60, 80, 100, 150, 200, 250, 300 and 400 ppm at pH≈ 5.5 mg of sorbent was added to each sample and with continuously stirring at RT for 12 h. Sorbent was separated by centrifugation, and U concentration in the supernatant was determined by ICP-OES. A sample of U solution without sorbent material was analyzed during each sorption experiment as a negative control. The sorption capacity q$_e$ (mg/g) of U was calculated with the following equation:

$$q_e = \frac{(C_0 - C_e)V}{m}$$

where C$_0$ and C$_e$ are the concentration of U initially and at equilibrium, respectively. V is the volume of solution, and m is the mass of sorbent in solution.

Simulated Seawater Uranium Adsorption Test:

Simulated seawater was prepared as follows: sodium chloride (460.8 g), sodium bicarbonate (3.474 g), and uranium nitrate hexahydrate were dissolved in distilled water (18 L).

The phosphorylurea functionalized porous organic polymer was shaked with this stock solution for 24 h at room temperature, and supernatant was then filtered before the determination of the uranium concentration.

TABLE 17

| Entry | Adsorbent | Initial U concentration (ppm) | U concentration after adsorption (ppm) | U uptake capacity (mg/g)$^a$ |
|---|---|---|---|---|
| 1 | 6D | 8.508 | 6.55 | 100.0 |
| 2 | 5E | 8.508 | 6.775 | 90.6 |
| 3 | 5F | 8.508 | 6.837 | 85.7 |

Conditions: simulated sea water (750 mL), adsorbents (15 ± 1 mg), shaking for 24 h.

Example 9: U Adsorption Performance of Amidoxime Polymers with Functionalized R-Group

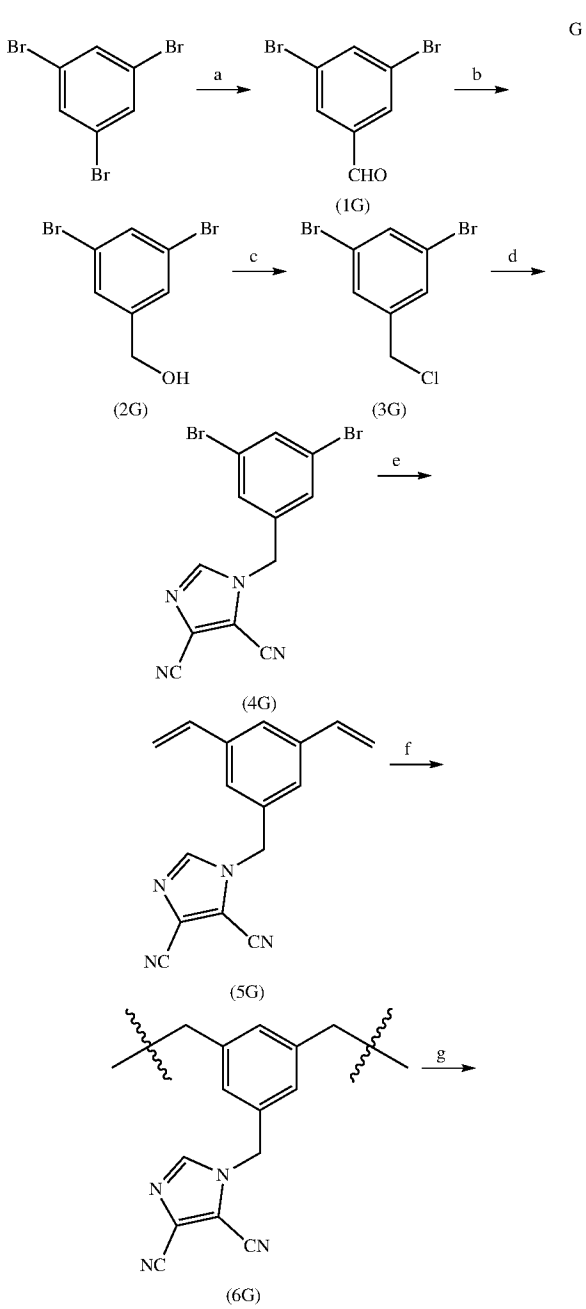

-continued

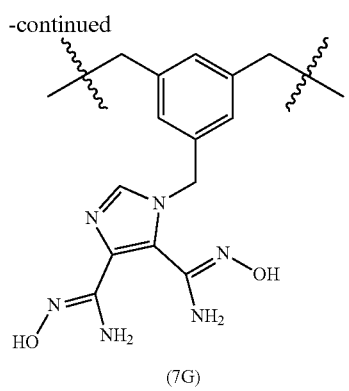

(7G)

Reagents:
(a) Mg, DMF;
(b) NaBH₄;
(c) cyanuric chloride, DMF;
(d) 4, 5-dicyanoimidazole;
(e) potassium vinyltrifluoroborate, Pd(PPh₃)₄;
(f) AIBN, DMF;
(g) OH-NH₂·HCl 3,5-dibromobenzaldehyde (1G): 1,3,5-tribromobenzene (10 g, 32 mmol) and anhydrous THF (150 mL) were added to a dried flask. After the solution was cooled down to −78° C., n-BuLi (12.8 mL, 32 mmol, 2.5 M solution in hexane) was added dropwise. After stirring for 1 h, degassed anhydrous DMF (5 mL) diluted in anhydrous THF (20 mL) was added dropwise. After the addition, the solution was then warmed up to room temperature, stirred for another 1 h, and quenched with HCl (10%) until the solution was acidic. The residue was extracted with ethyl acetate, washed with brine, dried over $Na_2SO_4$, and evaporated under reduced pressure, giving the crude compound which was purified by flash chromatography with hexane/ethyl acetate (10:1) as eluent to afford the title compound as white solid. Yield: 7.04 g (84%). ¹H NMR (400 MHz, $d_6$-DMSO, 298K, TMS): δ 9.92 (s, 1H), 8.19 (s, 1H), 8.07 (s, 2H) ppm.

(3,5-dibromophenyl)methanol (2G): To a round-bottom flask containing 3,5-dibromobenzaldehyde (2 g, 7.56 mmol) in EtOH (40 mL) and $CH_2Cl_2$ (40 mL) was slowly added NaBH₄ (572 mg, 15.1 mmol), and the reaction was stirred overnight at room temperature. The reaction mixture was poured into water (100 mL), extracted with ethyl acetate, the recovered organic phase washed with water, dried over $Na_2SO_4$ and evaporated under reduced pressure, giving the crude compound which was purified by flash chromatography with hexane/ethyl acetate (10:1) as eluent to afford the title compound as white solid. Yield: 1.85 g (93%). ¹H NMR (400 MHz, $d_6$-DMSO, 298K, TMS): δ 7.66 (s, 1H), 7.51 (s, 2H), 5.43 (s, 1H), 4.49 (d, 2H, J=4 Hz) ppm.

1,3-dibromo-5-(chloromethyl)benzene (3G): Cyanuric chloride (1.83 g, 10 mmol) was added to DMF (2 mL) and the mixture was stirred at room temperature. After the formation of a monolithic solid, 2G (2.5 g, 9.5 mmol) of $CH_2Cl_2$ (40 mL) solution was added dropwise. Then, the mixture was stirred at room temperature overnight and quenched with water. The residue was extracted with $CH_2Cl_2$, washed with brine, dried over $Na_2SO_4$, and evaporated under reduced pressure, giving the crude compound which was purified by flash chromatography with hexane as eluent to afford the title compound as white solid. Yield: 2.49 g (92%). ¹H NMR (400 MHz, $CDCl_3$, 298K, TMS): δ 7.67 (s, 1H), 7.46 (s, 2H), 4.47 (s, 2H) ppm.

1-(3,5-dibromobenzyl)-1H-imidazole-4,5-dicarbonitrile (4G): 3G (1.4 g, 5.0 mmol), 4,5-dicyanoimidazole (1.42 g, 6.0 mmol), and $K_2CO_3$ (1.38 g, 10 mmol) were dissolved in acetonitrile (50 mL) and the resulting mixture was refluxed at 80° C. under $N_2$ atmosphere for 24 h. After cooling to room temperature, water (50 mL) was added to quench the reaction and the residue was extracted with ethyl acetate, washed with brine, dried over $Na_2SO_4$, and evaporated under reduced pressure, giving the crude compound which was purified by flash chromatography with hexane/ethyl acetate (2:1) as eluent to afford the title compound as white solid. Yield: 1.59 g (88%).

1-(3,5-divinylbenzyl)-1H-imidazole-4,5-dicarbonitrile (5G): 4G (2.0 g, 5.5 mmol), potassium vinyltrifluoroborate (1.82 g, 13.2 mmol), $K_2CO_3$ (3.0 g, 22 mmol), and Pd(PPh₃)₄ (150 mg, 0.137 mmol) were dissolved in the mixture of toluene (25 mL), THF (25 mL) and $H_2O$ (5 mL) and the resulting mixture was refluxed at 90° C. under $N_2$ atmosphere for 36 h. The residue was extracted with ethyl acetate, washed with brine, dried over $Na_2SO_4$, and evaporated under reduced pressure, giving the crude compound which was purified by flash chromatography with hexane/ethyl acetate (2:1) as eluent to afford the title compound as white solid. Yield: 1.04 g (73%). ¹H NMR (400 MHz, $CDCl_3$, 298K, TMS): δ 7.69 (s, 1H), 7.48 (s, 1H), 7.18 (s, 2H), 6.05 (s, 1H), 6.67-6.72 (m, 2H), 5.80 (d, 2H, J=12 Hz), 5.36 (d, 2H, J=8 Hz), 5.25 (s, 2H) ppm.

Synthesis of polymer (6G): 5G (1.0 g) was dissolved in DMF (10 mL), followed by the addition of free radical initiator azobisisobutyronitrile (AIBN, 0.025 g). After stirring for 3 h at room temperature, the mixture was transferred into a 20 mL autoclave and maintained for 24 h at 100° C. A white solid product (1.0 g, 100% yield) was obtained by extracting of the DMF solvent with EtOH and drying in vacuum at 50° C. for 24 h.

Synthesis of polymer (7G): The polymer 6G was synthesized by treating the polymer 3 (0.2 g) with $NH_2OH·HCl$ (0.495 g) and KOH (0.4 g) in ethanol (20 mL) at 70° C. for 48 h. After cooling down, the polymer 7G as white solid was obtained by filtration, washing with water, and drying overnight in vacuum at 50° C.

Before the U adsorption tests, the resultant polyacrylonitrile-grafted sorbent was treated with 3% (w/w) aqueous potassium hydroxide solution at room temperature for 36 h. The product was separated by filtration and washed with water and drying overnight in vacuum at 50° C.

$N_2$ sorption isotherms collected at 77K indicate that both of the polymer 6G and 7G have no surface area.

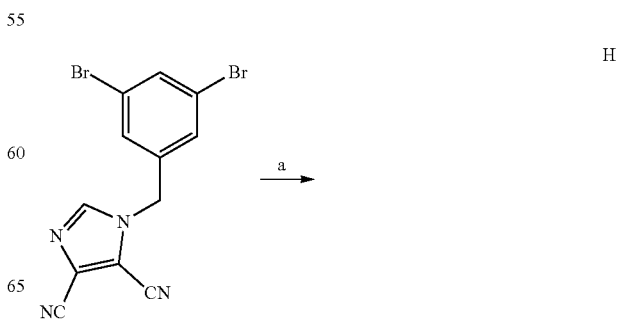

H

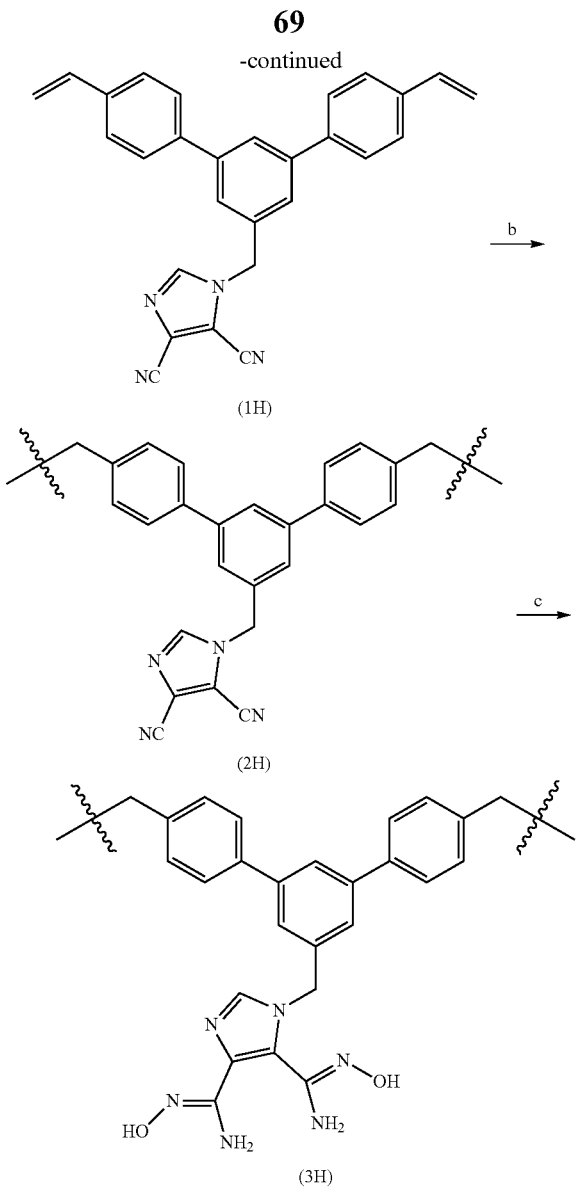

Reagents:
(a) 4-vinylphenylboronic acid, Pd(PPh₃)₄;
(b) AIBN, DMF;
(c) OH-NH₂·HCl 1-((4,4''-divinyl-[1,1':3',1''-terphenyl]-5'-yl)methyl)-1H-imidazole-4,5-dicarbonitrile (1H): 1-(3,5-dibromobenzyl)-1H-imidazole-4,5-dicarbonitrile (2.0 g, 5.5 mmol), (4-vinylphenyl)boronic acid (1.95 g, 13.2 mmol), K₂CO₃ (3.0 g, 22 mmol), and Pd(PPh₃)₄ (150 mg, 0.137 mmol) were dissolved in the mixture of toluene (25 mL), THF (25 mL) and H₂O (5 mL) and the resulting mixture was refluxed at 90° C. under N₂ atmosphere for 36 h. The residue was extracted with ethyl acetate, washed with brine, dried over Na₂SO₄, and evaporated under reduced pressure, giving the crude compound which was purified by flash chromatography with hexane/ethyl acetate (2:1) as eluent to afford the title compound as white solid. Yield: 1.04 g (73%). ¹H NMR (400 MHz, CDCl₃, 298K, TMS): δ 7.84 (s, 1H), 7.78 (s, 1H), 7.51-7.58 (m, 8H), 7.45 (s, 1H), 6.74-6.80 (m, 2H), 5.83 (d, 2H, J=16 Hz), 5.38 (s, 2H), 5.32 (d, 2H, J=8 Hz) ppm.

Synthesis of polymer (2H): 1H (1.0 g) was dissolved in DMF (10 mL), followed by the addition of free radical initiator azobisisobutyronitrile (AIBN, 0.025 g). After stirring for 3 h at room temperature, the mixture was transferred into a 20 mL autoclave and maintained for 24 h at 100° C. A white solid product (1.0 g, 100% yield) was obtained by extracting of the DMF solvent with EtOH and drying in vacuum at 50° C. for 24 h.

Synthesis of polymer (3H): The polymer 2H was synthesized by treating the polymer 3 (0.2 g) with NH₂OH·HCl (0.495 g) and KOH (0.4 g) in ethanol (20 mL) at 70° C. for 48 h. After cooling down, the polymer 3H as white solid was obtained by filtration, washing with water, and drying overnight in vacuum at 50° C.

Before the U adsorption tests, the resultant polyacrylonitrile-grafted sorbent was treated with 3% (w/w) aqueous potassium hydroxide solution at room temperature for 36 h. The product was separated by filtration and washed with water and drying overnight in vacuum at 50° C.

TABLE 18

Textural parameters of polymer 2H and 3H.

| Polymer | BET Surface Area (m²/g) | Pore Volume (cm³/g) |
|---------|------------------------|---------------------|
| 2H      | 749                    | 0.56                |
| 3H      | 504                    | 0.53                |

Simulated Seawater Uranium Adsorption Test:

Simulated seawater was prepared as follows: sodium chloride (460.8 g), sodium bicarbonate (3.474 g), and uranium nitrate hexahydrate were dissolved in distilled water (18 L).

The amidoximated polymer was shaked with this stock solution for 24 h at room temperature, and supernatant was then filtered before the determination of the uranium concentration.

TABLE 19

| Entry | Adsorbent | Initial U concentration (ppm) | U concentration after adsorption (ppm) | U uptake capacity (mg/g)ᵃ |
|-------|-----------|-------------------------------|----------------------------------------|---------------------------|
| 1     | 7G        | 8.508                         | 6.371                                  | 110.2                     |
| 2     | 3H        | 8.508                         | 5.776                                  | 141.8                     |

Conditions: simulated sea water (750 mL), adsorbents (15 ± 1 mg), shaking for 24 h.

Example 10: U Adsorption Via Diamidoxime Functionalized Hierarchical Porous Polymer

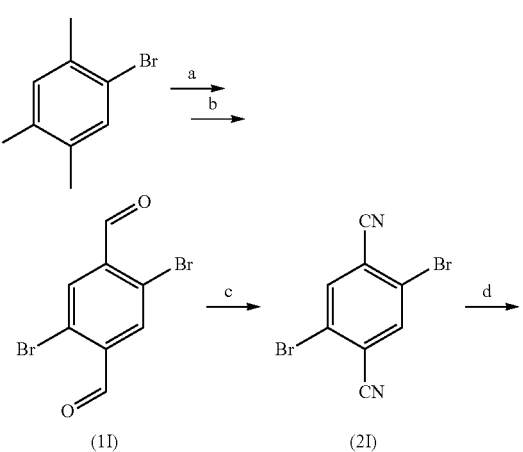

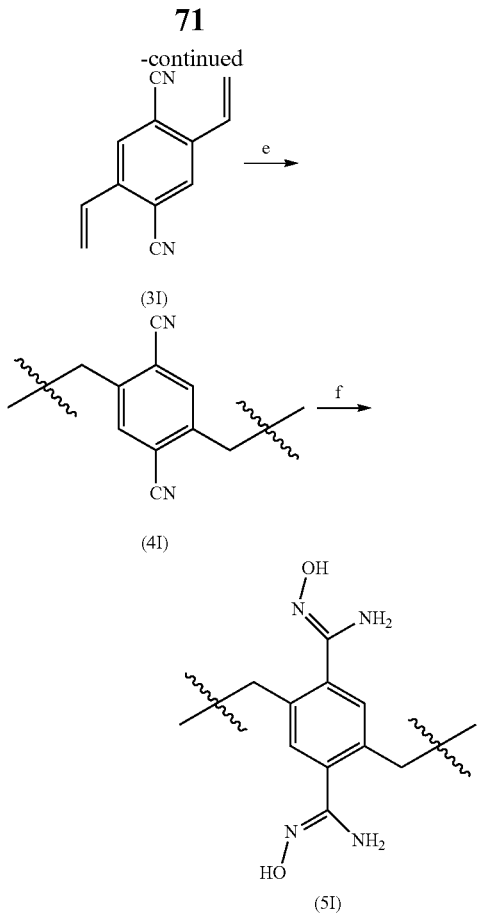

Reagents:
(a) $Cr_2O_3$, $H_2SO_4$, AcOH, $Ac_2O$;
(b) $H_2SO_4$, $H_2O$, EtOH;
(c) $NH_2OH\cdot HCl$, HCOOH, NaOAc;
(d) potassium vinyltrifluoroborate, $Pd(PPh_3)_4$;
(e) AIBN, DMF;
(f) $OH-NH_2\cdot HCl$ 2,5-dibromoterephthalaldehyde (1I): To a suspension containing acetic acid (40 mL), acetic anhydride (80 mL), and 1,4-dibromo-2,5-dimethylbenzene (8.0 g), sulfuric acid (28 mL) was added dropwise at 0° C. $CrO_3$ (12 g) was then added to the mixture in portions. After being stirred vigorously at 0° C. overnight, the resultant mixture was poured into ice-water, filtrated, and washed with water and methanol. The obtained white solid was then hydrolyzed by refluxing in a mixture of water (40 mL), ethanol (40 mL), and $H_2SO_4$ (4 mL) overnight. After being cooled, the pale yellow product was separated by filtration. The crude product was purified by recrystallization form chloroform. Yield: 3.82 g (43%). $^1$H NMR (400 MHz, $CDCl_3$, 298K, TMS): δ 10.17 (s, 2H), 8.10 (s, 2H) ppm.

2,5-dibromoterephthalonitrile (2I): The mixture of 1I (3.5 g, 12 mmol), hydroxylamine hydrochloride (4.17 g, 60 mmol), NaOAc (5.9 g, 72 mmol), and HCOOH (40 mL) was heated to reflux for 24 h. After that, the mixture was poured into ice water and extracted with $CHCl_3$. The organic layer was washed with diluted $NH_3$—$H_2O$ solution and brine and dried over $Na_2SO_4$. After evaporating the solvent, the title compound was obtained as a pale yellow solid (3.1 g, 91%). $^1$H NMR (400 MHz, $d_6$-DMSO, 298K, TMS): δ 8.57 (s, 2H) ppm.

2,5-divinylterephthalonitrile (3I): 2I (2.0 g, 7.0 mmol), potassium vinyltrifluoroborate (2.32 g, 16.8 mmol), $K_2CO_3$ (3.86 g, 28 mmol), and $Pd(PPh_3)_4$ (404 mg, 0.35 mmol) were dissolved in the mixture of toluene (25 mL), THF (25 mL) and $H_2O$ (5 mL) and the resulting mixture was refluxed at 90° C. under $N_2$ atmosphere for 48 h. The residue was extracted with ethyl acetate, washed with brine, dried over $Na_2SO_4$, and evaporated under reduced pressure, giving the crude compound which was purified by flash chromatography with hexane/ethyl acetate (5:1) as eluent to afford the title compound as a light yellow solid. Yield: 0.99 g (78%). $^1$H NMR (400 MHz, $d_6$-DMSO, 298K, TMS): δ 8.40 (s, 1H), 6.87-6.94 (m, 2H), 6.29 (d, 2H, J=16 Hz), 5.70 (d, 1H, J=12 Hz) ppm.

Synthesis of polymer (4I): 3I (1.0 g) was dissolved in THF (20 mL), followed by the addition of free radical initiator azobisisobutyronitrile (AIBN, 0.025 g). The mixture was transferred into an autoclave and maintained for 24 h at 100° C. The polymer was obtained as light yellow solid after being washed with $CH_2Cl_2$ and evaporated solvent under vacuum.

Synthesis of polymer (5I): The polymer 5I was synthesized by treating the polymer 4I (0.2 g) with $NH_2OH\cdot HCl$ (0.495 g) and KOH (0.4 g) in ethanol (20 mL) at 70° C. for 48 h. After being cooled, the polymer 5I as light yellow solid was obtained by filtration, washing with water, and drying at 50° C. under vacuum.

Before the U adsorption tests, the polymer 5I was treated with 3% (w/w) aqueous potassium hydroxide solution at room temperature for 36 h. The product was separated by filtration and washed with water and drying at 50° C. under vacuum.

TABLE 20

Textural parameters of polymer 4I and 5I.

| Polymer | BET Surface Area (m$^2$/g) | Pore Volume (cm$^3$/g) |
|---|---|---|
| 4I | 865 | 0.87 |
| 5I | 682 | 0.62 |

Simulated Seawater Uranium Adsorption Test:

Simulated seawater was prepared as follows: sodium chloride (460.8 g), sodium bicarbonate (3.474 g), and uranium nitrate hexahydrate were dissolved in distilled water (18 L).

The amidoximated polymer was shaked with this stock solution for 24 h at room temperature, and supernatant was then filtered before the determination of the uranium concentration.

| Entry | Adsorbent | Initial U concentration (ppm) | U concentration after adsorption (ppm) | U uptake capacity (mg/g)$^a$ |
|---|---|---|---|---|
| 1 | 5I | 8.508 | 6.934 | 78.7 |

Conditions: simulated sea water (750 mL), adsorbents (15±1 mg), shaking for 24 h.

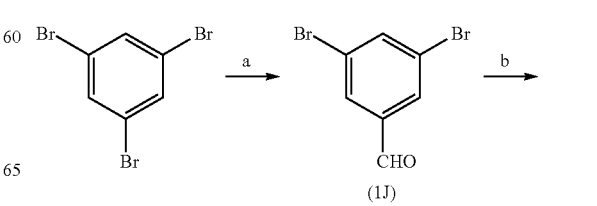

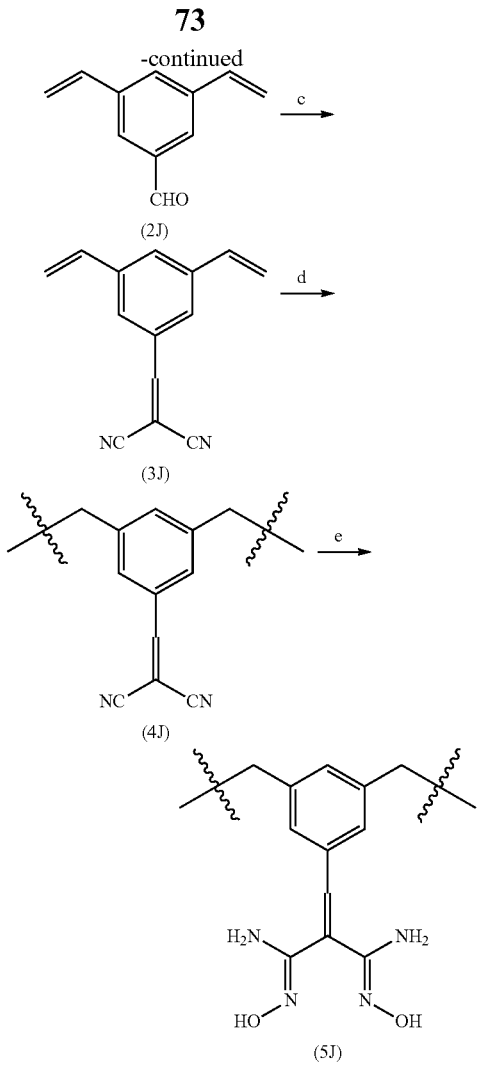

Reagents:
(a) Mg, DMF;
(b) potassium vinyltrifluoroborate, Pd(PPH$_3$)$_4$;
(c) malononitrile, piperdine;
(d) DMF, AIBN;
(e) OH-NH$_2$•HCl 3,5-dibromobenzaldehyde (1J): The compound 1,3,5-tribromobenzene (10 g, 32 mmol) and anhydrous diethyl ether (150 mL) were added to a dried flask. The solution was cooled down to −78° C., and n-BuLi (12.8 mL, 32 mmol, 2.5 M solution in hexane) was added dropwise. After the addition, degassed anhydrous DMF (5.0 mL) diluted in anhydrous diethyl ether (20 mL) was added dropwise, and the reaction stirred at −78° C. for 1 h. The solution was then allowed to reach 0° C. and quenched with HCl (10%). The residue was extracted with ethyl acetate, washed with brine, dried over Na$_2$SO$_4$, and evaporated under reduced pressure, giving the crude compound which was purified by flash chromatography with hexane/ethyl acetate (20:1) as eluent to afford the title compound as white solid. Yield: 6.1 g (72%). $^1$H NMR (400 MHz, d$_6$-DMSO, 298K, TMS): δ 9.92 (s, 1H), 8.19 (s, 1H), 8.07 (s, 2H) ppm.

3,5-divinylbenzaldehyde (2J): 1J (2.62 g, 10 mmol), potassium vinyltrifluoroborate (3.31 g, 24 mmol), K$_2$CO$_3$ (4.14 g, 30 mmol), and Pd(PPh$_3$)$_4$ (287 mg, 0.25 mmol) were dissolved in the mixture of toluene (25 mL), THF (25 mL) and H$_2$O (5 mL) and the resulting mixture was refluxed at 90° C. under N$_2$ atmosphere for 48 h. The residue was extracted with ethyl acetate, washed with brine, dried over Na$_2$SO$_4$, and evaporated under reduced pressure, giving the crude compound which was purified by flash chromatography with hexane/ethyl acetate (10:1) as eluent to afford the title compound as transparent liquid. Yield: 1.01 g (64%).

2-(3,5-divinylbenzylidene)malononitrile (3J): 2J (1.58 g, 10 mmol), malononitrile (0.726, 11 mmol) and three drops of piperidine were dissolved in ethanol (30 mL). The mixture was stirred at 50° C. under N$_2$ atmosphere for 24 h. The residue was extracted with ethyl acetate, washed with brine, dried over Na$_2$SO$_4$, and evaporated under reduced pressure, giving the crude compound which was purified by flash chromatography with hexane/ethyl acetate (5:1) as eluent to afford the title compound as yellow solid. Yield: 1.50 g (73%). $^1$H NMR (400 MHz, d$_6$-DMSO, 298K, TMS): δ 8.50 (s, 1H), 7.88 (s, 2H), 7.86 (s, 1H), 6.73-6.81 (m, 2H), 5.93 (d, 2H, J=20 Hz), 5.41 (d, 2H, J=12 Hz) ppm.

Synthesis of polymer (4J): 3J (1.0 g) was dissolved in DMF (10 mL), followed by the addition of free radical initiator azobisisobutyronitrile (AIBN, 0.025 g). The mixture was transferred into an autoclave and maintained for 24 h at 100° C. The product as light yellow solid was obtained in nearly quantitative yield after extracting of the DMF solvent with EtOH and then drying under vacuum at 50° C. for 24 h.

Synthesis of polymer (5J): The polymer 4J was synthesized by treating the polymer 41 (0.2 g) with NH$_2$OH·HCl (0.495 g) and KOH (0.4 g) in ethanol (20 mL) at 70° C. for 48 h. After cooling down, the polymer 5I as light yellow solid was obtained by filtration, washing with water, and drying at 50° C. under vacuum.

Before the U adsorption tests, the polymer 5I was treated with 3% (w/w) aqueous potassium hydroxide solution at room temperature for 36 h. The product was separated by filtration and washed with water and drying at 50° C. under vacuum.

TABLE 21

Textural parameters of polymer 4J and 5J.

| Polymer | BET Surface Area (m$^2$/g) | Pore Volume (cm$^3$/g) |
|---|---|---|
| 4J | 605 | 0.58 |
| 5J | 585 | 0.78 |

Simulated Seawater Uranium Adsorption Test:

Simulated seawater was prepared as follows: sodium chloride (460.8 g), sodium bicarbonate (3.474 g), and uranium nitrate hexahydrate were dissolved in distilled water (18 L).

The amidoximated polymer was shaked with this stock solution for 24 h at room temperature, and supernatant was then filtered before the determination of the uranium concentration.

| Entry | Adsorbent | Initial U concentration (ppm) | U concentration after adsorption (ppm) | U uptake capacity (mg/g)$^a$ |
|---|---|---|---|---|
| 1 | 5E | 8.508 | 6.63 | 93.7 |

Conditions: simulated sea water (750 mL), adsorbents (15±1 mg), shaking for 24 h.

Example 11: U Adsorption Via Amidoxime Functionalized Covalent Organic Framework

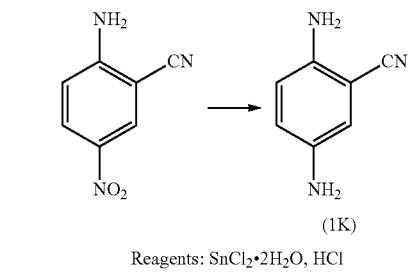

(1K)

Reagents: SnCl$_2$·2H$_2$O, HCl

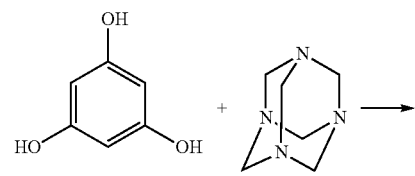

(2K)

Reagents: CF$_3$COOH, HCl

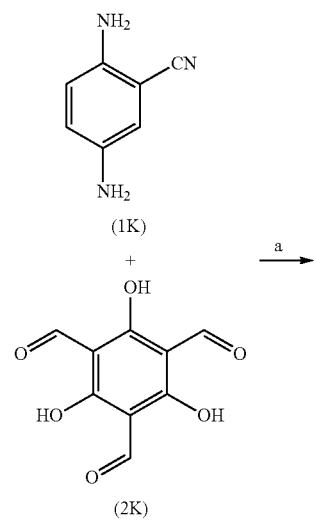

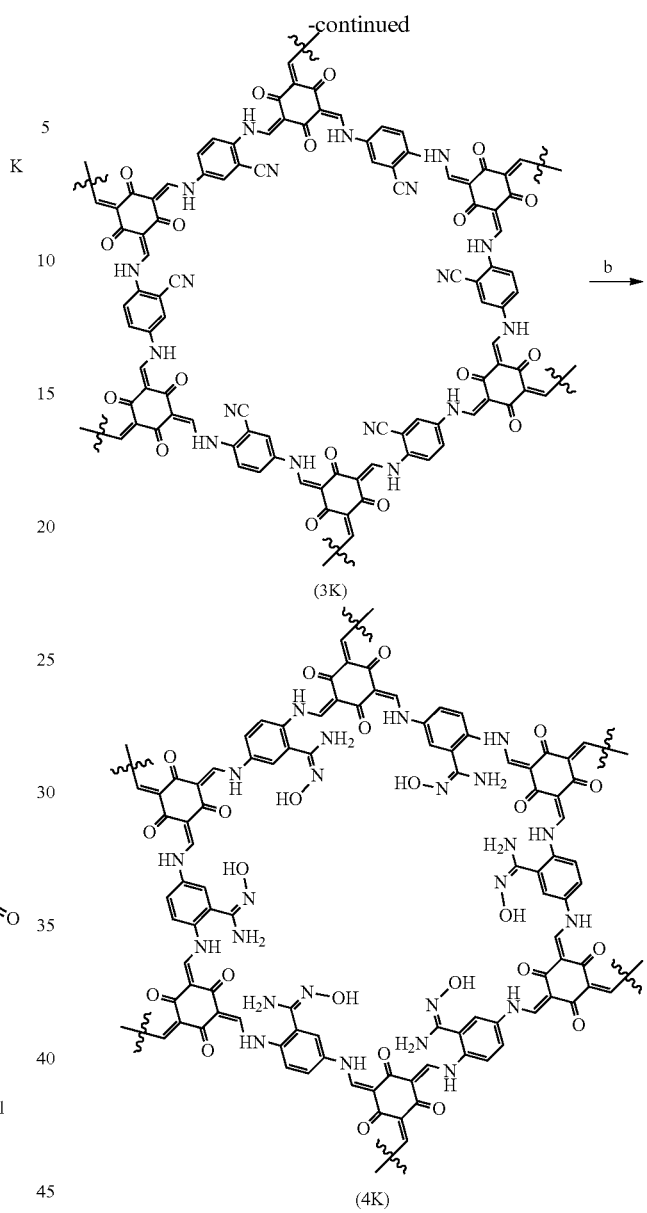

Reagents: (a) 1,4-dioxane, mesitylene, AcOH; (b) OH—NH$_2$·HCl 2,5-Diaminobenzonitrile (1K): 2-Amino-5-nitrobenzonitrile (5.0 g, 30.7 mmol), SnCl$_2$-2H$_2$O (27.7 g, 123 mmol), and concentrated HCl (60 mL) were dissolved in ethanol (100 mL). The resulting mixture was refluxed at 70° C. overnight. After being cooled, the mixture was neutralized by 2 M NaOH and extracted with excess ethyl acetate, dried over K$_2$CO$_3$, and the solution was evaporated under reduced pressure to afford the crude product, which was purified by flash chromatography with hexane/ethyl acetate (2:1) as eluent to give the title compound as brown solid. Yield: 3.75 g (92%). $^1$H NMR (400 MHz, d$_6$-DMSO, 298K, TMS): δ 6.70-6.72 (m, 1H), 6.61 (d, 1H, J=8.0 Hz), 6.56 (d, 1H, J=2.8 Hz), 5.09 (br, 2H), 4.63 (br, 2H) ppm.

Triformylphloroglucinol (2K): Hexamethylenetetraamine (15.1 g, 108 mmol), phloroglucinol (6.0 g, 49 mmol) and trifluoroacetic acid (90 mL) were refluxed at 100° C. under N$_2$ for 2.5 h. After that, 3 M HCl (150 mL) was added slowly, and the mixture was heated at 100° C. for another 1 h. After cooling to room temperature, the solution was filtered through Celite, extracted with excess $CH_2Cl_2$, dried over $MgSO_4$, and the solution was evaporated under reduced pressure to afford the product as light yellow solid. Yield: 1.53 g (14.5%). $^1$H NMR (400 MHz, $d_6$-DMSO, 298K, TMS): δ 9.99 (s, 3H), 6.88 (br, 3H) ppm. $^{13}$C NMR (125 MHz, $CDCl_3$, 298K, TMS) 103.62, 173.76, 191.92 ppm.

Synthesis of COF-CN (3K): A Pyrex tube measuring o.d.×i.d.=9.5×7.5 mm$^2$ was charged with triformylphloroglucinol (21 mg, 0.10 mmol) and 2,5-dinitrobenzonitrile (19.9 mg, 0.15 mmol) in 1.1 mL of a 5:5:1 v:v solution of 1,4-dioxane:mesitylene:6 M aqueous acetic acid. The tube was flash frozen at 77 K (liquid $N_2$ bath), evacuated and flame sealed. Upon sealing the length of the tube was reduced to ca. 15 cm. The reaction mixture was heated at 120° C. for 5 days to afford an orange-red precipitate which was isolated by filtration and washed with anhydrous tetrahydrofuran using soxhlet extraction for 2 days. The product was dried under vacuum at 50° C. to afford COF-CN (38.1 mg, 78%).

Synthesis of COF-AO (4K): The COF-AO was synthesized by treating the COF-CN (200 mg) with $NH_2OH \cdot HCl$ (82 mg) and trimethylamine (120 mg) in methanol (5 mL) at 70° C. for 12 h, and then another portion of $NH_2OH \cdot HCl$ (41 mg) and trimethylamine (60 mg) was introduced. After being cooled, the COF-AO was obtained by filtration, washing with water, and drying at 50° C. under vacuum.

Langmuir sorption isotherms tests: Langmuir sorption isotherms were obtained as follows: Samples of 10 mL water were prepared with uranyl concentrations of 40, 50, 60, 80, 100, 150, 200, 250, 300 and 400 ppm at pH≈6.5 mg of sorbent was added to each sample and with continuously stirring at RT for 12 h. Sorbent was separated by centrifugation, and U concentration in the supernatant was determined by ICP-OES. A sample of U solution without sorbent material was analyzed during each sorption experiment as a negative control. The sorption capacity $q_e$(mg/g) of U was calculated with the following equation $$q_e = \frac{(C_0 - C_e)V}{m}$$

where $C_0$ and $C_e$ are the concentration of U initially and at equilibrium, respectively. V is the volume of solution, and m is the mass of sorbent in solution.

Example 12

Synthesis and Characterization

PAF-1-NH(CH$_2$)$_2$AO

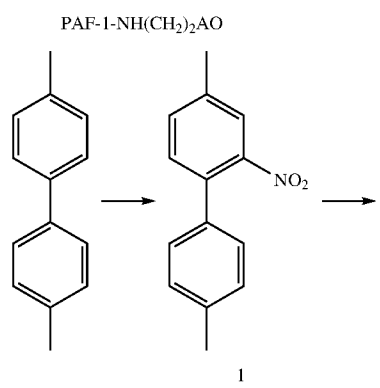

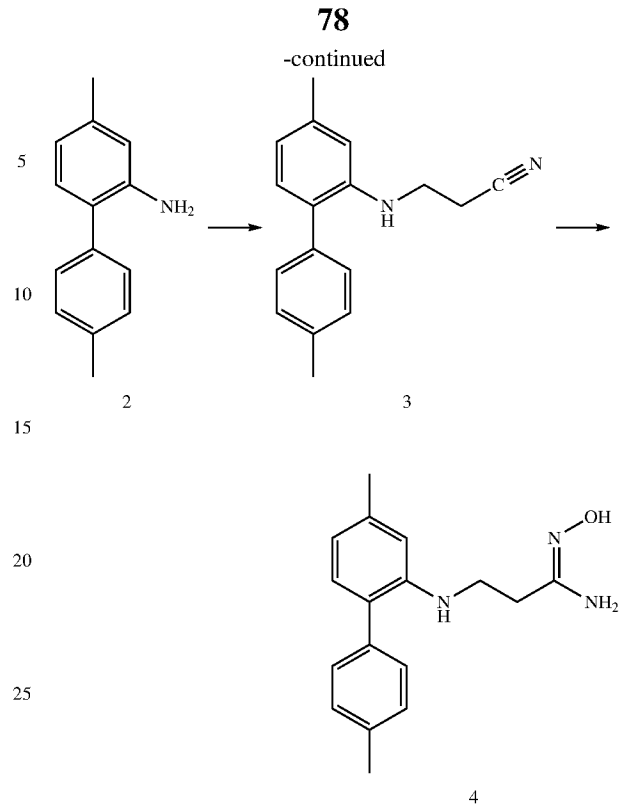

PAF-1-NO$_2$ (1) PAF-1 (100 mg) was dispersed in acetic anhydride (50 mL). The solution was put in an ice bath and 4 drops of sulfuric acid was added slowly. To the solution, nitric acid (3 mL) was gradually added and stirred for 1 hr in an ice bath and then allowed to steadily heat to room temperature while stirring for 24 hr. Additional nitric acid (3 mL) was added while in an ice bath and stirred at room temperature for 24 hr. The solution was poured into ice water and the solid product was formed. The solid was filtered, washed with an excess of water, and dried under vacuum.

PAF-1-NH$_2$ (2)$_1$ (100 mg) and $SnCl_2 \cdot H_2O$ (3.26 g) was placed in ethanol (20 mL) followed by the addition of 4 M HCl (15 mL) and heated to 75° C. for 24 hr. The solution was allowed to cool, filtered, and washed with excess water. The solid was then stirred in a solution of HCl:EtOH, then filtered and washed with water until neutrality was reached. The product was treated with 1 M NaOH followed by filtration and excess washing with water, then dried under vacuum.

PAF-1-NH(CH$_2$)$_2$CN (3) Hydroquinone (110 mg) and anhydrous $AlCl_3$ (2.5 g) were dissolved in acrylonitrile (15 mL). 2 (80 mg) was added to the solution and stirred at 70° C. for 72 hr. The solution was allowed to cool and the solid was filtered and washed with THF. The solid was subsequently treated with 1 M HCl and 1 M NaOH, respectively. The final product was produced after filtration, washing with water, and dried under vacuum.

PAF-1-NH(CH$_2$)$_2$AO (4) 3 (80 mg), $K_2CO_3$ (250 mg), and $NH_2OH$ (50 wt % in $H_2O$, 7.5 mL), were added to ethanol (20 mL) in a Schlenk tube and heated to 75° C. for 72 hr. After cooling, the solution was filtered, washed with water, and dried under vacuum. Elemental analysis: 3.08 mmol amidoxime/g.

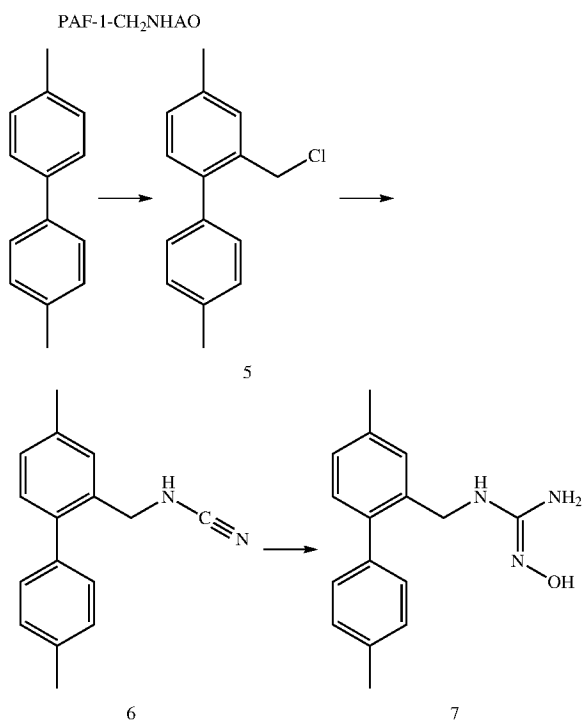

PAF-1-CH$_2$Cl (5) Under an inert atmosphere, PAF-1 (100 mg), chloromethyl methyl ether (0.5 g), and SnCl$_4$ (1 M in DCM, 5 mL), were added to anhydrous DCM (20 mL) and stirred at room temperature for 96 hr. The reaction was quenched by the addition of more DCM. The solution was filtered, washed with DCM and ethanol, and dried under vacuum.

PAF-1-CH$_2$NHCN (6) 5 (100 mg) and NaNHCN (200 mg) were added to ethanol (50 mL) in a Schlenk tube and heated to 75° C. for 72 hr. The solution was cooled and filtered, followed by washing with water and methanol, then dried under vacuum.

PAF-1-CH$_2$NHAO (7) 6 (100 mg), K$_2$CO$_3$ (250 mg), and NH$_2$OH (50 wt % in H$_2$O, 7.5 mL), were added to ethanol (20 mL) in a Schlenk tube and heated to 75° C. for 72 hr. After cooling, the solution was filtered, washed with water, and dried under vacuum. Elemental analysis: 1.35 mmol amidoxime/g.

Uranium Adsorption Experiments

Base Treatment

All adsorbent materials were treated with a 3 wt % potassium hydroxide solution for 24 hr. Following this, the adsorbents were filtered, washed with water, and dried under vacuum prior to uranium adsorption experiments.

A 400 ppm uranium stock solution was made by dissolving 0.5218 g UO$_2$(NO$_3$)$_2$·6H$_2$O in 500 mL deionized water. Dilutions of the stock solution with deionized water were performed to obtain lower concentration solutions. Before adsorption, the pH levels of all solutions were adjusted to 6.0 by aqueous solutions of HNO$_3$ or NaOH. The residual uranium concentration for all experiments was detected by inductively coupled plasma-optical emission spectroscopy (ICP-OES) or, for ppb level concentrations, inductively coupled plasma-mass spectrometry (ICP-MS). All the adsorption experiments were performed at ambient conditions.

Uranium sorption isotherm. To obtain the adsorption isotherm, 5 mg of adsorbent was placed in 10 mL aqueous solutions of increasing uranium concentrations (1-400 ppm). After the solutions were stirred for 24 hr they were filtered through a 0.45 μm membrane filter and the filtrate was analyzed via ICP to determine the residual uranium concentrations. The amount adsorbed or uptake capacity, $q_e$ (mg/g), at equilibrium was calculated using Equation 1

$$q_e = \frac{(C_0 - C_e) \times V}{m} \tag{1}$$

Where $C_0$ and $C_e$ are the initial and equilibrium concentrations, respectively, V is the volume of solution used (mL), and m is the mass of adsorbent (g).

Recyclability test. The uranium-contacted adsorbent was stirred in 1 M Na$_2$CO$_3$ solution (100 mL) overnight. The solid was collected by filtration, washed with deionized water, and dried under vacuum for further use. Subsequent adsorption experiments were performed after base treatment and contacted with a 10 ppm uranium solution at a phase ratio of 40 mL/mg. PAF-1-NH(CH$_2$)$_2$AO maintained an uptake of 301.6 mg/g after the first recycling experiment.

Uranium sorption kinetics. 5 mg of adsorbent was added to an Erlenmeyer flask containing 100 mL of a 5 ppm uranium solution. The mixture was then stirred for 24 hr. At increasing time intervals 3 mL aliquots were removed from the mixture, filtered through a 0.45 μm membrane filter, and the filtrate was analyzed by ICP for the remaining uranium concentration.

Spiked Seawater Adsorption. 15 mg of adsorbent was added to a flask containing 750 mL of a seawater sample spiked with 8 ppm uranium. The mixture was allowed to stir for 7 days and then filtered through a 0.45 μm membrane filter, and the filtrate was analyzed by ICP for the remaining uranium concentration. PAF-1-NH(CH$_2$)$_2$AO was found to adsorb 49.55 mg/g.

Simulated nuclear waste. 5 mg of adsorbent was added to an Erlenmeyer flask containing 200 mL of a simulated nuclear waste solution. The mixture was stirred for 24 hr and then filtered through a 0.45 μm membrane filter and the filtrate was analyzed via ICP to determine the residual uranium concentration. PAF-1-NH(CH$_2$)$_2$AO maintained an uptake of 383.3 mg/g after the adsorption experiment, reducing the uranium concentration to 0.418 ppm.

TABLE 22

Simulated Nuclear Waste Composition

| Metal | Metal Salt | Concentration (ppm) |
|---|---|---|
| Uranium | Uranyl nitrate hexahydrate | 10 |
| Cesium | Cesium chloride | 5 |
| Strontium | Strontium chloride hexahydrate | 5 |
| Barium | Barium chloride dihydrate | 5 |
| Iron | Iron(III) chloride hexahydrate | 5 |
| Copper | Copper(II) chloride dihydrate | 5 |
| Europium | Europium(III) nitrate pentahydrate | 5 |
| Gadolinium | Gadolinium(III) chloride | 5 |
| Terbium | Terbium(III) nitrate hexahydrate | 5 |
| Dysprosium | Dysprosium(III) nitrate pentahydrate | 5 |
| Holmium | Holmium(III) nitrate pentahydrate | 5 |

REFERENCES

[1] a) D. S. Sholl, R. P. Lively, Nature 2016, 532, 435-437; b) Y. Lu, Nat. Chem. 2014, 6.175-177; c) Y. Yue, R. T.

Mayes, J. Kim, P. F. Fulvio, X.-G. Sun, C. Tsouris, J. Chen, S. Brown, S. Dai, *Angew. Chem. Int. Ed.* 2013, 52, 13458-13462; d) C. Liu, P.-C. Hsu, J. Xie, J. Zhao, T. Wu, H. Wang, W. Liu, J. Zhang, S. Chu, Y. Cui, Nature Energy 2017, 2, 17007; e) J. Xie, Y. Wang, W. Liu, X. Yin, L. Chen, Y. Zou, J. Diwu, Z. Chai, T. E. Albrecht-Schmitt, C. Liu, S. Wang, *Angew. Chem. Int. Ed.* 2017, 56, 7500-7504.

[2] a) D. Banerjee, D. Kim, M. J. Schweiger, A. A. Kruger, P. K. Thallapally, *Chem. Soc. Rev.* 2016, 45, 2724-2739; b) A. E. V. Gorden, J. Xu, K. N. Raymond, *Chem. Rev.* 2003, 103, 4207-4282; c) D. J. Yang, Z. Feng, H. Y. Zhu, H. W. Liu, X. P. Gao, *Adv. Mater.* 2008, 20, 2777-2781; d) K. Buesseler, M. Aoyama, M. Fukasawa, *Environ. Sci. Technol.* 2011, 45, 9931-9935; e) E. Macerata, E. Mossini, S. Scaravaggi, M. Mariani, A. Mele, W. Panzeri, N. Boubals, L. Berthon, M.-C. Charbonnel, F. Sansone, A. Arduini, A. Casnati, *J. Am. Chem. Soc.* 2016, 138, 7232-7235; f) S. Wang, E. V. Alekseev, J. Diwu, W. H. Casey, B. L. Phillips, W. Depmeier, T. E. Albrecht-Schmitt, *Angew. Chem. Int. Ed.* 2010, 49, 1057-1060; g) L. Xian, G. Tian, C. M. Beavers, S. J. Teat, D. K. Shuh, *Angew. Chem. Int. Ed.* 2016, 55, 4671-4673.

[3] a) S. Komarneni, N. Kozai, W. J. Paulus, *Nature*, 2001, 410, 771; b) G. E. Fryxell, Y. Lin, S. Fiskum, J. C. Birnbaum, H. Wu. *Environ. Sci. Technol.* 2005, 39, 1324-1331; c) S. Ma, L. Huang, L. Ma, Y. Shim, S. M. Islam, P. Wang, L.-D. Zhao, S. Wang, G. Sun, X. Yang, M. G. Kanatzidis, *J. Am. Chem. Soc.* 2015, 13, 3670-3677; d) L. Ling, W.-x. Zhang, *J. Am. Chem. Soc.* 2015, 137, 2788-2791; e) S. J. Tesh, T. B. Scott, *Adv. Mater.* 2014, 26, 6056-6068; f) H. Yang, M. Luo, L. Luo, H. Wang, D. Hu, J. Lin, X. Wang, Y. Wang, S. Wang, X. Bu, P. Feng, T. Wu, *Chem. Mater.* 2016, 28, 8774-8780; g) C. W. Abeny, K. M. L. Taylor-Pashow, S. R. Russell, Y. Chen, R. Samantaray, J. V. Lockard, W. Lin, *Chem. Mater.* 2014, 26, 5231-5243.

[4] a) W. Chouyyok, J. W. Pittman, M. G. Warner, K. M. Nell, D. C. Clubb, G. A. Gill, R. S. Addleman, *Dalton Trans.* 2016, 45, 11312-11325; b) A. Mellah, S. Chegrouche, M. Barkat, *J. Colloid Interface Sci.* 2006, 296, 434-441.

[5] a) Y. H. Sihn, J. Byun, H. A. Patel, W. Lee, C. T. Yavuz. *RSC Adv.* 2016, 6, 45968-45976; b) N. Sahiner, H. Yu, G. Tan, J. He, V. T. John, D. A. Blake, *ACS Appl. Mater. Interfaces* 2012, 4, 163-170; c) B. Li, Q. Sun, Y. Zhang, C. Abney, B. Aguila, W. Lin, S. Ma, *ACS Appl. Mater. Interfaces* 2017, 9, 12511-12517; d) X. Han, M. Xu, S. Yang, J. Qian, D. Hua, *J. Mater. Chem. A* 2017, 5, 5123-5128.

[6] a) M. Carboni, C. W. Abney, S. Liu, W. Lin, *Chem. Sci.* 2013, 4, 2396-2402; b) W. Yang, Z.-Q. Bai, W.-Q. Shi, L.-Y. Yuan, T. Tian, Z.-F. Chai, H. Wang, Z.-M. Sun, *Chem. Commun.* 2013, 49, 10415-10417; c) Z.-Q. Bai, L.-Y. Yuan, L. Zhu, Z.-R. Liu, S.-Q. Chu, L.-R. Zheng, J. Zhang, Z.-F. Chai, W.-Q. Shi, *J. Mater. Chem. A* 2015, 3, 525-534; d) L. Li, W. Ma, S. Shen, H. Huang, Y. Bai, H. Liu, *ACS Appl. Mater. Interfaces* 2016, 8, 31032-31041.

[7] a) A. P. Côté, A. I. Benin, N. W. Ockwig, M. O'Keeffe, A. J. Matzger, O. M. Yaghi, *Science* 2005, 310, 1166-1170; b) X. Feng, X. Ding, D. Jiang, *Chem. Soc. Rev.* 2012, 41, 6010-6022; c) S.-Y. Ding, W. Wang, *Chem. Soc. Rev.* 2013, 42, 548-568; d) Y. Jin, Y. Hu, W. Zhang, *Nat. Rev. Chem.* 2017, 1, s41570-017; e) Z.-F. Pang, S.-Q. Xu, T.-Y. Zhou, R.-R. Liang, T.-G. Zhan, X. Zhao, Y. Fang, S. De Feyter, D. F. Perepichka, *J. Am. Chem. Soc.* 2017, 139, 2421-2427; g) G. Lin, H. Ding, D. Yuan, B. Wang, C. Wang, *J. Am. Chem. Soc.* 2016, 138, 3302-3305; h) R. P. Bisbey, W. R. Dichtel, *ACS Cent. Sci.* 2017, 3, 533-543.

[8] a) A. G. Slater, A. I. Cooper, *Science* 2015, 348, aaa8075; b) S. Das, P. Heasman, T. Ben, S. Qiu, *Chem. Rev.* 2017, 117, 1515-1563.

[9] a) Q. Sun, B. Aguila, J. Perman, L. D. Earl, C. Abney, Y. Cheng, H. Wei, N. Nguyen, L. Wojtas, S. Ma, *J. Am. Chem. Soc.* 2017, 139, 2786-2793; b) N. Huang, L. Zhai, H. Xu, D. Jiang, *J. Am. Chem. Soc.* 2017, 139, 2428-2434; c) Q. Fang, J. Wang, S. Gu, R. B. Kaspar, Z. Zhuang, J. Zheng, H. Guo, S. Qiu, Y. Yan, *J. Am. Chem. Soc.* 2015, 137, 8352-8355; d) Y. Peng, Y. Huang, Y. Zhu, B. Chen, L. Wang, Z. Lai, Z. Zhang, M. Zhao, C. Tan, N. Yang, F. Shao, Y. Han, H. Zhang, *J. Am. Chem. Soc.* 2017, 139, 8698-8704; e) V. S. Vyas, M. Vishwakarma, I. Moudrakovski, F. Haase, G. Savasci, C. Ochsenfeld, J. P. Spatz, B. V. Lotsch, *Adv. Mater.* 2016, 28, 8749-8754; f) S. Wang, Q. Wang, P. Shao, Y. Han, X. Gao, L. Ma, S. Yuan, X. Ma, J. Zhou, X. Feng, B. Wang, *J. Am. Chem. Soc.* 2017, 139, 4258-4261; g) S. Mitra, H. S. Sasmal, T. Kundu, S. Kandambeth, K. Illath, D. D. Diaz, R. Banerjee, *J. Am. Chem. Soc.* 2017, 139, 4513-4520; h) Y. Lin, X. Jiang, S. T. Kim, S. B. Alahakoon, X. Hou, Z. Zhang, C. M. Thompson, R. A. Smaldone, C. Ke, *J. Am. Chem. Soc.* 2017, 139, 7172-7175.

[10] a) Y. Du, H. Yang, J. M. Whiteley, S. Wan, Y. Jin, S.-H. Lee, W. Zhang, *Angew. Chem. Int. Ed.* 2016, 55, 1737-1741; b) Y. Zeng, R. Zou, Y. Zhao, *Adv. Mater.* 2016, 28, 2855-2873; c) L. A. Baldwin, J. W. Crowe, D. A. Pyles, P. L. McGrier, *J. Am. Chem. Soc.* 2016, 138, 15134-15137; d) Y. Pramudya, J. L. Mendoza-Cortes, *J. Am. Chem. Soc.* 2016, 138, 15204-15313.

[11] a) S. Lin, C. S. Diercks, Y.-B. Zhang, N. Kornienko, E. M. Nichols, Y. Zhao, A. R. Paris, D. Kim, P. Yang, O. M. Yaghi, C. J. Chang, *Science* 2015, 349, 1208-1213; b) H. Xu, J. Gao, D. Jiang, *Nat. Chem.* 2015, 7, 905-912; c) S.-Y. Ding, J. Gao, Q. Wang, Y. Zhang, W.-G. Song, C.-Y. Su, W. Wang, *J. Am. Chem. Soc.* 2011, 133, 19816-19822; d) Q. Sun, B. Aguila, J. A. Perman, N. Nguyen, S. Ma, *J. Am. Chem. Soc.* 2016, 138, 15790-15796; e) X. Wang, X. Han, J. Zhang, X. Wu, Y. Liu, Y. Cui, *J. Am. Chem. Soc.* 2016, 138, 12332-12335.

[12] a) G. H. V. Bertrand, V. K. Michaelis, T.-C. Ong, R. G. Griffin, M. Dincă, *Proc. Natl. Acad. Sci. U.S.A* 2013, 110, 4923-4928; b) M. Calik, F. Auras, L. M. Salonen, K. Bader, I. Grill, M. Handloser, D. D. Medina, M. Dogru, F. Löbermann, D. Trauner, A. Hartschuh, T. Bein, *J. Am. Chem. Soc.* 2014, 136, 17802-17807.

[13] a) M.-L. Feng, D. Sarma, X.-H. Qi, K.-Z. Du, X.-Y. Huang, M. G. Kanatzidis, *J. Am. Chem. Soc.* 2016, 138, 12578-12585; b) Y. Li, L. Wang, B. Li, M. Zhang, R. Wen, X. Guo, X. Li, J. Zhang, S. Li, *ACS Appl. Mater. Interfaces* 2016, 8, 28853-28861; c) S. O. Odoh, G. D. Bondarevsky, J. Karpus, Q. Cui, C. He, R. Spezia, L. Gagliardi, *J. Am. Chem. Soc.* 2014, 136, 17484-17497.

[14] a) C. W. Abney, S. Liu, W. Lin, *J. Phys. Chem. A* 2013, 117, 11558-11565; b) C. W. Abney, R. T. Mayes, M. Piechowicz, Z. Lin, V. S. Bryantsev, G. M. Veith, S. Dai, W. Lin, *Energy Environ. Sci.* 2016, 9, 448-453.

[15] S. Kandambeth, A. Mallick, B. Lukose, M. V. Mane, T. Heine, R. Banerjee, *J. Am. Chem. Soc.* 2012, 134, 19524-19527.

[16] Q. Sun, B. Aguila, S. Ma, *Mater. Chem.* Front. 2017, 1, 1310-1316.

[17] S. Das, S. Brown, R. T. Mayes, C. J. Janke, C. Tsouris, L. J. Kuo, G. Gill, S. Dai, Chem. Eng. J. 2016, 298, 125-135.

[18] S. Vukovic, L. A. Watson, S. O. Kang, R. Custelcean, B. P. Hay, Inorg. Chem. 2012, 51, 3855-3859.

[19] S. P. Kelley, P. S. Barber, P. H. K. Mullins, R. D. Rogers, Chem. Commun. 2014, 50, 12504-12507.

[20] M. J. Manos, M. G. Kanatzidis, J. Am. Chem. Soc. 2012, 134, 16441-16446.

[21] a) L. Zhou, M. Bosscher, C. Zhang, S. Öçubukçu, L. Zhang, W. Zhang, C. J. Li, J. Liu, M. P. Jensen, L. Lai, C. He, Nat. Chem. 2014, 6, 236-241; b) S. Kou, Z. Yang, F. Sun, ACS Appl. Mater. Interfaces 2017, 9, 2035-2039.

[22] M. J. Manos, M. G. Kanatzidis, J. Am. Chem. Soc. 2012, 134, 16441.

[23] S. M. Webb, Sixpack: A Graphical User Interface for Xas Analysis Using Ifeffit. Phys Scripta 2005, T115, 1011-1014.

[24] B. Ravel, M. Newville, Athena, Artemis, Hephaestus: Data Analysis for X-Ray Absorption Spectroscopy Using Ifeffit. J Synchrotron Radiat 2005, 12, 537-541.

[25] J. J. Rehr, R. C. Albers, Theoretical Approaches to X-Ray Absorption Fine Structure. Rev Mod Phys 2000, 72, 621-654.

[26] S. D. Kelly, K. M. Kemner, J. B. Fein, D. A. Fowle, M. I. Boyanov, B. A. Bunker, N. Yee, X-Ray Absorption Fine Structure Determination of Ph-Dependent U-Bacterial Cell Wall Interactions. Geochim Cosmochim Ac 2002, 66, 3855-3871.

[27] S. Calvin, Xafs for Everyone; CRC Press: Boca Raton, F L, 2013.

[28] Sholl, D. S. & Lively, R. P. Seven chemical separations to change the world. Nature 532, 435-437 (2016).

[29] Lu, Y. Uranium extraction: Coordination chemistry in the ocean. Nat. Chem. 6, 175-177 (2014).

[30] Yue, Y.; Mayes, R. T.; Kim, J.; Fulvio, P. F.; Sun, X.-G.; Tsouris, C.; Chen, J.; Brown, S. & Dai, S. Seawater uranium sorbents: preparation from a mesoporous copolymer initiator by atom-transfer radical polymerization. Angew. Chem. Int. Ed. 52, 13458-13462 (2013).

[31] Carboni, M.; Abney, C. W.; Liu, S. & Lin, W. Highly porous and stable metal-organic frameworks for uranium extraction. Chem. Sci. 4, 2396-2402 (2013).

[32] Liu, C.; Hsu, P. C.; Xie, J.; Zhao, J.; Wu, T.; Wang, H.; Liu, W.; Zhang, J.; Chu, S. & Cui, Y. A half-wave rectified alternating current electrochemical method for uranium extraction from seawater. Nat. Energy 2, 17007 (2017).

[33] Feng, M.-L.; Sarma, D.; Qi, X.-H.; Du, K.-Z.; Huang, X.-Y. & Kanatzidis, M. G. Efficient removal and recovery of uranium by a layered organic-inorganic hybrid thiostannate. J. Am. Chem. Soc. 138, 12578-12585 (2016).

[34] Kim, J.; Tsouris, C.; Mayes, R. T.; Oyola, Y.; Saito, T.; Janke, C. J.; Dai, S.; Schneider, E. & Sachde, D. Recovery of uranium from seawater: a review of current status and future research needs. Sep. Sci. Technol. 48, 367-387 (2013).

[35] Buesseler, K.; Aoyama, M. & Fukasawa, M. Impacts of the Fukushima nuclear power plants on marine radioactivity. Environ. Sci. Technol. 45, 9931-9935 (2011).

[36] Bardi, U. Extracting minerals from seawater: an energy analysis. Sustainability 2, 980-992 (2010).

[37] Sather, A. C.; Berryman, O. B. & Rebek, J. Selective recognition and extraction of the uranyl ion from aqueous solutions with a recyclable chelating resin. Chem. Sci. 4, 3601-3605 (2013).

[38] Yang, W.; Bai, Z.-Q.; Shi, W.-Q.; Yuan, L.-Y.; Tian, T.; Chai, Z.-F.; Wang, H. & Sun, Z.-M. MOF-76: from a luminescent probe to highly efficient $U^{VI}$ sorption material. Chem. Commun. 49, 10415-10417 (2013).

[39] Fryxell, G. E.; Lin, Y.; Fiskum, S.; Birnbaum, J. C. & Wu, H. Actinide sequestration using self-assembled monolayers on mesoporous supports. Environ. Sci. Technol. 39, 1324-1331 (2005).

[40] Gunathilake, C.; Górka, J.; Dai, S. & Jaroniec, M. Amidoxime-modified mesoporous silica for uranium adsorption under seawater conditions. J. Mater. Chem. A 3, 11650-11659 (2015).

[41] Sahiner, N.; Yu, H.; Tan, G.; He, J.; John, V. T. & Blake, D. A. Highly porous acrylonitrile-based submicron particles for $UO_2^{2+}$ absorption in an immunosensor assay. ACS Appl. Mater. Interfaces 4, 163-170 (2012).

[42] Lebed, P. J.; Savoie, J.-D.; Florek, J.; Bilodeau, F.; Larivière, D. & Kleitz, F. Large pore mesostructured organosilica-phosphonate hybrids as highly efficient and regenerable sorbents for uranium sequestration. Chem. Mater. 24, 4166-4176 (2012).

[43] Zhou, L.; Bosscher, M.; Zhang, C.; Öçubukçu, S.; Zhang, L.; Zhang, W.; Li, C. J.; Liu, J.; Jensen, M. P.; Lai, L. & He, C. A protein engineered to bind uranyl selectively and with femtomolar affinity. Nat. Chem. 6, 236-241 (2014).

[44] Odoh, S. O.; Bondarevsky, G. D.; Karpus, J.; Cui, Q.; He, C.; Spezia, R. & Gagliardi, L. $UO_2^{2+}$ uptake by proteins: understanding the binding features of the super uranyl binding protein and design of a protein with higher affinity. J. Am. Chem. Soc. 136, 17484-17497 (2014).

[45] Vukovic, S. & Hay, B. P. De novo structure-based design of bis-amidoxime uranophiles. Inorg. Chem. 52, 7805-7810 (2013).

[46] Franczyk, T. S.; Czerwinski, K. R. & Raymond, K. N. Stereognostic coordination chemistry. 1. The design and synthesis of chelators for the uranyl ion. J. Am. Chem. Soc. 114, 8138-8146 (1992).

[47] Slater, A. G. & Cooper, A. I. Function-led design of new porous materials. Science 348, aaa988 (2015).

[48] Das, S.; Heasman, P.; Ben, T. & Qiu, S. Porous organic materials: strategic design and structure-function correlation. Chem. Rev. 117, 1515-1563 (2017).

[49] Xu, Y.; Jin, S.; Xu, H.; Nagai, A. & Jiang, D. Conjugated microporous polymers: design, synthesis and application. Chem. Soc. Rev. 42, 8012-8031 (2013).

[50] Wu, D.; Xu, F.; Sun, B.; Fu, R.; He, H. & Matyjaszewski, K. Design and preparation of porous polymers. Chem. Rev. 112, 3959-4015 (2012).

[51] Li, B.; Zhang, Y.; Ma, D.; Shi, Z. & Ma, S. Mercury nano-trap for effective and efficient removal of mercury (II) from aqueous solution. Nat. Commun. 5, 5537 (2014).

[52] Byun, J.; Patel, H. A.; Thirion, D. & Yavuz, C. T. Charge-specific size-dependent separation of water-soluble organic molecules by fluorinated nanoporous networks. Nat. Commun. 7, 13377 (2016).

[53] Astheimer, L.; Schenk, H. J.; Witte, E. G. & Schwochau, K. Development of sorbers for the recovery of uranium from seawater. Part 2. The accumulation of uranium from seawater by resins containing amidoxime and imidoxime functional groups. Sep. Sci. Technol. 18, 307-339 (1983).

[54] Kelley, S. P.; Barber, P. S.; Mullins, P. H. K. & Rogers, R. D. Structural clues to $UO_2^{2+}/VO_2^+$ competition in seawater extraction using amidoxime-based extractants. Chem. Commun. 50, 12504-12507 (2014).

[55] Eloy, F. & Lenaers, R. The chemistry of amidoximes and related compounds. Chem. Rev. 62, 155-183 (1962).

[56] Bai, Z.-Q.; Yuan, L.-Y.; Zhu, L.; Liu, Z.-R. & Chu, S.-Q. Introduction of amino groups into acid-resistant MOFs for enhanced U(VI) sorption. *J. Mater. Chem. A* 3, 525-534 (2015).

[57] Doidge, E. D.; Carson, I.; Tasker, P. A.; Ellis, R. J.; Morrison, C. A. & Love, J. B. A simple primary amide for the selective recovery of gold from secondary resources. *Angew. Chem. Int. Ed.* 55, 12436-12439 (2016).

[58] Sun, Q.; Dai, Z.; Liu, X.; Sheng, N.; Deng, F.; Meng, X. & Xiao, F.-S. Highly efficient heterogeneous hydroformylation over Rh-metalated porous organic polymers: synergistic effect of high ligand concentration and flexible framework. *J. Am. Chem. Soc.* 137, 5205-5209 (2015).

[59] Sun, Q.; Aguila, B.; Verma, G.; Liu, X.; Dai, Z.; Deng, F.; Meng, X.; Xiao, F.-S. & Ma, S. Superhydrophobicity: constructing homogeneous catalysts into superhydrophobic porous frameworks to protect them from hydrolytic degradation. *Chem* 1, 628-639 (2016).

[60] Das, S.; Brown, S.; Mayes, R. T.; Janke, C. J.; Tsouris, C.; Kuo, L. J.; Gill, G. & Dai, S. Novel poly(imide dioxime) sorbents: development and testing for enhanced extraction of uranium from natural seawater. *Chem. Eng. J.* 298, 125-135 (2016).

[61] Sun, Q.; Dai, Z.; Meng, X. & Xiao, F.-S. Porous polymer catalysts with hierarchical structures. *Chem. Soc. Rev.* 44, 6018-6034 (2015).

[62] Sun, M.-H.; Huang, S.-Z.; Chen, L.-H.; Li, Y.; Yang, X.-Y.; Yuan, Z.-Y. & Su, B.-L. Applications of hierarchically structured porous materials from energy storage and conversion, catalysis, photocatalysis, adsorption, separation, and sensing to biomedicine. *Chem. Soc. Rev.* 45, 3749-3563 (2016).

[63] Pan, H.-B.; Kuo, L.-J.; Wood, J.; Strivens, J.; Gill, G. A.; Janke, C. J. & Wai, C. M. Towards understanding KOH conditioning of amidoxime-based polymer adsorbents for sequestering uranium from seawater. *RSC Adv.* 5, 100715-100721 (2015).

[64] Silver, M. A.; Dorfner, W. L.; Cary, S. K.; Cross, J. N.; Lin, J.; Schelter, E. J. & Albrecht-Schmitt, T. E. Why is uranyl formohydroxamate red. *Inorg. Chem.* 54, 5280-5284 (2015).

[65] The highest uranyl capture capacity from water given by POP-pNH$_2$-AO among the tested adsorbents can be reasonably attributed to the separate coordination between the uranyl-amidoxime and uranyl-amine in POP-pNH$_2$-AO. Interaction between the amino group and uranium is expected due to the successful uranyl extraction solely on an amine-based MOF[13]. However, in the case of POP-oNH$_2$-AO, the amino group participates in the complex formation, serving as a reinforce group to enhance the coordinative interaction between amidoxime and uranyl, which does not bind with uranyl proven by the single crystal structure (see details below).

[66] Barber, P. S.; Kelley, S. P.; Griggs, C. S.; Wallace, S. & Rogers, R. D. Surface modification of ionic liquid-spun chitin fibers for the extraction of uranium from seawater: seeking the strength of chitin and the chemical functionality of chitosan. *Green Chem.* 16, 1828-1836 (2014).

[67] Vukovic, S.; Watson, L. A.; Kang, S. O.; Custelcean, R. & Hay, B. P. How amidoximate binds the uranyl cation. *Inorg. Chem.* 51, 3855-3859 (2012).

[68] Wegner, S. V.; Boyaci, H.; Chen, H.; Jensen, M. P. & He, C. Engineering a uranyl-specific binding protein from NikR. *Angew. Chem. Int. Ed.* 48, 2339-2341 (2009).

[69] Mehio, N.; Lashely, M. A.; Nugent, J. W.; Tucker, L.; Correia, B.; Do-Thanh, C.-L.; Dai, S.; Hancock, R. D. & Bryantsev, V. S. Acidity of the amidoxime functional group in aqueous solution: a combined experimental and computational study. *J. Phys. Chem. B* 119, 3567-3576 (2015).

[70] Mehio, N.; Ivanov, A. S.; Williams, N. J.; Mayes, R. T.; Bryantsev, V. S.; Hancock, R. D. & Dai, S. Quantifying the binding strength of salicylaldoxime-uranyl complexes relative to competing salicylaldoxime-transition metal ion complexes in aqueous solution: a combined experimental and computational study. *Dalton. Trans.* 45, 9051-9064 (2016).

[71] Wang, C. Z.; Lan, J. H.; Wu, Q. Y.; Luo, Q.; Zhao, Y. L.; Wang, X. K.; Chai, Z. F. & Shi, W. Q. Theoretical insights on the interaction of uranium with amidoxime and carboxyl groups. *Inorg. Chem.* 53, 9466-9476 (2014).

[72] Ramamoorthy, S. & Santappa, M. Stability constants of some uranyl complexes. *Bull. Chem. Soc. Jpn.* 41, 1330-1333 (1968).

[73] Martell, A. E. & Smith, R. M. Critical Stability Constant Database, 46; National Institute of Science and Technology (NIST): Gaithersburg, MD, USA, 2003.

[74] Manos, M. J. & Kanatzidis, M. G. Layered metal sulfides capture uranium from seawater. *J. Am. Chem. Soc.* 134, 16441-16446 (2012).

[75] Barber, P. S.; Kelley, S. P. & Rogers, R. D. Highly selective extraction of the uranyl ion with hydrophobic amidoxime functionalized ionic liquids via $\eta^2$ coordination. *RSC Adv.* 2, 8526-8530 (2012).

[76] Zhang, A.; Asakura, T. & Uchiyama, G. The adsorption mechanism of uranium(VI) from seawater on a macroporous fibrous polymeric adsorbent containing amidoxime chelating functional group. *React. Funct. Polym.* 57, 67-76 (2003).

[77] Rao, L. Recent International R&D Activities in the Extraction of Uranium from Seawater Report LBNL-4034E, Lawrence Berkeley National Laboratory, Berkeley, California, USA, Mar. 15 2010.

[78] Bruker. *APEX*3 (Version 2015.9). Bruker AXS Inc., Madison, Wisconsin, USA (2016).

[79] Bruker SAINT V8.35 Å. Data Reduction Software (2016).

[80] Sheldrick, G. M. SADABS. *Program for Empirical Absorption Correction*. University of Gottingen, Germany (1996).

[81] Sheldrick, G. M. "Crystal structure refinement with SHELXL", Acta Cryst. C71, 3-8, (2015).

[82] Sheldrick, G. M. Acta Cryst. A 46, 467-473, (1990).

[83] Sheldrick, G. M. Acta Cryst. A 64, 112-122, (2008).

[84] Sheldrick, G. M. Acta Cryst. A 71, 3-8, (2015).

[85] Dolomanov, O. V.; Bourhis, L. J.; Gildea, R. J.; Howard, J. A. K. & Puschmann, H. OLEX2: A complete structure solution, refinement and analysis program. *J. Appl. Cryst.* 42, 339-341, (2009).

[86] Frisch, M. J. et al. Gaussian, Inc. Wallingford CT, (2009).

[87] Zhao, Y. & Truhlar, D. G. The M06 suite of density functionals for main group thermochemistry, thermochemical kinetics, noncovalent interactions, excited states, and transition elements: two new functionals and systematic testing of four M06-class functionals and 12 other functionals. *Theor. Chem. Acc.* 120, 215-241, (2008).

[88] Dolg, M.; Stoll, H.; Preuss, H. & Pitzer, R. M. Relativistic and correlation effects for element 105 (Hahnium, Ha). A comparative study of M and MO (M=Nb, Ta, Ha) using energy-adjusted ab initio pseudopotentials. *J. Phys. Chem.* 97, 5852, (1993).

[89] Becke, A. D. Density-functional thermochemistry. III. The role of exact exchange. *J. Chem. Phys.* 98, 5648-565, (1993).

[90] Marenich, A. V.; Cramer, C. J. & Truhlar, D. G. Universal solvation model based on solute electron density and on a continuum model of the solvent defined by the bulk dielectric constant and atomic surface tensions. *J. Phys. Chem. B* 113, 6378-6396, (2009).

[91] Vukovic, S.; Hay, B. P. & Bryantsev, V. S. Predicting stability constants for uranyl complexes using density functional theory. *Inorg. Chem.* 54, 3995-4001, (2015).

[92] Mehio, N.; Ivanov, A. S.; Williams, N. J.; Mayes, R. T.; Bryantsev, V. S.; Hancock, R. D. & Dai, S. Quantifying the binding strength of salicylaldoxime-uranyl complexes relative to competing salicylaldoxime-transition metal ion complexes in aqueous solution: a combined experimental and computational study. *Dalton. Trans.* 45, 9051-9064, (2016).

[93] Foster, J. P. & Weinhold, F. "Natural hybrid orbitals." *J. Am. Chem. Soc.* 102, 7211-7218, (1980).

[94] Glendening, E. D.; Landis, C. R. & Weinhold, F. "NBO 6.0: natural bond orbital analysis program." *J. Comput. Chem.* 34, 1429-1437, (2013).

[95] Vyboishchikov, S. F.; Sierraalta, A. & Frenking, G. J. Topological analysis of electron density distribution taken from a pseudopotential calculation. *Comput. Chem.* 18, 416-429, (1997).

[96] Pantazis, D. A.; Chen, X.-Y; Landis, C. R. & Neese, F. All-electron scalar relativistic basis sets for third-row transition metal atoms. *J. Chem. Theory Comput.* 4, 908-919, (2008).

[97] Mehio, N.; Lashely, M. A.; Nugent, J. W.; Tucker, L.; Correia, B.; Do-Thanh, C.-L.; Dai, S.; Hancock, R. D. & Bryantsev, V. S. Acidity of the amidoxime functional group in aqueous solution: a combined experimental and computational study. *J. Phys. Chem. B* 119, 3567-3576, (2015).

[98] Alderighi, L.; Gans, P.; Ienco, A.; Peters, D.; Sabatini, A. & Vacca, A. Hyperquad simulation and speciation (HySS): a utility program for the investigation of equilibria involving soluble and partially soluble species. *Coord. Chem. Rev.* 184, 311-318, (1999).

[99] Ravel, B. & Newville, M. Athena, artemis, hephaestus: data analysis for X-ray absorption spectroscopy using IFEFFIT. *J. Synchrotron Radiat.* 12, 537-541, (2005).

[100] Rehr, J. J. & Albers, R. C. Theoretical approaches to X-ray absorption fine structure. *Rev. Mod. Phys.* 72, 621-654, (2000).

[101] Calvin, S. XAFS forEveryone. CRC Press: Boca Raton, FL, (2013).

[102] Kelly, S. D.; Kemner, K. M.; Fein, J. B.; Fowle, D. A.; Boyanov, M. I.; Bunker, B. A. & Yee, N. X-ray absorption fine structure determination of pH-dependent U-bacterial cell wall interactions. *Geochim. Cosmochim. Acta* 66, 3855-3871, (2002).

[103] Nifenecker, H. *Rep. Prog. Phys.*, 2011, 74, 1-8.

[104] Gupta, C. K.; Singh, H. *Uranium Resource Processing: Secondary Resources*; Springer-Verlag: Berlin, 2003.

[105] Davies, R. V.; Kennedy, J.; McIlroy, R. W.; Spence, R.; Hill, K. M. *Nature*, 1964, 203, 1110-1115.

[106] (a) Seko, N.; Tamada, M.; Yoshii, F. *Nucl. Instrum. Methods Phys. Res., Sect. B,* 2005, 236, 21-29; (b) Chauhan, K.; Chauhan, G. S. *Sep. Sci. Technol.,* 2011, 46, 172-178; (c) Manos, M. J.; Kanatzidis M. G. *J. Am. Chem. Soc.,* 2012, 134, 16441-16446; (d) Comarmond, M. J.; Payne, T. E.; Harrison, J. J.; Thiruvoth, S.; Wong, H. K.; Aughterson, R. D.; Lumpkin, G. R.; Müller, K.; Foerstendorf, H. *Environ. Sci. Technol.,* 2011, 45, 5536-5542; (e) Wu, Z. X.; Zhao, D. Y. *Chem. Commun.,* 2011, 47, 3332-3338; (f) Vivero-Escoto, J. L.; Carboni, M.; Abney, C. W.; deKrafft, K. E.; Lin, W. *Micropor. Mesopor. Mater.,* 2013, 180, 22-31; (f) Liang, C.; Li, Z.; Dai, S. *Angew. Chem., Int. Ed.,* 2008, 47, 3696-3717; (g) Carboni, M.; Abney, C. W.; Taylor-Pashow, K. M. L.; Vivero-Escoto, J. L.; Lin, W. *Ind. Eng. Chem. Res.,* 2013, 52, 15187-15197; (h) Rogers, R. D.; Seddon, K. R. *ACS Symposium Series* 818, American Chemical Society, Washington D.C., 2002; (i) Sun, X.; Luo, H.; Dai, S. *Chem. Rev.,* 2012, 112, 2100-2128.

[107] Kim, J.; Tsouris, C.; Mayes, R. T.; Oyola, Y.; Saito, T.; Janke, C. J.; Dai, S.; Schneider, E.; Sachde, D. *Separ. Sci. Technol.,* 2013, 48, 367-387.

[108] (a) Cooper, A. I. *Adv. Mater.* 2009, 21, 1291-1295; (b) Xu, Y.; Jin, S.; Xu, H.; Nagai, A.; Jiang, D. *Chem. Soc. Rev.,* 2013, 42, 8012-8031.

[109] Zhou, H.-C.; Long, J. R.; Yaghi, O. M. *Chem. Rev.* 2012, 112, 673-674.

[110] Feng, X.; Ding, X.; Jiang, D. *Chem. Soc. Rev.,* 2012, 41, 6010-6022.

[111] (a) Zou, X.; Ren, H.; Zhu, G. *Chem. Commun.,* 2013, 49, 3925-3936; (b) Lu, W.; Sculley, J.; Yuan, D.; Krishna, R.; Wei, Z.; Zhou, H.-C., *Angew. Chem. Int. Ed.,* 2012, 51, 7480-7484.

[112] (a) Ben, T.; Ren, H.; Ma, S.; Cao, D.; Lan, J.; Jing, X.; Wang, W.; Xu, J.; Deng, F.; Simmons, J. M.; Qiu, S.; Zhu, G., *Angew Chem. Int. Ed.,* 2009, 48, 9457-9460; (b) Yuan, D.; Lu, W.; Zhao, D.; Zhou, H.-C. *Adv. Mater.* 2011, 23, 3723-3725.

[113] (a) Lu, W.; Verdegaal, W. M.; Yu J.; Balbuena, P. B.; Jeong, H.-K.; Zhou, H.-C, *Energy Environ. Sci.,* 2013, 6, 3559-3564; (b) Zhu, Y.; Long, H.; Zhang, W. *Chem. Mater.* 2013, 25, 1630-1635; (c) Wang, X.-S.; Liu, J.; Bonefont, J. M.; Yuan, D.-Q.; Thallapally, P. K. Ma, S. *Chem. Commun.* 2013, 49, 1533-1535.

[114] Yue, Y.; Mayes, R. T.; Kim, J.; Fulvio, P. F.; Sun, X.-G.; Tsouris, C.; Chen, J.; Brown, S.; Dai, S. *Angew. Chem. Int. Ed.,* 2013, 52, 13458-13462.

[115] Carboni, M.; Abney, C. W.; Liu, S.; Lin, W. *Chem. Sci.,* 2013, 4, 2396-2402.

[116] (a) Yaghi, O. M.; O'Keeffe, M.; Ockwig, N. W.; Chae, H. K.; Eddaoudi, M.; Kim, *J. Nature* 2003, 423, 705-714; (b) Li, M.; Li, D.; O'Keeffe, M.; Yaghi, O. M. *Chem. Rev.,* 2014, 114, 1343-1370.

[117] Perego, C.; Ingallina, P. *Green Chem.* 2004, 6, 274-279.

[118] (a) Eloy, F.; Lenaers, R. *Chem. Rev.,* 1962, 62, 155-183; (b) Gordon, A. E.; Xu, J.; Raymond, K. N.; Durbin, P. *Chem. Rev.,* 2003, 103, 4207-4282; (c) Sawicki, M.; Siaugue, J. M.; Jacopin, C.; Moulin, C.; Bailly, T.; Burgada, R.; Meunier, S.; Baret, P.; Pierre, J. L.; Taran, F. *Chem.-Eur. J.* 2005, 11, 3689-3697.

[119] Yamamoto, T. *Bull. Chem. Soc. Jpn.* 1999, 72, 621-638.

[120] Chui, S. S.-Y.; Lo, S. M.-F.; Charmant, J. P. H.; Orpen, A. G.; Williams, I. D. *Science,* 1999, 283, 1148-1150.

[121] Akira. S.; Miyaura, N. *Chem. Rev.,* 1995, 95, 2457-2483.

[122] Zhou, L.; Bosscher1, M.; Zhang, C.; Ozcubukcu1, S.; Zhang, L.; Zhang, W.; Li, C. J.; Liu, J.; Jensen, M. P.; Lai, L.; He, C. *Nature Chem.,* 2014, 6, 236-241.

[123] (a) Bagherifam, S.; Lakziam, A.; Ahmadi, S. J.; Rahimi, M. F.; Halajnia, A. *J. Radioanal. Nucl. Chem.* 2010, 283, 289-296; (b) Camacho, L. M.; Deng, S.; Parra, R. R. *J. Hazard. Mater.,* 2010, 175, 393-398.

[124] Sato, I.; Kudo, H.; Tsuda, S. *J. Toxicol. Sci.,* 2011, 36, 829-834.
[125] Yang, R. T. *adsorbents fundamentals and applications*; John Wiley & Sons, Inc.: New Jersey, 2003.
[126] Rudzinski, W.; Plazinski, W. *J. Phys. Chem. B,* 2006, 110, 16514-16525.
[127] Mellah, A.; Chegrouche, S.; Barkat, M. *J. Colloid Interface Sci.,* 2006, 296, 434-441.
[128] Kim, J.; Oyola, Y.; Tsouris, C.; Hexel, C. H.; Mayes, R. T.; Janke, C. J.; Dai, S. *Ind. Eng. Chem. Res.,* 2013, 52, 9433-9440.

We claim:

1. A composition for uranium uptake, the composition comprising a porous organic polymer (POP) comprising:
    (i) a plurality of repeat units each having a structure according to any one of Formula 1A-Formula 1C

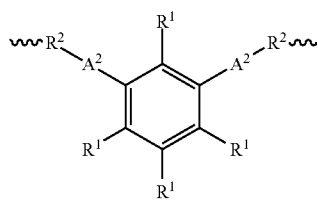

Formula 1A

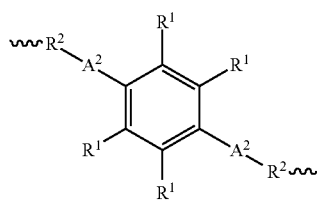

Formula 1B

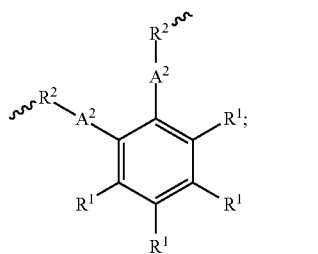

Formula 1C and
    (ii) a plurality of pores having a hierarchical pore size distribution over a range of pore sizes;
    where each occurrence of $R^1$ is independently a hydrogen, a halide, an alkyl or heteroalkyl having 1 to 3 carbon atoms, a hydrogen-bond donor, an amidoxime, or an amidrazone so long as at least one occurrence of $R^1$ is an amidoxime or an amidrazone;
    where each occurrence of $R^2$ is independently an alkyl having 1 to 3 carbon atoms; and
    where each occurrence of $A^2$ is independently none or a substituted or unsubstituted phenyl.

2. The composition according to claim 1, wherein the repeat units in the plurality of repeat units each have a structure according to any one of Formula 2A-Formula 2C

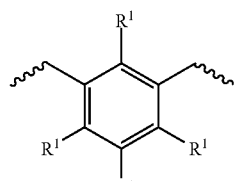

Formula 2A

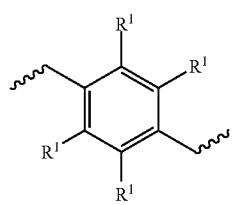

Formula 2B

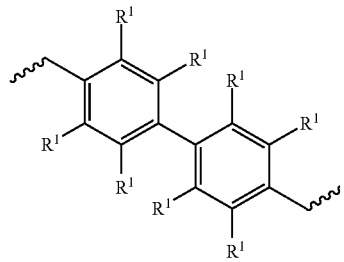

Formula 2C where $R^1$ is as defined in claim 1.

3. The composition according to claim 1, wherein each occurrence of $R^1$ is independently a hydrogen, a hydrogen-bond donor, or an amidoxime;
    wherein as at least one occurrence of $R^1$ is an amidoxime; and
    wherein at least one occurrence of $R^1$ is a hydrogen-bond donor.

4. The composition according to claim 1, wherein the range of pore sizes is at least 5 nm, at least 8 nm, or at least 10 nm.

5. The composition according to claim 1, wherein the range of pore sizes is about 1 nm to 10 nm, about 1 nm to 8 nm, about 1 nm to 5 nm, or about 5 nm to 10 nm.

6. The composition according to claim 1, wherein the range of pore sizes is about 1 nm to about 10 nm; and
    wherein at least 80% of the pore sizes in the pore size distribution have a pore volume of at least 0.01 cm$^3$ g$^{-1}$.

7. A method of making the composition of claim 1, the method comprising:
    forming a mixture comprising a precursor monomer and a free radical initiator in an aprotic solvent, wherein the precursor monomer has a structure according to the formula $CH_2=CHA^1CH=CH_2$ where $A^1$ is a conjugated core having one or more nitrile moieties covalently attached thereto;
    heating the mixture to a first elevated temperature for a first period of time to form the porous organic polymer having nitrile moieties covalently attached thereto; and
    converting the nitrile moieties into an amidoxime or an amidrazone to form the porous organic polymer having one or more amidoxime or amidrazone moieties covalently attached thereto.

* * * * *